(12) United States Patent
Takashima

(10) Patent No.: US 8,094,992 B2
(45) Date of Patent: Jan. 10, 2012

(54) INFORMATION RECORDING DEVICE AND METHOD, PROGRAM STORAGE MEDIUM, AND PROGRAM

(75) Inventor: Yoshikazu Takashima, Tokyo (JP)

(73) Assignee: Sony Corporation, Tokyo (JP)

( * ) Notice: Subject to any disclaimer, the term of this patent is extended or adjusted under 35 U.S.C. 154(b) by 430 days.

(21) Appl. No.: 11/629,050

(22) PCT Filed: Jun. 9, 2005

(86) PCT No.: PCT/JP2005/010579
§ 371 (c)(1),
(2), (4) Date: Oct. 1, 2008

(87) PCT Pub. No.: WO2005/122169
PCT Pub. Date: Dec. 22, 2005

(65) Prior Publication Data
US 2009/0116349 A1  May 7, 2009

(30) Foreign Application Priority Data

Jun. 11, 2004 (JP) .................................. 2004-174631
Sep. 13, 2004 (JP) .................................. 2004-264837
Dec. 14, 2004 (JP) .................................. 2004-362050

(51) Int. Cl.
*H04N 9/80* (2006.01)
*G11B 20/18* (2006.01)
*G11B 27/36* (2006.01)
*G11B 7/24* (2006.01)

(52) U.S. Cl. ..... 386/239; 386/248; 386/263; 369/53.17; 369/53.21; 369/275.2

(58) Field of Classification Search ............... 369/53.15, 369/53.14, 53.17, 53.19, 53.21, 275.2; 386/239, 386/248, 263
See application file for complete search history.

(56) References Cited

U.S. PATENT DOCUMENTS
6,373,800 B1 * 4/2002 Takahashi .................. 369/53.15
(Continued)

FOREIGN PATENT DOCUMENTS
JP         5 46456       2/1993
(Continued)

OTHER PUBLICATIONS

"Universal Disk Format Specification", Revision 2.50, Optical Storage Technology Association, 2003.

(Continued)

*Primary Examiner* — Vincent Boccio
(74) *Attorney, Agent, or Firm* — Oblon, Spivak, McClelland, Maier & Neustadt, L.L.P.

(57) ABSTRACT

The present invention relates to an information recording device and method, a program storage medium, and a program, wherein updated file system information can be recorded without changing a logical address. As shown to the upper side in FIG. 18, in the event that data has been recorded, upon a file (Files (Stream+DB)) recorded in region B112 being updated, an updated file is recorded at region B112' as shown at the middle in FIG. 18. In conjunction with this, main FS (FS (Metadata)), inner side volume structure information, and anchor information, which had been recorded in region B111 until this time, is rendered unreadable, and newly-generated file system information (FS (Metadata)), inner side volume structure information, and anchor information, are recorded in region B111' in an ISA which is an inner side SA region. The present invention can be applied to a Blu-Ray Disc recording/playing device.

8 Claims, 69 Drawing Sheets

U.S. PATENT DOCUMENTS

| | | | |
|---|---|---|---|
| 6,553,180 B1 * | 4/2003 | Kikuchi et al. | 386/95 |
| 6,581,167 B1 * | 6/2003 | Gotoh et al. | 714/7 |
| 2002/0184440 A1 * | 12/2002 | Park et al. | 711/112 |
| 2003/0076764 A1 * | 4/2003 | Iwano et al. | 369/99 |
| 2005/0207305 A1 * | 9/2005 | Park | 369/53.29 |
| 2008/0215803 A1 * | 9/2008 | Tanaka | 711/103 |

FOREIGN PATENT DOCUMENTS

| | | |
|---|---|---|
| JP | 6 103577 | 4/1994 |
| JP | 11 7731 | 1/1999 |
| JP | 2000 293948 | 10/2000 |
| JP | 2001 167527 | 6/2001 |
| JP | 2001 243096 | 9/2001 |
| JP | 2003 208759 | 7/2003 |
| JP | 2004-079125 | 3/2004 |

OTHER PUBLICATIONS

"Universal Disk Format Specification", Revision 2.60, Optical Storage Technology Association, 2005.

* cited by examiner

FIG. 8

| LSN | Structure | Descriptors | LBN |
|---|---|---|---|
| 0 TO 15 | — | Reserved | |
| 16 TO 18 | Volume Recognition Sequence | — | |
| 19 TO 31 | — | Reserved | |
| 32 | Main Volume Descriptor Sequence | Primary Volume Descriptor | |
| 33 | | Implementation Use Volume Descriptor | |
| 34 | | Partition Descriptor | |
| 35 | | Logical Volume Descriptor ③ | |
| 36 | | Unallocated Space Descriptor | |
| 37 | | Terminating Descriptor | |
| 38 TO 47 | | Trailing Logical Sectors | |
| 48 | Logical Volume Integrity Sequence | Logical Volume Integrity Descriptor ④ | |
| 49 | | Terminating Descriptor | |
| 50 TO 63 | | Trailing Logical Sectors | |
| 64 TO 255 | — | Reserved | |
| 256 | Anchor-1 | Anchor Volume Descriptor Pointer ① | |
| 257 TO 271 | Partition | Reserved | |
| 272 TO LSNall-272 | | File Structure and Files ⑤ | 0 TO LBNall |
| LSNall-271 TO LSNall-257 | | Reserved | |
| LSNall-256 | Anchor-2 | Anchor Volume Descriptor Pointer | |
| LSNall-255 TO LSNall-224 | | Reserved | |
| LSNall-223 TO LSNall-208 | Reserved Volume Descriptor Sequence | (SAME AS Main Volume Descriptor Sequence) | |
| LSNall-207 TO LSNall-1 | | Reserved | |
| LSNall | Anchor-3 | Anchor Volume Descriptor Pointer | |

INFORMATION RECORDING DEVICE AND METHOD, PROGRAM STORAGE MEDIUM, AND PROGRAM

TECHNICAL FIELD

The present invention relates to an information recording device and method, a program storage medium, and a program, and particularly relates to an information recording device and method, a program storage medium, and a program, wherein, in the event of updating a file system, the updated file system can be easily recorded or read out without changing a logical address, by recording in a replacement region on the recording medium or in a user region, as a replacement of the updated file system.

BACKGROUND ART

Technology for recording files in large-capacity recording media is becoming commonplace.

Also, various formats for recording files in such large-capacity recording media have been proposed.

For example, there is the UDF (Universal Disc Format) which is used with DVD (Digital Versatile Disc) (for example, see Universal Disk Format Specification Revision 2.50 Apr. 30, 2003 Optical Storage Technology Association, and Universal Disk Format Specification Revision 2.60 February, 2003 Optical Storage Technology Association (approval expected February, 2005)).

DISCLOSURE OF INVENTION

Problems to be Solved by the Invention

Now, with the aforementioned UDF standard (Ver. 2.50 and later), a function has been added wherein the file system information is kept together in a region called a metadata partition, so as to be situated at a logical address within the metadata partition.

However, with write-at-once media (recording media capable of recording only once), upon the recorded files or file system being updated, this is recorded on a new region on the recording medium, so the logical address needs to be rewritten accordingly.

For example, with the case of Blu-Ray Disc (hereafter also referred to as BD) corresponding to the UDF standard (Ver. 2.50 and later), files and file system information are recorded as shown at the upper side of FIG. 1. Here, FIG. 1 illustrates an example of the recorded state of a BD write-at-once medium (hereafter also called Blu-Ray Disc-Recordable: BD-R). In FIG. 1, the LSN (Logical Sector Number (=logical address)) is set from the left in the drawing, and at the upper side of FIG. 1, the region set as volume space is 0 through N. The region at the head position of the LSN described as "Reserved" indicates the reservation region. The region described as "VRS (Volume Recognition Sequence)" indicates a region where information for identifying the file system type is recorded. The region described as "Files (Stream+DB)" indicates a region where stream data recorded or played by an application program for recording or playing stream data to/from the BD, and database information used for the playing processing, are recorded. The region described as "Files (other than BD management)" indicates a region where data recorded by a program other than the application program for recording or playing stream data to/from the BD is recorded. The region described as "FS (Metadata)" indicates a region where file system information is recorded as metadata. The two regions described as "Anchor" indicate regions where anchor information is recorded. The region described as "Volume Str. (Volume Structure)" indicate a region where volume structure information is recorded. Note that the region described as "Files (Stream+DB)" is also called region B0. Also, the regions described as "FS", "Anchor", and "Volume Str." are also collectively called region B1.

For example, in the event that stream data is additionally written to the BD-R in the state shown to the upper side of FIG. 1, such that the database information thereof is updated, information is recorded in the BD-R as can be seen to the lower side of FIG. 1.

That is to say, the new stream data additionally written to the information described in the region B0, and the playback database information thereof, are recorded in the region B0'. Further, the file system information (hereafter also referred to as FS) updated by newly additionally recording information in the following region B0', and anchor information and volume structure information corresponding to the FS, are recorded in the region B2. At this time, the FS information and the anchor information and volume structure information corresponding to the FS recorded in region B1 are rendered unreadable.

Accordingly, the logical address which is the write position information needs to be re-recorded each time a file or the file system is updated, so there has been the problem that this makes file system updating processing troublesome.

The present invention has been made in light of this situation, and in particular updates file system information without changing the logical address, by recording updated file system information (FS) provided as a standard for file formats such as UDF, as a replacement for pre-update file system information, in a replacement region or user region, thereby facilitating updating processing of file systems with write-at-once media such as BD-R, for example.

Means for Solving the Problems

A first information recording device according to the present invention comprises: initialization means for setting a replacement region and a user region, and also initializing a recording medium; and setting means for setting a track where a file is recorded in the user region, according to attributes of the file; wherein the setting means set, in the user region, a track where at least information of the placement of the file recorded in the recording medium is recorded.

The setting means may set, in the user region, a track for recording each of a main file and a mirror file, made up of information of the placement of the file recorded in the recording medium.

The setting means may set, in the user region, a track for recording a management file made up of information for managing the file, in addition to the information of the placement of the file recorded in the recording medium.

The setting means may set, in the user region, a track for recording an original management file made up of information for managing the file, and a backup management *file, in addition to the information of the placement of the file recorded in the recording medium.

A first information recording method according to the present invention comprises: an initialization step for setting a replacement region and a user region, and also initializing a recording medium; and a setting step for setting a track where a file is recorded in the user region, according to attributes of the file; wherein the processing in the setting step sets, in the user region, a track where at least information of the placement of the file recorded in the recording medium is recorded.

A first program of a storage medium according to the present invention comprises: an initialization control step for controlling setting of a replacement region and a user region, and also initializing a recording medium; and a setting control step for controlling setting of a track where a file is recorded in the user region, according to attributes of the file; wherein the processing in the setting control step controls setting of, in the user region, a track where at least information of the placement of the file recorded in the recording medium is recorded.

A first program according to the present invention causes a computer to execute: an initialization control step for controlling setting of a replacement region and a user region, and also initializing a recording medium; and a setting control step for controlling setting of a track where a file is recorded in the user region, according to attributes of the file; wherein the processing in the setting control step controls setting of, in the user region, a track where at least information of the placement of the file recorded in the recording medium is recorded.

A second information recording device according to the present invention comprises: initialization means for setting a replacement region and a user region, and also initializing a recording medium; setting means for setting a track where a file is recorded in the user region, according to attributes of the file; recording means for recording a file on a predetermined track set on the recording medium, based on the attributes of the file; and control means for controlling the recording means so as to record information of the placement of the file recorded to the recording medium; wherein, in the event that the file is additionally written to the recording medium, or the file recorded thereupon is updated, the control means control the recording means to record, information of the placement on the recording medium, and the file, at a region of the predetermined track set by the setting means, as information of placement on the recording medium before the updating, and as a replacement for the file, based on the attributes of the file.

The recording medium may be for write-once recording.

The recording medium may be a write-once optical disk recorded and played using blue-violet laser.

The file may be a file managed by UDF.

In the event that information of the placement on the recording medium is updated, the control means may control the recording means so as to record information of the placement on the recording medium, and the file, at a track set by the setting means, as information of placement on the recording medium before the updating, and as a replacement for the file, based on the attributes of the file, without changing information of placement on the recording medium, and the logical address of the recording position of the file.

The initialization means may initialize a recording medium, fixedly setting the placement of at least one or more of volume structure information, anchor information, and file structure information, of the information of placement on the recording medium; wherein, in the event that the placement information on the recording medium has been updated, the control means control the recording means so as to record at least one or more of volume structure information, anchor information, and file structure information, of the information of placement on the recording medium, regarding which the placement is fixedly set by the initialization means, as a replacement for information of placement on the recording medium before updated, at the replacement region or user region.

The initialization means may initialize a recording medium, fixedly setting to the head portion of the volume space the placement of at least one or more of volume structure information, anchor information, and file structure information, of the information of placement on the recording medium; wherein, in the event that the placement information on the recording medium has been updated, the control means control the recording means so as to record at least one or more of volume structure information, anchor information, and file structure information, of the information of placement on the recording medium, regarding which the placement is fixedly set to the head portion of the volume space by the initialization means, as a replacement for information of placement on the recording medium before updated, at the replacement region or user region.

The control means may control the recording means so as to record the file at the replacement region set by the setting means or in the user region, based on the attributes of the file.

The initialization means may set a DL (Defect List) in addition to a replacement region and user region, and also initialize the recording medium.

The information recording device may further comprise: DL updating means for updating a replacement origin and replacement target of the DL in cluster units; and re-situating means for re-situating the replacement target of the DL such that the clusters are sequential at the replacement target in the DL, of which the replacement target and replacement origin have been updated in cluster units by the updating means; wherein, in the event that placement information on the recording medium has been updated, the control means control the recording means so as to record information of placement on the recording medium as a replacement for information of placement on the recording medium before the updating, at the replacement region or user region, based on the DL re-situated by the re-situating means such that the clusters of the replacement target are sequential.

A second information recording method according to the present invention comprises: an initialization step for setting a replacement region and a user region, and also initializing a recording medium; a setting step for setting a track where a file is recorded in the user region, according to attributes of the file; a recording step for recording a file on a predetermined track set on the recording medium, based on the attributes of the file; and a control step for controlling the processing in the recording step so as to record information of the placement of the file recorded to the recording medium; wherein, in the event that the file is additionally written to the recording medium, or the file recorded thereupon is updated, the processing in the control step controls the processing in the recording step so as to record, information of the placement on the recording medium, and the file, at a region of the predetermined track set in the processing of the setting step, as information of placement on the recording medium before the updating, and as a replacement for the file, based on the attributes of the file.

A second program of a storage medium according to the present invention comprises: an initialization control step for controlling setting of a replacement region and a user region, and also initializing a recording medium; a setting control step for controlling setting of a track where a file is recorded in the user region, according to attributes of the file; a recording control step for controlling of recording a file on a predetermined track set on the recording medium, based on the attributes of the file; and an action control step for controlling actions in the recording control step so as to record information of the placement of the file recorded to the recording medium; wherein, in the event that the file is additionally written to the recording medium, or the file recorded thereupon is updated, the processing in the action control step controls action of the processing in the recording control step so as to record, information of the placement on the recording medium, and the file, at a region of the predetermined track set in the processing of the setting control step, as information of placement on the recording medium before the updating, and as a replacement for the file, based on the attributes of the file.

A second program according to the present invention causes a computer to execute: an initialization control step for controlling setting of a replacement region and a user region, and also initializing a recording medium; a setting control step for controlling setting of a track where a file is recorded in the user region, according to attributes of the file; a recording control step for controlling of recording a file on a predetermined track set on the recording medium, based on the attributes of the file; and an action control step for controlling actions in the recording control step so as to record information of the placement of the file recorded to the recording medium; wherein, in the event that the file is additionally written to the recording medium, or the file recorded thereupon is updated, the processing in the action control step controls action of the processing in the recording control step so as to record, information of the placement on the recording medium, and the file, at a region of the predetermined track set in the processing of the setting control step, as information of placement on the recording medium before the updating, and as a replacement for the file, based on the attributes of the file.

With the first information recording device and method, and first program according to the present invention, a replacement region and a user region are set and a recording medium is initialized, a track where a file is recorded is set in the user region, according to attributes of the file, and a track where at least information of the placement of the file recorded in the recording medium is recorded in the user region.

With the second information recording device and method, and program according to the present invention, a replacement region and a user region are set and a recording medium is initialized, a track where a file is recorded is set in the user region, according to attributes of the file, a file is recorded on a predetermined track set on the recording medium, based on the attributes of the file, information of the placement of the file recorded to the recording medium is recorded, and in the event that a file is additionally written to the recording medium, or the file recorded thereupon is updated, the information of the placement on the recording medium, and the file, are recorded at a set region of the predetermined track, as information of placement on the recording medium before the updating, and as a replacement for the file, based on the attributes of the file.

The information recording device according to the present invention may be an independent device, or may be a block which performs information recording processing.

ADVANTAGES

According to the present invention, file system information can be updated at the same logical address, so there is no need to update the logical address when updating file system information, thereby facilitating updating of the file system information with write-at-once media. Also, at the time of recording post-update file system information as a replacement for pre-update file system information, a DL wherein replacement origin and replacement target information is sorted in increments of clusters can be generated and recorded. Further, files are recorded on tracks set for each file attribute, thereby enabling files to be read out at high speed, and according to the placement thereof, endurance regarding damage to the recording medium can be improved.

BRIEF DESCRIPTION OF THE DRAWINGS

FIG. 8 is a diagram for describing procedures for access to files with UDF.

Figure 1:
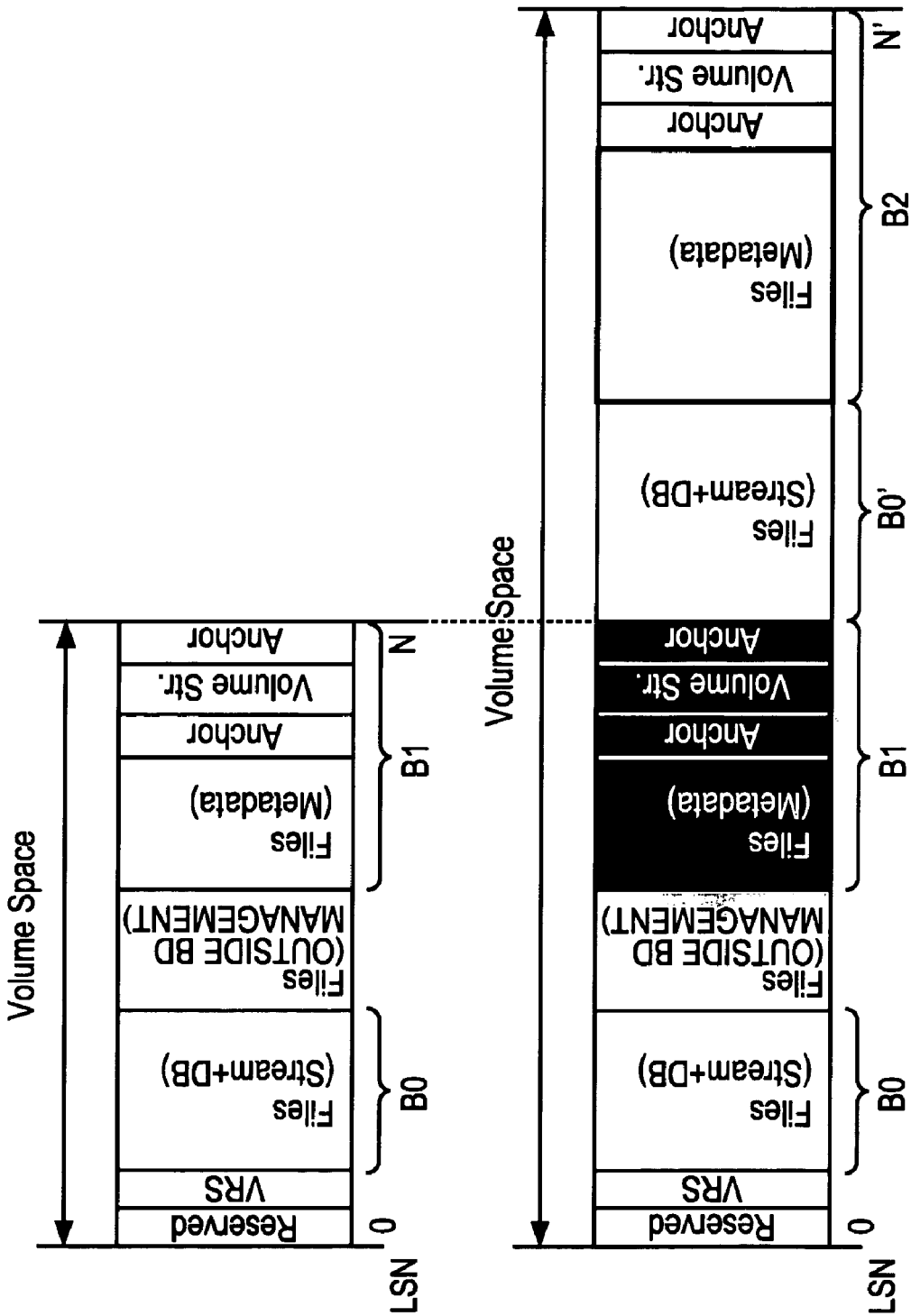
FIG. 1 is a diagram for describing conventional file system information updating processing.

REFERENCE NUMERALS 22 recording/playing mechanism section
51 control unit
52 recording unit
53 recording/playing block
54 playing unit
61 file system information recognizing unit
62 file system information generating unit
63 replacement information management unit
63a memory
64 replacement information generating unit 64a memory
71 ECC encoding unit
72 modulation unit
73 writing unit
81 recording medium
91 reading unit
92 demodulation unit
93 ECC decoding unit
301 file system information recognizing unit
302 file system information generating unit
303 replacement information management unit
303a memory
304 replacement information generating unit
304a memory
311 file system information recognizing unit
312 file system information generating unit
313 replacement information management unit
313a memory
314 replacement information generating unit
314a memory
331 control unit
341 file system information recognizing unit
342 file system information generating unit
343 replacement information management unit
343a memory
344 replacement information generating unit
344a memory
351 control unit
361 file system information recognizing unit
362 file system information generating unit
363 replacement information management unit
363a memory
364 replacement information generating unit
364a memory
371 control unit
381 file system information recognizing unit
382 file system information generating unit
383 replacement information management unit
383a memory
384 replacement information generating unit
384a memory
391 control unit
401 file system information recognizing unit
402 file system information generating unit
403 replacement information management unit
403a memory
404 replacement information generating unit
404a memory

BEST MODE FOR CARRYING OUT THE INVENTION

Figure 2:
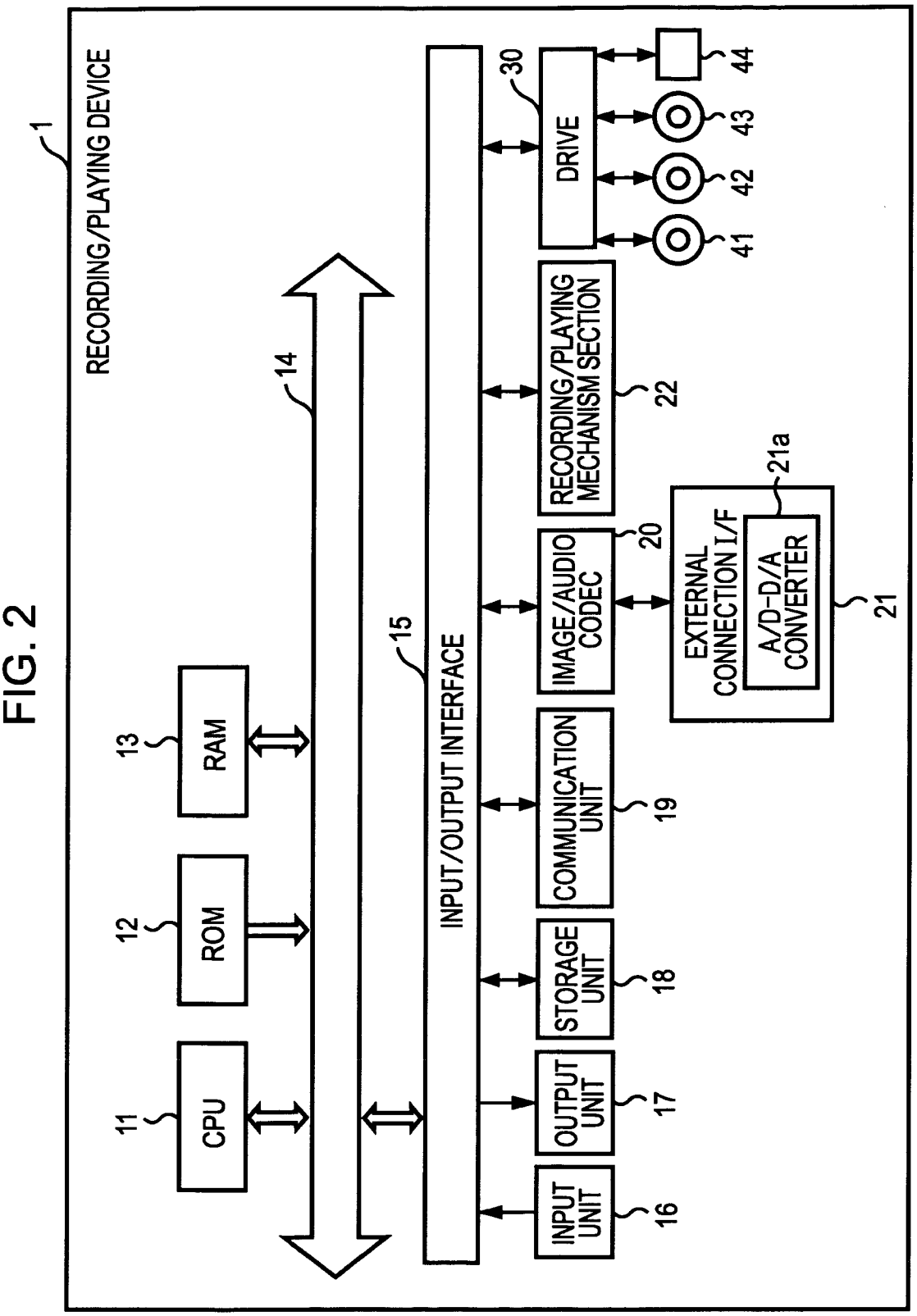
FIG. 2 is a diagram illustrating the configuration of an embodiment of a recording/playing device to which the present invention has been applied.

FIG. 2 is a diagram illustrating the configuration of an embodiment of a recording/playing device 1 to which the present invention has been applied.

A CPU (Central Processing Unit) 11 executes various types of processing following programs stored in ROM (Read Only Memory) 12 or stored in a storage unit 18. RAM (Random access Memory) 13 stores programs and data to be executed by the CPU 11, as appropriate. The CPU 11, ROM 12, and RAM 13, are mutually connected by a bus 14.

An input/output interface 15 is connected to the CPU 11 via the bus 14. Connected to the input/output interface 15 are an input unit 16 made up of a keyboard, mouse, microphone, and so forth, and an output unit 17 made up of a display, speaker, and so forth. The CPU 11 executes various types of processing in response to commands input from the input unit 16. The CPU 11 then outputs images, audio, and so forth, obtained as the result of processing, to the output unit 17.

The storage unit 18 connected to the input/output interface 15 is configured of a hard disk or the like for example, and stores programs to be executed by the CPU 11, and various types of data. A communication unit 19 communicates with information processing devices such as external servers and the like, via networks of which the Internet or an intranet are representative.

Also, the storage unit 18 stores various types of programs, and the CPU 11 reads out these programs and executes processing corresponding thereto. The storage unit 18 stores, for example, an OS which is a basic program, drivers, and so forth. Programs stored in the storage unit 18 may be obtained and stored via the communication unit 19, besides the above-described.

An image/audio codec 20 subjects image or audio files compressed by predetermined compression methods that have been read out from a magnetic disc 41, optical disc 42, magneto-optical disc 43, or semiconductor memory 44, connected to a drive 30, or further, a recording medium 81 (FIG. 3) of a recording/playing mechanism section 22, to predetermined decompression, and supplies these to an external connection I/F (Interface) 21 or output unit 17. Also, the image/audio codec 20 subjects to predetermined compression image or audio files, supplied from the input unit 16 or external connection I/F 21, and stores to the magnetic disc 41, optical disc 42, magneto-optical disc 43, or semiconductor memory 44, connected to the drive 30, or further, a recording medium 81 (FIG. 3) of the recording/playing mechanism section 22.

The recording/playing mechanism section 22 records predetermined information in the recording medium 81 (FIG. 3) such as a Blu-Ray Disc (Registered Trademark), which is a magneto-optical recording medium, for example, and reads out information recorded in the recording medium 81. Note that the detailed configuration of the recording/playing mechanism section 22 will be described later with reference to FIG. 3.

Upon a magnetic disc 41, optical disc 42, magneto-optical disc 43, semiconductor memory 44, or the like being mounted thereto, the drive 30 connected to the input/output interface 15 drives these, and obtains programs and data and the like recorded therein. The obtained programs and data are transferred to the storage unit 18 and stored, if necessary.

Next, the operations of the recording/playing device 1 shown in FIG. 2 will be described.

Figure 3:
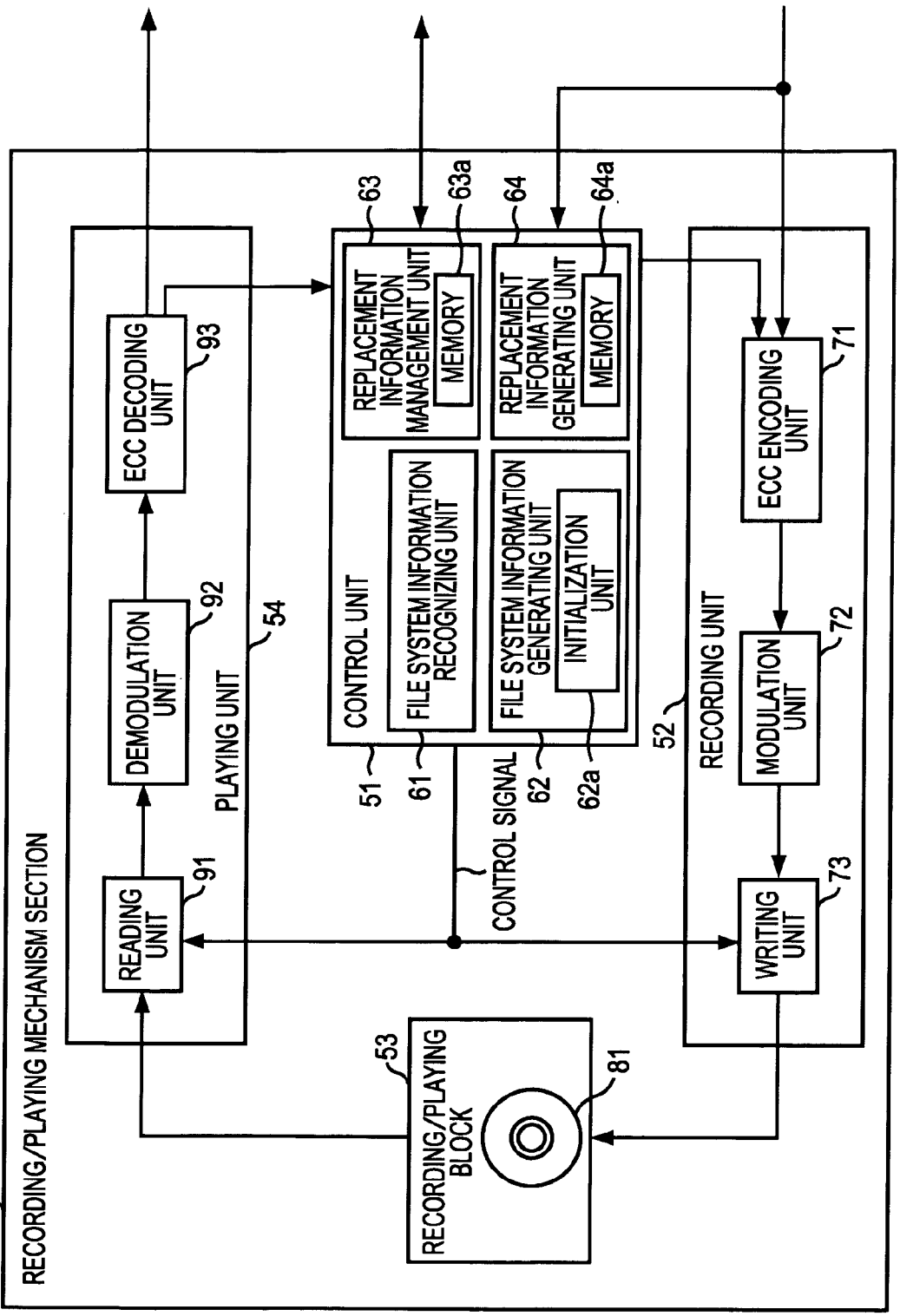
FIG. 3 is a diagram illustrating the configuration of a recording/playing mechanism section in FIG. 2.

Upon receiving an instruction for recording input data supplied via the external connection I/F 21, from the input unit 16, the CPU 11 controls the image/audio codec 20 based on programs stored in the ROM 12, RAM 13, or the storage unit 18 so as to compress input data with a predetermined compression method, supplies to the recording/playing mechanism section 22, and records the input data to the later-described recording medium 81 (FIG. 3).

Also, upon playing of data recorded in the recording medium 81 mounted to the recording/playing mechanism section 22 being instructed by the input unit 16, the recording/playing mechanism section 22 is controlled based on programs stored in the ROM 12, RAM 13, or the storage unit 18 so as to play the data recorded in the recording medium 81 and supply to the image/audio codec 20, and also to control the image/audio codec 20 so as to decompress the input data with a predetermined decompression method, so as to be externally output via the external connection I/F 21, or output to the output unit 17 and be displayed, or audio be emitted.

Next, the detailed configuration of the recording/playing mechanism section 22 will be described with reference to FIG. 3.

The control unit 51 controls the overall operations of the recording/playing mechanism section 22, and based on control signals supplied from the CPU 11, controls the recording unit 52 so as to cause a recording/playing block 53 to record information to the recording medium 81, or controls the playing unit 54 so as to cause the recording/playing block 53 to read out information recorded in the recording medium 81.

A file system information generating unit 62 of the control unit 51 groups the input data according to files of predetermined attributes, based on the attributes of the input data files, determines the recording position thereof on the recording medium 81 and records the files accordingly, and generates file system information based on the information which is supplied to a recording unit 52 and recorded in the recording medium 81. At this time, the file system information generating unit 62 records file system information, anchor information, and volume structure information in either a User region or SA (SA: Spare Area) region of the recording medium 81. Also, at the time of formatting the recording medium 81, an initialization unit 62a of the file system information generating unit 62 sets an SA region made up of replacement sectors as well as setting the recording region. A replacement sector is a sector for recording information instead of a damaged sector, in the event that a sector on the recording medium 81 has been physically damaged. At this time, although the recording address on the physical recording medium 81 is changed, the logical address is not changed even in the event that the replacement sector is used, so even using the replacement sector does not affect the operations for recording or reading information using the logical address. Accordingly, in the event that files have been added or updated, the file system information generating unit 62 of the control unit 51 controls a writing unit 73 so as to record the file system information, anchor information, and volume structure information to the SA region.

A file system information recognizing unit 61 of the control unit 51 reads out either main or mirror file system information supplied from a playing unit 54, and reads out a predetermined file based on the file system information. More specifically, the file system information recognizing unit 61 controls a reading unit 61 to read out the file system information, volume structure information, and anchor information, recorded in either the User region or SA region. Note that with the recording/playing mechanism section 22 shown in FIG. 3, the same file system information is recorded as both main file system information and mirror file system information at the time of recorded information in the recording medium 81, thereby having a dual structure wherein, even in the event that one file system information is destroyed due to some reason, the other can be used. Note that in the following, main file system information will be called FS, and mirror file system information will be called mirror FS.

In the event that data writing to be performed at the time of writing processing is overwrite processing, a replacement information management unit 63 stores the original position of the data (position of replacement origin) at the logical address in increments clusters and the position at the logical address of the data to be overwritten (position of replacement target) in a correlated manner in memory 63a as a DL (Defect List).

At the time of recording data in the recording medium 81, in a case of reading out the DL recorded in the memory 63a of the replacement information management unit 63 and finding from the replacement origin and replacement target information in cluster increments that replacement target cluster positions are continuously situated, a replacement information generating unit 64 updates the continuous region as a single list on the DL, and records the data together in a continuous region. Also, at the time of recording data in the recording medium 81, in a case of reading out the DL recorded in the memory 63a of the replacement information management unit 63 and finding that replacement target positions are not continuously situated, the replacement information generating unit 64 changes the replacement target positions so as to group the multiple replacement targets of DL into one so as to configure a continuous region, then updates the continuous region as a single list, and records the data together in a continuous region.

A recording/playing block 53 is controlled by the writing unit 73 or writing unit 91, and physically records or plays information in/from the recording medium 81. The recording medium 81 is capable of recording mechanically, optically, magnetically, or magneto-optically, and may be repeatedly writable (e.g., including BD-RW (Blu-Ray Disc-Rewritable), DVD-RW (Digital Versatile Disc-Rewritable), and DVD-RAM (Digital Versatile Disc-Random Access Memory)), or capable of only single-writing (e.g., including BD-R (Blu-Ray Disc-Recordable), DVD-R (Digital Versatile Disc-Recordable), and DVD-ROM (Digital Versatile Disc-Read Only Memory)), i.e., the format thereof is irrelevant as long as it is a disc-type recording medium capable of recording/playing data. Accordingly, the recording/playing block 53 is not restricted in particular as long as it is capable of recording/playing with regard to such recording media 81. Particularly, this is useful with large-capacity recording media such as optical disks wherein recording and playing is performed using blue-violet laser.

An ECC encoding unit 71 adds error-correction coding to the input, encodes, and outputs to a modulation unit 72. The modulation unit 72 modulates the data input from the ECC encoding unit 71 and outputs to a writing unit 73. The writing unit 73 supplies the data input from the modulation unit 72 to the recording/playing block 53, and causes the recording/playing block 53 to perform writing processing for writing to the recording medium 81.

A reading unit 91 of the playing unit 54 reads out the information recorded in the recording medium 81. A demodulation unit 92 demodulates data which the reading unit has read out from the recording medium 81, and supplies this to an ECC decoding unit 93. The ECC decoding unit 93 separates the data supplied from the demodulating unit 92 into normal files (e.g., AV (Audio Visual) stream data and the like) and file system information, outputs the normal files as output data, and outputs the file system information to the control unit 51.

Next, the management structure of files of the input data, grouped and managed by the file system information generating unit 62, will be described with reference to FIG. 4. Note that files are basically recorded in the recording medium 81 in UDF format. Accordingly, the files are each recorded in the recording medium 81 in UDF format, following the management structure described below.

Figure 4:
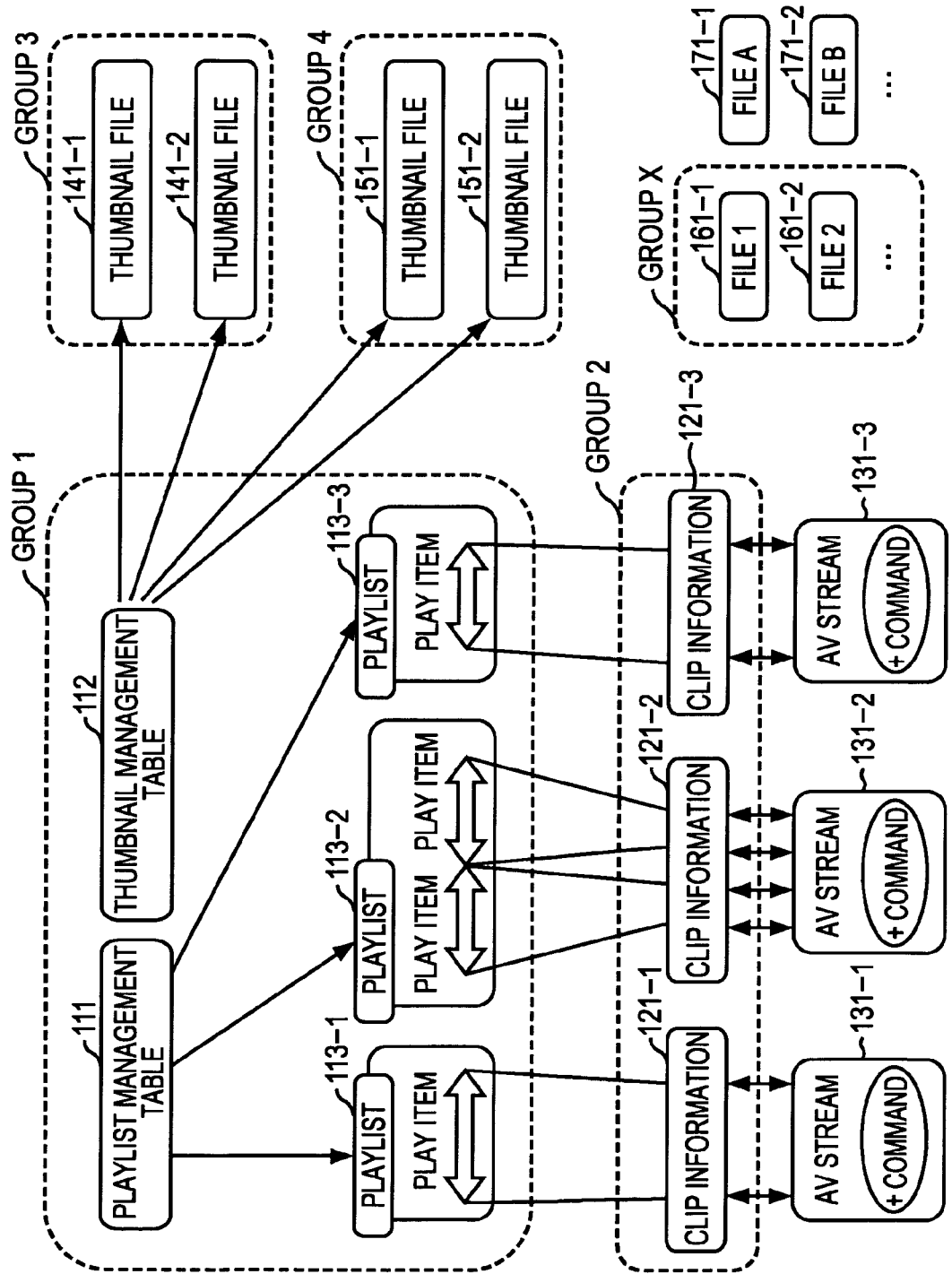
FIG. 4 is a diagram illustrating an example of group management.

FIG. 4 illustrates an example of a case of managing various types of data at the time of recording AV stream data in a rewritable recording medium, with the management structure thereof complying with the management structure of the Blu-Ray Disc Rewritable (Registered Trademark) standard. In FIG. 4, the three layers of content management layer, playlist layer, and clip layer, are illustrated in order from the top. Note that this management structure corresponds to the management structure of the Blu-Ray Disc Rewritable (Registered Trademark) standard.

Now, belonging to the content management layer are a playlist management table 111 and thumbnail management table 112. Also, playlists 113-1 through 113-3 belong to the playlist layer. Further, clip information 121-1 through 121-3 belong to the clip layer. Note that in the following, in the event that there is no need to distinguish between the playlists 113-1 through 113-3, and the clip information 121-1 through 121-3, this will be referred to simply as playlist 113 and clip information 121, with other configurations being referred to in the same way.

A combination of the two of an AV stream 131 and clip information 121 file (having AV stream attribute information) is particularly called a clip. An AV stream 131 is data such as MPEG-TS (Moving Picture Experts Group-Transport Stream) data for example, which is a file having a structure wherein information such as Video, Audio, subtitles, and so forth, have been multiplexed. Also, an AV stream 131 may also have command multiplexed information for performing control at the time of playing. The drawing shows an example wherein command information has been multiplexed.

A playlist has a structure of having multiple play items, wherein a particular range of a clip is referenced using a playing start point and a playing end point, with a single playlist providing functions for sequentially playing multiple playing sequences. Further, there exist, the playlist management table 111 of showing the user the list of playlists, thumbnail management table 112 used for thumbnail display functions, and respectively corresponding thumbnail files 141-1 and 141-2 and thumbnail files 151-1 and 151-2.

A pair of one AV stream 131 and accessory information thereof will be considered to be one object, which will be referred to as a clip. An AV stream file will be called an AV stream file, and accessory information thereof is called clip information 121.

Generally, files used with computers and the like are handled as byte strings, but the contents of an AV stream 131 are rendered on a time axis, with the playlist 113 specifying access points in the clip information 121 with primarily time stamps. When the playlist 113 provides a timestamp at an access point within the clip, the clip information 121 is used to find the address information (data byte position) in the AV stream 131 for starting decoding of a stream.

The playlist 113 has been introduced in order to enable select a playing section which the user wants to view from a clip, and to easily edit this. A single playlist 113 is a collection of playing sections in the clip. One playing section in a certain clip is called a play item, which is represented by a pair of IN point and OUT point on the time axis. Accordingly, a play list is a collection of play items.

In FIG. 4, files are grouped as follows, according to the frequency of usage and updating, and the largest total size of files belonging to the group. The playlist management table 111, thumbnail management table 112, and playlists 113 are classified in group 1, clip information 112 in group 2, menu thumbnail files 141 and 142 in group 3, and marking thumbnail files 151 and 152 in group 4.

The files grouped here are management data necessary for playing the AV stream 131. Extracting and managing such management data at one place enables management data to be speedily read out. Consequently, the AV stream data can be played at high speed.

Note that while description has been made regarding an example of grouping files for management data of the AV stream 131, files not defined in the Blu-ray Disc Rewritable standard can also be grouped. That is to say, in the drawing, a group X is defined as a group of files differing from files for management data of the AV stream 131, and files 161-1 and 161-2 belong to that group. Also note that the files 171-1 and 171-2 in the drawing indicate that these are files which are not grouped. Also, the AV streams 131 are not management data, and accordingly are not subjected to grouped management.

Figure 5:
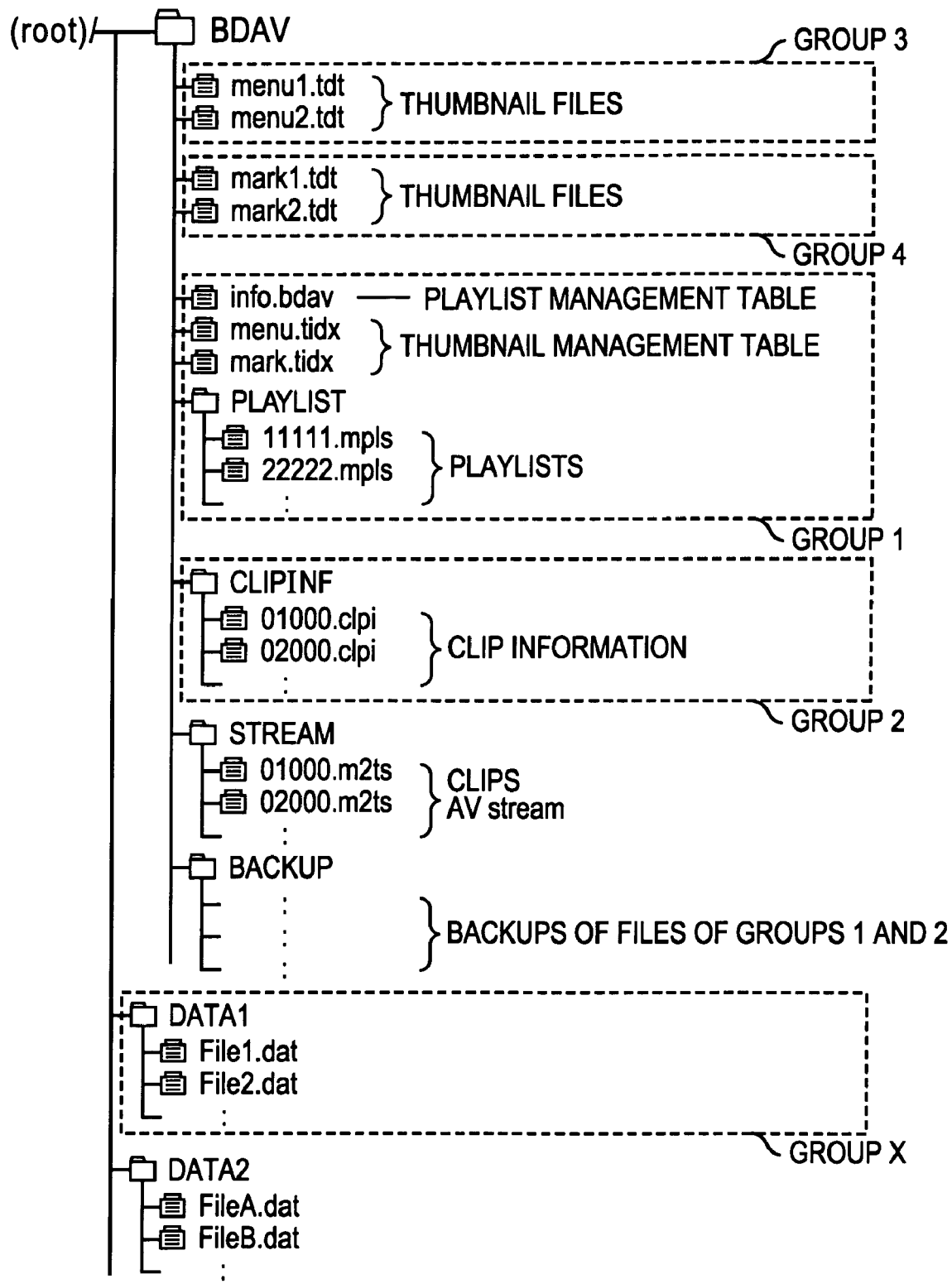
FIG. 5 is a diagram illustrating the configuration of a directory and files generated by the group management shown in FIG. 4.

FIG. 5 shows an example of the directory structure of Blu-Ray Disc Audio Visual (BDAV) information defined in the Blu-Ray Disc Rewritable Format (BD-RE) recorded in the recording medium 81. Note that directories other than these can be made under the root directory, but may be disregarded with BDAV dedicated players. Also, the directory structure shown in FIG. 5 can also be recorded on a Blu-Ray Disc Recordable (BD-R).

As shown in the drawing, the root directory includes one directory.

Recorded in the "BDAV" directory is all files and directories stipulated by the BDAV application format. Also, the "BDAV" directory includes the directories described below.

Recorded in the "PLAYLIST" directory are the database files for the playlists 113. This directory is set even in a case wherein not a single playlist 113 exists.

Recorded in the "CLIPINF" directory are clip databases. This directory is set even in a case wherein not a single clip exists.

Recorded in the "STREAM" directory are AV stream files. This directory is set even in a case wherein not a single AV stream file exists.

Recorded in the "BACKUP" directory are backup files classified in groups 1 and 2. This directory is set even in a case wherein not a single file classified in group 1 or 2 exists.

Recorded in the "PLAYLIST" directory are two types of PlayList files, namely Real PlayList and Virtual PlayList. In the case shown in FIG. 5, 11111.rpls and 22222.rpls are recorded. Of these, files indicated by "xxxxx.rpls" hold information relating to a single Real PlayList, with one file being created for each playlist. Note that "xxxxx" is five numerals from 0 to 9.

Files indicated by "yyyyy.vpls" hold information relating to a single Virtual PlayList, with one file being created for each playlist. The filename is "yyyyy.vpls". Note that "yyyyy" is five numerals from 0 to 9.

A Real PlayList is viewed as sharing the stream portion of a clip to which it refers. That is to say, a Real PlayList takes up an amount of disk capacity equivalent to the AV stream portion of the clip to which it refers. In the event that an AV stream is to be recorded as a new clip, a Real PlayList referring to the entire playable range of the clip is generated. In the event that a part of the playing range of the Real PlayList is deleted, the data of the stream portion of the Clip to which it refers is also deleted.

A Virtual PlayList is viewed as not sharing clip data. The clip is not changed in any way even of a Virtual PlayList is changed or deleted. Note that in the description made in the present specification, Real PlayList and Virtual PlayList will be collectively referred to simply as playlist.

The "CLIPINF" directory holds one file corresponding to each AV stream file. In the case in FIG. 5, 01000.clpi and 02000.clpi are held.

Files indicated by "zzzzz.clpi" is clip information 121 corresponding to one AV stream 131. The file name is "zzzzz.clpi", and "zzzzz" is five numerals from 0 to 9.

The "STREAM" directory holds AV stream files. In the case in FIG. 5, 01000.m2ts and 02000.m2ts are held.

Files indicated by "zzzzz.m2ts" are AV stream 131 files. The file name is "zzzzz.m2ts", and "zzzzz" is five numerals from 0 to 9. Note that the one AV stream 131 file and the clip information 121 corresponding thereto have the same numerals "zzzzz" set as the file names thereof.

Also, the "BDAV" directory holds menu1.tdt and menu2.tdt corresponding to the thumbnail files 141-1 and 141-2 directly beneath, and also holds mark1.tdt and mark2.tdt corresponding to the thumbnail files 151-1 and 151-2. Moreover, info.bdav corresponding to the playlist management table 111, and menu.tidx and mark.tidx corresponding to the thumbnail management table 112 are held thereby.

Also, a "DATA1" directory and a "DATA2" directory are set directly beneath the "root", with File1.dat, File2.dat . . . corresponding to files 161-1 and 161-2, and FileA.dat, FileB.dat . . . corresponding to files 171-1 and 171-2, being held as files subjected to group management, respectively.

In the files and directories managed under the directory shown in FIG. 5, menu1.tdt and menu2.tdt corresponding to the thumbnail files 141-1 and 141-2 are grouped and managed as group 3, mark1.tdt and mark2.tdt corresponding to the thumbnail files 151-1 and 151-2 as group 4, info.bdav corresponding to the playlist management table 111, menu.tidx and mark.tidx corresponding to the thumbnail management table 112, and 11111.rpls and 22222.rpls held in the "PLAYLIST" directory as group 1, and 01000.clpi and 02000.clpi held in the "CLIPINF" directory as group 2, as shown in FIG. 4.

Further, File1.dat and File2.dat corresponding to the files 161-1 and 161-2 held in the "DATA1" directory besides the BDAV dedicated files thus grouped and managed are grouped as group X.

Figure 6:
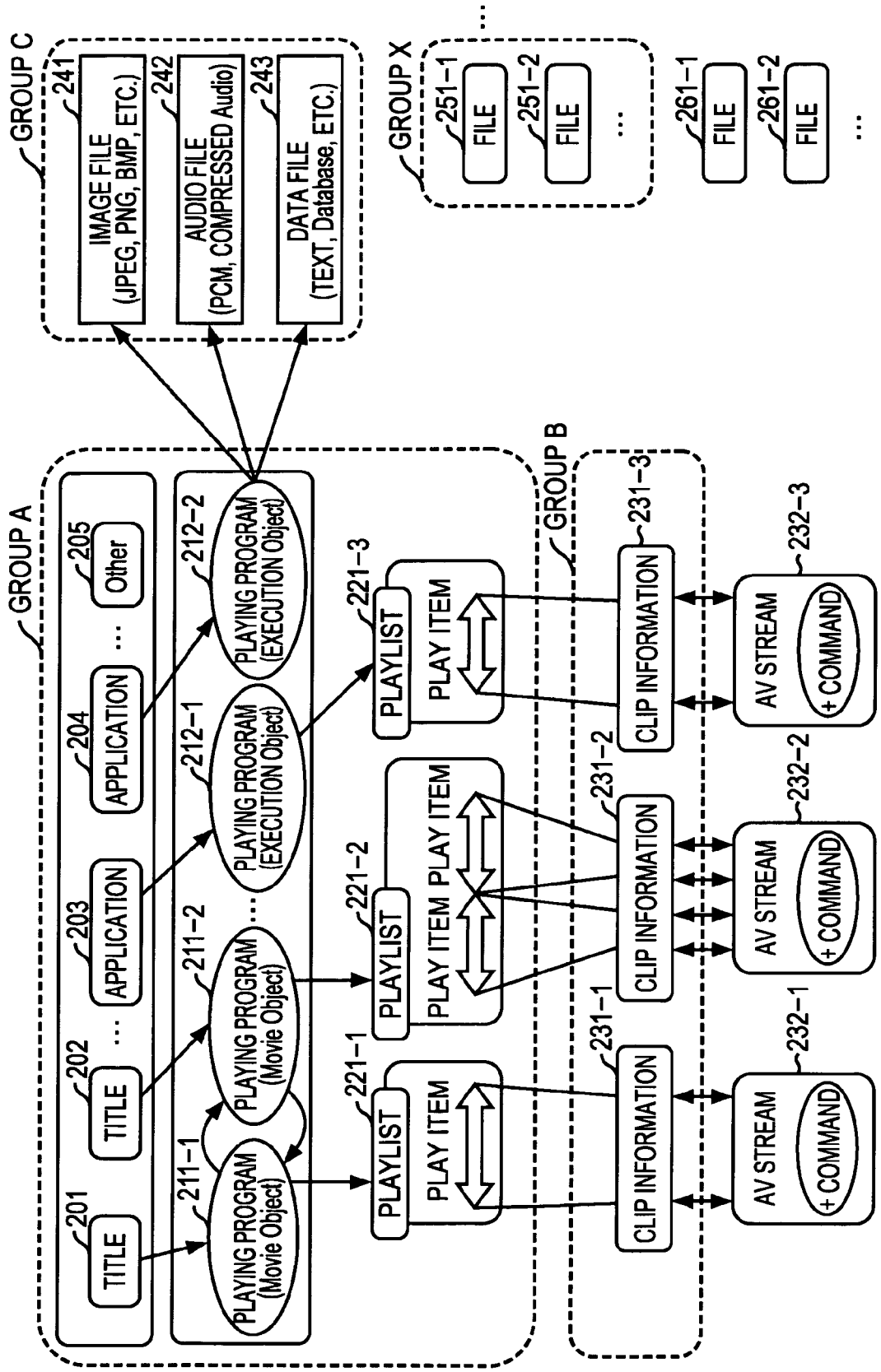
FIG. 6 is a diagram illustrating another example of group management.
Figure 7:
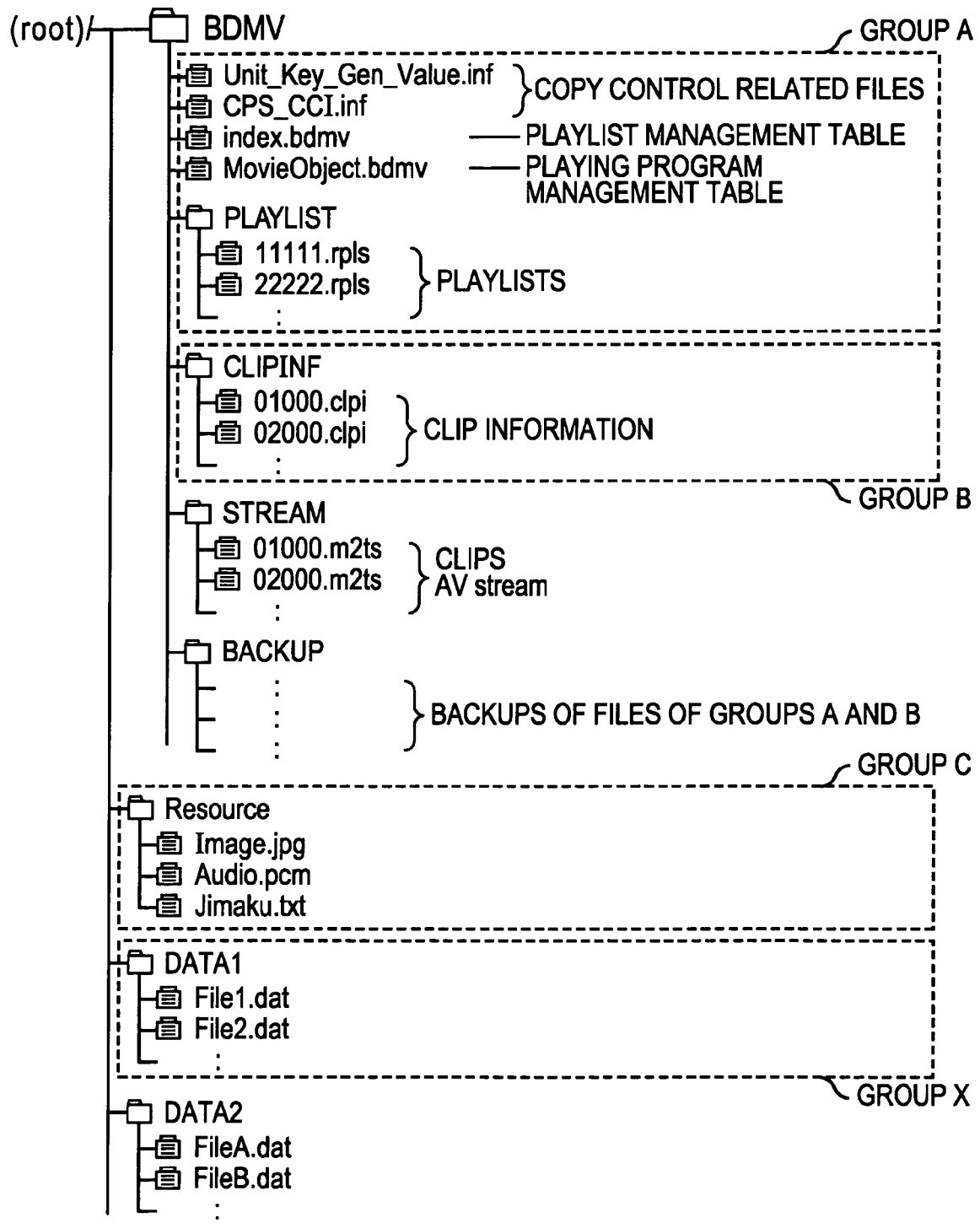
FIG. 7 is a diagram illustrating the configuration of a directory and files generated by the group management shown in FIG. 6.

While FIG. 4 and FIG. 5 illustrate a management structure with grouping in the case of recording on the recording medium 81 in the UDF format, based on the Blu-Ray Disc Rewritable (a rewritable recording medium) standard, next, an example will be illustrated of a grouped management structure (logical format) with Blu-Ray Disc ROM (a read-only recording medium), with reference to FIG. 6 and FIG. 7. FIG. 5 illustrates a case of recording HD (High Density) movie contents.

Note that in FIG. 6, playlists 221-1 through 221-3, clip information 231-1 through 231-3, AV streams 232-1 through 232-3, files 251-1 and 251-2, and files 261-1 and 261-2, are the same as the playlists 113-1 through 113-3, clip information 121-1 through 121-3, AV streams 131-1 through 131-3, files 161-1 and 161-2, and files 171-1 and 171-2, so description thereof will be omitted as appropriate.

There are two layers of higher order than the clip information 231 and playlists 221 described in FIG. 4, which are playing programs 211-1 and 211-2 (movie objects), and tiles 201 and 202. A playing program 211 (movie object) specifies a playlist to be played, and also programmably provides other functions necessary for presenting HD movie contents, such as response to user operations, jumping between titles 201 and 202, branching of playing sequences, and so forth.

The titles 201 and 202 can be recognized from the user, and are used as an index for starting playing of the contents. The titles 201 and 202 are of a structure for specifying one movie object to execute. Also, in addition to normal titles, there are also titles automatically played at first, titles for displaying menus, and so forth.

Also, applications (application programs) 203 and 204 are for executing expanded applications such as games and Web contents, at which time the playing programs (execution Object) 212-1 and 212-2 are activated and executed. There are cases wherein the playing program 212 uses a playlist, and cases wherein it does not use a playlist. Also, the playing program 212 can refer to arbitrary image files 241, audio files 242, files 243, and so forth, at the application programs 203 and 204.

The number of titles 201 and 202 indicating movie contents, and applications 202 and 203 can be further increased, this being shown as Other 205 in FIG. 6. Also, these may be recorded in a mixed manner on the recording medium 81, with FIG. 6 illustrating this coexisting state.

In FIG. 6, as with the case shown in FIG. 4, files are grouped as follows, according to the frequency of usage and updating, and the largest total size of files belonging to the group. That is to say, the titles 201 and 202, applications 203 and 204, Other 205, playing programs 211-1, 211-2, 212-1, and 212-1, and playlists 221-1 through 221-3 are classified in group A, clip information 231 in group B, and image files 241, audio files 242, and files 243, in group C.

Note that as with the groups 1, 2, 3, and 4 in FIG. 4, the groups A, B, and C in FIG. 6 have been divided and named only for convenience, and are the same in the sense of being one group of files for processing.

FIG. 7 illustrates an example of the directory structure of Blu-Ray Disc Movie (BDMV) information defined in the Blu-Ray Disc Rom Format (BD-ROM) recorded in the recording medium 81. Note that directories other than these can be made under the root directory, but may be disregarded with BDMV dedicated players.

As shown in the drawing, the root directory includes one directory.

Recorded in the "BDMV" directory is all files and directories stipulated by the BDMV application format. Also, the "BDMV" directory includes the directories described below.

Recorded in the "PLAYLIST" directory are the database files for the playlists 221. This directory is set even in a case wherein not a single playlist 221 exists.

Recorded in the "CLIPINF" directory are clip databases. This directory is set even in a case wherein not a single clip exists.

Recorded in the "STREAM" directory are AV stream files. This directory is set even in a case wherein not a single AV stream file exists.

Recorded in the "BACKUP" directory are backup files classified in groups A and B. This directory is set even in a case wherein not a single file classified in group A or B exists.

Recorded in the "PLAYLIST" directory are, in the case shown in FIG. 7, 11111.rpls and 22222.rpls. of these, files indicated by "xxxxx.rpls" hold information relating to a single Movie PlayList, with one file being created for each playlist. Note that "xxxxx" is five numerals from 0 to 9.

The "CLIPINF" directory holds one file corresponding to each AV stream file. In the case in FIG. 7, 01000.clpi and 02000.clpi are held.

Files indicated by "zzzzz.clpi" is clip information 231 corresponding to one AV stream 232. The file name is "zzzzz.clpi", and "zzzzz" is five numerals from 0 to 9.

The "STREAM" directory holds AV stream files. In the case in FIG. 7, 01000.m2ts and 02000.m2ts are held.

Files indicated by "zzzzz.m2ts" are AV stream 232 files. The file name is "zzzzz.m2ts", and "zzzzz" is five numerals from 0 to 9. Note that the one AV stream 232 and the clip information 231 corresponding thereto have the same numerals "zzzzz" set as the file names thereof.

Also, the "BDMV" directory holds Unit_Key_Gen_Valie.inf and CPS_CCE.inf, as copy control related files, directly beneath, and also holds index.bdmv as a title management table file. Further held is MoviObject.bdmv as a player program management table.

Also, a "Resource" directory, a "DATA1" directory, and a "DATA2" directory are set directly beneath the "root". These directories are no indispensable directories in the Bu-Ray Disc ROM Format, but have been added as examples of directories for storing extension data which is necessary depending to the contents of the contents. Held in the "Resource" directory are Image.jpg, Audui.pcm, and Jimaku.txt, which correspond to image files 241, audio files 242, and files 243, which are group-managed files. Also held in the "DATA1" directory are File1.dat and File2.dat corresponding to files 251-1 and 251-2, and further, held in the "DATA2" directory are FileA.dat and FileB.dat corresponding to files 261-1 and 261-2.

With the files and directories managed under the directory shown in FIG. 7, Unit_Key_Gen_Value.inf CPS_CCI.inf, index.bdmv, and Moviobject.bdmv, and the 11111.mpls and 22222.mpls held in the "PLAYLIST" directory, are grouped as group A, the 01000.clpi and 02000.clpi held in the "CLIP-INF" directory as group B, and the Image.jpg, Audio.pcm, and Jimaku.txt held in the "Resource" directory as group C, respectively.

Further, besides the above-described files group managed, File1.dat and File2.dat corresponding to files 251-1 and 251-2 held in the "DATA1" directory are grouped as group X.

Next, procedures for accessing files in conventional UDF will be described with reference to FIG. 8 and FIG. 9, before describing the recording processing according to the present invention.

Figure 9:
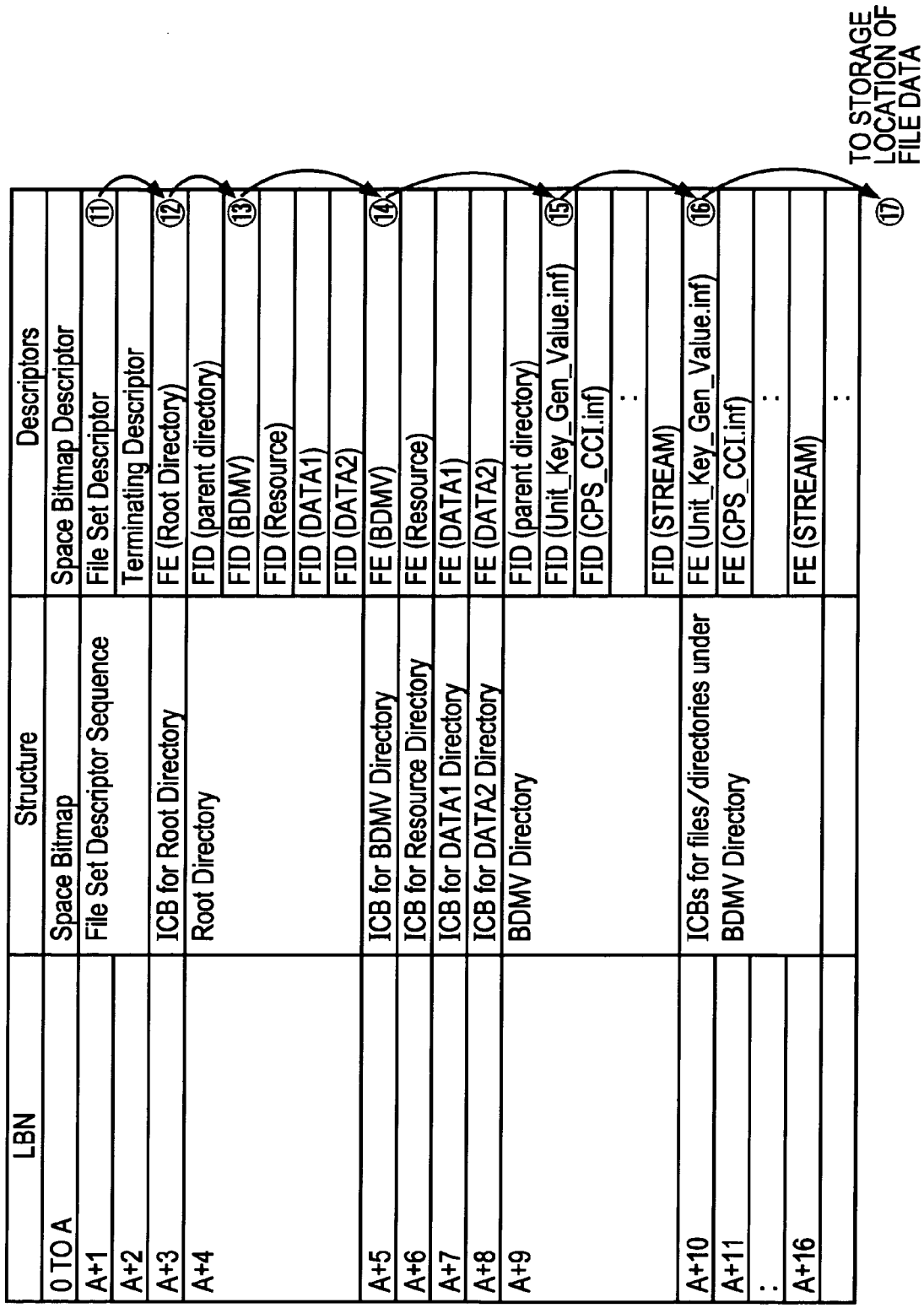
FIG. 9 is a diagram for describing procedures for access to files with UDF.

FIG. 8 illustrates an example of the Volume Structure of the UDF, and FIG. 9 illustrates the contents of File Structures and Files. Here, description will be made with an example of the case of accessing the "root/BDMV/Unit_Key_Gen_Value.inf", shown in FIG. 9.

In FIG. 8, Volume Structure stores information relating to a logical Volume and information relating to an analysis start point of the File structure recorded within a partition. Note that in FIG. 8, the left-most column indicates the LSN (Logical Sector Number), the second column from the left indicates structure, the second column from the right indicates Descriptors, and the right-most column indicates the LBN (Logical Block Number). Also, in FIG. 9, the left-most column indicates the LBN (Logical Block Number), the center column indicates Structure, and the right-most column indicates Descriptors.

Address information within a volume is represented by LSN (Logical Sector Number), and address information within a partition is represented by LBN (Logical Block Number). Also, in the event that there are multiple partitions within a volume, multiple sets of partition information can be recorded within a Logical Volume Descriptor.

Note that only items necessary for processing will be described from FIG. 8 and FIG. 9, and description of items unnecessary for processing will be omitted as appropriate.

First, anchor information of the Anchor-1 (Anchor Volume Descriptor Pointer) at the LSN position of 256, which is indicated by No. 1 in FIG. 8, is analyzed, and the position of the Volume Descriptor Sequence indicated by No. 2 is obtained. Next, the Volume Descriptor Sequence at the LSN position of 32 through 47 indicated by No. 2 is analyzed. The Volume Descriptor Sequence includes "Primary Volume Descriptor", "Implementation Use Volume Descriptor", "Partition Descriptor", "Logical Volume Descriptor", "Unallocated Space Descriptor", "Terminating Descriptor", and "Trailing Logical Sectors", with "Primary Volume Descriptor" storing information for identifying the volume, "Implementation Use Volume Descriptor" information indicating compatibility, "Partition Descriptor" information for identifying partitions, "Logical Volume Descriptor" information indicating the position of a logical partition, "Unallocated Space Descriptor" information indicating unused region, "Terminating Descriptor" information indicating the final position of a region, and "Trailing Logical Sectors" information of the remaining regions.

The position of the "Logical Volume Integrity Sequence" described in the "Logical Volume Descriptor" of these at the LSN position of 35 indicated by No. 3 in FIG. 8, the position of the object partition, and the position of he File Set Descriptor within the partition, are obtained.

Further, the "Logical Volume Integrity Sequence" at the LSN position of 48 indicated by No. 4 is analyzed, a volume information integrity check is performed of the Volume information, and in the event that there is no problem with integrity, within the File Structure and Files partition at the LSN position of 272 through 272Na11-272 indicated by No. 5 is analyzed. Thus, access to the object partition can be started with the above procedures.

Next, root information is stored in the File Set Descriptor of which the LBN is (A+1) indicated by No. 11 in FIG. 9, so this is analyzed, and the position of the File Entry (shown as FE (Root Directory) in the drawing) of the root directory of which the LBN is (A+3) indicated by No. 12 is obtained.

Further, the File Entry (shown as FE (Root Directory) in the drawing) of the root directory of which the LBN is (A+3) indicated by No. 12 is analyzed, and the position where information of the root directory is recorded (LBN=A+4) is obtained. Next, the FID (File Identifier Description) of the BDMV directory indicated by No. 13 which is within the root directory information is analyzed, and the position of the FE (File Entry) of the BDMV directory (shown as FE (BDMV) in the drawing) (LBN=A+5) indicated by No. 14 is obtained.

Further, the File Entry of the BDMV directory indicated by No. 14 is analyzed, and the position where information of the BDMV directory is recorded (LBN=A+9) is obtained.

Next, information of the BDMV directory is obtained, and the File Identifier Descriptor of the Unit_Key_Gen_Value.inf in the BDMV directory indicated by No. 15 is analyzed to obtain the position of the File Entry of the Unit_Key_Gen_Value.inf. The File Entry of the Unit_Key_Gen_Value.inf of No. 16 is then analyzed, the position where the data of the Unit_Key_Gen_Value.inf is recorded is obtained, the address where the data of the Unit_Key_Gen_Value.inf is recorded is accessed, and the object data is obtained. Thus, the data of the file "root/BDMV/Unit_Key_Gen_Value.inf" indicated by No. 17 can be obtained.

In the event that a metadata partition introduced from UDF 2.50 and later is used, the File Set Descriptor indicated by No. 11, the File Entry of the root directory indicated by No. 12, the FID (File Identifier Descriptor) of the BDMV directory indicated by No. 13, the FE (File Entry) of the BDMV directory indicated by No. 14, the File Identifier Descriptor of the Unit_Key_Gen_Value.inf in the BDMV directory indicated by No. 15, and the File Entry of the Unit_Key_Gen_Value.inf of No. 16, are situated using logical address within a metadata partition.

The position where the metadata partition is recorded can be obtained by the file entry of the metadata file. By reading the data within the metadata partition all at once in the memory, reading out the three pieces of directory information, which are File Information Descriptor, File Entry, and directory information, from the recording medium each time going down a level in the directory can be avoided even when accessing files saved under a directory with multiple hierarchical levels, and information necessary for reading out the files can be obtained and analyzed from the metadata partition information that has been read out to the memory.

Next, a technique for placing file system information at virtual addresses will be described with reference to FIG. 10 through FIG. 12.

File system information is situated together as a metadata file, using an address on a normal physical partition used with the file system. Virtual addresses (with a head address of 0 for the partition) are allocated within the metadata file, and the file system information is configured within the metadata partition by referencing the virtual addresses.

That is to say, information up the File Set Descriptor indicated by No. 11, the File Entry of the root directory indicated by No. 12, the FID (File Identifier Descriptor) of the BDMV directory indicated by No. 13, the FE (File Entry) of the BDMV directory indicated by No. 14, the File Identifier Descriptor of the Unit_Key_Gen_Value.inf in the BDMV directory indicated by No. 15, and the File Entry of the Unit_Key_Gen_Value.inf of No. 16, as described in FIG. 9, can be traced (read out) using the virtual addresses within the metadata file.

Figure 10:
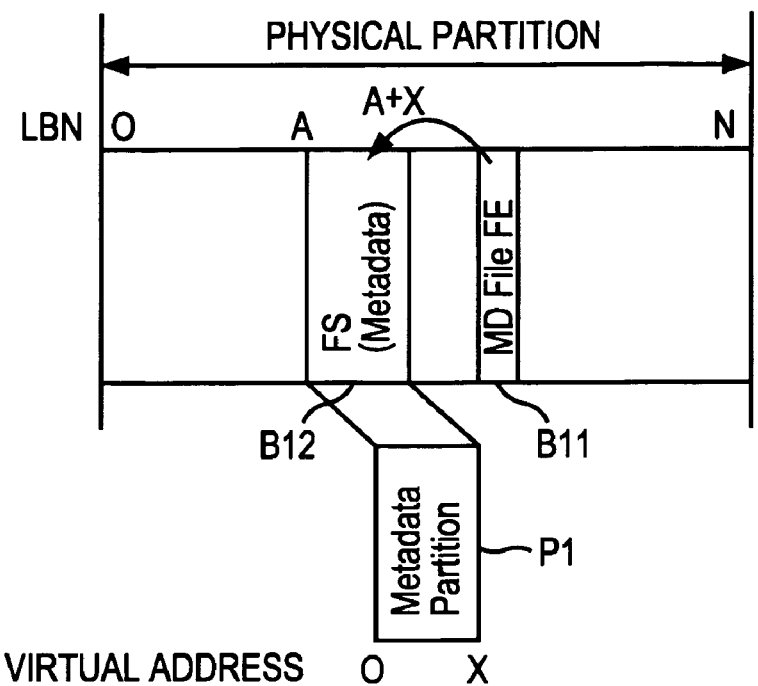
FIG. 10 is a diagram for describing a technique for setting file system information at a virtual address.
Figure 11:
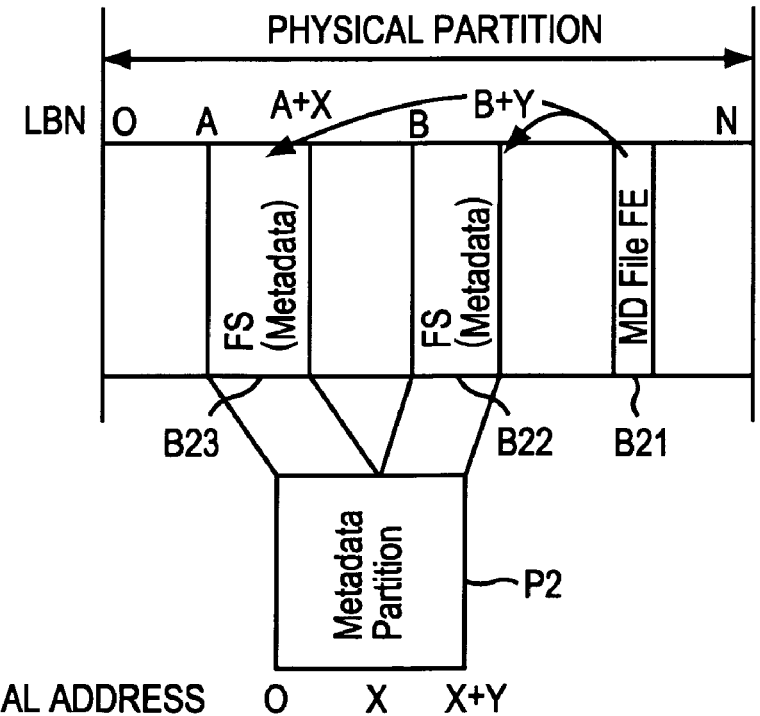
FIG. 11 is a diagram for describing a technique for setting file system information at a virtual address.

At the upper side of FIG. 10, the MD File FE (Metadata File File-Entry) is described in region B11, and based on this description, the file system information (FS) described in region B12 can be traced. That is to say, the MD File FE in region B12 indicates that the file system information (FS) is recorded in the region B11 of addresses A through A+X in the physical partition. Also, as shown to the lower side of FIG. 10, the above-described file system information (FS) is described in region P1 at virtual address 0 through X within the metadata partition.

Also, the metadata partition may be situated at multiple regions in a physical partition. For example, in the event of being situated at the two locations of region B23 at the physical partition addresses A through A+X and at the physical partition addresses B through B+Y as shown to the upper side of FIG. 11, the MF File FE at region B21 indicates that the file system information is recorded at the two locations of region B23 which is addresses A through A+X of the physical partition and region B22 which is addresses B through B+Y of the physical partition. As shown to the lower side of FIG. 11, the file system information is described in region P2 at virtual address 0 through X+Y within the metadata partition.

Further, as a function employed with UDF 2.50 and later, an arrangement can be made wherein metadata files are situated in duplicate (situating two identical metadata files (FS), calling with one a main metadata file (=main FS) and the other a mirror metadata file (mirror FS)), thereby improving the reliability of the file system information.

Figure 12:
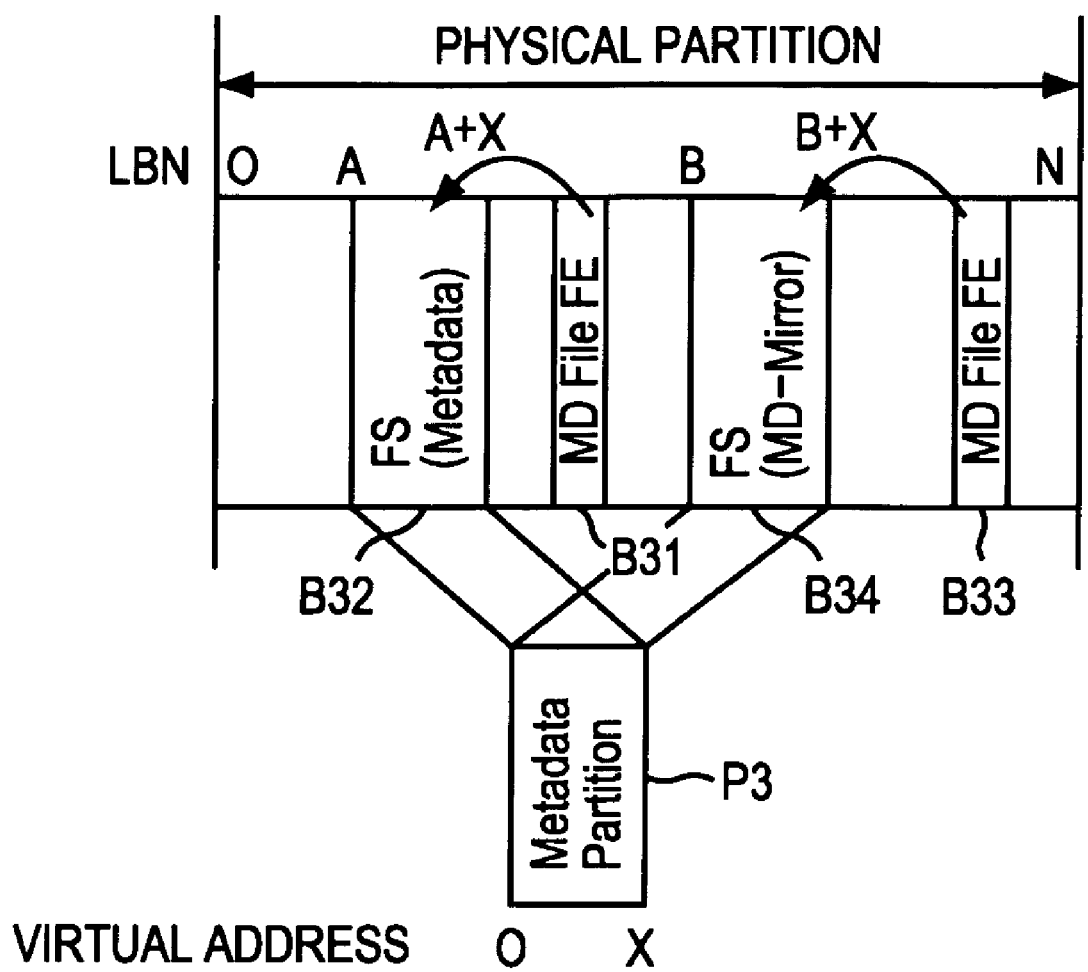
FIG. 12 is a diagram for describing a technique for setting file system information at a virtual address.

That is to say, as shown in FIG. 12, in the event that the (main) metadata file which is file system information is situated in region B32 at the addresses A through A+X of the physical partition, and the mirror metadata file which is file system information is situated in region B34 at the addresses B through B+Y of the physical partition, the MD File FE at region B31 indicates that the metadata file is recorded at region B32 which is the region of the addresses A through A+X of the physical partition. As shown to the lower part of FIG. 12, the file system information is then recorded as the (main) metadata file in the region P3 at the virtual addresses 0 through X within the metadata partition. At this time, in the same way, the MDM File FE at region B33 indicates that the metadata file is recorded at region B34 which is the region of the addresses B through B+X of the physical partition. Also, in the same way as with the main metadata file described above, as shown to the lower side of FIG. 12, the file system information is then recorded as the mirror metadata file in the region P3 at the virtual addresses 0 through X within the metadata partition. Thus, describing the same metadata file enables the reliability of the file system information to be improved.

Next, description will be made regarding a recording format in the event that the recording medium 81 is a BD-R, with reference to FIG. 13. There are the sequential recording mode and random recording mode for the BD-R recording formats.

The sequential recording mode is a mode wherein information is sequentially recorded in a predetermined direction from the recording start position of the recording medium (generally the center portion of the disk in the case of a disc-shaped recording medium). On the other hand, the random recording mode is a mode wherein a position is randomly set on the recording medium and information is recorded. With a disc-shaped recording medium, information recorded with the sequential recording format can be read out faster, since the information is recorded in a state with the relation of temporal succession being reflected in the recorded state. Accordingly, the following description will be made with the understanding that information is recorded with the sequential recording mode. However, it should be noted that with the embodiment of the present invention, the mode for recording information on a recording medium is not restricted to the sequential recording mode, and that the random recording mode may be employed.

Figure 13:
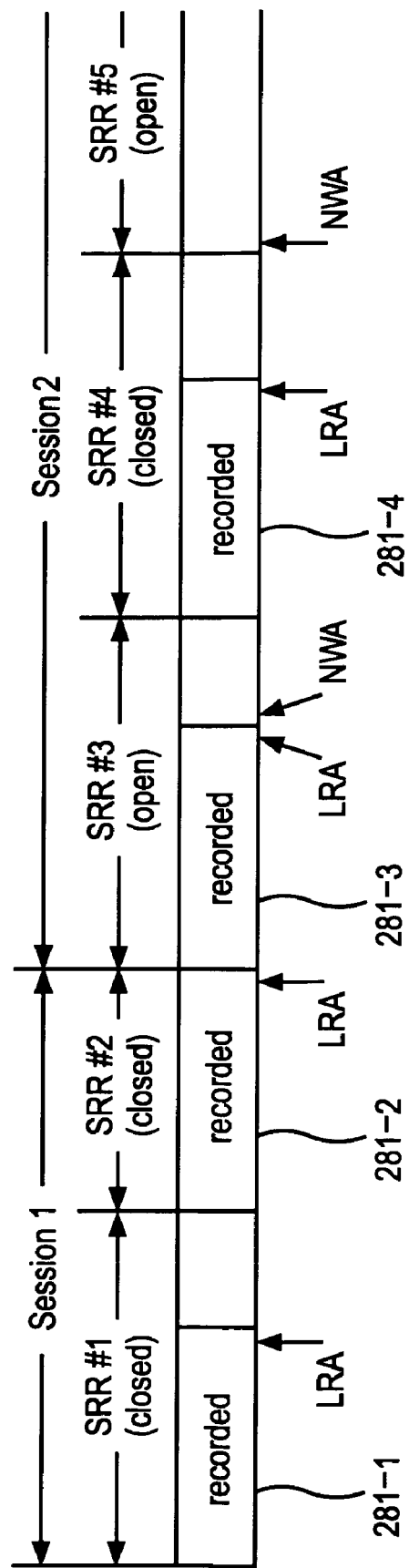
FIG. 13 is a diagram for describing a recording method in the event that the recording medium is a BD-R.

FIG. 13 is a diagram illustrating, of the BD-R recording formats, the overview of the sequential recording mode.

The information recorded in a BD-R is recorded in the User region in increments of Sessions. While FIG. 13 shows two sessions, shown as Session 1 and 2 in the User region, it is needless to say that more sessions may be used. A session is configured of one or more SRR (Sequential Recording Ranges). Also, though multi-sessions can be configured, only the last-set session is a recordable session.

SRR (Sequential Recording Ranges) are configured of multiple clusters (64 KB) which are the smallest unit of information recorded on a BD-R, and are recording increments equivalent to a track with CD-R (Compact Disc-Recordable) media. Also, there are two states of SRRs, Open and Closed, with Open being a recordable state, and following recording the SRR is in a Closed state whereupon recording cannot be performed. Further, up to a maximum of 16 sessions may be in an Open state. Also, up to a maximum of 7600 SRRs can be set for a single BD-R. In FIG. 13, SRR #1 through #5 are set, SRR #1 through #4 indicating that information is already written in the regions 281-1 through 281-4 (indicated as being recorded). Also, LRA (Last Recording Allocation) is described at the end portions of the regions 281-1 through 281-4, indicating the last-recorded position. Also, in FIG. 13, sessions #3 and #5 are in an Open state, and the other sessions are in a Closed state. Accordingly, this shows that with the sessions #3 and #5, the position immediately following the LRA is an NWA (New Writing Allocation) for starting new recording.

Next, format processing of the recording medium 81 will be described with reference to the flowchart shown in FIG. 14.

In step S1, the initialization unit 62*a* of the file system information generating unit 62 of the control unit 51 controls the writing unit 73 so as to cause the recording/playing block 53 to set a SA (Spare Area) region on the recording medium 81. That is to say, in the event that the recording medium 81 is a single-layer BD-R for example, SA regions are set at the ends of the recording region, on the inner side and outer side of the Disc, as shown in FIG. 15.

Figure 15:
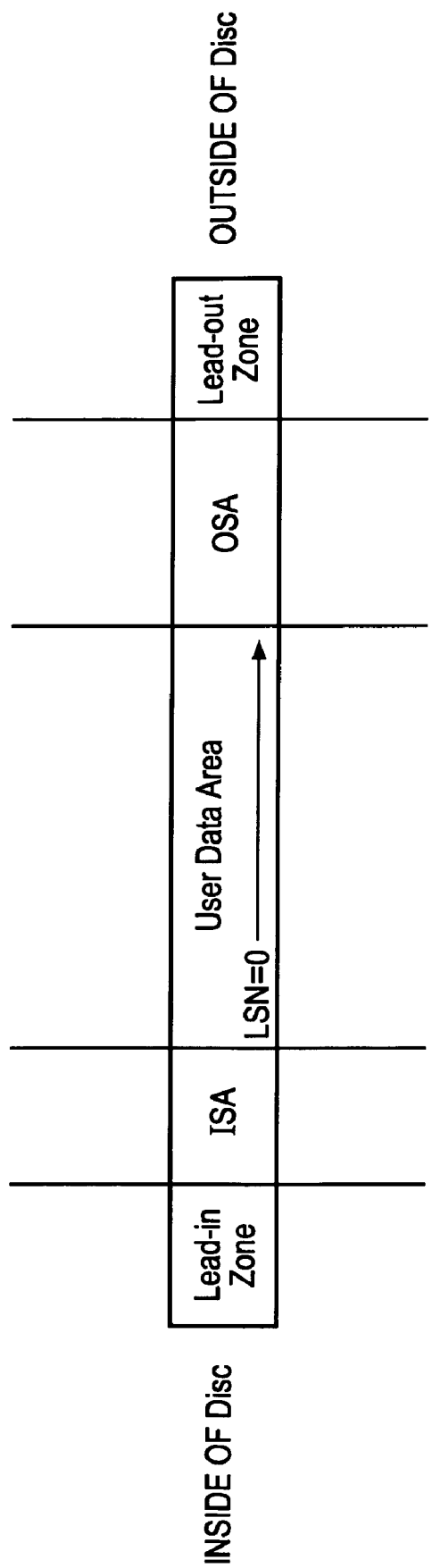
FIG. 15 is a diagram for describing setting of an SA region.

Now, in FIG. 15, the left side of the drawing indicates the inner side of the recording medium 81, and the right side of the drawing indicates the outer side of the recording medium 81. Also, recording to the recording medium 81 is performed from the inner side toward the outer side. Also, the recording medium 81 has a lead-in zone (Lead in Zone) which does not contribute to recording (region where information is not recorded) at the inner side end, and a lead-out zone (Lead out Zone) which does not contribute to recording (region where information is not recorded) at the outer side end.

In this case, the initialization unit 62a sets an inner side SA region (ISA) and an outer side SA region (OSA) at the adjacent regions of the lead-in zone and the lead-out zone. Consequently, the region between the ISA and the OSA is the User region (User Data Area), and various types of information are substantially recorded in this User region. In the User region, information is recorded from the inner side toward the outer side as described above, the LSN (logical sector numbers) are set from the inner side toward the outer side, as indicated by the arrow in the drawing.

Note that while the region size of the ISA and OSA each can be arbitrarily set, and cluster damage and later-described information writing processing can be stabilized by making the ISA and OSA regions larger in size, but the User region is reduced in size accordingly, meaning that the region valid for recording information is smaller.

Figure 16:
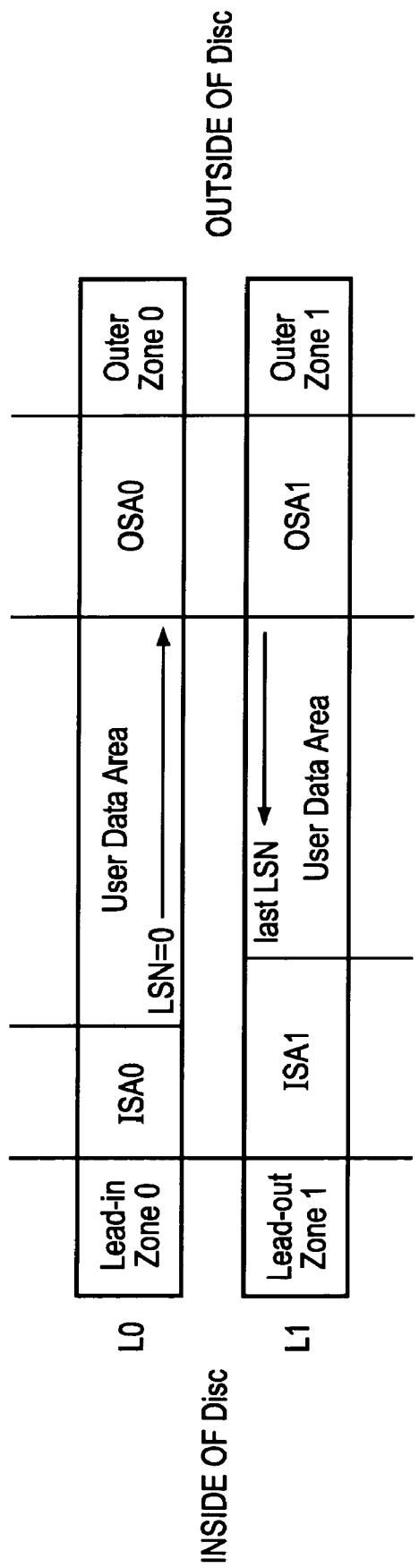
FIG. 16 is a diagram for describing setting of an SA region.

Also, in the event that the recording medium 81 is a dual-layer BD-R for example, SA regions are set at the ends of the recording region, on the inner side and outer side of the Disc, for each of the first layer and the second layer, as shown in FIG. 16.

Now, in FIG. 16, the left side of the drawing indicates the inner side of the recording medium 81, and the right side of the drawing indicates the outer side of the recording medium 81. Also, the layer shown as L0 to the top in FIG. 16 is the configuration of the first layer, and the layer shown as L1 to the bottom in FIG. 16 is the configuration of the second layer.

Also, in the case of a dual-layer BD-R, recording to the recording medium 81 is performed from the inner side toward the outer side at the first layer, and is performed from the outer side toward the inner side at the second layer. Also, the recording medium 81 has a lead-in zone (Lead in Zone0) which does not contribute to recording (region where information is not recorded) at the inner side end, and a lead-out zone (Lead out Zone0) which does not contribute to recording (region where information is not recorded) at the outer side end, each on the first layer, and a lead-in zone (Lead in Zone1) which does not contribute to recording (region where information is not recorded) at the inner side end, and a lead-out zone (Lead out Zone1) which does not contribute to recording (region where information is not recorded) at the outer side end, each on the second layer.

In this case, the initialization unit 62a sets inner side SA regions (ISA 0, 1) and outer side SA regions (OSA 0, 1) at the adjacent regions of the lead-in zones and the lead-out zones on the first layer and the second layer. Consequently, the region between the ISA 0 and the OSA 0 on the first layer, and the region between the ISA 1 and the OSA 1 on the second layer, are the User region, and various types of information are substantially recorded in this User region. In the User region on the first layer, information is recorded from the inner side toward the outer side as described above, so the LSN (logical sector numbers) are set from the inner side toward the outer side. On the other hand, in the User region on the second layer, information is recorded from the outer side toward the inner side as described above, so the LSN (logical sector numbers) are set from the outer side toward the inner side.

Figure 14:
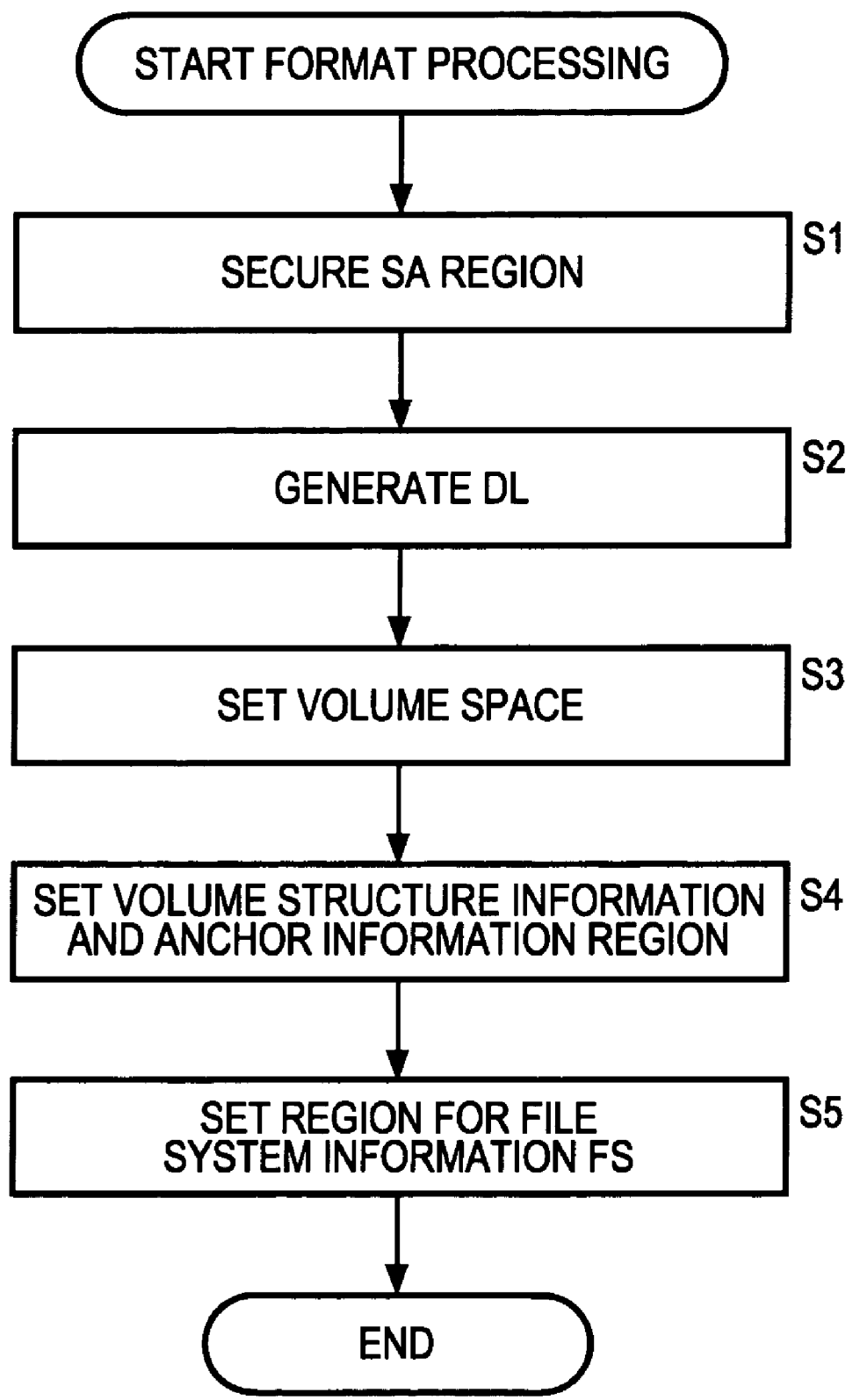
FIG. 14 is a flowchart for describing format processing.

We will now return to description of the flowchart in FIG. 14.

In step S2, the initialization unit 62a causes the replacement information management unit 63 to generate a DL (Defect List). Thus, the replacement information management unit 63 generates and stores a DL in the memory 63a. Note that at this stage, no information is included in the DL.

In step S3, the initialization unit 62a controls the writing unit 73 to cause the recording/playing block 53 to set a volume space on the recording medium 81. That is to say, as shown at the upper side in FIG. 18 to be described later, a volume space is set. Note that FIG. 18 illustrates an example of a case of the recording medium 81 used being a single-layer BD-R.

In step S4, the initialization unit 62a controls the writing unit 73 so as to cause the recording/playing block 53 to set on the recording medium 81 regions for recording volume structure information and anchor regions, for recording volume structure information and anchor information. That is to say, the regions shown as "Volume Str." and regions shown as "Anchor" at the upper side of the later-described FIG. 18, are set. Note that in the example shown in FIG. 18, a structure is employed wherein file system information is dually set, so a region for recording the volume information and anchor information, corresponding to the main FS region (the "Volume Str." and "Anchor" included in region B111 in the drawing), and a region for recording the volume information and anchor information, corresponding to the mirror FS region (the "Volume Str." and "Anchor" included in region B113 in the drawing), are each set.

In step S5, the initialization unit 62a controls the writing unit 73 so as to cause the recording/playing block 53 to set on the recording medium 81 Fs regions for recording file system information. That is to say, the region indicated by "FS" at the upper side of FIG. 18 described later are set. Note that in the example shown in FIG. 18, a structure is employed wherein file system information is dually set, so an FS region corresponding to the main FS region (the "FS (Metadata)" included in region B111 in the drawing), and a mirror FS region (the "FS (MD-Mirror)" included in region B113 in the drawing), are each set.

Figure 18:
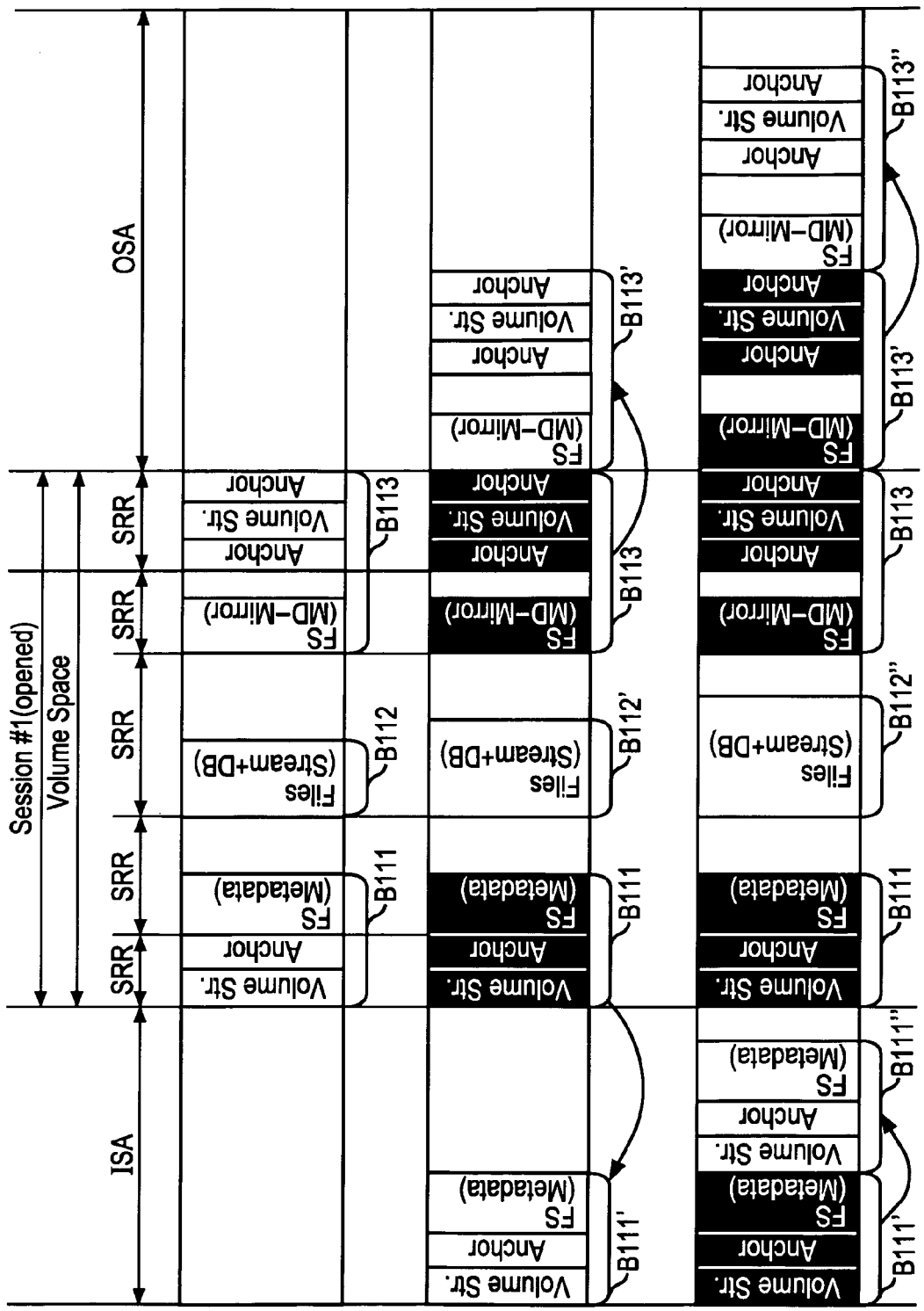
FIG. 18 is a diagram for describing writing processing with the recording/playing mechanism section shown in FIG. 3.

Note that in FIG. 18, at the time of formatting, from the left side in the drawing the inner side volume structure information and anchor information, main FS, files (Files(Stream+DB)), mirror FS, and outer side volume structure information and anchor information, are each set as one SRR.

Due to the above processing, the ISA and OSA which are regions used as replacement sectors, the volume space, anchor regions, regions for recording volume structure information, and FS regions, are set on the recording medium 81. Note that with formatting the regions are only set, and no actual information has been written. Also, the placement of the main FS (FS (Metadata)) and mirror FS (FS(MD-Mirror)) in the drawing may be reversed. Further, an arrangement may be made wherein a single FS is set, and in this case, may be set on either the inner side or the outer side.

Figure 17:
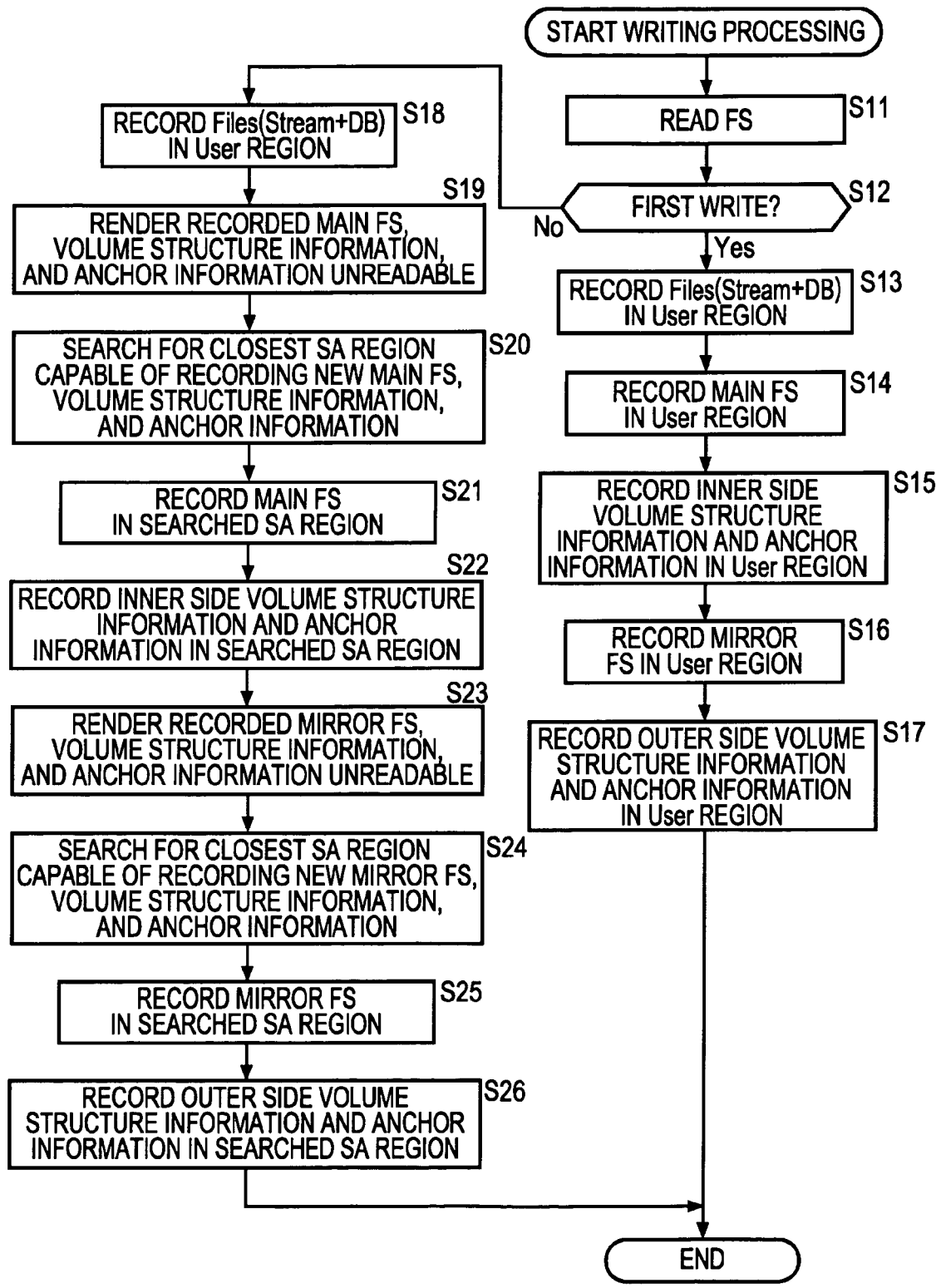
FIG. 17 is a flowchart for describing writing processing with the recording/playing mechanism section shown in FIG. 3.

Next, the processing for writing information to the recording medium 81 which has been formatted (initialized) by the processing shown in FIG. 14, by the recording/playing mechanism section 22 shown in FIG. 3, will be described with reference to the flowchart in FIG. 17.

In step S11, the file system information generating unit 62 generates and reads in file system information based on information such as additionally written or updated file attributes or the like.

In step S12, the file system information generating unit 62 determines whether or not this is the first writing processing for the recording medium 81.

In the event that determination is made in step S12 that this is the first writing for example, the processing proceeds to step S13, where the file system information generating unit 62 causes the recording/playing block 53 to write to the User region of the recording medium 81a file (stream+DB: a file made up of stream data and a database for managing the stream data) input to the writing unit 73 via the ECC encoding unit 71 and modulation unit 72.

That is, as shown to the upper side in FIG. 18, the file system information generating unit 62 causes the file (Files (stream+DB) in the drawing) input to the writing unit 73 via the ECC encoding unit 71 and modulation unit 72 to be recorded to the region B112 set on the recording medium 81 by the above-described formatting processing. Note that FIG. 18 illustrates a case of using a single-layer BD-R as the recording medium 81, as mentioned earlier.

In step S14, the file system information generating unit 62 supplies the main FS to the writing unit 73 via the ECC encoding unit 71 and modulation unit 72, and causes the recording/playing block 53 to write to the User region of the recording medium 81.

That is to say, as can be seen at the upper part of FIG. 18, the file system information generating unit 62 supplies the file system information to the writing unit 73 via the ECC encoding unit 71 and modulation unit 72, and records the main FS in the region B111 set therefore in the formatting processing of the recording medium 81 described above (records as the "FS (Metadata)" in the drawing).

In step S15, the file system information generating unit 62 supplies the inner side volume structure information and anchor information to the writing unit 73 via the ECC encoding unit 71 and modulation unit 72, and causes the recording/playing block 53 to write to the User region of the recording medium 81.

That is to say, as shown at the upper part of FIG. 18, the file system information generating unit 62 supplies the volume structure information and anchor information to the writing unit 73 via the ECC encoding unit 71 and modulation unit 72, and records the inner side volume structure information and anchor information corresponding to the main FS in the region B111 set therefore in the formatting processing of the recording medium 81 described above (records as the "Volume Str." and "Anchor" in the drawing).

In step S16, the file system information generating unit 62 supplies the mirror FS to the writing unit 73 via the ECC encoding unit 71 and modulation unit 72, and causes the recording/playing block 53 to write to the User region of the recording medium 81.

That is to say, as can be seen at the upper part of FIG. 18, the file system information generating unit 62 supplies the mirror FS to the writing unit 73 via the ECC encoding unit 71 and modulation unit 72, and records the mirror FS in the region B113 set therefore in the formatting processing of the recording medium 81 described above (records as the "FS (MD-Mirror)" in the drawing).

In step S17, the file system information generating unit 62 supplies the outer side volume structure information and anchor information to the writing unit 73 via the ECC encoding unit 71 and modulation unit 72, and causes the recording/playing block 53 to write to the User region of the recording medium 81.

That is to say, as shown at the upper part of FIG. 18, the file system information generating unit 62 supplies the outer side volume structure information and anchor information to the writing unit 73 via the ECC encoding unit 71 and modulation unit 72, and records the outer side volume structure information and anchor information corresponding to the mirror FS in the region B113 set therefore in the formatting processing of the recording medium 81 described above (records as the "Volume Str." and the two "Anchor" in the drawing).

On the other hand, in the event that determination is made in step S12 that this is not the first writing, that is to say, that the information has been recorded by the processing of steps S13 through S17 at least once or more for example, the processing proceeds to step S18.

In step S18, the file system information generating unit 62 causes the recording/playing block 53 to write to the User region of the recording medium 81 the file (stream+DB: a file made up of stream data and a database for managing the stream data) input to the writing unit 73 via the ECC encoding unit 71 and modulation unit 72.

That is, in he event that information has been recorded as shown to the upper side in FIG. 18 for example, the file system information generating unit 62 causes the file (Files (stream+DB) in the drawing) input to the writing unit 73 via the ECC encoding unit 71 and modulation unit 72 to be recorded to the region B112' set on the recording medium 81 by the above-described processing, as shown at the middle in FIG. 18. More specifically, in the event that the file is an additional write, the file system information generating unit 62 records the additional information newly added to the information recorded in the region B112 shown to the top in FIG. 18, in the region B112' shown to the middle of FIG. 18. Also, in the event of recording a file wherein new information has been updated, readout of the file recorded in the region B112 shown to the top in FIG. 18 is disabled, the information of the region B112' is configured so as to record the newly updated file in the region adjacent to the region B112, and is thus recorded.

In step S19, the file system information generating unit 62 controls the writing unit 73 via the ECC encoding unit 71 and modulation unit 72 so as to disable readout of the main FS (FS (Metadata)) and volume structure information and anchor information from the recording medium 81 by the recording/playing block 53.

That is to say, as shown to the middle of FIG. 18, the file system information generating unit 62 disables readout of the main FS (FS (Metadata)) and volume structure information and anchor information recorded in the region B111 from the recording medium 81 by the recording/playing block 53. Note that in FIG. 18, regions which have been rendered unreadable are black-white inverted, and this method of representation will be used hereinafter also.

In step S20, the file system information generating unit 62 searches for the closest positioned SA region where the new main FS (FS (Metadata)) and volume structure information and anchor information, generated by additional writing or updating of the file in the processing in step S19, can be overwritten.

That is to say, in the case of a single-layer BD-R, an SA region is one of the OSA situated at the outer side and the ISA situated at the inner side, and with the case shown to the middle in FIG. 18 for example, in the event that the SA region where the new main FS (FS (Metadata)) and volume structure information and anchor information can be written and which is closest is the ISA, the file system information generating unit 62 selects the ISA as the closest recordable region.

In step S21, the file system information generating unit 62 supplies the main FS to the writing unit 73 via the ECC encoding unit 71 and modulation unit 72, and causes the recording/playing block 53 to write to the SA region searched by the processing in step S20.

That is to say, as can be seen at the middle part of FIG. 18, the file system information generating unit 62 supplies the file system information to the writing unit 73 via the ECC encoding unit 71 and modulation unit 72, and records this in the region B111' in the ISA of the recording medium 81.

Further, in step S22, the file system information generating unit 62 supplies the inner side volume structure information and anchor information corresponding to the main FS to the writing unit 73 via the ECC encoding unit 71 and modulation unit 72, and causes the recording/playing block 53 to write to the SA region searched by the processing in step S20.

That is to say, as can be seen at the middle part of FIG. 18, the file system information generating unit 62 supplies the inner side volume structure information and anchor information to the writing unit 73 via the ECC encoding unit 71 and modulation unit 72, and records these in the region B111' in the ISA of the recording medium 81.

In step S23, the file system information generating unit 62 controls the writing unit 73 via the ECC encoding unit 71 and modulation unit 72 so as to disable readout of the mirror FS (FS (MD-Mirror)) and volume structure information and anchor information from the recording medium 81 by the recording/playing block 53.

That is to say, as shown to the middle of FIG. 18, the file system information generating unit 62 disables readout of the mirror FS (FS (MD-Mirror)) and volume structure information and anchor information recorded in the region B113 from the recording medium 81 by the recording/playing block 53.

In step S24, the file system information generating unit 62 searches for the closest positioned SA region where the new outer side mirror FS (FS (MD-Mirror)) and volume structure information and anchor information, in the processing in step S23, can be recorded.

That is to say, in the case of a single-layer BD-R, an SA region is one of the OSA situated at the outer side and the ISA situated at the inner side, and with the case shown to the middle in FIG. 18 for example, in the event that the SA region where the unreadable mirror FS (FS (MD-Mirror)) and volume structure information and anchor information can be written and which is closest is the OSA, the file system information generating unit 62 selects the OSA as the closest recordable region.

In step S25, the file system information generating unit 62 supplies the mirror FS to the writing unit 73 via the ECC encoding unit 71 and modulation unit 72, and causes the recording/playing block 53 to write the file system information thereof to the SA region searched by the processing in step S24.

That is to say, as can be seen at the middle part of FIG. 18, the file system information generating unit 62 supplies the mirror FS to the writing unit 73 via the ECC encoding unit 71 and modulation unit 72, and records the mirror FS in the region B113' in the OSA of the recording medium 81.

Further, in step S26, the file system information generating unit 62 supplies the outer side volume structure information and anchor information corresponding to the mirror FS to the writing unit 73 via the ECC encoding unit 71 and modulation unit 72, and causes the recording/playing block 53 to write to the SA region searched by the processing in step S24.

That is to say, as can be seen at the middle part of FIG. 18, the file system information generating unit 62 supplies the outer side volume structure information and anchor information to the writing unit 73 via the ECC encoding unit 71 and modulation unit 72, and records in the region B113' in the OSA of the recording medium 81.

Further, in the case of additionally writing or updating a file written to the recording medium 81 as shown in at the middle in FIG. 18, in step S18, as shown to the lower side of FIG. 18 the file system information generating unit 62 causes the file (Files (stream+DB) in the drawing) input to the writing unit 73 via the ECC encoding unit 71 and modulation unit 72 to be recorded to the region B112" set on the recording medium 81 by the above-described processing. More specifically, in the event that the file is an additional write, the file system information generating unit 62 records the additional information newly added to the information recorded in the region B112' shown to the top in FIG. 18, in the region B112" shown to the bottom of FIG. 18. Also, in the event of recording a file wherein new information has been updated, readout of the file recorded in the region B112' shown to the middle in FIG. 18 is disabled, the information of the region B112" is configured so as to record the newly updated file in the region adjacent to the region B112', and is thus recorded.

In step S19, as shown to the lower side in FIG. 18, the file system information generating unit 62 controls the writing unit 73 via the ECC encoding unit 71 and modulation unit 72 so as to disable readout of the main FS (FS (Metadata)) and volume structure information and anchor information, recorded in the region B111', from the recording medium 81 by the recording/playing block 53.

In step S20, in the case of the bottom in FIG. 18 for example, in the event that the SA region where the new main FS (FS (Metadata)) and volume structure information and anchor information can be written and which is closest is the ISA, the file system information generating unit 62 selects the ISA as the closest recordable region.

In step S21, as can be seen at the bottom part of FIG. 18, the file system information generating unit 62 supplies the main FS to the writing unit 73 via the ECC encoding unit 71 and modulation unit 72, and records the main FS in the region B111" in the ISA of the recording medium 81.

Further, in step S22, as shown at the bottom part of FIG. 18, the file system information generating unit 62 supplies the volume structure information and anchor information to the writing unit 73 via the ECC encoding unit 71 and modulation unit 72, and causes writing to the region B111' in the SA region of the recording medium 81.

In step S23, as shown at the bottom part of FIG. 18, the file system information generating unit 62 disables readout of the mirror FS (FS (MD-Mirror)) and volume structure information and anchor information recorded in the region B113' from the recording medium 81 by the recording/playing block 53.

In step S24, in the case at the bottom part of FIG. 18 for example, in the event that the SA region where the new mirror FS (FS (MD-Mirror)) and volume structure information and anchor information can be written and which is closest is the OSA, the file system information generating unit 62 selects the OSA as the closest recordable region.

In step S25, as shown at the bottom part of FIG. 18, the file system information generating unit 62 supplies the mirror FS to the writing unit 73 via the ECC encoding unit 71 and modulation unit 72, and records in the region B113" in the OSA of the recording medium 81.

Further, in step S26, as can be seen at the bottom part of FIG. 18, the file system information generating unit 62 supplies the volume structure information and anchor information to the writing unit 73 via the ECC encoding unit 71 and modulation unit 72, and records in the region B113" in the OSA of the recording medium 81.

Due to the above processing, at the time of a file being added or updated, updated information of the file system information, anchor information, and volume structure information, is sequentially recorded in a replacement sector of an SA region, so even though the file system information, anchor information, and volume structure information are sequentially written at a physically different location, the file system information, anchor information, and volume structure information can be recorded to the recording medium without changing the logical addresses thereof. Also, there is no need to rewrite the logical addressees of information such as the file system information, anchor information, and volume structure information, at the time of adding or updating files. Consequently, even recording media upon which overwriting cannot be performed at the same position, e.g., write-at-once media, can be handled as if information, which is required to be recorded at a fixed logical address, is being overwritten.

The recording processing in each of the steps S13 through S18, S21, S22, S25, and S26 in the flowchart in FIG. 17 will be described later in further detail.

While description has been made in the above regarding an example of updated new file system information being sequentially recorded as file system information, but an arrangement may be made wherein, for example, only the difference information between the pre-updating file system information and the post-updating file system information (e.g., only directory information which was changed) is recorded in the SA region. In such a case, the file system information of the recording medium 81 can be generated by using the pre-updating file system information and the difference information. Consequently, the amount of information recorded on the SA region can be conserved.

Also, in the processing in steps S20 and S24, at the time of searching for an SA region where the file system information, anchor information, and volume structure information can be recorded and which is closest, the closest SA region is determined to a certain extent according to the position on the recording medium 81, so an arrangement may be made wherein a table or a like compiling such information is generated at the time of formatting for example, to be used for searching for an SA region. Thus, the SA region searching processing can be realized at higher speed.

Further, while description has been made in the above regarding an example of the recording medium 81 being a single-layer BD-R, an arrangement may be made wherein with a case of the recording medium 81 being a dual-layer BD-R as well, at the time of searching for an SA region where the file system information, anchor information, and volume structure information can be recorded, and which is closest, the SA region being searched for may be in a relation of across layers, if the physical distance is close. That is to say, for example, at the time of searching for an SA region where the file system information, anchor information, and volume structure information, on the first layer, can be recorded, and which is closest, in the event that of the searched SA regions, an SA region on the second layer is closer than the closest SA region on the same layer, the SA region on the second layer is selected. Thus, the updated file system information, anchor information, and volume structure information can be recorded at high speed.

Also, while description has been made in the above regarding an example of recording each the main Fs and mirror FS in an SA region, both the main FS and mirror FS are recorded in the SA region each time a file is added or updated, so there is the need to ensure that much region in the ISA or OSA, so consequently, the User region on the recording medium 81 may be restricted to a smaller size.

Accordingly, an arrangement may be made wherein only one of the main FS and mirror FS is written to the SA region.

Figure 19:
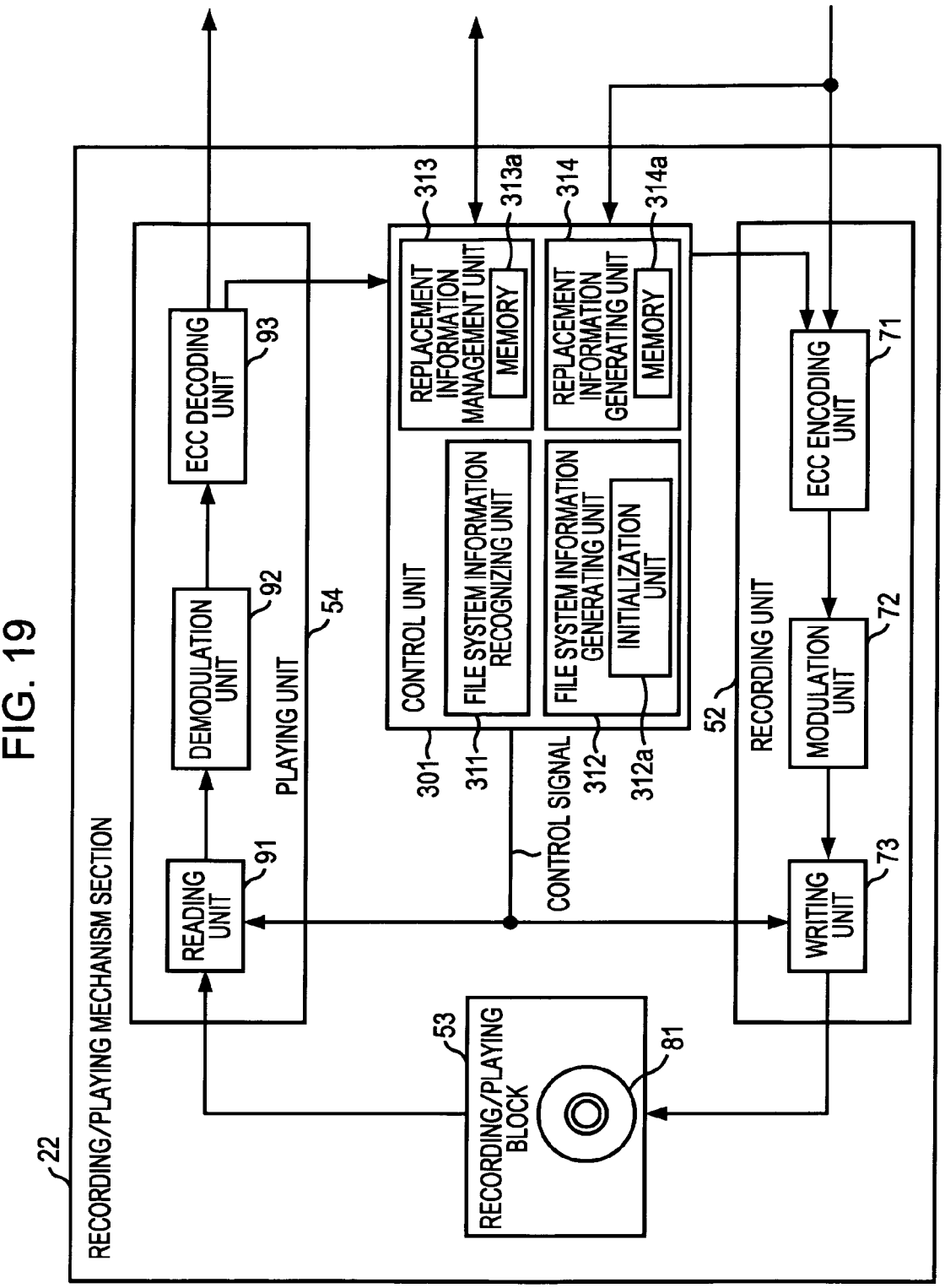
FIG. 19 is a diagram for describing another configuration of the recording/playing mechanism section.

FIG. 19 illustrates the configuration of a recording/playing mechanism section 22 configured to write only the mirror FS, and inner side file system information, anchor information, and volume structure information corresponding to the mirror FS, to SA regions. Note that with the recording/playing mechanism section 22 shown in FIG. 19, configurations corresponding to those of the recording/playing mechanism section 22 shown in FIG. 3 will be denoted with the same reference numerals, and description thereof will be omitted as appropriate.

The recording/playing mechanism section 22 in FIG. 19 and the recording/playing mechanism section 22 in FIG. 3 structurally differ in that a control unit 301 has been provided instead of the control unit 51. The control unit 301 differs in having, instead of the file system information recognizing unit 61, file system information generating unit 62, replacement information management unit 63, and replacement information generating unit 64, of the control unit 51, a file system information recognizing unit 311, a file system information generating unit 312, a replacement information management unit 313, and a replacement information generating unit 314.

While the basic function of the file system information recognizing unit 311 is the same as that of the file system information recognizing unit 51, at the time of recognizing file system information, the mirror FS, inner side volume structure information, and anchor information are read out from permanently fixed logical addresses, and the main FS, outer side volume structure information, and anchor information are read out from the User region.

While the basic function of the file system information generating unit 312 is the same as that of the file system information generating unit 62, at the time of a file being added or updated, only the main FS, outer side anchor information, and volume structure information are recorded in the User region, with the mirror FS, inner side anchor information, and volume structure information are recorded in the SA region.

While the basic function of the initialization unit 312a of the file system information generating unit 312 is the same as that of the initialization unit 62a, the positions of the mirror FS and main FS are formatted in an inverted state between the inner side and the outer side. That is to say, as shown in at the top of FIG. 21 to be described later, the anchor information and volume structure information corresponding to the mirror FS is set at the region B131, and the anchor information and volume structure information corresponding to the main FS is set at the region B133. Note that in FIG. 21, the inner side volume structure information and anchor information, main FS, files, mirror FS, anchor information, and volume structure information, are each set as one SRR.

Note that while here, description will be made regarding an example wherein, at the time of a file being added or updated, only the mirror FS, inner side anchor information, and volume structure information are recorded in the SA region, and the main FS, outer side anchor information, and volume structure information are recorded in the User region, an arrangement may be made wherein only the main FS, outer side anchor information, and volume structure information are recorded in the SA region, and the mirror FS, inner side anchor information, and volume structure information are recorded in the User region.

Also, the replacement information management unit 313, memory 303a, replacement information generating unit 314, and memory 314a are the same as the replacement information management unit 63, memory 63*a*, replacement information generating unit 64, and memory 64*a*, in FIG. 3, so description thereof will be omitted.

Next, description will be made regarding the writing processing by the recording/playing mechanism section 22 in FIG. 19, with reference to the flowchart in FIG. 20.

Figure 20:
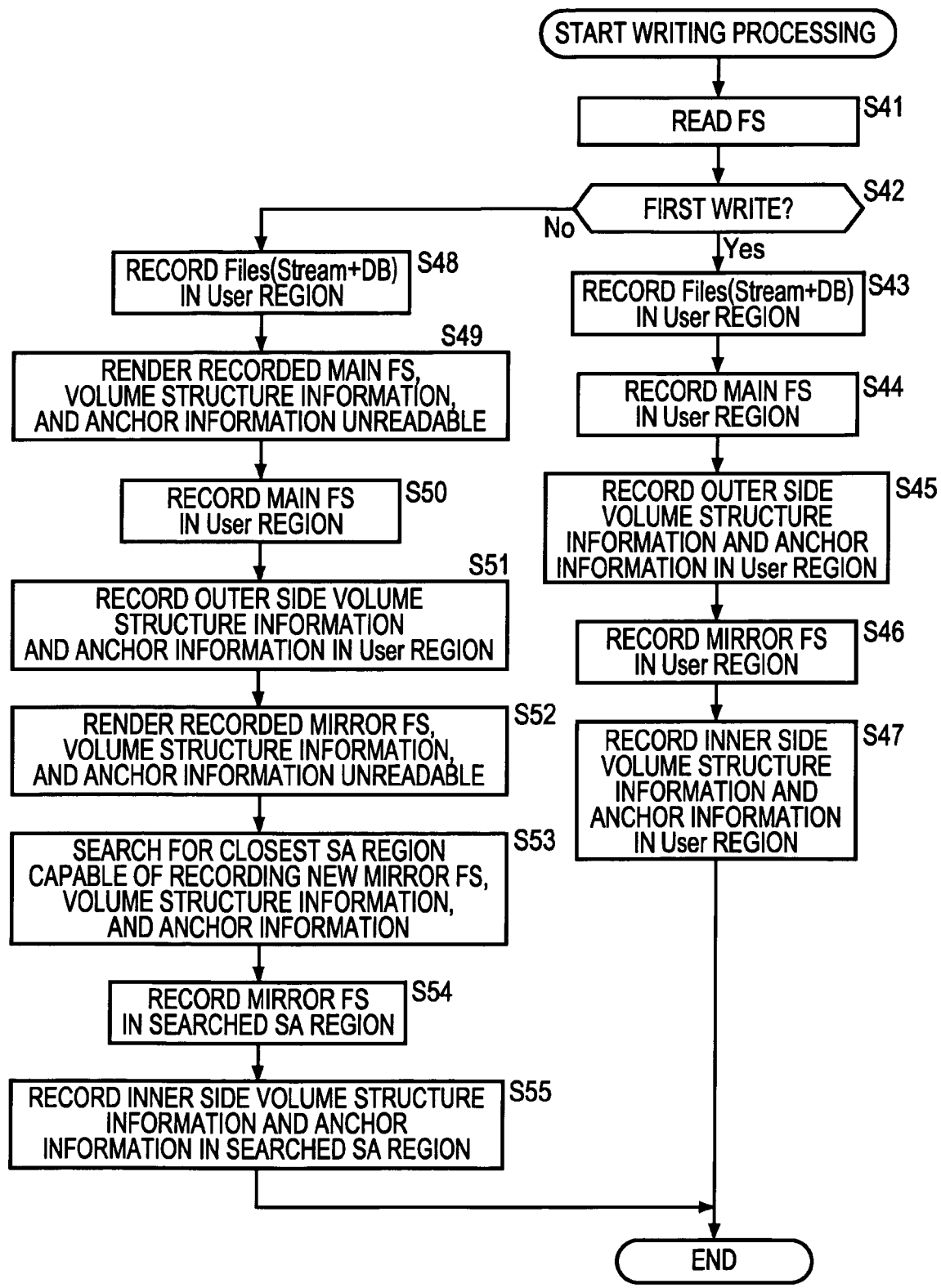
FIG. 20 is a flowchart for describing writing processing with the recording/playing mechanism section shown in FIG. 19.

Note that the processing of steps S41 through S49, and steps S52 through S55, in the flowchart in FIG. 20, is the same as processing of steps S11 through S19, and steps S23 through S26, described with reference to the flowchart in FIG. 17, so description thereof will be omitted.

Figure 21:
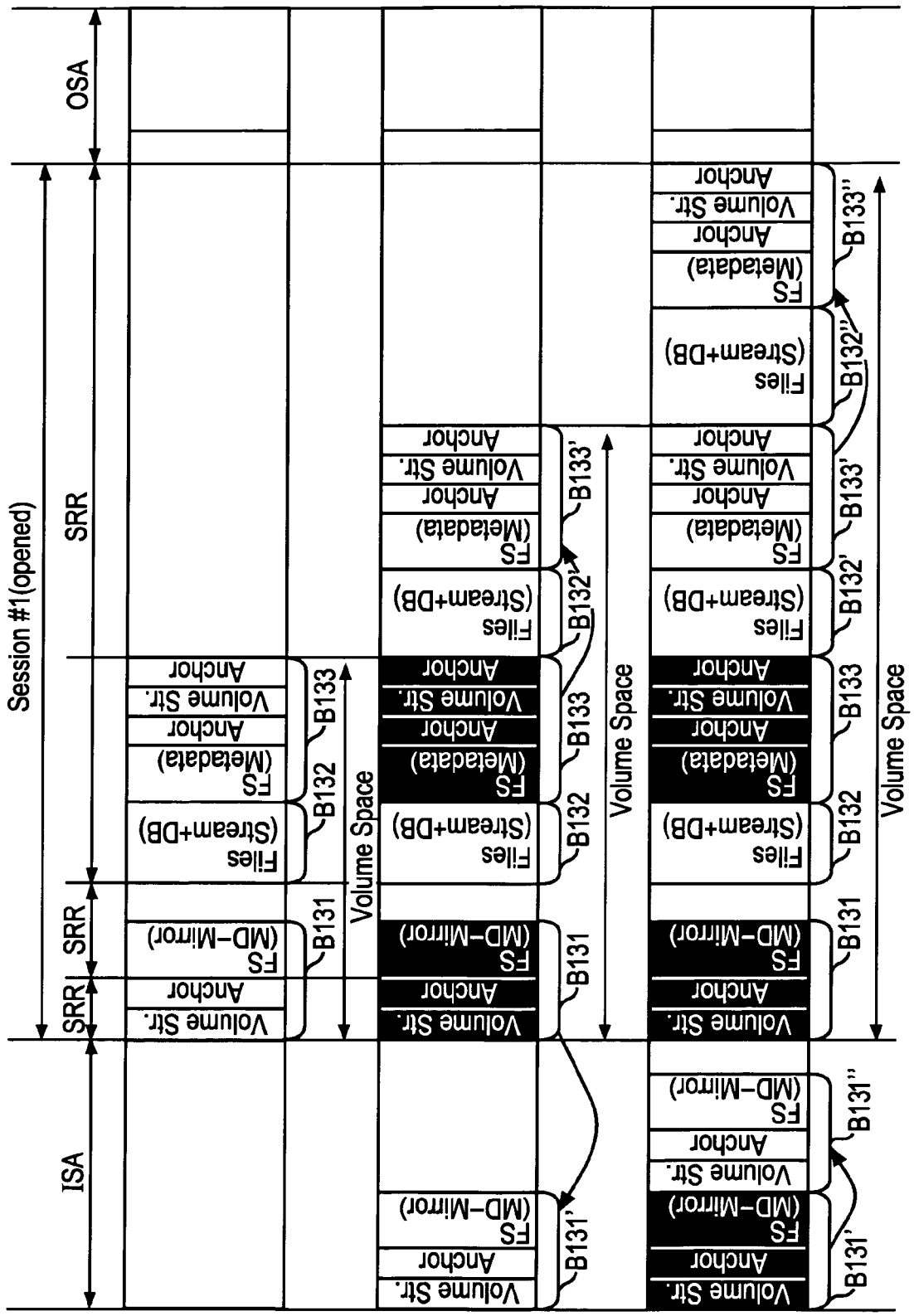
FIG. 21 is a diagram for describing writing processing with the recording/playing mechanism section shown in FIG. 19.

In step S41, the file system information is read in, in step S42, whether or not this is the first write is determined, and in the event that this is the first processing for example, in step S43, the recorded file (Files (Stream+DB in the drawing) is recorded to the region B132 of the User region, as shown at the top in FIG. 21. In step S44, the main FS (FS (Metadata) in the drawing) is recorded to the region B133 of the User region, as shown at the top in FIG. 21, for example. In step S45, the outer side volume structure information corresponding to the main FS (Volume Str. in the drawing) and the anchor information (Anchor in the drawing) are recorded to the region B131 of the User region. In step S46, the mirror FS (FS (MD-Mirror) in the drawing) is recorded to the region B131 of the User region. In step S47, the inner side volume structure information corresponding to the mirror FS (Volume Str. in the drawing) and the anchor information (Anchor in the drawing) are recorded to the region B131 of the User region.

Further, in step S42, in the event that a file has been recorded by the processing of steps S43 through S47 described above, and subsequently, the file has been added, in step S48, the added file (Files (Stream+DB) in the drawing) is additionally written to the region B132' of the User region, as shown at the middle in FIG. 21. In step S49, readout of the main FS, outer side volume structure information, and anchor information, described immediately before, is disabled.

In step S50, the file system information generating unit 312 supplies the main FS to the writing unit 73 via the ECC encoding unit 71 and modulation unit 72, and causes the recording/playing block 53 to write to the region B133' of the User region, as shown at the middle in FIG. 21.

Further, in step S51, the file system information generating unit 312 supplies the outer side volume structure information and anchor information corresponding to the main FS to the writing unit 73 via the ECC encoding unit 71 and modulation unit 72, and causes writing thereof to the region B133' of the User region, as shown at the middle in FIG. 21.

Then in step S52, the file system information generating unit 312 disables readout of the mirror FS (FS (MD-Mirror)) and inner side volume structure information and anchor information recorded in the region B131' at the middle in FIG. 21. In step S53, the closest recordable SA region from the position where the mirror FS, inner side volume structure information, and anchor information, are recorded, is searched. For example, in the case of the middle in FIG. 21, the ISA is searched as the closest recordable SA region.

In steps S54 and S55, the mirror FS and the inner side anchor information and volume structure information corresponding to the mirror FS are recorded to the region B131' of the searched ISA, as shown at the middle in FIG. 21.

Further, in the event that a file is added in this state in step S48, the added file (Files (Stream+DB) in the drawing) is additionally written to the region B132" of the User region, as shown at the lower side in FIG. 21. In step S49, readout of the main FS, outer side volume structure information, and anchor information, described in region B133' immediately before, is disabled.

In step S50, the file system information generating unit 312 supplies the main FS to the writing unit 73 via the ECC encoding unit 71 and modulation unit 72, and causes the recording/playing block 53 to write to the region B133" of the User region, as shown at the lower side in FIG. 21.

Further, in step S51, the file system information generating unit 312 supplies the outer side volume structure information and anchor information corresponding to the main FS to the writing unit 73 via the ECC encoding unit 71 and modulation unit 72, and causes writing thereof to the region B133" of the User region, as shown at the lower side in FIG. 21.

Then in step S52, the file system information generating unit 312 disables readout of the mirror FS (FS (MD-Mirror)) and inner side volume structure information and anchor information recorded in the region B133' at the lower side in FIG. 21. In step S53, the closest recordable SA region from the position where the mirror FS, inner side volume structure information, and anchor information, are recorded, is searched. For example, in the case of the lower side in FIG. 21, the ISA is searched as the closest recordable SA region.

In steps S54 and S55, the mirror FS and the inner side anchor information and volume information corresponding to the mirror FS are recorded to the region B131" of the searched ISA, as shown at the lower side in FIG. 21.

Due to the above processing, in the event that a file is added or updated, the mirror FS and the inner side anchor information and volume structure information corresponding to the mirror FS alone are recorded to the SA region, so the space consumed at the SA region can be kept to around half of that with the recording/playing mechanism section 22 shown in FIG. 3. However, in this case, the position where the main FS and the anchor information and volume structure information corresponding to the main FS are recorded is changed in the order of regions B133, B133', and B133", so the logical address needs to be changed, for example, as shown in FIG. 21. Accordingly, in such a case, an arrangement may be made wherein the mirror FS is normally read out to obtain the mirror FS recorded at the fixed logical address, and only in the event that the mirror FS cannot be read for some reason, read out the main FS recorded in the User region, thereby realizing both the advantage of reading file system information from a fixed logical address and the advantage of configuring the FS in duplicate, while conserving SA region.

The recording processing in each of the steps S43 through S48, S50, S51, S54, and S55, in the flowchart in FIG. 20 will be described later in further detail.

While description has been made in the above regarding an example of providing duplicate FS by providing identical main FS and mirror FS, an arrangement may be made wherein only the main file system information is recorded in the User region at the time of a file being added or updated, and only the inner side volume structure information and anchor information is recorded in the SA region, thereby further conserving the amount of SA region used.

Figure 22:
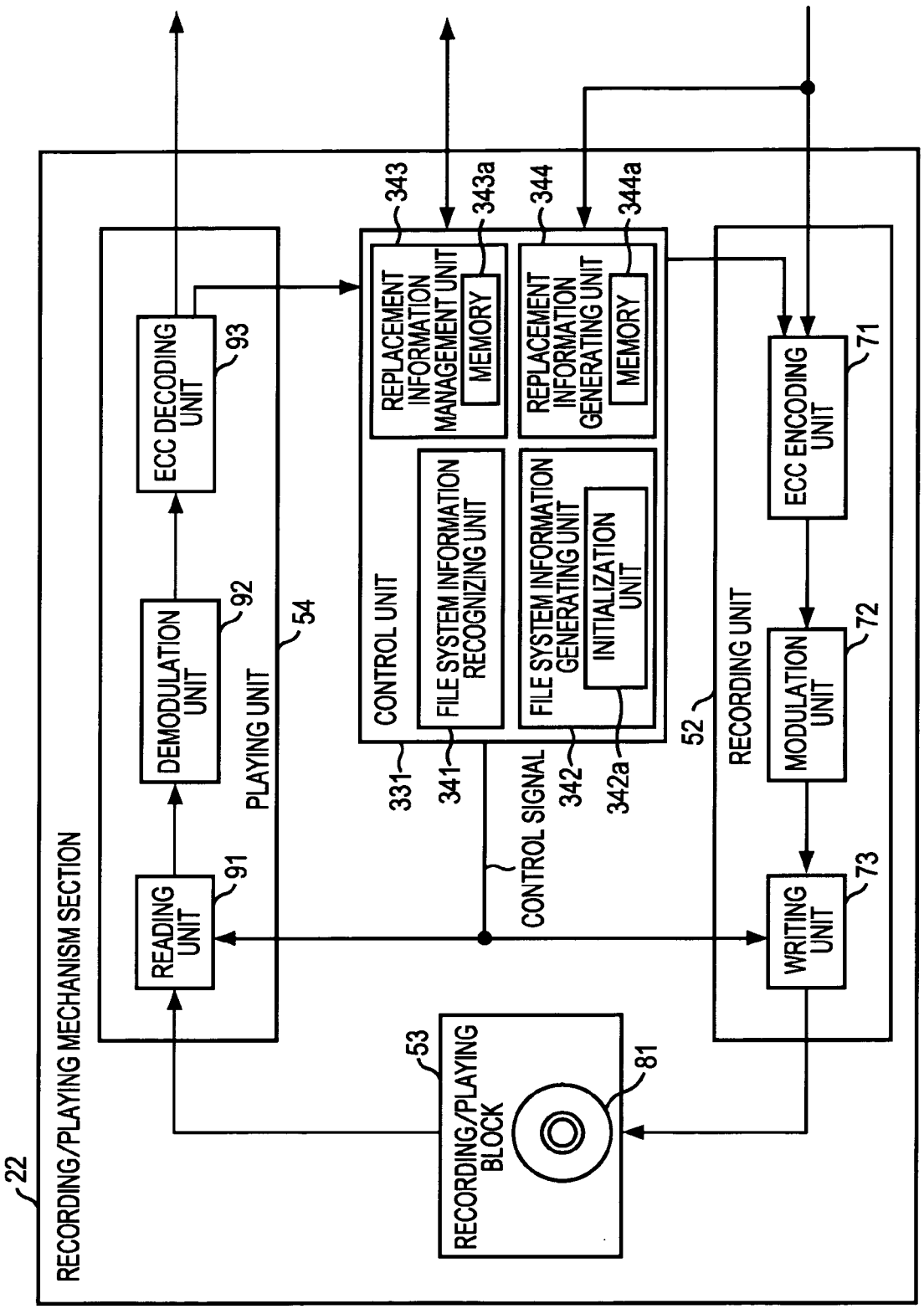
FIG. 22 is a diagram for describing yet another configuration of the recording/playing mechanism section.

FIG. 22 illustrates the configuration of a recording/playing mechanism section 22 configured to write only the main FS, to the User region at the time of a file being added or updated, and only inner side volume structure information and anchor information to SA regions. Note that with the recording/playing mechanism section 22 shown in FIG. 22, configurations corresponding to those of the recording/playing mechanism section 22 shown in FIG. 19 will be denoted with the same reference numerals, and description thereof will be omitted as appropriate.

The recording/playing mechanism section 22 in FIG. 22 and the recording/playing mechanism section 22 in FIG. 19 differ in that a control unit 331 has been provided instead of the control unit 301. The control unit 331 differs in having, instead of the file system information recognizing unit 311, file system information generating unit 312, replacement information management unit 313, and replacement information generating unit 314, a file system information recognizing unit 341, a file system information generating unit 342, a replacement information management unit 343, and a replacement information generating unit 344.

While the basic function of the file system information recognizing unit 341 is the same as that of the file system information recognizing unit 311, at the time of recognizing file system information, the main FS, outer side volume structure information, and anchor information are read out. Note that here, with the example in FIG. 22, only the main FS alone is recorded, so regarding what is readable, the file system information recognizing unit 341 can only read out the main FS as file system information.

While the basic function of the file system information generating unit 342 is the same as that of the file system information generating unit 62, at the time of a file being added or updated, only the file system alone, outer side anchor information, and volume structure information are recorded in the User region, with the inner side anchor information and volume structure information being recorded in the SA region.

While the basic function of the initialization unit 342a of the file system information generating unit 342 is basically the same as that of the initialization unit 312a, unlike the initialization unit 312a the main FS alone is set to the User region. That is to say, as shown at the upper side of FIG. 24 to be described later, the main FS alone, and the outer side anchor information and volume structure information are set in the region B153 and the inner side anchor information and volume structure information are set in the region B151. Note that in FIG. 24, the inner side volume structure information and anchor information, main FS, files, mirror FS, anchor information, and volume structure information, are each set as one SRR.

Also, the replacement information management unit 343, memory 343a, replacement information generating unit 344, and memory 344a are the same as the replacement information management unit 63, memory 63a, replacement information generating unit 64, and memory 64a, in FIG. 3, so description thereof will be omitted.

Next, description will be made regarding the writing processing by the recording/playing mechanism section 22 in FIG. 22, with reference to the flowchart in FIG. 23.

Figure 23:
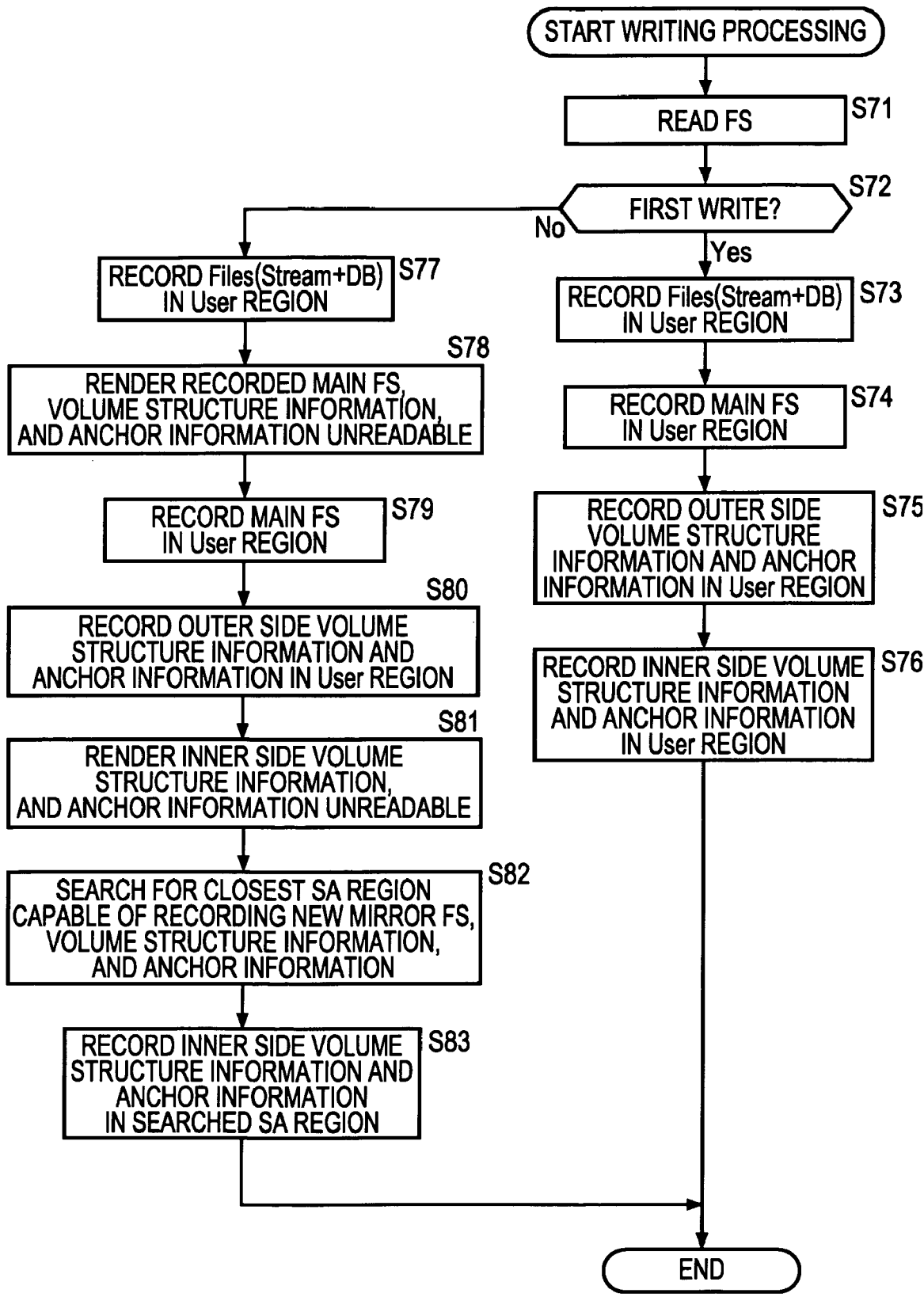
FIG. 23 is a flowchart for describing writing processing with the recording/playing mechanism section shown in FIG. 22.

Note that the processing of steps S71 through S81 in the flowchart in FIG. 23 is the same as processing of steps S41 through S45, and steps S47 through S51, described with reference to the flowchart in FIG. 20, so description thereof will be omitted.

Figure 24:
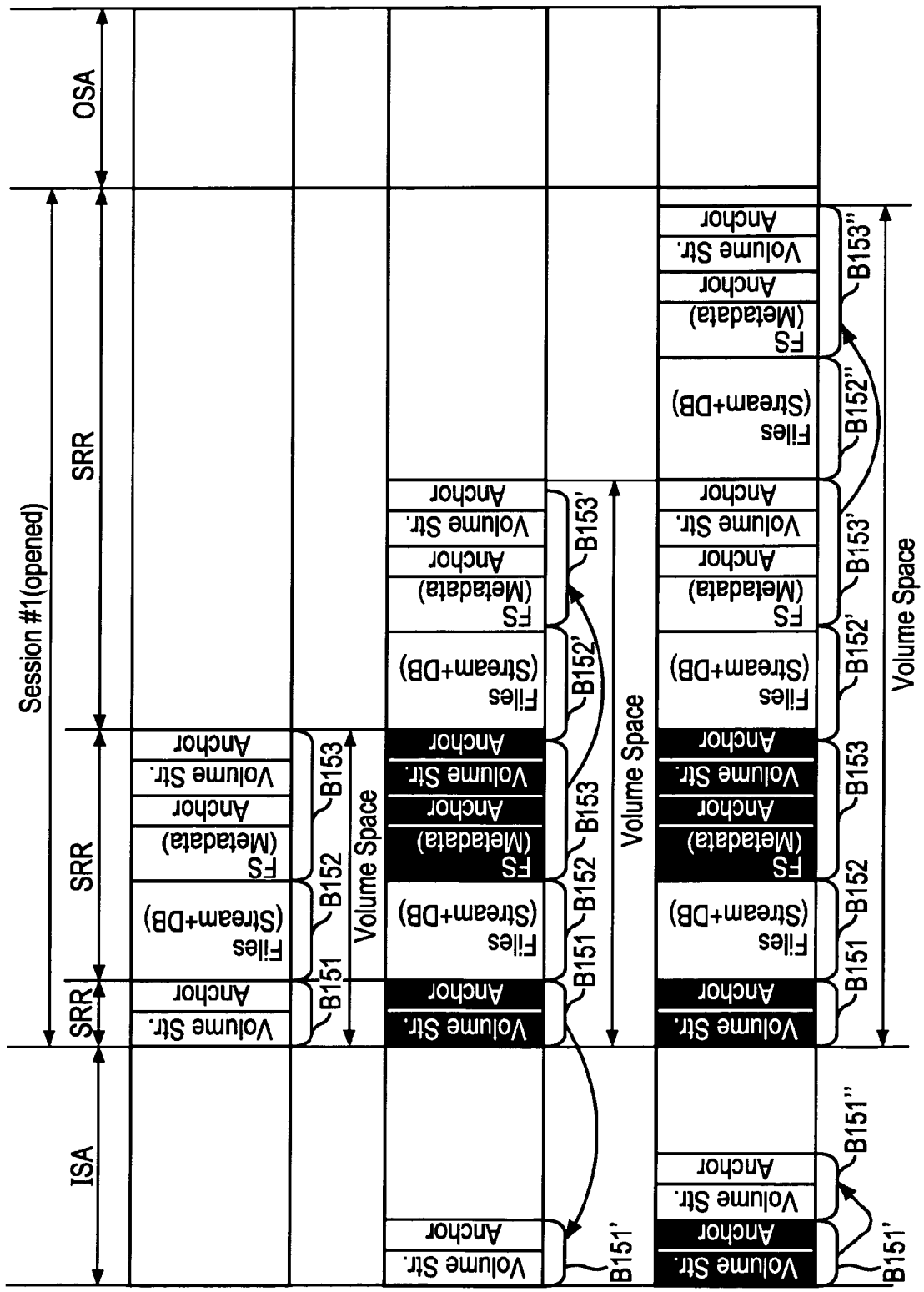
FIG. 24 is a diagram for describing writing processing with the recording/playing mechanism section shown in FIG. 22.

In step S71, the file system information is read in, in step S72, whether or not this is the first write is determined, and in the event that this is the first processing, in step S73, the recorded file (Files (Stream+DB in the drawing) is recorded to the region B152 of the User region, as shown at the top in FIG. 24. In step S74, the (solitary) main FS (FS (Metadata) in the drawing) is recorded to the region B153 of the User region, as shown at the top in FIG. 24. In step S75, the outer side volume structure information (Volume Str. in the drawing) and the anchor information (Anchor in the drawing) are recorded to the region B153 of the User region. In step S76, the inner side volume structure information (Volume Str. in the drawing) and the anchor information (Anchor in the drawing) are recorded to the region B151 of the User region.

Further, in step S72, in the event that a file has been recorded by the processing of steps S73 through S76 described above, and subsequently, the file has been added, in step S77, the added file (Files (Stream+DB) in the drawing) is additionally written to the region B152' of the User region, as shown at the middle in FIG. 24. In step S78, readout of the main FS, outer side volume structure information, and anchor information, described immediately before in the region 153, is disabled.

In step S79, the file system information is written to the region B153' of the User region, as shown at the middle in FIG. 24. Further, in step S80, the outer side volume structure information and anchor information are written to the region B153' of the User region, as shown at the middle in FIG. 24.

Further, in step S81, file system information generating unit 342 disables readout of the inner side volume structure information and anchor information recorded in the region B151 at the middle in FIG. 24.

Further, in step S82, the file system information generating unit 342 searches for the closest recordable SA region from the position where the inner side volume structure information and anchor information are recorded. For example, in the case of the middle in FIG. 24, the ISA is searched as the closest recordable SA region.

In step S83, the file system information generating unit 342 records the inner side anchor information and volume structure information to the region B151' of the searched ISA region, as shown at the middle in FIG. 24.

Further, in the event that a file is added in this state, in step S77 the added file (Files (Stream+DB) in the drawing) is additionally written to the region B152" of the User region, as shown at the lower side in FIG. 24. In step S78, readout of the main FS, volume structure information, and anchor information, described in region B153' immediately before, is disabled.

In step S79, the main FS is written to the region B153" of the User region, as shown at the lower side in FIG. 24.

Further, in step S80, with the file system information generating unit 312, the outer side volume structure information and anchor information are written to the region B153" of the User region, as shown at the lower side in FIG. 24.

Then in step S81, readout of the inner side volume structure information and anchor information recorded in the region B151' at the lower side in FIG. 24 is disabled. In step S82, the closest recordable SA region from the position where the inner side volume structure information and anchor information are recorded is searched. For example, in the case of the lower side in FIG. 24, the ISA is searched as the closest recordable SA region.

In step S83, the inner side anchor information and volume information are recorded to the region B151" of the searched ISA, as shown at the lower side in FIG. 24.

Due to the above processing, in the event that a file is added or updated, only the inner side anchor information and volume structure information are recorded to the SA region, so volume structure information and anchor information at fixed logical addresses can be read out. Also, the space consumed at the SA region can be kept to even less than that with the recording/playing mechanism section 22 shown in FIG. 3 or FIG. 19. However, in this case as well, the position where the main FS and the outer side anchor information and volume structure information are recorded is changed in the order of regions B153, B153', and B153", as shown in FIG. 24 for example, so the logical address needs to be changed.

The recording processing in each of the steps S73 through S77, S79, S80, and S83, in the flowchart in FIG. 23 will be described later in further detail.

While description has been made in the above regarding an example of setting file system information (both main FS and mirror FS or only main FS) and volume structure information and anchor information, or volume structure information and anchor information, at the head portion of the volume space, and recording in an SA region each time there is an update, the information is not restricted to these combinations, and may be, for example, one of file system information, volume structure information, and anchor information.

Also, while description has been made in the above regarding an example of recording one of file system information, volume structure information, and anchor information, in an SA region, at the head portion of the volume space, to enable reading out of the file system information, volume structure information, or anchor information, by performing updating of the file system information, volume structure information, or anchor information, upon adding or updating of a file, an arrangement may further be made wherein a portion of a file is also recorded in an SA region at the time of adding or updating of a file.

Figure 25:
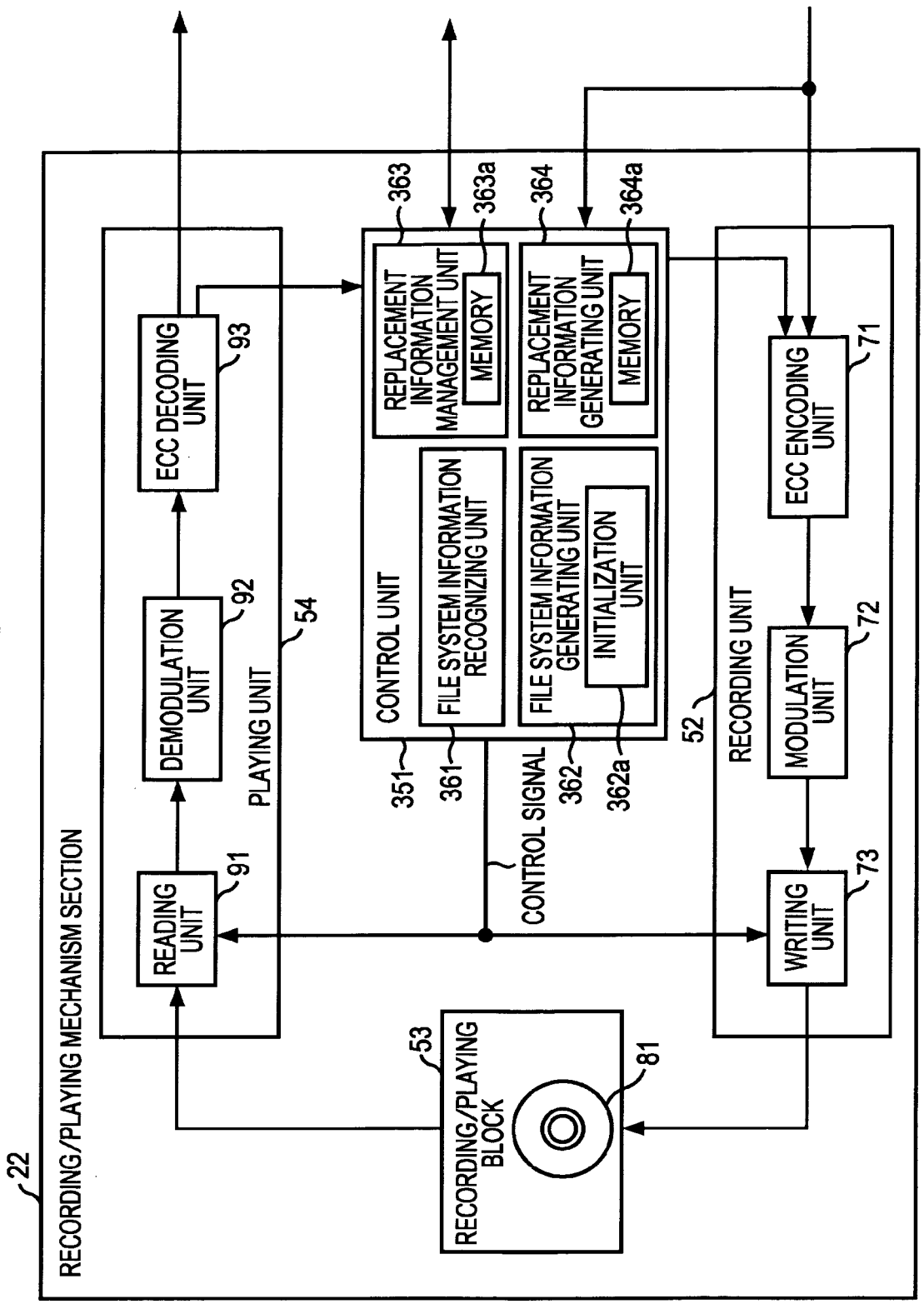
FIG. 25 is a diagram for describing yet another configuration of the recording/playing mechanism section.

FIG. 25 illustrates the configuration of a recording/playing mechanism section 22 configured to write, in addition to the file system information, volume structure information, and anchor information, a part of files, to SA regions, at the time of adding or updating a file.

Note that with the recording/playing mechanism section 22 shown in FIG. 25, configurations corresponding to those of the recording/playing mechanism section 22 shown in FIG. 3 will be denoted with the same reference numerals, and description thereof will be omitted as appropriate.

The recording/playing mechanism section 22 in FIG. 25 and the recording/playing mechanism section 22 in FIG. 3 differ in that a control unit 351 has been provided instead of the control unit 51. The control unit 351 differs in having, instead of the file system information recognizing unit 61, file system information generating unit 62, replacement information management unit 63, and replacement information generating unit 64, a file system information recognizing unit 361, a file system information generating unit 362, a replacement information management unit 363, and a replacement information generating unit 364.

While the basic function of the file system information recognizing unit 361 is the same as that of the file system information recognizing unit 51, at the time of recognizing file system information, file system information, volume structure information, anchor information, and files (stream data database DB: hereinafter referred to as file (DB)) recorded in the inner side ISA are read out from permanently fixed logical addresses, and the outer side file system information, volume structure information, and anchor information are read out from the User region.

While the basic function of the file system information generating unit 362 is the same as that of the file system information generating unit 62, at the time of a file being added or updated, the inner side file system information, anchor information, volume structure information, and file (DB) are written to an SA region, and also, outer side file system information, anchor information, and volume structure information are recorded to the User region.

While the basic function of the initialization unit 362a of the file system information generating unit 362 is the same as that of the initialization unit 62a, files are separately set as stream data (Files (Stream)) and database (Files (DB)) at the time of formatting. That is to say, as shown at the upper side in FIG. 27 to be described layer, in addition to the anchor information and volume structure information corresponding to the main FS (FS (Metadata)), the database information (Files (DB)) is set in region B171, and the anchor information and volume structure information corresponding to the mirror FS (FS(MD-Mirror)) is set in region B173.

Also, the replacement information management unit 363, memory 363a, replacement information generating unit 364, and memory 364a are the same as the replacement information management unit 63, memory 63a, replacement information generating unit 64, and memory 64a, in FIG. 3, so description thereof will be omitted.

Next, description will be made regarding the writing processing by the recording/playing mechanism section 22 in FIG. 25, with reference to the flowchart in FIG. 26.

Figure 26:
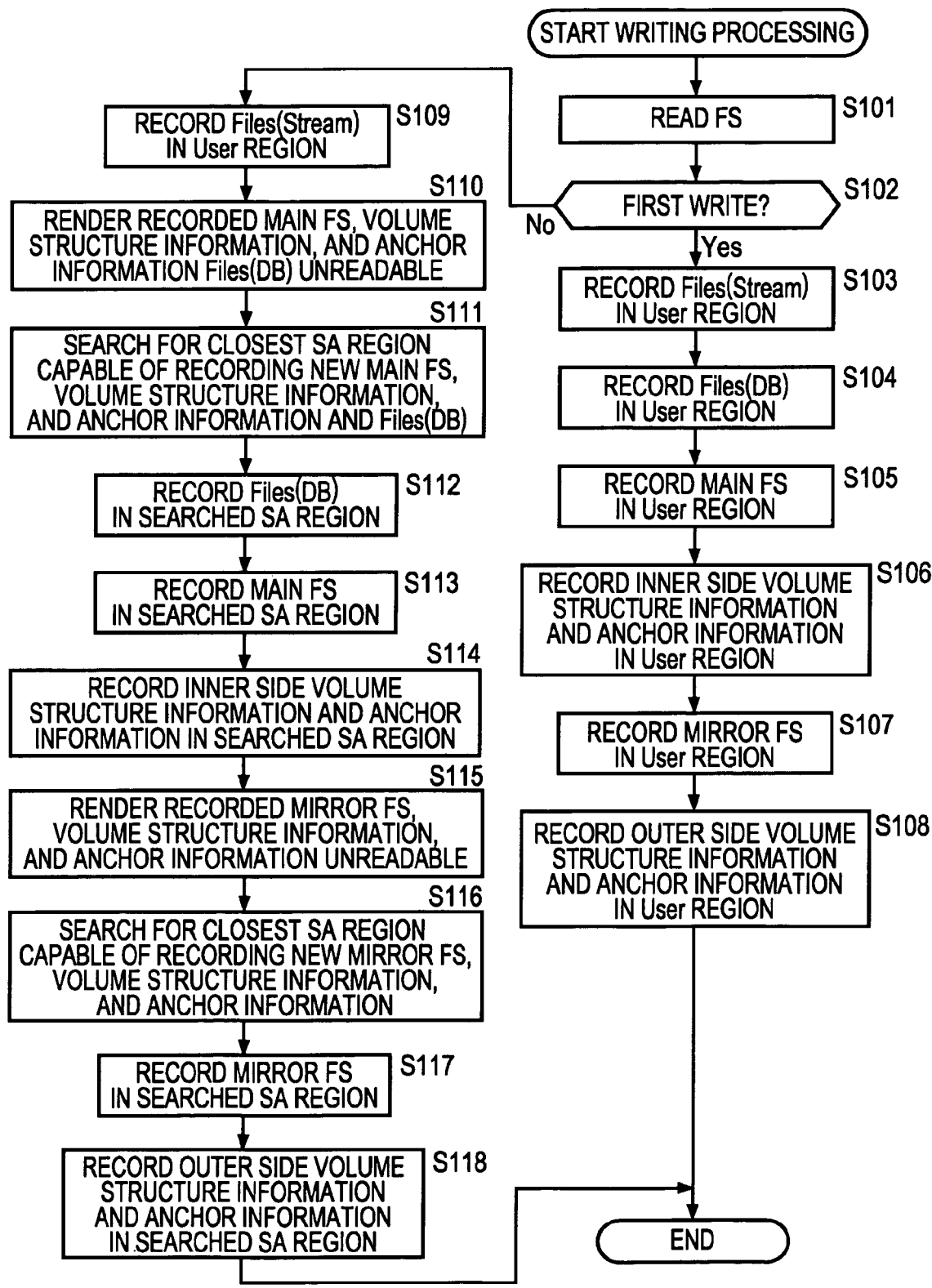
FIG. 26 is a flowchart for describing writing processing with the recording/playing mechanism section shown in FIG. 25.

Note that the processing of steps S101 and S102, steps S105 through S108, and steps S113 through S118 in the flowchart in FIG. 26 is the same as processing of steps S11 and S12, steps S14 through S17, and steps S21 through S26 in described with reference to the flowchart in FIG. 17, so description thereof will be omitted.

In step S101, the file system information FS is read in, in step S102, whether or not this is the first write is determined, and in the event that this is the first processing, in step S103, the file system information generating unit 362 causes the recording/playing block 53 to write to the User region of the recording medium 81 stream data (Files (Stream)) input to the writing unit 73 via the ECC encoding unit 71 and modulation unit 72.

Figure 27:
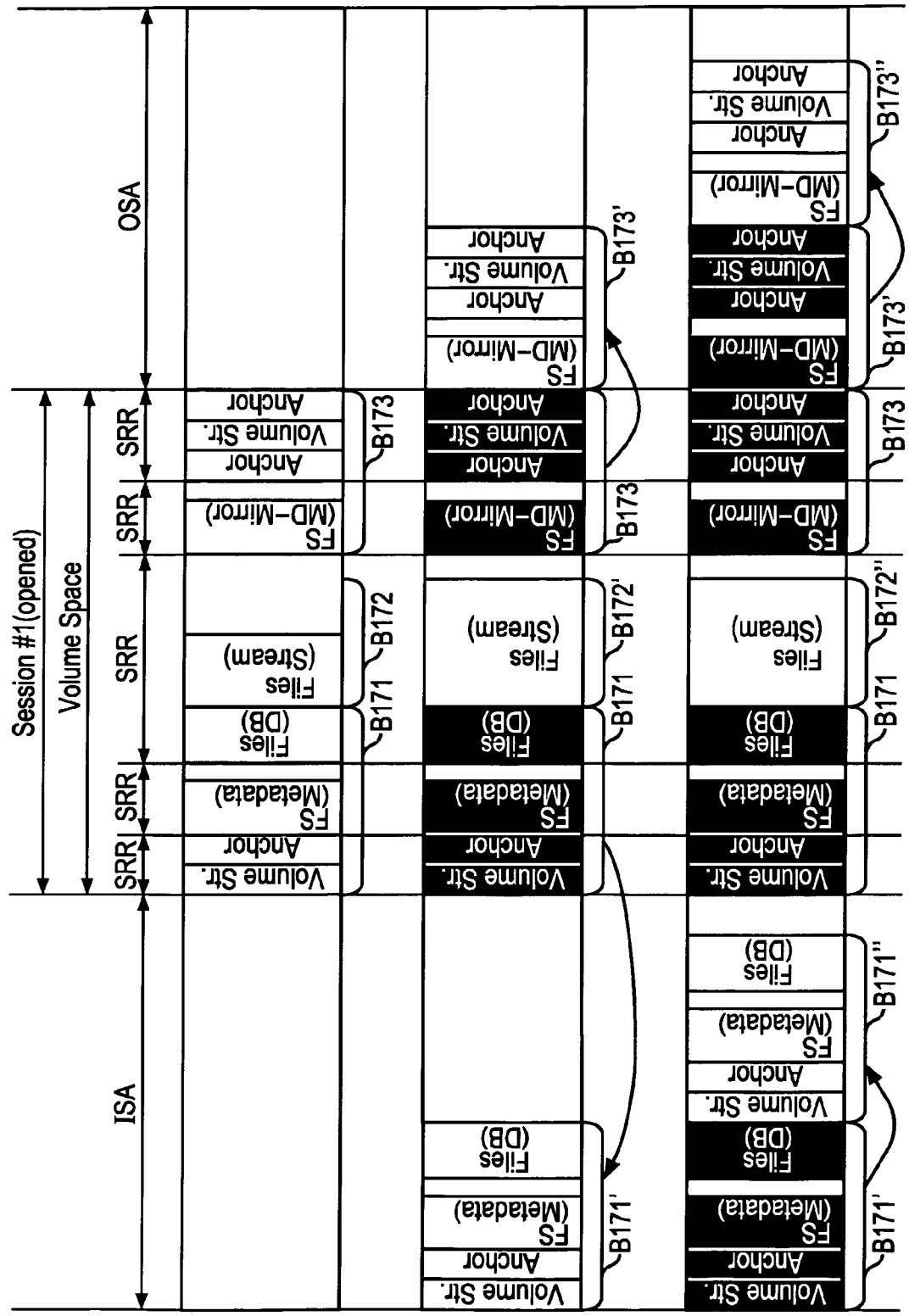
FIG. 27 is a diagram for describing writing processing with the recording/playing mechanism section shown in FIG. 25.

That is, as shown to the upper side in FIG. 27, the file system information generating unit 362 causes the file (Files (Stream)) input to the writing unit 73 via the ECC encoding unit 71 and modulation unit 72 to be recorded to the region B172 set on the recording medium 81 by the above-described formatting processing.

In step S104, the file system information generating unit 362 writes the database (Files (DB): database for managing stream data) input to the writing unit 73 via the ECC encoding unit 71 and modulation unit 72, to the User region of the recording medium 81 by the recording/playing block 53.

That is to say, as can be seen at the upper part of FIG. 27, the file system information generating unit 362 records the file (Files (Stream+DB) in the drawing) input to the writing unit 73 via the ECC encoding unit 71 and modulation unit 72, to the region B171 set on the recording medium 81 by the above-described formatting processing.

In step S105, the main FS (FS (Metadata) in the drawing) is recorded to the region B171 of the User region, as shown at the top in FIG. 27. In step S106, the inner side volume structure information (Volume Str. in the drawing) and the anchor information (Anchor in the drawing) corresponding to the main FS are recorded to the region B171 of the User region. In step S107, the mirror FS (FS (MD-Mirror) in the drawing) is recorded to the region B173 in the User region. In step S108, the outer side volume structure information (Volume Str. in the drawing) and the anchor information (Anchor in the drawing) corresponding to the mirror FS are recorded to the region B173 of the User region.

Further, in step S102, in the event that a file has been recorded by the processing of steps S103 through S108 described above, and subsequently, the file has been added or updated, the processing advances to step S109.

In step S109, the file system information generating unit 362 causes the recording/playing block 53 to write to the User region of the recording medium 81 the file (Stream: a file made up of stream data) input to the writing unit 73 via the ECC encoding unit 71 and modulation unit 72.

That is, in the event that information is recorded on the recording medium 81 in a state such as shown to the upper side in FIG. 27 for example, the file system information generating unit 62 causes the file (Files (Stream) in the drawing) input to the writing unit 73 via the ECC encoding unit 71 and modulation unit 72 to be recorded to the region B172' set on the recording medium 81 by the above-described processing, as shown to the middle in FIG. 27. More specifically, in the event that the file is an additional write, the file system information generating unit 362 records the additional information newly added to the information recorded in the region B172 shown at the upper side in FIG. 27, in the region B172' shown to the middle of FIG. 27. Also, in the event of recording a file wherein new information has been updated, readout of the file recorded in the region B172 shown to the top in FIG. 27 is disabled, the information of the region B172' is configured so as to record the newly updated file in the region adjacent to the region B172, and is thus recorded.

In step S110, the file system information generating unit 362 controls the writing unit 73 via the ECC encoding unit 71 and modulation unit 72 so as to disable readout of the main FS (FS (Metadata)) and inner side volume structure information, anchor information, and Files (DB) from the recording medium 81 by the recording/playing block 53.

That is to say, as shown to the middle of FIG. 27, the file system information generating unit 362 disables readout of the main FS (FS (Metadata)) and volume structure information, anchor information, and Files (DB) (database file updated at the time of a file being added or updated), recorded in the region B171 from the recording medium 81 by the recording/playing block 53.

In step S111, the file system information generating unit 362 searches for the closest positioned SA region where the new main FS (FS (Metadata)), volume structure information, anchor information, and database file (Files (DB)) can be overwritten by the processing in step S110.

That is to say, in the case of a single-layer BD-R, an SA region is one of the OSA situated at the outer side and the ISA situated at the inner side, and with the case shown to the middle in FIG. 27 for example, in the event that the SA region where the new main FS (FS (Metadata)), volume structure information, anchor information, and database file (Files (DB)) can be written and which is closest is the ISA, the file system information generating unit 362 selects the ISA as the closest recordable region.

In step S112, the file system information generating unit 312 records the database file (Files (DB)) to the searched SA region. That is to say, as can be seen at the middle part of FIG. 27 for example, the file system information generating unit 362 records the database file (Files (DB)) in the region B171' in the ISA which is the searched SA region.

In step S113, the file system information generating unit 362 records the main FS to the searched SA region. That is to say, as can be seen at the middle part of FIG. 27 for example, the file system information generating unit 312 records the file system information in the region B171' in the ISA which is the searched SA region.

In step S114, the volume structure information and anchor information corresponding to the main FS are recorded to the region B171' of the SA region, as shown at the middle in FIG. 27.

In step S115, readout of the mirror FS (FS (MD-Mirror)), outer side volume structure information, and anchor information, recorded in the region B173 shown at the middle in FIG. 27, is disabled. In step S116, the closest positioned SA region where the new mirror FS, volume structure information, and anchor information, can be recorded, is searched. For example, in the case of the middle in FIG. 27, the OSA is searched as the closest recordable region.

In steps S117 and S118, the mirror FS, outer side anchor information, and volume structure information, are recorded to the region B173' of the searched OSA, as shown to the middle in FIG. 27.

Further, in the event that a file is added in this state, in step S109 the added file (Files (Stream) in the drawing) is additionally written to the region B172" of the User region, as shown at the lower side in FIG. 27. In step S110, readout of the main FS, inner side volume structure information, and anchor information, described in region B171' immediately before, is disabled.

In step S111, the closest positioned SA region where the new main FS (FS (Metadata)), volume structure information, anchor information, and database file (Files (DB)) can be recorded, is searched by the processing in step S110. With the case shown to the lower side in FIG. 27 for example, in the event that the SA region where the new main FS (FS (Metadata)), volume structure information, anchor information, and database file (Files (DB)) can be written and which is closest is the ISA, the file system information generating unit 362 selects the ISA as the closest recordable region.

In step S112, the database file (Files (DB)) is written to the searched SA region. That is to say, as can be seen at the lower part of FIG. 27 for example, the database file (Files (DB)) is recorded in the region B171" in the ISA which is the searched SA region.

In step S113, the main FS is written to the region B171" of the User region, as can be seen at the lower part of FIG. 27.

Further, in step S114, the inner side volume structure information and anchor information corresponding to the main FS are recorded to the region B171" of the User region, as shown at the lower side in FIG. 27.

In step S115, readout of the mirror FS (FS (MD-Mirror)), volume structure information, and anchor information, recorded in the region B173' shown at the lower side in FIG. 27, is disabled. In step S116, the closest positioned SA region where the new mirror FS, volume structure information, and anchor information, can be recorded, is searched. For example, in the case of the lower side in FIG. 27, the OSA is searched as the closest recordable SA region.

In steps S117 and S118, the mirror FS, outer side anchor information corresponding to the mirror FS, and volume structure information, are recorded to the region B173" of the searched OSA, as shown to the lower side in FIG. 27.

Due to the above processing, in the event that a file is added or updated, in addition to the main FS and the inner side anchor information and volume structure information corresponding to the main FS, the database file (Files (DB)) is recorded to the SA region, so at the time of performing readout for playing the stream data, the stream data can be read out without changing the allocation of the file system information.

Further, with either of the recording/playing mechanism sections 22 in FIG. 19 and FIG. 22, the database file (Files (DB)) may be added as information to be recorded in an SA region.

Further, while it goes without saying that the processing described with the above writing processing can be realized even with the recording order and the like being inverted, it is preferably that recording processing to the recording medium 81 be performed in one direction continuously, from the inner side toward the outer side, or from the outer side toward the inner side. Setting the processing procedures thus enables the writing processing and reading processing to be performed at high speed.

The recording processing in each of the steps S103 through S109, S112 through S117, S118, and S118, in the flowchart in FIG. 26 will be described later in further detail.

While description has been made in the above regarding an example of sequentially recording all or a part of updated information of file system information, anchor information, and volume structure information, at the time of adding or updating a file, in an SA region, recording to the updated information of file system information, anchor information, and volume structure information, at the time of adding or updating a file, is not restricted to an SA region, and may be recorded in the User region or an SA region.

Figure 28:
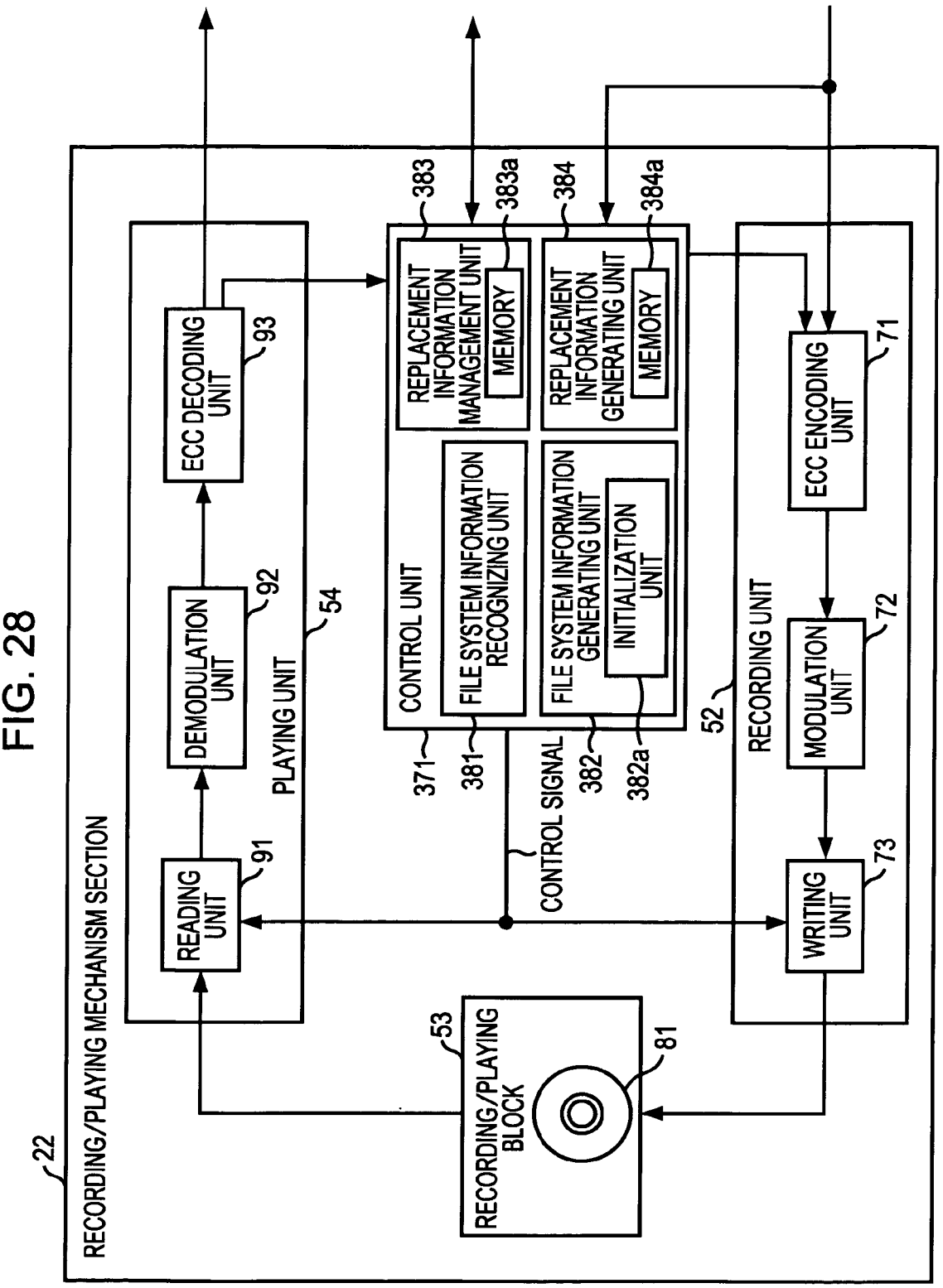
FIG. 28 is a diagram for describing yet another configuration of the recording/playing mechanism section.

FIG. 28 illustrates the configuration of a recording/playing mechanism section 22 configured to write file system information, anchor information, and volume structure information, to the User region or to SA regions, rather than being restricted to SA regions, at the time of adding or updating a file. Note that with the recording/playing mechanism section 22 shown in FIG. 28, configurations corresponding to those of the recording/playing mechanism section 22 shown in FIG. 3 will be denoted with the same reference numerals, and description thereof will be omitted as appropriate.

The recording/playing mechanism section 22 in FIG. 28 and the recording/playing mechanism section 22 in FIG. 3 structurally differ in that a control unit 371 has been provided instead of the control unit 51. The control unit 371 differs in having, instead of the file system information recognizing unit 61, file system information generating unit 62, replacement information management unit 63, and replacement information generating unit 64, a file system information recognizing unit 381, a file system information generating unit 382, a replacement information management unit 383, and a replacement information generating unit 384.

The file system information recognizing unit 381 is identical to the file system information recognizing unit 61.

While the basic function of the file system information generating unit 382 is the same as that of the file system information generating unit 62, at the time of a file being added or updated, the added or updated main FS, outer side anchor information, and volume structure information, and mirror FS, inner side anchor information, and volume structure information, are recorded in a region close to each (may be either the User region or an SA region), as replacement for the pre-updating main FS, outer side anchor information, and volume structure information, and mirror FS, inner side anchor information, and volume structure information. That is to say, the file system information generating unit 382 records the actually updated data at another position on the recording medium 81 in the User region as well, without changing the position thereof on the logical address, as with the case of recording in an SA region.

Also, the replacement information management unit 383, memory 383a, replacement information generating unit 384, and memory 384a are the same as the replacement information management unit 63, memory 63a, replacement information generating unit 64, and memory 64a, in FIG. 3, so description thereof will be omitted.

Figure 29:
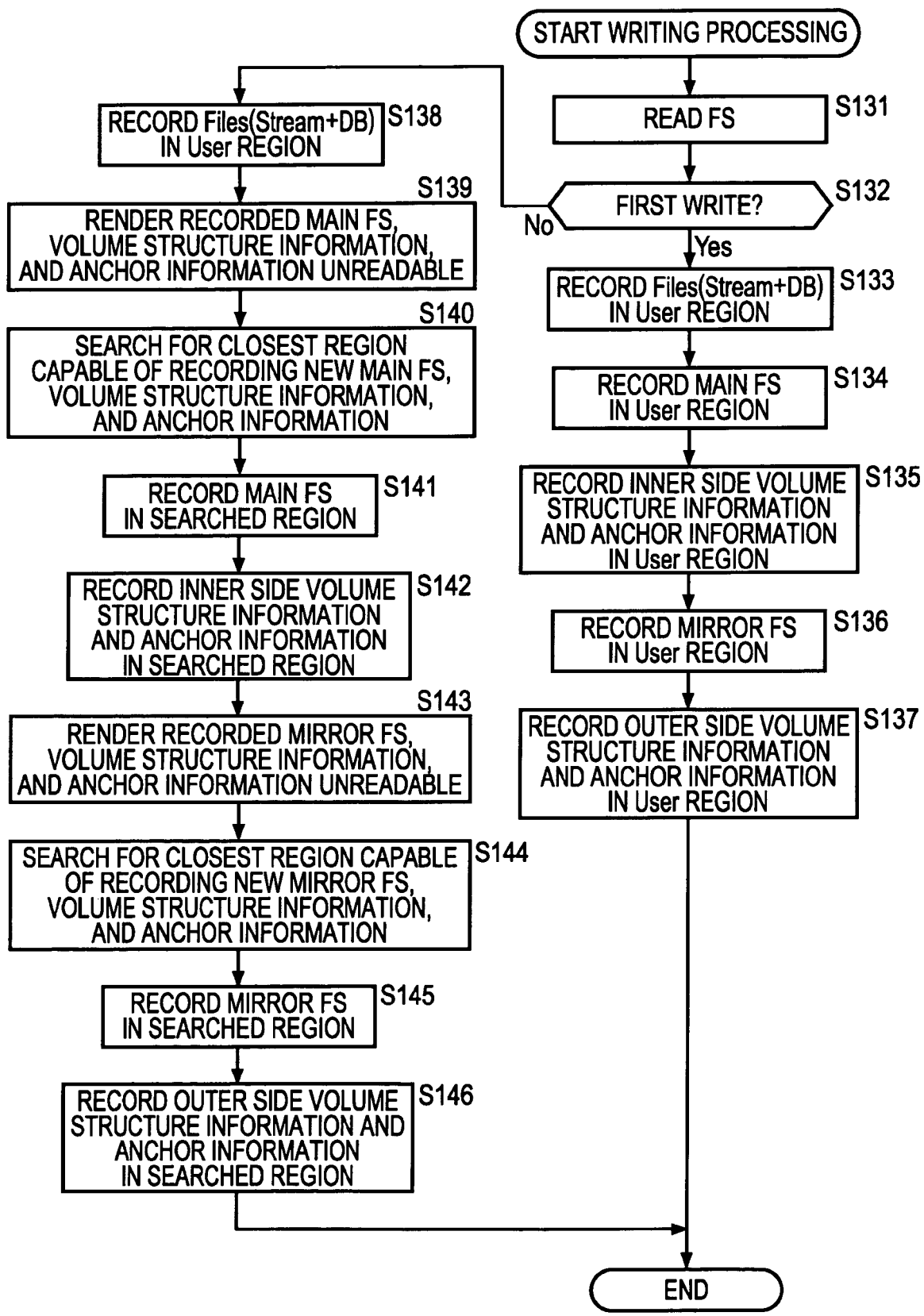
FIG. 29 is a flowchart for describing writing processing with the recording/playing mechanism section shown in FIG. 28.

Next, description will be made regarding the writing processing for writing information in a recording medium 81 formatted (initialized) by the processing shown in FIG. 14, by the recording/playing mechanism section 22 in FIG. 28, with reference to the flowchart in FIG. 29. Note that the processing of steps S131 through S137, S139, and step S143, in the flowchart in FIG. 29, is the same as processing of steps S11 through S19, and step S23, described with reference to the flowchart in FIG. 17, so description thereof will be omitted.

In step S138, the file system information generating unit 382 causes the recording/playing block 53 to write to the User region of the recording medium 81 the file (stream+DB: a file made up of stream data and a database for managing the stream data) input to the writing unit 73 via the ECC encoding unit 71 and modulation unit 72.

Figure 30:
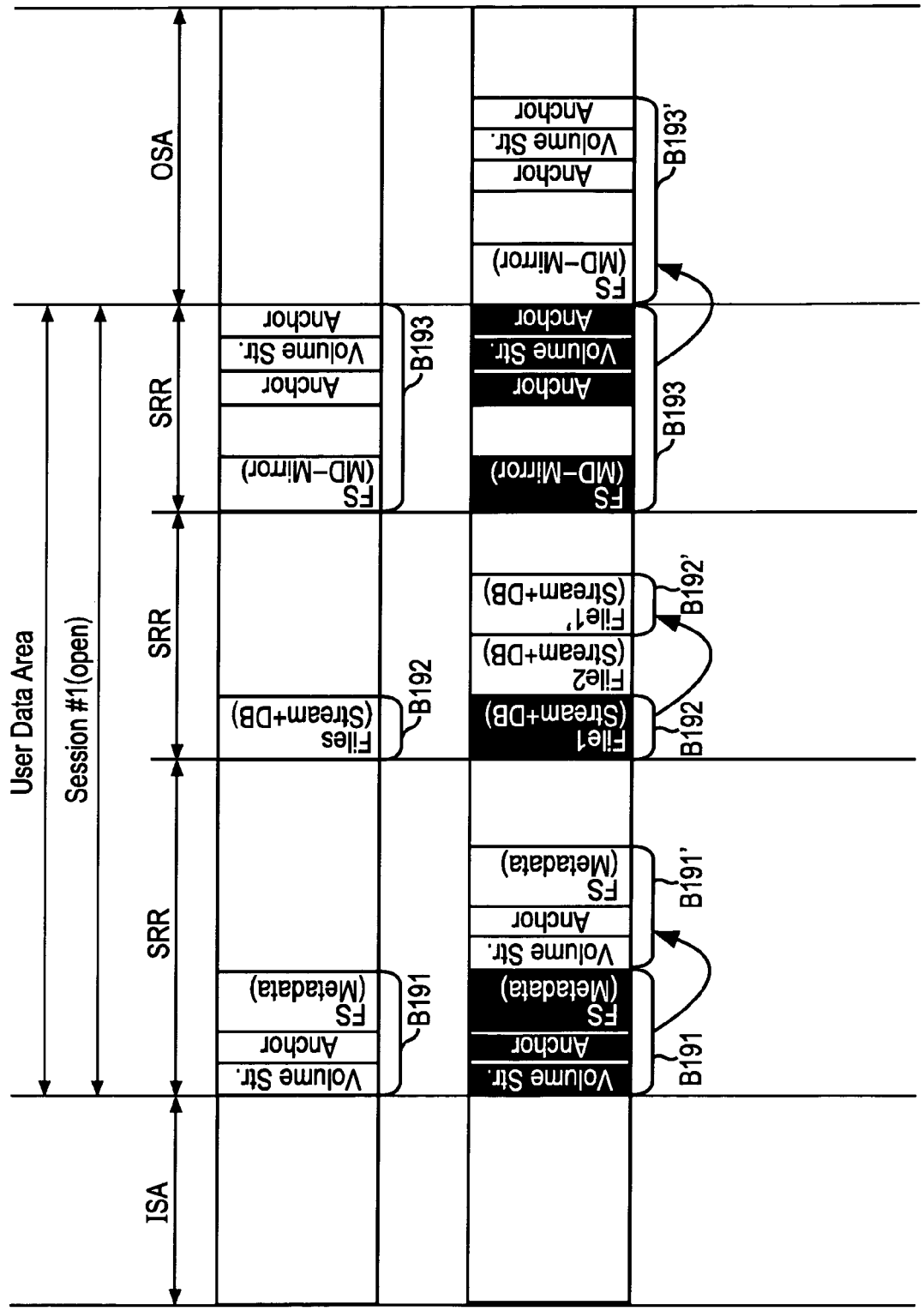
FIG. 30 is a diagram for describing writing processing with the recording/playing mechanism section shown in FIG. 28.

That is, in the event that information has been recorded in a state as shown to the upper side in FIG. 30, the file system information generating unit 62 causes the file (File1' (stream+DB) in the drawing) input to the writing unit 73 via the ECC encoding unit 71 and modulation unit 72 to be recorded to the region B192' set on the recording medium 81 by the above-described formatting processing as shown in the lower side in FIG. 30. More specifically, in the event that the file is an additional write, the file system information generating unit 382 records the additional information newly added to the information recorded in the region B192 shown to the top in FIG. 30, in the region B192' shown to the lower side of FIG. 30. Also, in the event of recording a file wherein new information has been updated, readout of the file recorded in the region B192 shown to the top in FIG. 30 is disabled, the information of the region B192' is configured so as to record the newly updated file in the region adjacent to the region B192, and is thus recorded. Note that in FIG. 30, File2 (Stream+DB) is a file newly recorded at another timing separate from that of File1 (Stream+DB).

In step S140, the file system information generating unit 382 searches for the closest positioned User region or SA region where the new main FS (FS (Metadata)) and volume structure information and anchor information, generated by additional writing or updating of the file in he processing in step S139, can be overwritten.

That is to say, in the case shown to the upper side in FIG. 30 for example, in the event that there is an available region in the User region where the new main FS (FS (Metadata)) and volume structure information and anchor information can be written and which is closest, or the SA region adjacent in the outward direction (closest region in the outward direction) (adjacent to the right of region B191 in FIG. 30), the file system information generating unit 62 selects the region B191, shown to the middle in FIG. 30, as the closest recordable region.

In step S141, the file system information generating unit 382 supplies the main FS to the writing unit 73 via the ECC encoding unit 71 and modulation unit 72, and causes the recording/playing block 53 to write to the User region or SA region searched by the processing in step S20.

That is to say, as shown to the middle in FIG. 30, the file system information generating unit 382 supplies the file system information to the writing unit 73 via the ECC encoding unit 71 and modulation unit 72, to write to the region B191' of the User region on the recording medium 81.

Further, in step S142, the file system information generating unit 382 supplies the inner side volume structure information and anchor information corresponding to the main FS to the writing unit 73 via the ECC encoding unit 71 and modulation unit 72, and causes the recording/playing block to perform writing thereof to the User region or SA region searched by the processing in step S140.

That is to say, as shown to the lower side in FIG. 30, the file system information generating unit 382 supplies the inner side volume structure information and anchor information to the writing unit 73 via the ECC encoding unit 71 and modulation unit 72, to write to the region B191' of the User region on the recording medium 81.

In step S144, the file system information generating unit 382 searches for the closest positioned User region or SA region where the new outer side mirror FS (FS (MD-Mirror)) and volume structure information and anchor information, at the processing in step S143, can be recorded. That is to say, in the case shown in FIG. 30 for example, the file system information generating unit 382 selects the region B193' in the OSA, as the closest recordable region adjacent in the outer direction from the region B193 where the outer side mirror FS (FS (MD-Mirror)), volume structure information, and anchor information are recorded.

In step S145, the file system information generating unit 382 supplies the mirror FS to the writing unit 73 via the ECC encoding unit 71 and modulation unit 72, and causes the recording/playing block 53 to write the file system information thereof to the User region or SA region searched by the processing in step S144.

That is to say, as shown to the lower side in FIG. 30, the file system information generating unit 382 supplies the mirror FS to the writing unit 73 via the ECC encoding unit 71 and modulation unit 72, to write to the region B193' of the OSA region on the recording medium 81.

Further, in step S146, the file system information generating unit 382 supplies the outer side volume structure information and anchor information corresponding to the mirror FS to the writing unit 73 via the ECC encoding unit 71 and modulation unit 72, and causes the recording/playing block 53 to perform writing thereof to the User region or SA region searched by the processing in step S144.

That is to say, as shown to the lower side in FIG. 30, the file system information generating unit 382 supplies the outer side volume structure information and anchor information to the writing unit 73 via the ECC encoding unit 71 and modulation unit 72, to write to the region B193' in the OSA on the recording medium 81.

Due to the above processing, at the time of a file being added or updated, updated information of the file system information, anchor information, and volume structure information is sequentially recorded as replacement sectors in the closest User region or SA region, so even though the file system information, anchor information, and volume structure information are sequentially written to physically different positions, the information can be recorded to the recording medium without changing the logical addresses of the recorded file system information, anchor information, and volume structure information. Also, there is no need to rewrite the logical addresses of the file system information, anchor information, and volume structure information and so forth each time a file is added or updated. Consequently, even recording media upon which overwriting cannot be performed at the same position, e.g., write-at-once media, can be handled as if information, which is required to be recorded at a fixed logical address, is being overwritten. Further, both the User region and SA regions are used by adding or updating files, so region for using the SA regions originally provided for cases of defective sectors occurring on the recording medium 81 is secured, while also using for adding and overwriting processing of normal files, as necessary.

Note that while in the above, recording is made in the closest region adjacent in the outward direction, but this may be a region adjacent in the inward direction, or one of the two may be selected. The recording processing in each of the steps S133 through S138, S141, S142, S145, and S146, in the flowchart in FIG. 29 will be described later in further detail.

While description has been made in the above regarding an example wherein, at the time of a file being added or updated, updated information of the file system information, anchor information, and volume structure information is sequentially recorded as replacement sectors in the closest User region or SA region, an arrangement may be made wherein dedicated SRRs for recording each of the file system information, anchor information, and volume structure information, are set, and upon a file being added or updated, the updated information of the file system information, anchor information, and volume structure information is recorded in the available region within each SRR. Note that in this case, recording may be performed in an SA region in the event that there is no available space in a dedicated SRR.

Figure 31:
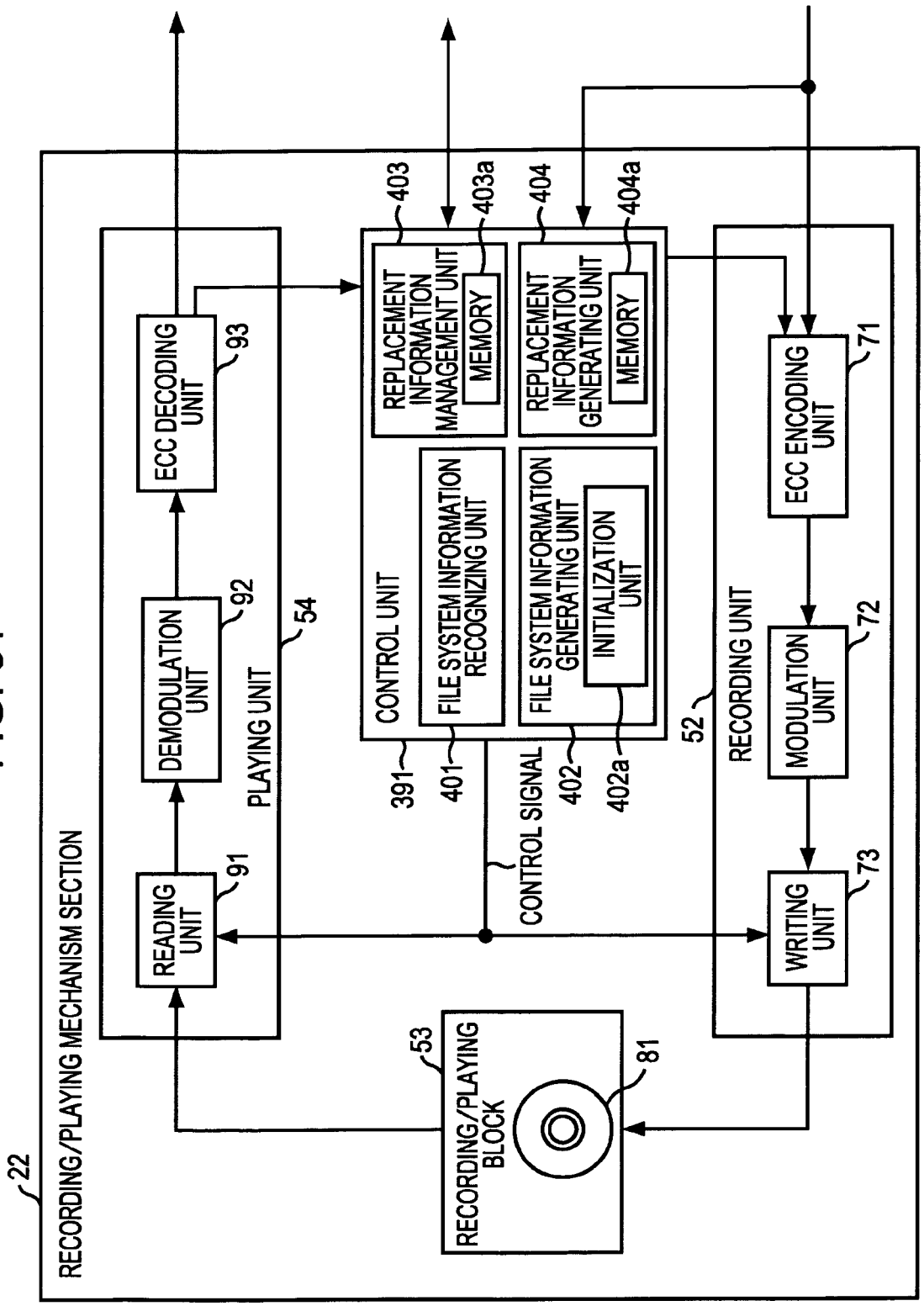
FIG. 31 is a diagram for describing yet another configuration of the recording/playing mechanism section.

FIG. 31 illustrates the configuration of a recording/playing mechanism section 22, wherein dedicated SRRs are set for recording each of the file system information, anchor information, and volume structure information, and upon a file being added or updated, the updated information of the file system information, anchor information, and volume structure information is recorded in the available region within each SRR. Note that with the recording/playing mechanism section 22 shown in FIG. 31, configurations corresponding to those of the recording/playing mechanism section 22 shown in FIG. 3 will be denoted with the same reference numerals, and description thereof will be omitted as appropriate.

The recording/playing mechanism section 22 in FIG. 31 and the recording/playing mechanism section 22 in FIG. 3 structurally differ in that a control unit 391 has been provided instead of the control unit 51. The control unit 391 differs in having, instead of the file system information recognizing unit 61, file system information generating unit 62, replacement information management unit 63, and replacement information generating unit 64, a file system information recognizing unit 401, a file system information generating unit 402, a replacement information management unit 403, and a replacement information generating unit 404.

The file system information recognizing unit 401 is identical to the file system information recognizing unit 61.

While the basic function of the file system information generating unit 402 is the same as that of the file system information generating unit 62, at the time of a file being recorded, the main FS, outer side anchor information, and volume structure information, and mirror FS, inner side anchor information, and volume structure information, are each recorded in a dedicated SRR. Also, at the time of a file being added or updated, file system information generating unit 402 records the updated main FS, outer side anchor information, and volume structure information, and mirror FS, inner side anchor information, and volume structure information, in a region within each dedicated SRR (may be either the User region or an SA region), as replacement for the pre-updating main FS, outer side anchor information, and volume structure information, and mirror FS, inner side anchor information, and volume structure information. That is to say, the file system information generating unit 402 records the actually updated data at another position on the recording medium 81 in the User region as well, without changing the position thereof on the logical address, as with the case of recording in an SA region.

Also, the replacement information management unit 403, memory 403a, replacement information generating unit 404, and memory 404a are the same as the replacement information management unit 63, memory 63a, replacement information generating unit 64, and memory 64a, in FIG. 3, so description thereof will be omitted.

Figure 32:
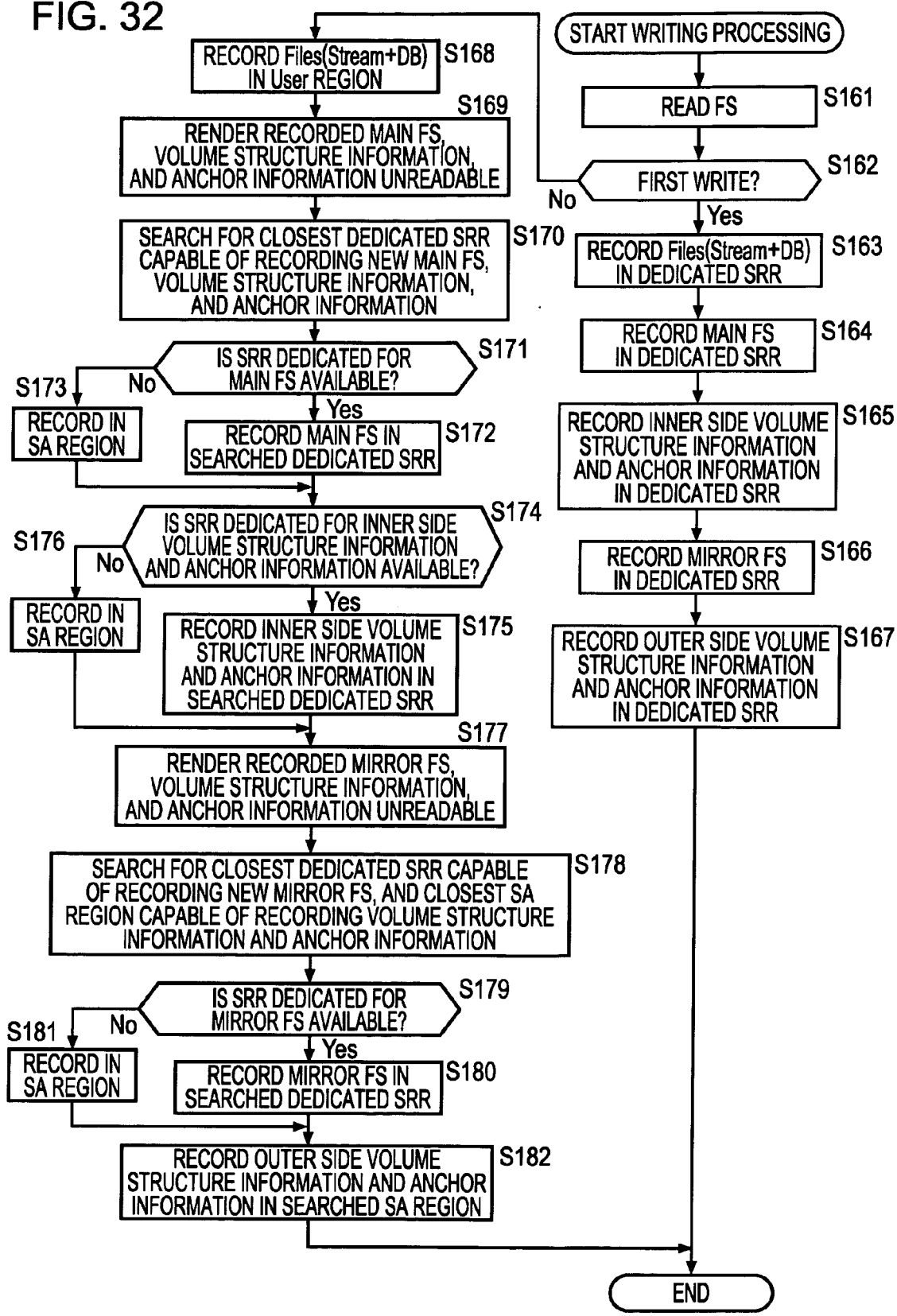
FIG. 32 is a flowchart for describing writing processing with the recording/playing mechanism section shown in FIG. 31.

Next, the processing for writing information to the recording medium 81 which has been formatted (initialized) by the processing shown in FIG. 14, by the recording/playing mechanism section 22 shown in FIG. 31, will be described with reference to the flowchart in FIG. 32.

In step S161, the file system information generating unit 402 generates and reads in file system information based on information such as additionally written or updated file attributes or the like.

In step S162, the file system information generating unit 402 determines whether or not this is the first writing processing for the recording medium 81.

Figure 33:
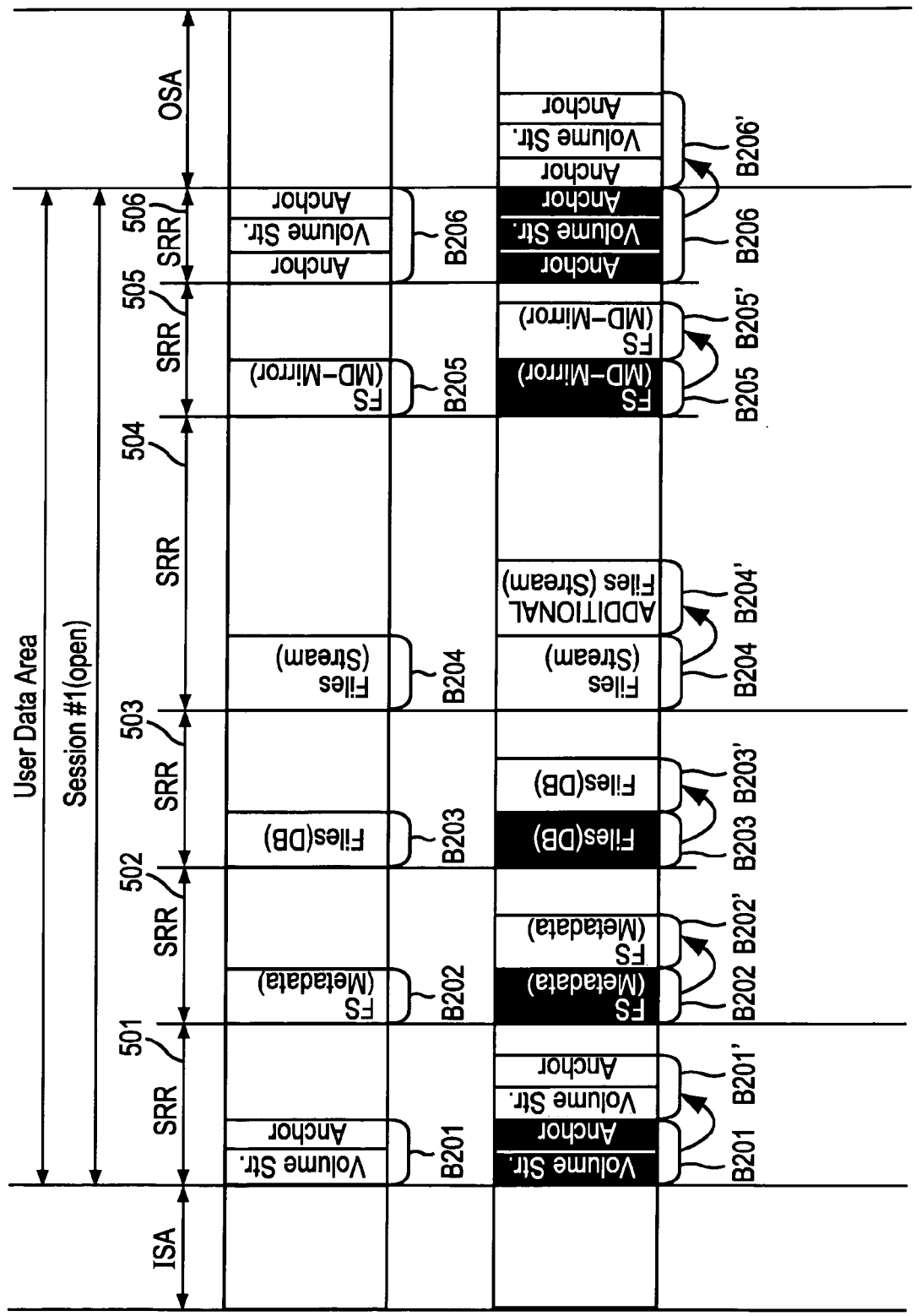
FIG. 33 is a diagram for describing writing processing with the recording/playing mechanism section shown in FIG. 31.

In the event that determination is made in step S162 that this is the first writing for example, the processing proceeds to step S163, where the file system information generating unit 402 causes the recording/playing block 53 to write to the dedicated SRRs in the User region of the recording medium 81a file (stream+DB: stream data (Files (Stream)) in FIG. 33) input to the writing unit 73 via the ECC encoding unit 71 and modulation unit 72, and a file made up of a database for managing the stream data (Files (DB) in FIG. 33).

That is, as shown to the upper side in FIG. 33, the file system information generating unit 402 causes the files (Files (stream) and Files (DB) in the drawing) input to the writing unit 73 via the ECC encoding unit 71 and modulation unit 72 to be respectively recorded to the region B204 in the dedicated SRR 504 for recording files (Files (Stream)) and to the region B203 in the dedicated SRR 503 for recording files (Files (DB)), of the regions set on the recording medium 81 by the above-described processing. Note that FIG. 33 illustrates an example of a case of the recording medium 81 used being a single-layer BD-R, as mentioned earlier.

In step S164, the file system information generating unit 402 supplies the main FS to the writing unit 73 via the ECC encoding unit 71 and modulation unit 72, and causes the recording/playing block 53 to write to an SRR 502 dedicated for the main FS in the User region of the recording medium 81.

That is to say, as can be seen at the upper part of FIG. 33, the file system information generating unit 402 supplies the file system information to the writing unit 73 via the ECC encoding unit 71 and modulation unit 72, and records this in the region B202 in the dedicated SRR 502 set for recording the main FS, set in the formatting processing of the recording medium 81 described above (records as the "FS (Metadata)" in the drawing).

In step S165, the file system information generating unit 402 supplies the inner side volume structure information and anchor information to the writing unit 73 via the ECC encoding unit 71 and modulation unit 72, and causes the recording/playing block 53 to write to the dedicated SRR in the User region of the recording medium 81.

That is to say, as shown at the upper part of FIG. 33, the file system information generating unit 402 supplies the volume structure information and anchor information to the writing unit 73 via the ECC encoding unit 71 and modulation unit 72, and records the volume structure information and anchor information in the region B201 in the dedicated SRR 501 set for recording the inner volume structure information and anchor information and anchor information corresponding to the main FS in the formatting processing of the recording medium 81 described above (records as the "Volume Str." and "Anchor" in the drawing).

In step S166, the file system information generating unit 402 supplies the mirror FS to the writing unit 73 via the ECC encoding unit 71 and modulation unit 72, and causes the recording/playing block 53 to write to the dedicated SRR in the User region of the recording medium 81.

That is to say, as can be seen at the upper part of FIG. 33, the file system information generating unit 402 supplies the mirror FS to the writing unit 73 via the ECC encoding unit 71 and modulation unit 72, and records the mirror FS in the region B205 in the dedicated SRR 505 set for recording the mirror FS in the formatting processing of the recording medium 81 described above (records as the "FS (MD-Mirror)" in the drawing).

In step S167, the file system information generating unit 402 supplies the outer side volume structure information and anchor information to the writing unit 73 via the ECC encoding unit 71 and modulation unit 72, and causes the recording/playing block 53 to write to the dedicated SRR in the User region of the recording medium 81.

That is to say, as shown at the upper part of FIG. 33, the file system information generating unit 402 supplies the outer side volume structure information and anchor information to the writing unit 73 via the ECC encoding unit 71 and modulation unit 72, and records the volume structure information and anchor information in the region B206 in the dedicated SRR 501 set for recording the outer side volume structure information and anchor information corresponding to the mirror FS in the formatting processing of the recording medium 81 described above (records as the "Volume Str." and the two "Anchor" in the drawing).

On the other hand, in the event that determination is made in step S162 that this is not the first writing, that is to say, that information has been recorded by the processing of steps S163 through S167 at least once or more for example, the processing proceeds to step S168.

In step S168, the file system information generating unit 402 causes the recording/playing block 53 to write to the dedicated SRR in the User region of the recording medium 81 the file (stream+DB: a file (Files (Stream)) in the drawing) made up of stream data and a database (Files (DB) in the drawing) for managing the stream data) input to the writing unit 73 via the ECC encoding unit 71 and modulation unit 72.

That is, in the event that information is recorded on the recording medium 81 in a state such as shown to the upper side in FIG. 33, the file system information generating unit 402 causes the FILE (Files (stream) and Files (DB) in the drawing) input to the writing unit 73 via the ECC encoding unit 71 and modulation unit 72 to be recorded to the region B204' of the dedicated SRR 504 and the region B203' of the dedicated SRR 503 set on the recording medium 81 by the above-described processing, as shown to the lower side in FIG. 33. More specifically, in the event that the file is an additional write, as indicated by "additional Files (Stream)" in the drawing, the file system information generating unit 402 records the additional information newly added to the information recorded in the region B204 of the dedicated SRR 504 shown to the lower side in FIG. 33, in the region B204' of the dedicated SRR 504 shown to the lower side of FIG. 33. Also, in the event of recording a file wherein new information has been updated, as indicated by "additional Files (DB)" in the drawing, readout of the file recorded in the region B203 in the dedicated SRR 503 shown to the lower side in FIG. 33 is disabled, the information of the region B203' is configured so as to record the newly updated file in the region adjacent to the region B203 of the dedicated SRR 503, and is thus recorded.

In step S169, the file system information generating unit 402 controls the writing unit 73 via the ECC encoding unit 71 and modulation unit 72 so as to disable readout of the main FS (FS (Metadata)) and volume structure information and anchor information from the recording medium 81 by the recording/playing block 53.

That is to say, as shown to the lower side of FIG. 33, the file system information generating unit 402 disables readout of the main FS (FS (Metadata)) recorded in the region B202 in the dedicated SRR 502, the volume structure information recorded in the region B201 in the dedicated SRR 501, and anchor information, from the recording medium 81 by the recording/playing block 53. Note that in FIG. 33, regions which have been rendered unreadable are black-white inverted, and this method of representation will be used hereinafter also.

In step S170, the file system information generating unit 402 refers to the dedicated SRRs for each of the new main FS (FS (Metadata)) and volume structure information and anchor information generated by additional writing or updating of the file by the processing in step S169, and searches for the closest position where the new main FS (FS (Metadata)) and volume structure information and anchor information, can be recorded.

That is to say, with the case shown to the upper side in FIG. 33, the file system information generating unit 402 searches the region B202' adjacent to the region B202 in the dedicated SRR 502 regarding which readout has been disabled, as a position where the new main FS within the SRR 502 dedicated for the main FS (FS (Metadata)) can be recorded. Also, the file system information generating unit 402 searches the region B201' adjacent to the region B201 in the dedicated SRR 501 regarding which readout has been disabled, as a position where the new volume structure information and anchor information within the dedicated SRR 502 dedicated for the volume structure information and anchor information can be recorded.

In step S171, the file system information generating unit 402 determines whether or not there is available region for recording a new main FS within the SRR dedicated for the main FS. In the case in FIG. 33, this exists, so the processing advances to step S172.

In step S172, the file system information generating unit 402 supplies the main FS to the writing unit 73 via the ECC encoding unit 71 and modulation unit 72, causes the recording/playing block 53 to write to the region searched by the processing in step S170.

That is to say, as shown at the lower side in FIG. 33, the file system information generating unit 402 supplies the file system information to the writing unit 73 via the ECC encoding unit 71 and modulation unit 72, to write to the region B202' within the dedicated SRR 502 on the recording medium 81.

Further, in step S174, the file system information generating unit 402 determines whether or not there is available region for recording the volume structure information and anchor information within the SRR dedicated for the volume structure information and anchor information. In the case of the upper side in FIG. 33, this exists, so the processing advances to step S175.

In step S175, the file system information generating unit 402 supplies the inner side volume structure information and anchor information corresponding to the main FS to the writing unit 73 via the ECC encoding unit 71 and modulation unit 72, causes the recording/playing block 53 to write to the region within the SRR dedicated for the volume structure information and anchor information, searched by the processing in step S170.

That is to say, as shown at the lower side in FIG. 33, the file system information generating unit 402 supplies the inner side volume structure information and anchor information to the writing unit 73 via the ECC encoding unit 71 and modulation unit 72, to write to the region B201' within the SRR 501 dedicated for the volume structure information and anchor information on the recording medium 81.

In step S177, the file system information generating unit 402 controls the writing unit 73 via the ECC encoding unit 71 and modulation unit 72 so as to disable readout of the mirror FS (FS (MD-Mirror)) and volume structure information and anchor information recorded in the respective dedicated SRRs at the outer side from the recording medium 81 by the recording/playing block 53.

That is to say, as shown to the lower side of FIG. 33, the file system information generating unit 402 disables readout of the mirror FS (FS (MD-Mirror)) recorded in the region B113 in the SRR 505 dedicated for the mirror FS (FS (MD-Mirror)), and the volume structure information and anchor information recorded in the SRR 506 dedicated for the volume structure information and anchor information, from the recording medium 81 by the recording/playing block 53.

In step S178, the file system information generating unit 402 searches the SRR dedicated for the outer side mirror FS (FS (MD-Mirror)) for the closest SA region or Use where a new outer side mirror FS (FS (MD-Mirror)) can be recorded, and also searches for an SA region at the closest position where the volume structure information and anchor information can be recorded, in response to the processing of step S177.

That is to say, with the case shown to the upper side in FIG. 33, the file system information generating unit 402 searches the region B205' adjacent to the region B205 in the dedicated SRR 505 regarding which readout has been disabled, as a position where the new mirror FS within the SRR 505 dedicated for the mirror FS (FS (MD-Mirror)) can be recorded. Also, the file system information generating unit 402 searches the region B206' adjacent to the region B206 which is the SA region closest to the region B206 in the dedicated SRR 506 regarding which readout has been disabled, as a position where the new volume structure information and anchor information within the SRR 506 dedicated for the volume structure information and anchor information can be recorded.

In step S179, the file system information generating unit 402 determines whether or not there is available region for recording the mirror FS within the SRR dedicated for the mirror FS. In the case to the upper side in FIG. 33, this exists, so the processing advances to step S180.

In step S180, the file system information generating unit 402 supplies the mirror FS to the writing unit 73 via the ECC encoding unit 71 and modulation unit 72, causes the recording playing block 53 to write to the region searched by the processing in step S178.

That is to say, as shown at the lower side in FIG. 33, the file system information generating unit 402 supplies the file system information to the writing unit 73 via the ECC encoding unit 71 and modulation unit 72, to write to the region B205' within the dedicated SRR 505 on the recording medium 81.

Further, in step S182, the file system information generating unit 402 supplies the outer side volume structure information and anchor information corresponding to the mirror FS to the writing unit 73 via the ECC encoding unit 71 and modulation unit 72, and causes the recording/playing block 53 to write to the OSA region searched by the processing in step S178.

That is to say, in the case of the upper side of FIG. 33, the file system information generating unit 402 records the outer side volume structure information and anchor information corresponding to the mirror FS in the region B206' in the OSA searched as a position where the outer side volume structure information and anchor information corresponding to the mirror FS can be written.

Figure 34:
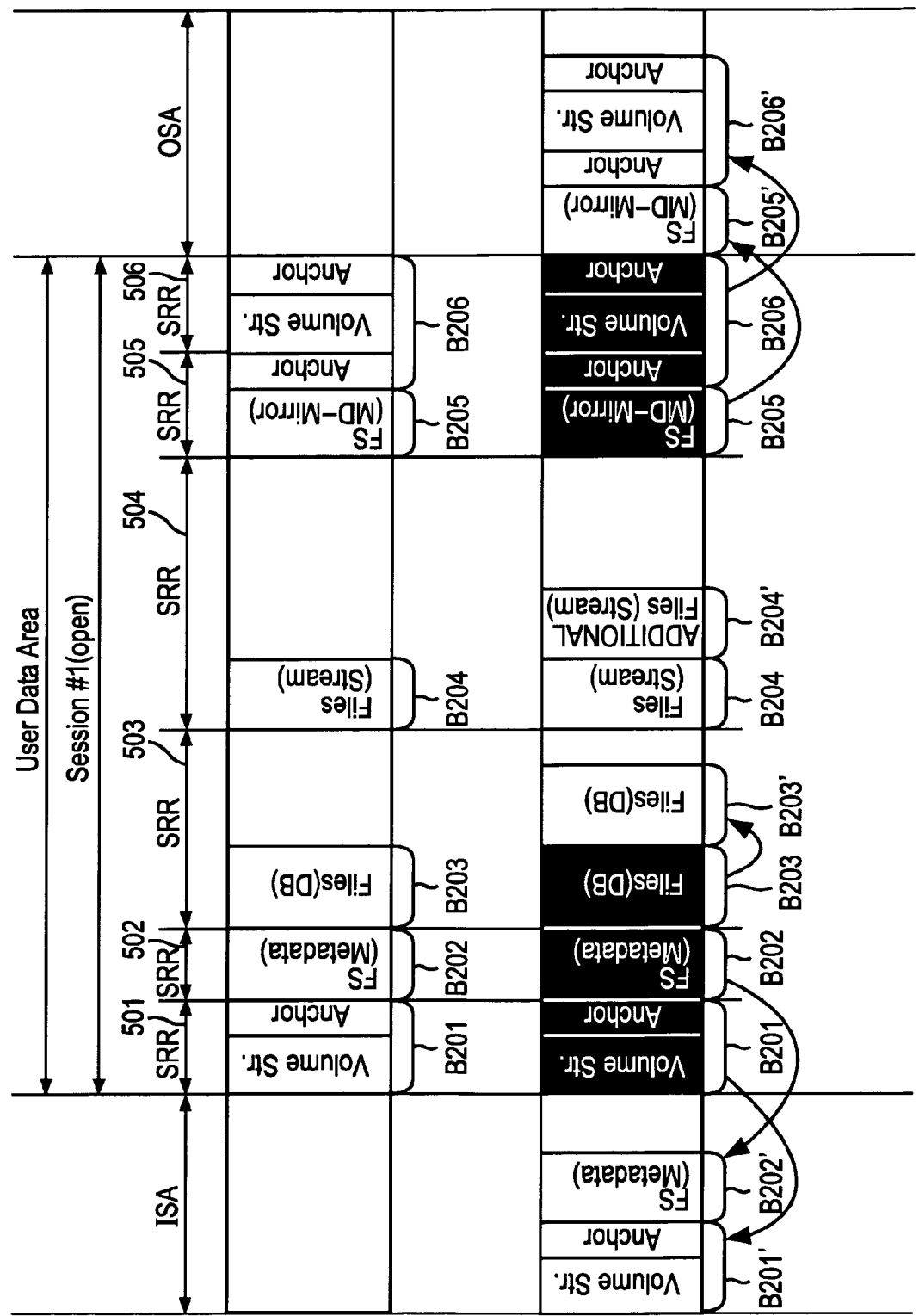
FIG. 34 is a diagram for describing writing processing with the recording/playing mechanism section shown in FIG. 31.

On the other hand, for example, in the event that the main FS is recorded in the region B202 at the entire region of the SRR 502 dedicated for the main FS as shown to the upper side of FIG. 34, in step S169 the entire region of the region B202 where the main Fs is recorded is rendered unreadable as shown to the lower side of FIG. 34, meaning that no region capable of recording the new main FS exists within the dedicated SRR 502. In such a case, determination is made in step S171 that no available region where the new main FS can be recorded exists, and the processing advances to step S173.

In step S173, the file system information generating unit 402 supplies the main FS to the writing unit 73 via the ECC encoding unit 71 and modulation unit 72, and causes the recording/playing block 53 to write this to the SA region at the closest position.

That is to say, as shown at the lower side in FIG. 33, the file system information generating unit 402 supplies the file system information to the writing unit 73 via the ECC encoding unit 71 and modulation unit 72, and writes this to the region B202' in the ISA on the recording medium 81.

In the same way, for example, in the event that the volume structure information and anchor information corresponding to the main FS is recorded in the region B201 at the entire region of the SRR 501 dedicated for the volume structure information and anchor information corresponding to the main FS as shown to the upper side of FIG. 34, in step S169 the entire region of the region B201 where the main FS is recorded is rendered unreadable as shown to the lower side of FIG. 34, meaning that no region capable of recording the volume structure information and anchor information corresponding to the new main FS exists within the dedicated SRR 501. In such a case, determination is made in step S174 that no available region where the volume structure information and anchor information corresponding to the new main FS can be recorded exists, and the processing advances to step S176.

In step S173, the file system information generating unit 402 supplies the inner side volume structure information and anchor information corresponding to the main FS to the writing unit 73 via the ECC encoding unit 71 and modulation unit 72, and causes the recording/playing block 53 to write this to the SA region at the closest position.

That is to say, as shown at the lower side in FIG. 34, the file system information generating unit 402 supplies the inner side volume structure information and anchor information to the writing unit 73 via the ECC encoding unit 71 and modulation unit 72, and writes this to the region B201' in the ISA on the recording medium 81.

Further, in step S179, in the event that the mirror FS information is recorded in the region B205 at the entire region of the SRR 502 dedicated for the mirror FS information as shown to the upper side of FIG. 34 for example, in step S177 the entire region of the region B205 where the mirror FS is recorded is rendered unreadable as shown to the lower side of FIG. 34, meaning that no region capable of recording the new mirror FS information exists within the dedicated SRR 505. In such a case, determination is made in step S179 that no available region where the new mirror FS information can be recorded exists, and the processing advances to step S181.

In step S181, the file system information generating unit 402 supplies the mirror FS to the writing unit 73 via the ECC encoding unit 71 and modulation unit 72, and causes the recording/playing block 53 to write the file system information thereof, to the SA region at the closest position.

That is to say, as shown at the lower side in FIG. 33, the file system information generating unit 402 supplies the mirror FS to the writing unit 73 via the ECC encoding unit 71 and modulation unit 72, and writes this to the region B205' in the OSA on the recording medium 81.

Note that the recording processing in each of the steps S163 through S168, S172, S173, S175, S176, and S180 through S182, in the flowchart in FIG. 32 will be described later in further detail.

Due to the above processing, at the time of a file being added or updated, updated information of the file system information, anchor information, and volume structure information is sequentially recorded as replacement for the pre-addition or pre-updating file system information, anchor information, and volume structure information, within dedicated SRRs, so even though the file system information, anchor information, and volume structure information are sequentially written to physically different positions, the information can be recorded to the recording medium without changing the logical addresses of the recorded file system information, anchor information, and volume structure information. Also, there is no need to rewrite the logical addresses of the file system information, anchor information, and volume structure information and so forth each time a file is added or updated. Consequently, even recording media upon which overwriting cannot be performed at the same position, e.g., write-at-once media, can be handled as if information, which is required to be recorded at a fixed logical address, is being overwritten.

Further, data recorded at the time of a file being added or updated is recorded in dedicated SRRs for each information, basically within the User region, so the SA region originally to be used for cases of defective sectors in the recording medium 81 can be spared from being used wastefully, also, in the event that processing wherein a file is added or updated is repeated to where there is not sufficient space within each of the dedicated SRRs the SA regions can be used, so the SA regions can be used effectively for data recording processing without wastefully consuming the SA regions.

While description has been made in the above regarding an example wherein, at the time of a file being added or updated, added or updated information of file system information, anchor information, and volume structure information is sequentially recorded as replacement for the pre-addition or pre-updating file system information, anchor information, and volume structure information, within dedicated SRRs, an arrangement may be made wherein SRRs are set beforehand at the formatting stage for the different usages (combinations of usages) of each of the file system information, anchor information, volume structure information, files (the same as Files (Stream) described above), and DB files (the same as Files (DB) described above), with recording being performed in replacement regions within the SRRs set for each usage when adding or updating files.

Figure 35:
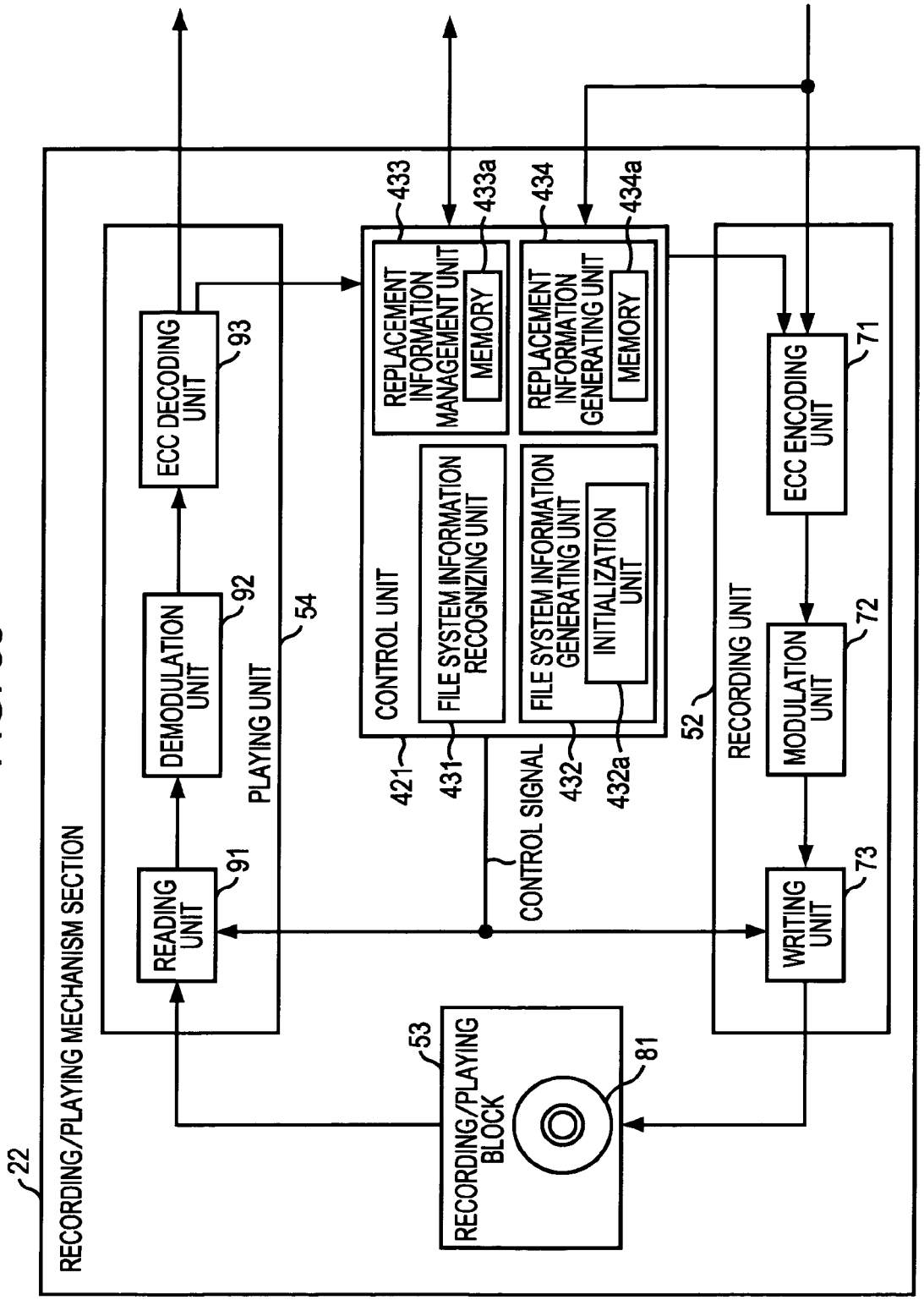
FIG. 35 is a diagram for describing yet another configuration of the recording/playing mechanism section.

FIG. 35 illustrates the configuration of a recording/playing mechanism section 22, wherein SRRs are set beforehand at the formatting stage depending on combinations of usages of each of file system information, anchor information, volume structure information, files (the same as Files (Stream) described above: hereinafter, files of stream data alone are also called stream files in particular), and DB files (the same as Files (DB) described above), with recording being performed in replacement regions within the SRRs set for each usage combination when adding or updating files. Note that with the recording/playing mechanism section 22 shown in FIG. 35, configurations corresponding to those of the recording/playing mechanism section 22 shown in FIG. 3 will be denoted with the same reference numerals, and description thereof will be omitted as appropriate.

The recording/playing mechanism section 22 in FIG. 35 and the recording/playing mechanism section 22 in FIG. 3 structurally differ in that a control unit 421 has been provided instead of the control unit 51. The control unit 421 differs in having, instead of the file system information recognizing unit 61, file system information generating unit 62, replacement information management unit 63, and replacement information generating unit 64, of the control unit 51, a file system information recognizing unit 431, a file system information generating unit 432, a replacement information management unit 433, and a replacement information generating unit 434.

The file system information recognizing unit 431 is identical to the file system information recognizing unit 61.

While the basic function of the file system information generating unit 432 is the same as that of the file system information generating unit 62, with regard to the stream file (Files (Stream)), original DB file (Files (DB) (original)), backup DB file (Files (DB) (backup)), main FS, outer side anchor information, volume structure information, mirror FS, and inner side anchor information and volume structure information, SRRs to be used are set (allocated for each usage combination) at the time of formatting the recording medium 81, so that at the time of recording files, each are recorded to the SRRs set thereto. The number of SRRs set at the time of formatting can be optionally selected, and further, the sort of combinations allocated for the stream file (Files (Stream)), original DB file (Files (DB) (original)), backup DB file (Files (DB) (backup)), main FS, outer side anchor information, volume structure information, mirror FS, and inner side anchor information and volume information, can be optionally set corresponding to the number of SRRs set.

Also, at the time of a file being added or updated, the file system information generating unit 432 records the updated stream file (Files (Stream)), original DB file (Files (DB) (original)), backup DB file (Files (DB) (backup)), main FS, outer side anchor information, volume structure information, mirror FS, and inner side anchor information and volume structure information, in regions in the SRRs allocated for each usage, upon a pre-updating file being added or updated, as replacement for pre-updating stream file (Files (Stream)), original DB file (Files (DB) (original)), backup DB file (Files (DB) (backup)), main FS, outer side anchor information, volume structure information, mirror FS, and inner side anchor information and volume structure information. That is to say, the file system information generating unit 432 records the actually updated data at another position on the recording medium 81 within the allocated SRRs, without changing the position thereof on the logical address, as with the case of recording in an SA region.

The initialization unit 432a basically has the same functions as the initialization unit 432a shown in FIG. 3, and further sets the SRRs according to usage (by usage combination) at the time of formatting.

Also, the replacement information management unit 433, memory 433a, replacement information generating unit 434, and memory 434a are the same as the replacement information management unit 63, memory 63a, replacement information generating unit 64, and memory 64a, in FIG. 3, so description thereof will be omitted.

Figure 36:
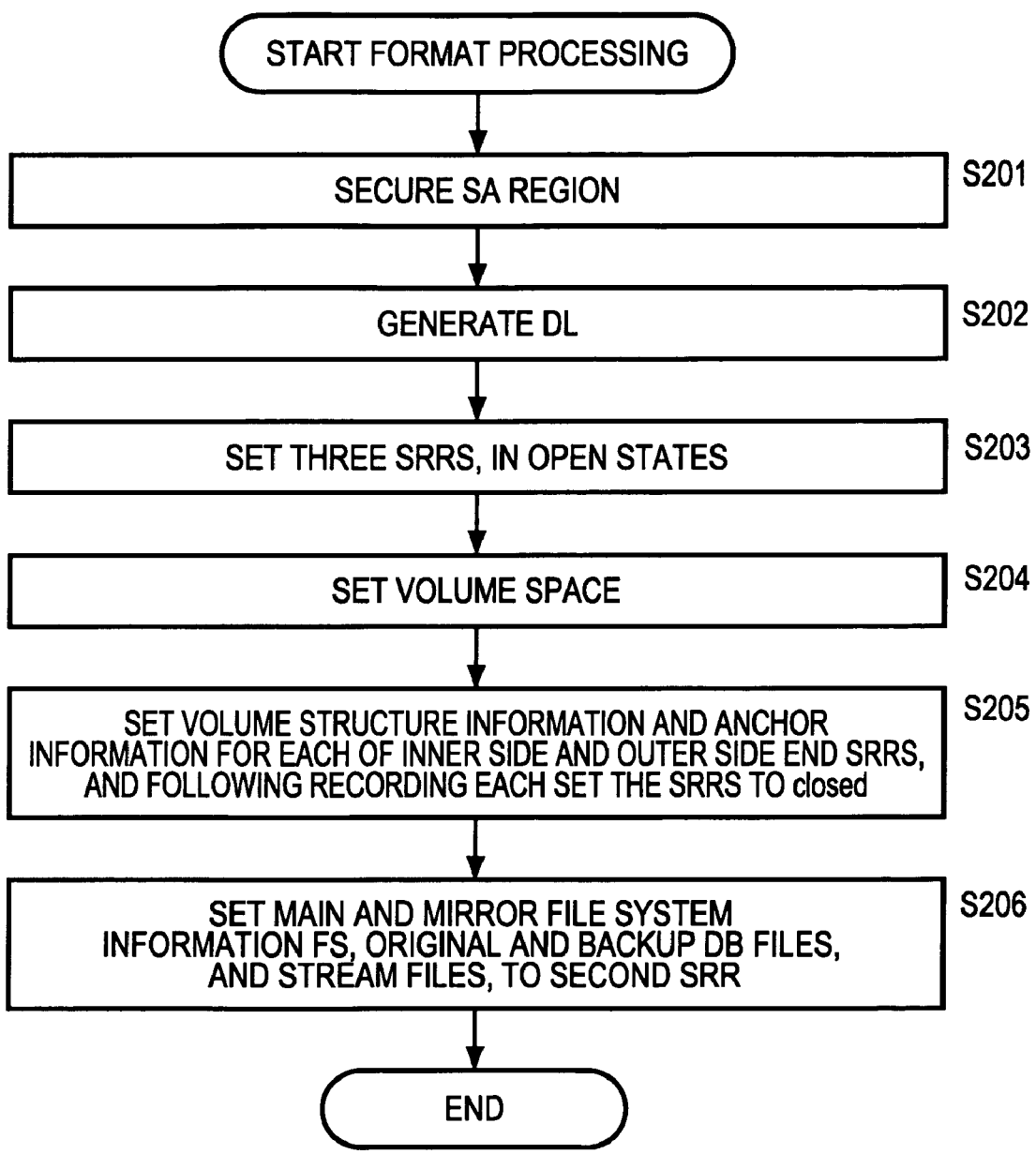
FIG. 36 is a flowchart for describing formatting processing with the recording/playing mechanism section shown in FIG. 35.

Next, the processing for formatting of the recording medium 81 wherein one SRR is set for inner side anchor information and volume structure information, one SRR is set for outer side anchor information and volume structure information, and one SRR is set for other information, will be described, with reference to the flowchart shown in FIG. 36.

In step S201, the initialization unit 432a of the file system information generating unit 432 of the control unit 421 controls the writing unit 73 so as to cause the recording/playing block 53 to set a SA (Spare Area) region on the recording medium 81.

In step S202, the initialization unit 432a causes the replacement information management unit 433 to generate a DL (Defect List). Thus, the replacement information management unit 433 generates and stores a DL in the memory 433a. Note that at this stage, no information is included in the DL.

Figure 37:
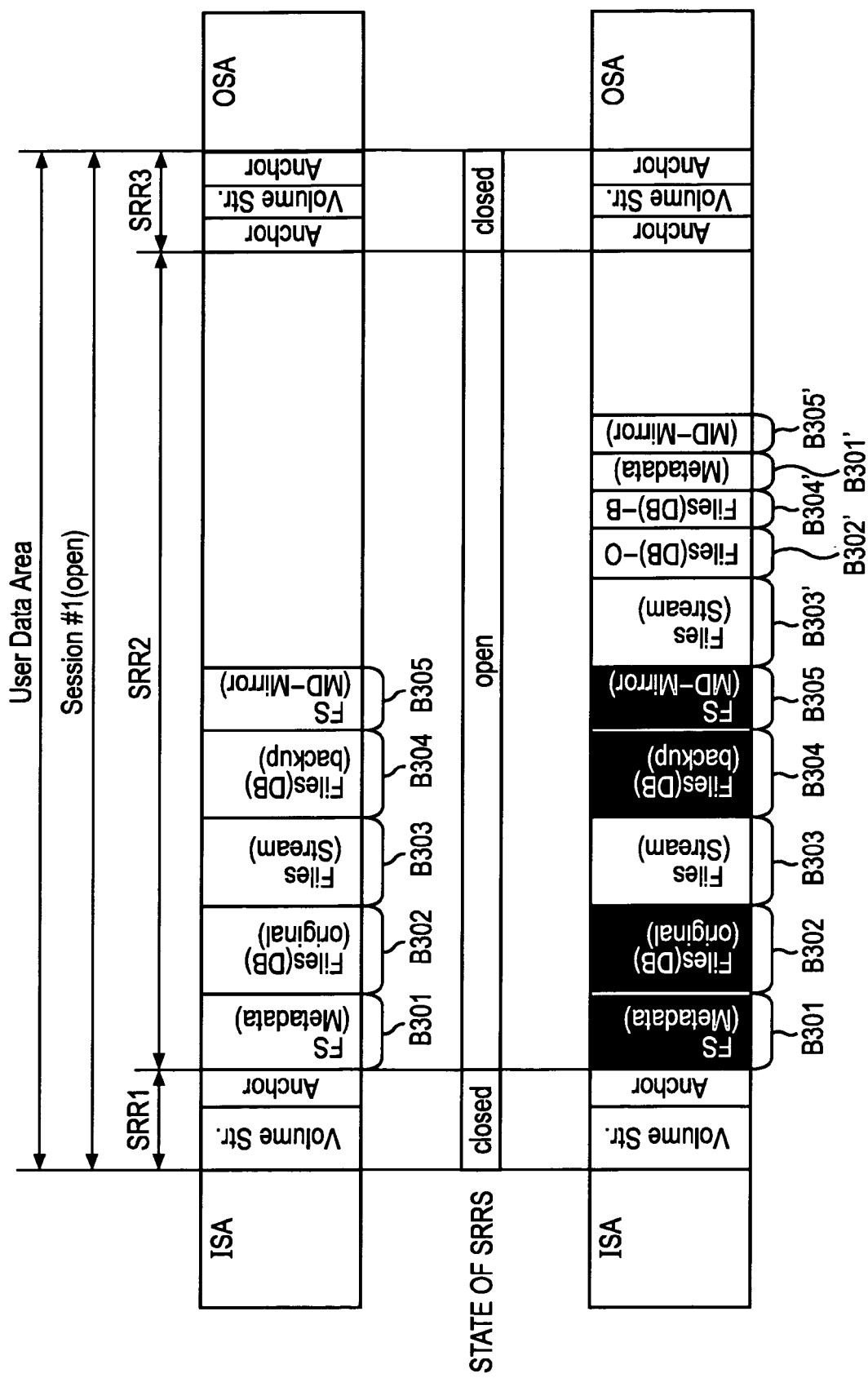
FIG. 37 is a diagram for describing formatting processing with the recording/playing mechanism section shown in FIG. 35.

In step S203, the initialization unit 432a sets one SRR for the inner side anchor information and volume structure information, sets one SRR for the outer side anchor information and volume structure information, and sets one SRR for other information, each in an open state. As shown in FIG. 37, the three SRRs of a first SRR through a third SRR (SRR1 through SRR3 in FIG. 37) are set in open states.

In step S204, the initialization unit 432a controls the writing unit 73 to cause the recording/playing block 53 to set a volume space on the recording medium 81.

In step S205, the initialization unit 432a controls the writing unit 73 so as to cause the recording/playing block 53 to set regions for recording volume structure information and anchor information at the SRRs at the outer side and inner side ends of the recording medium 81. That is to say, in this case, the first SRR (SRR1 in FIG. 37) and the third SRR (SRR3 in FIG. 37) are set as regions for recording volume structure information and anchor information, as shown to the upper side in FIG. 37. Following this processing, the SRRs in which are recorded the volume structure information and anchor information are placed in a closed state, but there are the following two state setting methods thereof. In the event that there is no unrecorded region in the object SRR, the state of the SRR is closed by an automatic processing within the drive. On the other hand, in the event that an unrecorded region remains within the object SRR, the object SRR is set to a closed state by a host issuing a command for setting the state of the SRR to closed. Hereinafter, the processing for setting the SRRs to a closed state will be omitted, but it will be understood that the same processing is used to set all SRRs in which are recorded the volume structure information and anchor information to the closed state.

In step S206, the initialization unit 432a controls the writing unit 73 so as to cause the recording/playing block 53 to set stream files, main FS and mirror FS storing file system information, and original and backup DB files, in the second SRR (SRR2 in FIG. 37) of the recording medium 81. That is to say, in the case to the upper side in FIG. 37, the initialization unit 432a controls the writing unit 73 so as to cause the recording/playing block 53 to set the stream file (Files (Stream)) to the region B303 of the second SRR of the recording medium 81, the main FS (FS (Metadata) at the upper side in FIG. 37) and mirror FS (FS (MD-Mirror) at the upper side in FIG. 37) each recording file system information to the regions B301 and B305, and further the original and backup DB files (Files (DB) (original) and Files (DB) (backup) at the upper side in FIG. 37) respectively to the regions B302 and B304.

According to the above processing, three SRRs are set on the recording medium 81 to be formatted for each usage.

Note that at the time of formatting, only regions are being set, and no information is actually being written.

Also, the placement order of the regions in the second SRR are not restricted to that shown in FIG. 37, and other placement orders may be used.

Next, the processing for writing information to the recording medium 81 which has been formatted (initialized) by the processing shown in FIG. 36, by the recording/playing mechanism section 22 shown in FIG. 35, will be described with reference to the flowchart in FIG. 38.

In step S221, the file system information generating unit 432 generates and reads in file system information based on information such as additionally written or updated file attributes or the like.

In step S222, the file system information generating unit 432 determines whether or not this is the first writing processing for the recording medium 81.

In the event that determination is made in step S222 that this is the first writing for example, the processing proceeds to step S223, where the file system information generating unit 432 causes the recording/playing block 53 to write to the second SRR (SRR2) on the recording medium 81 the Files (Stream) input to the writing unit 73 via the ECC encoding unit 71 and modulation unit 72.

That is, as shown to the upper side in FIG. 37, the file system information generating unit 432 causes the file (Files (Stream) in the drawing) input to the writing unit 73 via the ECC encoding unit 71 and modulation unit 72 to be recorded to the region B303 of the second SRR set on the recording medium 81 by the above-described formatting processing.

In step S224, the file system information generating unit 432 supplies the original DB file to the writing unit 73 via the ECC encoding unit 71 and modulation unit 72, and causes the recording/playing block 53 to write to the second SRR of the recording medium 81.

That is to say, as shown to the upper side in FIG. 37, the file system information generating unit 432 records the original DB file at the region B302 of the second SRR set on the recording medium 81 via the ECC encoding unit 71 and modulation unit 72, by the above-described formatting processing (Files (DB) (original) in the drawing).

In step S225, the file system information generating unit 432 supplies the backup DB file to the writing unit 73 via the ECC encoding unit 71 and modulation unit 72, and causes the recording/playing block 53 to write to the second SRR of the recording medium 81.

That is to say, as shown to the upper side in FIG. 37, the file system information generating unit 432 records the backup DB file at the region B304 of the second SRR set on the recording medium 81 via the ECC encoding unit 71 and modulation unit 72, by the above-described formatting processing (Files (DB) (backup) in the drawing).

In step S226, the file system information generating unit 432 supplies the main FS to the writing unit 73 via the ECC encoding unit 71 and modulation unit 72, and causes the recording/playing block 53 to write to the second SRR on the recording medium 81.

That is to say, as shown to the upper side in FIG. 37, the file system information generating unit 432 records the main FS at the region B301 of the second SRR set on the recording medium 81 via the ECC encoding unit 71 and modulation unit 72, by the above-described formatting processing (FS (Metadata) in the drawing).

In step S227, the file system information generating unit 432 supplies the inner side volume structure information and anchor information to the writing unit 73 via the ECC encoding unit 71 and modulation unit 72, and causes the recording/playing block 53 to write to the inner side end SRR on the recording medium 81. At the upper side in FIG. 37, the inner side volume structure information and anchor information are recorded in the first SRR.

In step S228, the file system information generating unit 432 supplies the mirror FS to the writing unit 73 via the ECC encoding unit 71 and modulation unit 72, and causes the recording/playing block 53 to write to the second SRR on the recording medium 81.

That is to say, as shown to the upper side in FIG. 37, the file system information generating unit 432 records the mirror FS at the region B305 of the second SRR set on the recording medium 81 via the ECC encoding unit 71 and modulation unit 72, by the above-described formatting processing (FS (MD-Mirror) in the drawing).

In step S229, the file system information generating unit 432 supplies the outer side volume structure information and anchor information to the writing unit 73 via the ECC encoding unit 71 and modulation unit 72, and causes the recording/playing block 53 to write to the outer side end SRR on the recording medium 81. At the upper side in FIG. 37, the outer side volume structure information and anchor information are recorded in the third SRR ("Volume Str." and "Anchor" at SRR3 in the drawing).

On the other hand, in the event that determination is made in step S222 that this is not the first writing, that is to say, that information has been recorded by the processing of steps S223 through S229 at least once or more for example, the processing proceeds to step S230.

In step S230, the file system information generating unit 432 causes the recording/playing block 53 to write to the second SRR on the recording medium 81 the stream file (Files (Stream)) input to the writing unit 73 via the ECC encoding unit 71 and modulation unit 72.

That is, in the event that information is recorded on the recording medium 81 in a state such as shown to the upper side in FIG. 37 for example, the file system information generating unit 432 causes the stream file (Files (stream) in the drawing) input to the writing unit 73 via the ECC encoding unit 71 and modulation unit 72 to be recorded to the region B303' of the second SRR on the recording medium 81 set by the above-described formatting processing. More specifically, in the event that the file is an additional write, the fuel system information generating unit 432 records the additional information newly added to the information recorded in the region B303 shown to the upper side in FIG. 37 in the region B303' shown to the middle of FIG. 37. Also, in the event of recording a file wherein new information has been updated, readout of the file recorded in the region B303 shown to the upper side in FIG. 37 is disabled, and the newly updated file is recorded in the region B303'.

In step S231, the file system information generating unit 432 controls the writing unit 73 via the ECC encoding unit 71 and modulation unit 72 so as to disable readout of the original DB file (Files (DB) (original)) from the recording medium 81 by the recording/playing block 53.

That is to say, as shown to the lower side of FIG. 37, the file system information generating unit 432 disables readout of the original DB file (Files (DB) (original)) recorded in the region B302 from the recording medium 81 by the recording/playing block 53.

In step S232, the file system information generating unit 432 supplies the new original DB file (Files (DB)-O) to the writing unit 73 via the ECC encoding unit 71 and modulation unit 72, and causes the recording/playing block 53 to write to a new region in the second SRR.

That is to say, as shown to the lower side of FIG. 37, the file system information generating unit 432 supplies the original DB file (Files (DB) (original)) to the writing unit 73 via the ECC encoding unit 71 and modulation unit 72, and causes the recording/playing block 53 to write to region B302' in the second SRR on the recording medium 81 (Files (DB)-O in the drawing).

In step S233, the file system information generating unit 432 controls the writing unit 73 via the ECC encoding unit 71 and modulation unit 72 so as to disable readout of the backup DB file (Files (DB) (backup)) from the recording medium 81 by the recording/playing block 53.

That is to say, as shown to the lower side of FIG. 37, the file system information generating unit 432 disables readout of the backup DB file (Files (DB) (backup)) recorded in the region B304 from the recording medium 81 by the recording/playing block 53.

In step S234, the file system information generating unit 432 supplies the new backup DB file (Files (DB) (backup)) to the writing unit 73 via the ECC encoding unit 71 and modulation unit 72, and causes the recording/playing block 53 to write to a new region in the second SRR.

That is to say, as shown to the lower side of FIG. 37, the file system information generating unit 432 supplies the backup DB file (Files (DB) (backup)) to the writing unit 73 via the ECC encoding unit 71 and modulation unit 72, and causes the recording/playing block 53 to write to region B304' in the second SRR on the recording medium 81 (Files (DB)-B in the drawing).

In step S235, the file system information generating unit 432 controls the writing unit 73 via the ECC encoding unit 71 and modulation unit 72 so as to disable readout of the main FS (FS (Metadata)) and inner side volume structure information and anchor information from the recording medium 81 by the recording/playing block 53.

That is to say, as shown to the lower side of FIG. 37, the file system information generating unit 432 disables readout of the main FS (FS (Metadata)) recorded in the region B301, and the inner side volume structure information and anchor information recorded in the first SRR from the recording medium 81 by the recording/playing block 53.

In step S236, the file system information generating unit 432 supplies the main FS to the writing unit 73 via the ECC encoding unit 71 and modulation unit 72, and causes the recording/playing block 53 to write in the second SRR.

That is to say, as shown to the middle of FIG. 37, the file system information generating unit 432 supplies the main file system information FS to the writing unit 73 via the ECC encoding unit 71 and modulation unit 72, and causes the recording/playing block 53 to write to region B301' in the second SRR on the recording medium 81.

Further, in step S237, the file system information generating unit 432 supplies the inner side volume structure information and anchor information corresponding to the main FS to the writing unit 73 via the ECC encoding unit 71 and modulation unit 72, and causes the recording/playing block 53 to write to a replacement region of the first SRR.

Note that while this replacement region of the first SRR is not shown in FIG. 37, this is recorded substantially in the same way as with the DB files and FS. That is to say, the volume structure information and anchor information are recorded with the same processing as described with reference to FIG. 32 through FIG. 34, for example.

In step S238, the file system information generating unit 432 controls the writing unit 73 via the ECC encoding unit 71 and modulation unit 72 so as to disable readout of the mirror FS (FS (MD-Mirror)) and outer side volume structure information and anchor information from the recording medium 81 by the recording/playing block 53.

That is to say, as shown to the lower side of FIG. 37, the file system information generating unit 432 disables readout of the mirror FS (FS (MD-Mirror)) recorded in the region B305, and the outer side volume structure information and anchor information recorded in the third SRR from the recording medium 81 by the recording/playing block 53.

In step S239, the file system information generating unit 432 supplies the mirror FS to the writing unit 73 via the ECC encoding unit 71 and modulation unit 72, and causes the recording/playing block 53 to write in the second SRR.

That is to say, as shown to the middle of FIG. 37, the file system information generating unit 432 supplies the main file system information FS to the writing unit 73 via mirror ECC encoding unit 71 and modulation unit 72, and causes the recording/playing block 53 to write to region B305' in the second SRR on the recording medium 81.

Further, in step S240, the file system information generating unit 432 supplies the outer side volume structure information and anchor information corresponding to the mirror FS to the writing unit 73 via the ECC encoding unit 71 and modulation unit 72, and causes the recording/playing block 53 to write to a replacement region of the third SRR.

Note that while this replacement region of the third SRR is not shown in FIG. 37, this is recorded substantially in the same way as with the DB files and FS. That is to say, the volume structure information and anchor information are recorded with the same processing as described with reference to FIG. 32 through FIG. 34, for example.

Due to the above processing, replacement regions are set in SRRs set beforehand, and at the time of adding or updating files, updated information of the stream file (Files (Stream)), original DB file (Files (DB) (original)), backup DB file (Files (DB) (backup)), main FS, mirror FS, and anchor information and volume structure information, is sequentially recorded in replacement sectors in the SRRs set beforehand, so the anchor information, the volume structure, and all other information can be classified and the replacement targets determined within a particular SRR, thereby shortening the seek time for replacement regions, and accessing capabilities can be improved.

Note that in the above example, description has been made regarding a case of recording two of the same file for the DB file and file system FS, such as the original and backup, or main and mirror, but having multiple of these is not always necessary, so in the event of a single file, one of the above-described processes will be omitted.

Now, in the event of setting three SRRs at the time of formatting, as shown in FIG. 37, the replacement regions of the stream file (Files (Stream)), original DB file (Files (DB) (original)), backup DB file (Files (DB) (backup)), main FS, and mirror FS are recorded in an intermingled state, so there may be classes wherein access capabilities are deteriorated by the distance from the replacement origin to the replacement target. Accordingly, the usage classification of SRRs at the time of formatting may be further broken down.

Figure 39:
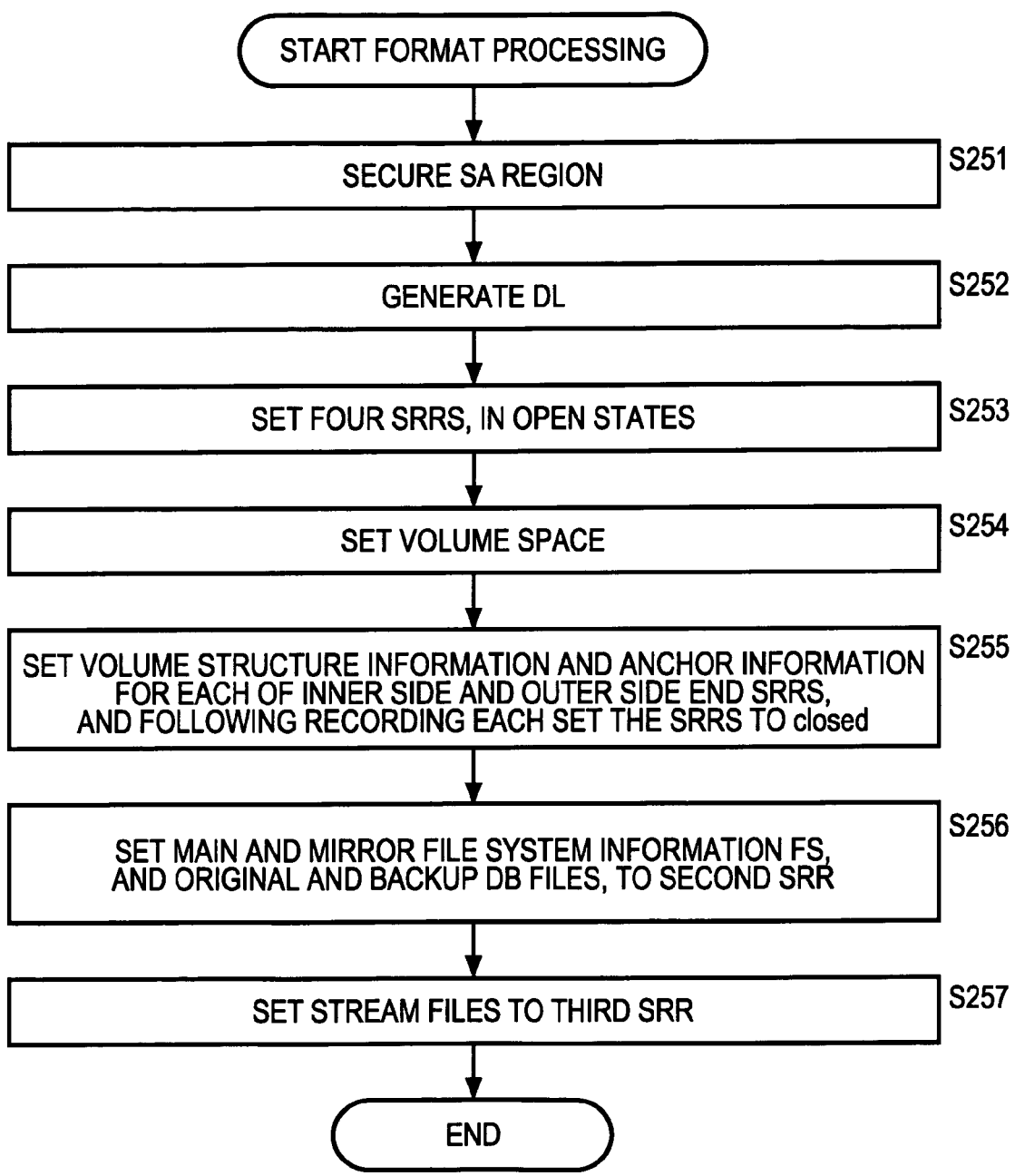
FIG. 39 is a flowchart for describing other formatting processing with the recording/playing mechanism section shown in FIG. 35.

Next, the processing for formatting of the recording medium 81 wherein one SRR is set for inner side anchor information and volume structure information, one SRR is set for outer side anchor information and volume structure information, one SRR is set for stream files (Files (Stream)), and one SRR is set for other information, will be described, with reference to the flowchart shown in FIG. 39. Note that the processing in steps S251, S252, and S254 of the flowchart in FIG. 39 is the same as the processing in step S201, S202, and S204 in the flowchart in FIG. 36, and accordingly description thereof will be omitted.

Figure 40:
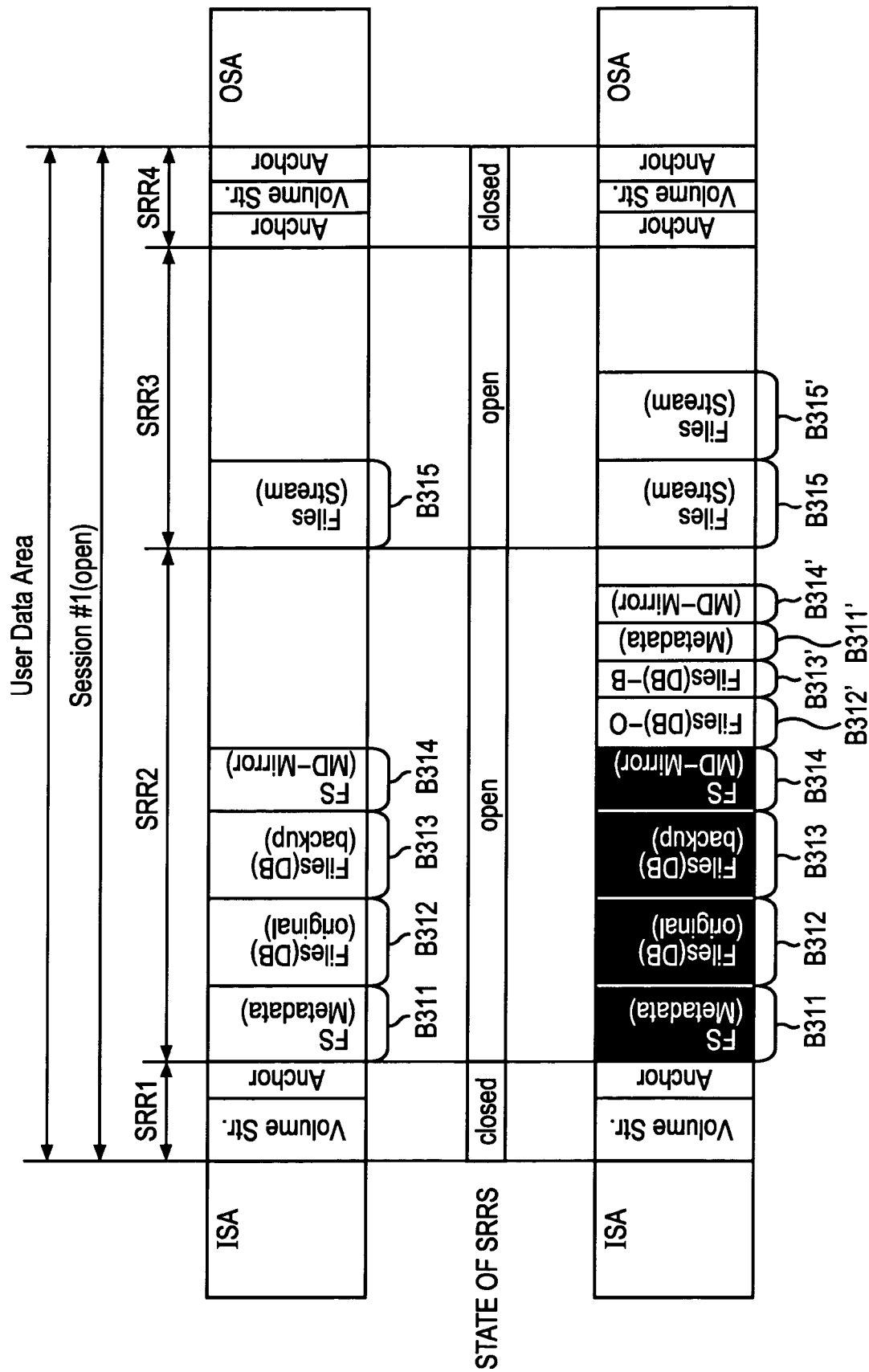
FIG. 40 is a diagram for describing other formatting processing with the recording/playing mechanism section shown in FIG. 35.

In step S253, the initialization unit 432a sets one SRR for the inner side anchor information and volume structure information, sets one SRR for the outer side anchor information and volume structure information, sets one SRR for stream files (Files (Stream)), and sets an SRR for other information, each in an open state. As shown in FIG. 40, the four SRRs of a first SRR through a fourth SRR (SRR1 through SRR4 in FIG. 40) are set in open states.

In step S255, the initialization unit 432a controls the writing unit 73 so as to cause the recording/playing block 53 to set regions for recording volume structure information and anchor information at the SRRs at the outer side and inner side ends of the on the recording medium 81. That is to say, in this case, the first SRR and the fourth SRR are set as regions for recording volume structure information and anchor information, as shown to the upper side in FIG. 37.

In step S256, the initialization unit 432a controls the writing unit 73 so as to cause the recording/playing block 53 to set the main FS and mirror FS storing file system information, and original and backup DB files, in the second SRR of the recording medium 81. That is to say, in the case to the upper side in FIG. 40, the initialization unit 432a controls the writing unit 73 so as to cause the recording/playing block 53 to set the main FS (FS (Metadata) at the upper side in FIG. 40) and mirror FS (FS (MD-Mirror) at the upper side in FIG. 40) to the regions B311 and B314, in the second SRR of the recording medium 81, and further the original and backup DB files (Files (DB) (original) and Files (DB) (backup) at the upper side in FIG. 40) respectively to the regions B312 and B313.

In step S257, the initialization unit 432a controls the writing unit 73 so as to cause the recording/playing block 53 to set the stream file in the third SRR of the recording medium 81. That is to say, in the case to the upper side in FIG. 40, the initialization unit 432a controls the writing unit 73 so as to cause the recording/playing block 53 to set the stream file (Files (Stream) at the upper side in FIG. 40) to the region B315 of the third SRR of the recording medium 81.

According to the above processing, four SRRs are set on the recording medium 81 to be formatted for each usage.

Figure 41:
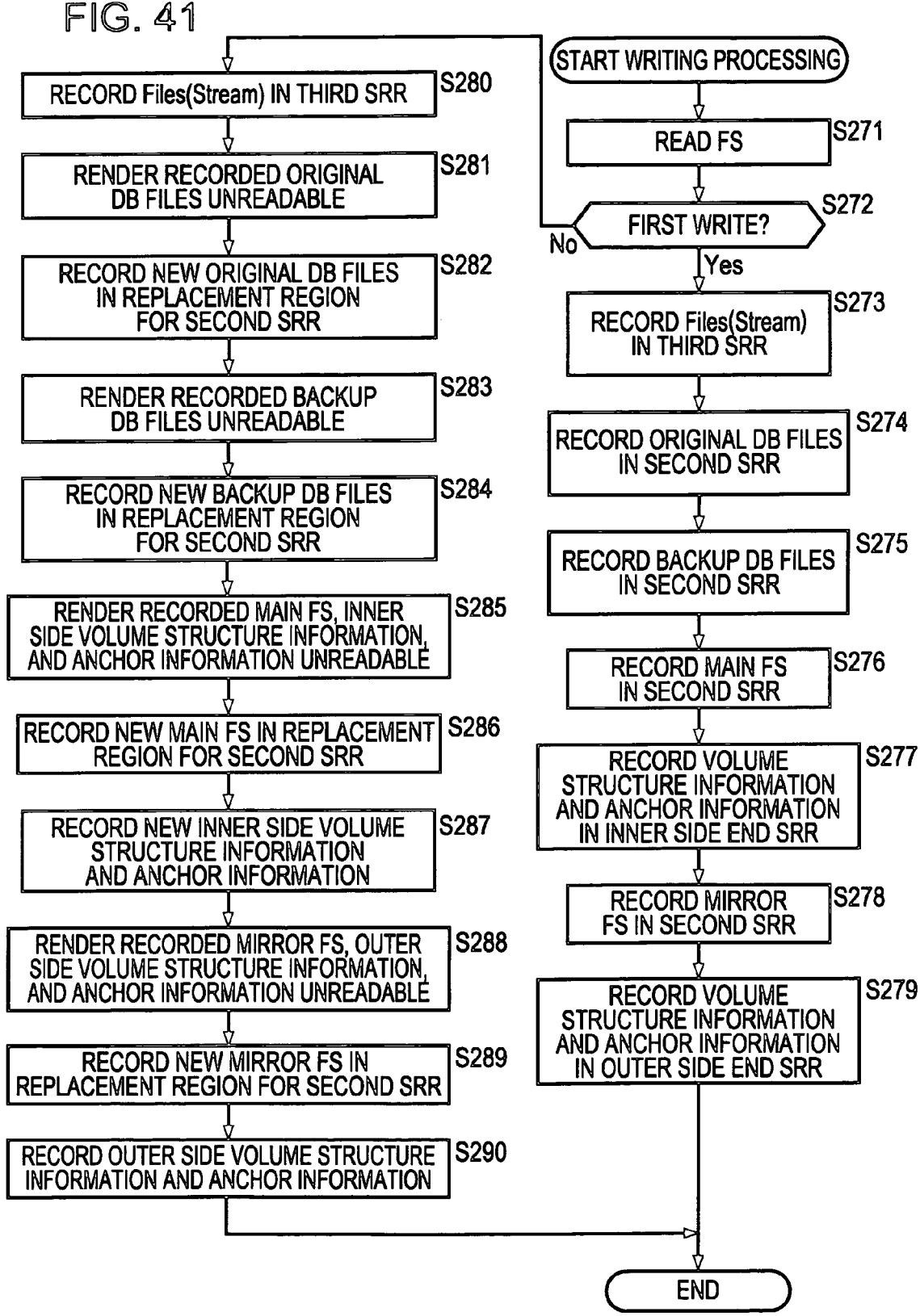
FIG. 41 is a flowchart for describing other writing processing with the recording/playing mechanism section shown in FIG. 35.

Next, the processing for writing information to the recording medium 81 which has been formatted (initialized) by the processing shown in FIG. 39, by the recording/playing mechanism section 22 shown in FIG. 35, will be described with reference to the flowchart in FIG. 41. Note that the processing in steps S271 and S272 of the flowchart in FIG. 41 is the same as the processing in steps S221 and S222 in the flowchart in FIG. 38, and accordingly description thereof will be omitted.

In step S273, the file system information generating unit 432 causes the recording/playing block 53 to write to the third SRR (SRR3) on the recording medium 81 the stream file Files (Stream) input to the writing unit 73 via the ECC encoding unit 71 and modulation unit 72.

That is, as shown to the upper side in FIG. 40, the file system information generating unit 432 causes the file (Files (Stream) in the drawing) input to the writing unit 73 via the ECC encoding unit 71 and modulation unit 72 to be recorded to the region B315 of the third SRR set on the recording medium 81 by the above-described formatting processing.

In step S274, the file system information generating unit 432 supplies the original DB file to the writing unit 73 via the ECC encoding unit 71 and modulation unit 72, and causes the recording/playing block 53 to write to the second SRR on the recording medium 81.

That is to say, as shown to the upper side in FIG. 40, the file system information generating unit 432 records the original DB file at the region B312 of the second SRR set on the recording medium 81 via the ECC encoding unit 71 and modulation unit 72, by the above-described formatting processing (Files (DB) (original) in the drawing).

In step S275, the file system information generating unit 432 supplies the backup DB file to the writing unit 73 via the ECC encoding unit 71 and modulation unit 72, and causes the recording/playing block 53 to write to the second SRR on the recording medium 81.

That is to say, as shown to the upper side in FIG. 40, the file system information generating unit 432 records the backup DB file at the region B313 of the second SRR set on the recording medium 81 via the ECC encoding unit 71 and modulation unit 72, by the above-described formatting processing (Files (DB) (backup) in the drawing).

In step S276, the file system information generating unit 432 supplies the main FS to the writing unit 73 via the ECC encoding unit 71 and modulation unit 72, and causes the recording/playing block 53 to write to the second SRR on the recording medium 81.

That is to say, as shown to the upper side in FIG. 40, the file system information generating unit 432 records the main FS at the region B311 of the second SRR set on the recording medium 81 via the ECC encoding unit 71 and modulation unit 72, by the above-described formatting processing (FS (Metadata) in the drawing).

In step S277, the file system information generating unit 432 supplies the inner side volume structure information and anchor information to the writing unit 73 via the ECC encoding unit 71 and modulation unit 72, and causes the recording/playing block 53 to write to the inner side end SRR on the recording medium 81. At the upper side in FIG. 40, the inner side volume structure information and anchor information are recorded in the first SRR.

In step S278, the file system information generating unit 432 supplies the mirror FS to the writing unit 73 via the ECC encoding unit 71 and modulation unit 72, and causes the recording/playing block 53 to write to the second SRR on the recording medium 81.

That is to say, as shown to the upper side in FIG. 40, the file system information generating unit 432 records the mirror FS at the region B314 of the second SRR set on the recording medium 81 via the ECC encoding unit 71 and modulation unit 72, by the above-described formatting processing (FS (MD-Mirror) in the drawing).

In step S279, the file system information generating unit 432 supplies the outer side volume structure information and anchor information to the writing unit 73 via the ECC encoding unit 71 and modulation unit 72, and causes the recording/playing block 53 to write to the outer side end SRR on the recording medium 81. At the upper side in FIG. 40, the outer side volume structure information and anchor information are recorded in the fourth SRR ("Volume Str." and "Anchor" at SRR4 in the drawing).

On the other hand, in the event that determination is made in step S272 that this is not the first writing, that is to say, that information has been recorded by the processing of steps S273 through S279 at least once or more for example, the processing proceeds to step S280.

In step S280, the file system information generating unit 432 causes the recording/playing block 53 to write to the third SRR on the recording medium 81 the file (Files (Stream): a file made up of stream data) input to the writing unit 73 via the ECC encoding unit 71 and modulation unit 72.

That is, in the event that information is recorded on the recording medium 81 in a state such as shown to the upper side in FIG. 40 for example, the file system information generating unit 432 causes the file (Files (stream) in the drawing) input to the writing unit 73 via the ECC encoding unit 71 and modulation unit 72 to be recorded to the region B315' of the third SRR set on the recording medium 81 by the above-described formatting processing. More specifically, in the event that the file is an additional write, the file system information generating unit 432 records the additional information newly added to the information recorded in the region B315 shown to the upper side in FIG. 40 in the region B315' shown to the middle of FIG. 40. Also, in the event of recording a file wherein new information has been updated, readout of the file recorded in the region B315 shown to the upper side in FIG. 40 is disabled, and the information of the region B315' is configured so as to record the newly updated file in the region adjacent to the region B315, and is thus recorded.

In step S281, the file system information generating unit 432 controls the writing unit 73 via the ECC encoding unit 71 and modulation unit 72 so as to disable readout of the original DB file (Files (DB) (original)) from the recording medium 81 by the recording/playing block 53.

That is to say, as shown to the lower side of FIG. 40, the file system information generating unit 432 disables readout of the original DB file (Files (DB) (original)) recorded in the region B302 from the recording medium 81 by the recording/playing block 53.

In step S282, the file system information generating unit 432 supplies the new original DB file (Files (DB) (original)) to the writing unit 73 via the ECC encoding unit 71 and modulation unit 72, and causes the recording/playing block 53 to write to a new region in the second SRR.

That is to say, as shown to the lower side of FIG. 40, the file system information generating unit 432 supplies the original DB file (Files (DB) (original)) to the writing unit 73 via the ECC encoding unit 71 and modulation unit 72, and causes the recording/playing block 53 to write to region B302' on the recording medium 81 (Files (DB)-O in the drawing).

In step S283, the file system information generating unit 432 controls the writing unit 73 via the ECC encoding unit 71 and modulation unit 72 so as to disable readout of the backup DB file (Files (DB) (backup)) from the recording medium 81 by the recording/playing block 53.

That is to say, as shown to the lower side of FIG. 40, the file system information generating unit 432 disables readout of the backup DB file (Files (DB) (backup)) recorded in the region B304 from the recording medium 81 by the recording/playing block 53.

In step S284, the file system information generating unit 432 supplies the new backup DB file (Files (DB) (backup)) to the writing unit 73 via the ECC encoding unit 71 and modulation unit 72, and causes the recording/playing block 53 to write to a new region in the second SRR.

That is to say, as shown to the lower side of FIG. 40, the file system information generating unit 432 supplies the backup DB file (Files (DB) (backup)) to the writing unit 73 via the ECC encoding unit 71 and modulation unit 72, and causes the recording/playing block 53 to write to region B313' in the second SRR on the recording medium 81 (Files (DB)-B in the drawing).

In step S285, the file system information generating unit 432 controls the writing unit 73 via the ECC encoding unit 71 and modulation unit 72 so as to disable readout of the main FS (FS (Metadata)) and inner side volume structure information and anchor information from the recording medium 81 by the recording/playing block 53.

That is to say, as shown to the lower side of FIG. 40, the file system information generating unit 432 disables readout of the main FS (FS (Metadata)) recorded in the region B311, and the inner side volume structure information and anchor information recorded in the first SRR from the recording medium 81 by the recording/playing block 53.

In step S286, the file system information generating unit 432 supplies the main FS to the writing unit 73 via the ECC encoding unit 71 and modulation unit 72, and causes the recording/playing block 53 to write in the second SRR.

That is to say, as shown to the lower side of FIG. 40, the file system information generating unit 432 supplies the main file system information FS to the writing unit 73 via the ECC encoding unit 71 and modulation unit 72, and causes the recording/playing block 53 to write to region B311' in the second SRR on the recording medium 81.

Further, in step S287, the file system information generating unit 432 supplies the inner side volume structure information and anchor information corresponding to the main FS to the writing unit 73 via the ECC encoding unit 71 and modulation unit 72, and causes the recording/playing block 53 to write to a replacement region of the first SRR.

In step S288, the file system information generating unit 432 controls the writing unit 73 via the ECC encoding unit 71 and modulation unit 72 so as to disable readout of the mirror FS (FS (MD-Mirror)) and outer side volume structure information and anchor information from the recording medium 81 by the recording/playing block 53.

That is to say, as shown to the lower side of FIG. 40, the file system information generating unit 432 disables readout of the mirror FS (FS (MD-Mirror)) recorded in the region B314, and the outer side volume structure information and anchor information recorded in the third SRR from the recording medium 81 by the recording/playing block 53.

In step S289, the file system information generating unit 432 supplies the mirror FS to the writing unit 73 via the ECC encoding unit 71 and modulation unit 72, and causes the recording/playing block 53 to write in the second SRR.

That is to say, as shown to the lower side of FIG. 40, the file system information generating unit 432 supplies the mirror file system information FS to the writing unit 73 via the ECC encoding unit 71 and modulation unit 72, and causes the recording/playing block 53 to write to region B314' in the second SRR on the recording medium 81.

Further, in step S290, the file system information generating unit 432 supplies the outer side volume structure information and anchor information corresponding to the mirror FS to the writing unit 73 via the ECC encoding unit 71 and modulation unit 72, and causes the recording/playing block 53 to write to a replacement region of the fourth SRR.

Due to the above processing, the file system FS, DB files, and the stream files, are each recorded in different SRRs, with the stream files being recorded in a continuous state in a fixed SRR, thereby enabling improvement of access capabilities.

Note that while in the above example, description has been made regarding a case of setting four SRRs, with the file system FS, DB files, and the stream files, each being recorded in different SRRs, other combinations may be used for the way to allocate the file system FS, DB files, and the stream files, to the two SRRs excluding the inner side and outer side end SRRs (first SRR and fourth SRR) for recording the volume structure information and anchor information.

For example, an allocation may be made wherein the main FS and mirror FS are set in the second SRR, and the original DB file, backup DB file, and stream files are set in the third SRR.

Figure 42:
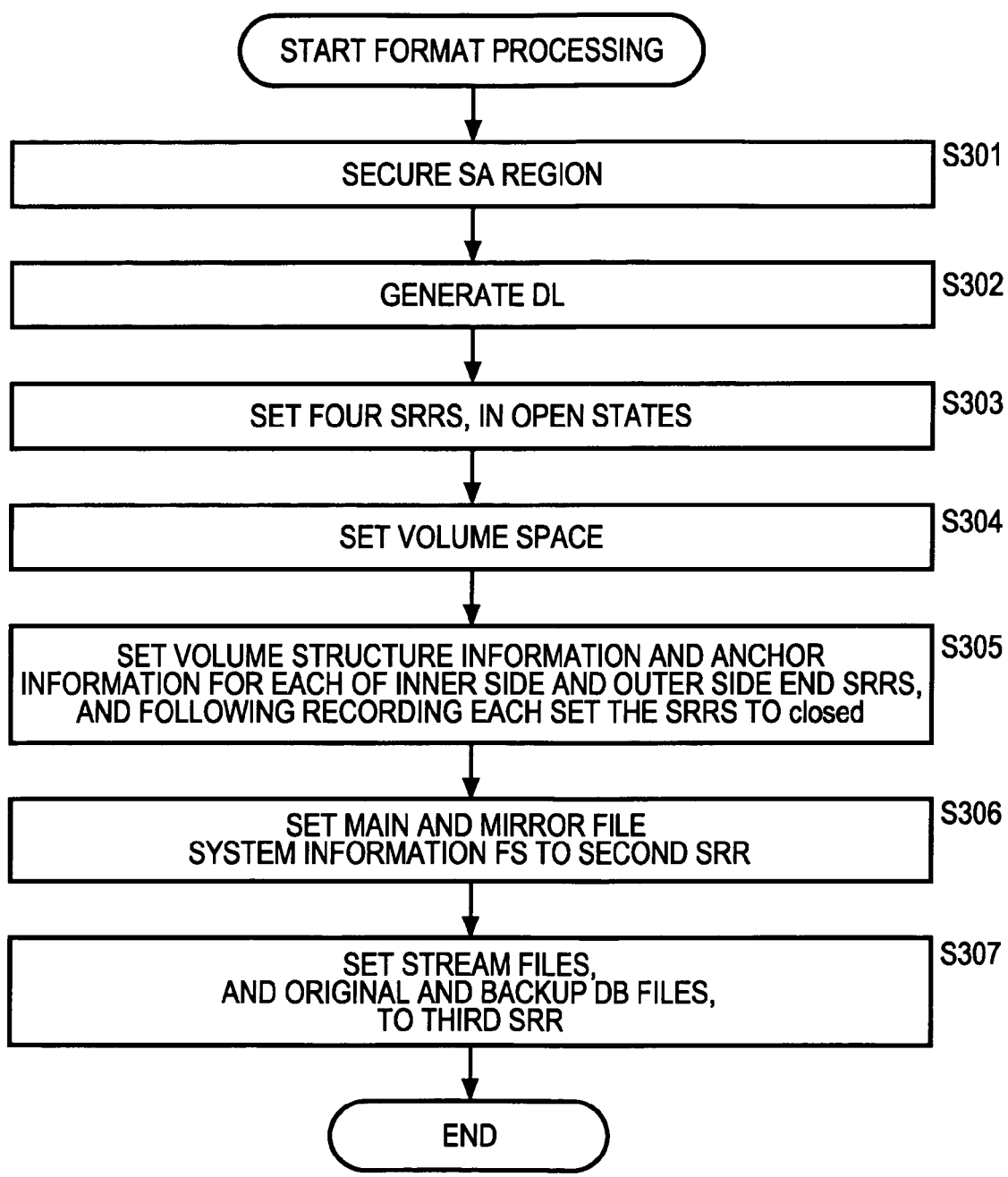
FIG. 42 is a flowchart for describing still other formatting processing with the recording/playing mechanism section shown in FIG. 35.

Next, the processing for formatting of the recording medium 81 wherein one SRR is set for inner side anchor information and volume structure information, one SRR is set for outer side anchor information and volume structure information, one SRR is set for stream files (Files (Stream)) and the original DB file and backup DB file, and one SRR is set for the main file system FS and mirror file system FS, will be described, with reference to the flowchart shown in FIG. 42. Note that the processing in steps S301, S302, and S304 of the flowchart in FIG. 42 is the same as the processing in step S201, S202, and S204 in the flowchart in FIG. 42, and accordingly description thereof will be omitted.

In step S303, the initialization unit 432a sets one SRR for the inner side anchor information and volume structure information, sets one SRR for the outer side anchor information and volume structure information, sets one SRR for stream files (Files (Stream)) and the original DB file and backup DB file, and sets an SRR for the main file system FS and mirror file system FS, each in an open state. Consequently, as shown in FIG. 43, the four SRRs of a first SRR through a fourth SRR (SRR1 through SRR4 in FIG. 43) are set in open states.

In step S305, the initialization unit 432a controls the writing unit 73 so as to cause the recording/playing block 53 to set regions for recording volume structure information and anchor information at the SRRs at the outer side and inner side ends of the on the recording medium 81, as with the above step S255 (FIG. 39). That is to say, in this case, the first SRR and the fourth SRR are set as regions for recording volume structure information and anchor information, as shown to the upper side in FIG. 43.

In step S306, the initialization unit 432a controls the writing unit 73 so as to cause the recording/playing block 53 to set the main FS and mirror FS storing file system information in the second SRR of the recording medium 81. That is to say, in the case to the upper side in FIG. 43, the initialization unit 432a controls the writing unit 73 so as to cause the recording/playing block 53 to set the main FS (FS (Metadata) at the upper side in FIG. 43) and mirror FS (FS (MD-Mirror) at the upper side in FIG. 43), which each record file system information, to the regions B321 and B322 in he second SRR of the recording medium 81.

Figure 43:
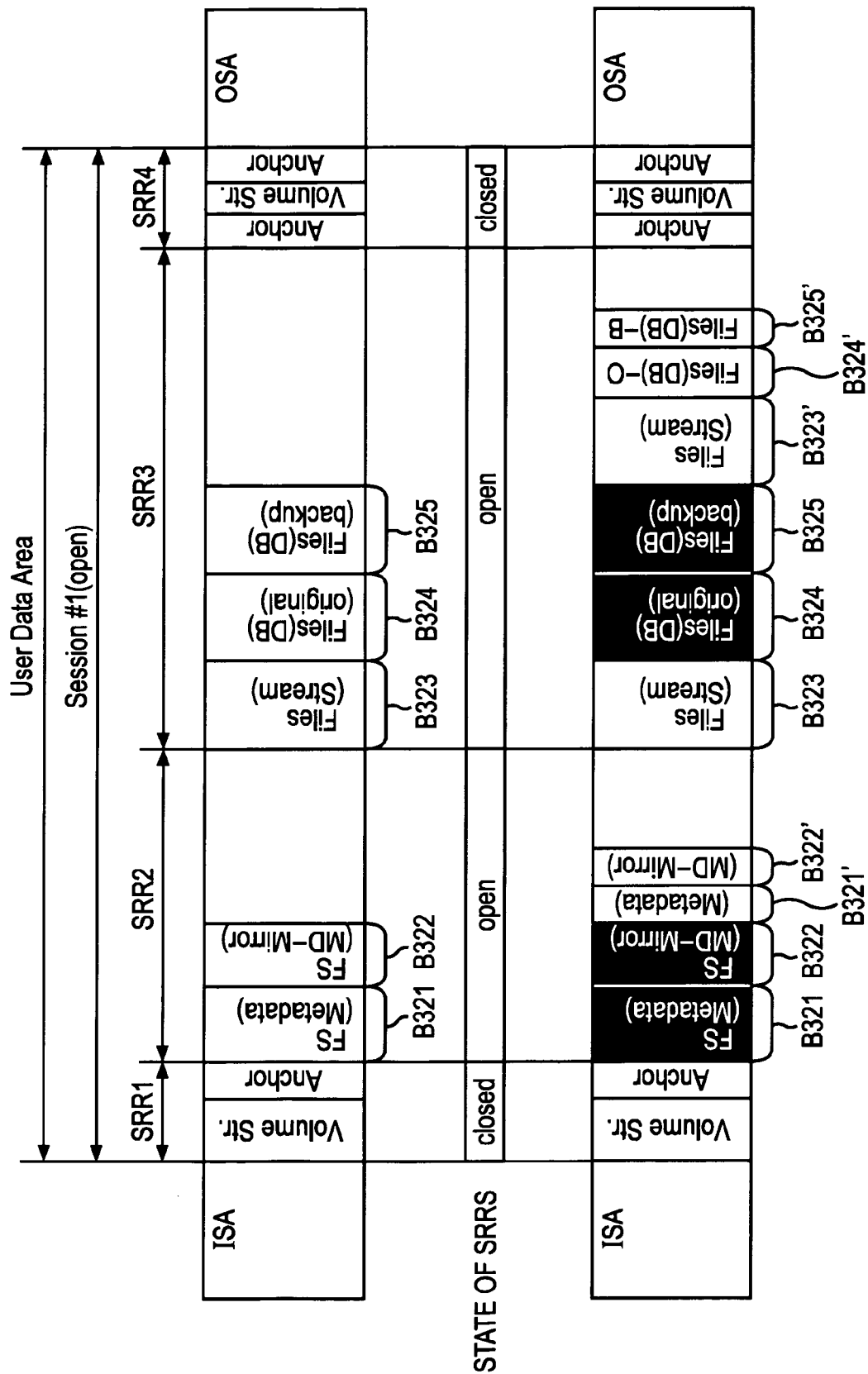
FIG. 43 is a diagram for describing still other formatting processing with the recording/playing mechanism section shown in FIG. 35.

In step S307, the initialization unit 432a controls the writing unit 73 so as to cause the recording/playing block 53 to set the stream file, and original and backup DB files (Files (DB) (original) and Files (DB) (backup)) at the upper side in FIG. 43), in the third SRR of the recording medium 81. That is to say, in the case to the upper side in FIG. 43, the initialization unit 432a controls the writing unit 73 so as to cause the recording/playing block 53 to set the stream file (Files (Stream) at the upper side in FIG. 43) to the region B323 of the third SRR of the recording medium 81, and further the original and backup DB files (Files (DB) (original) and Files (DB) (backup)) at the upper side in FIG. 43) respectively to the regions B324 and B325.

According to the above processing, four SRRs are set on the recording medium 81 to be formatted for each usage.

Figure 44:
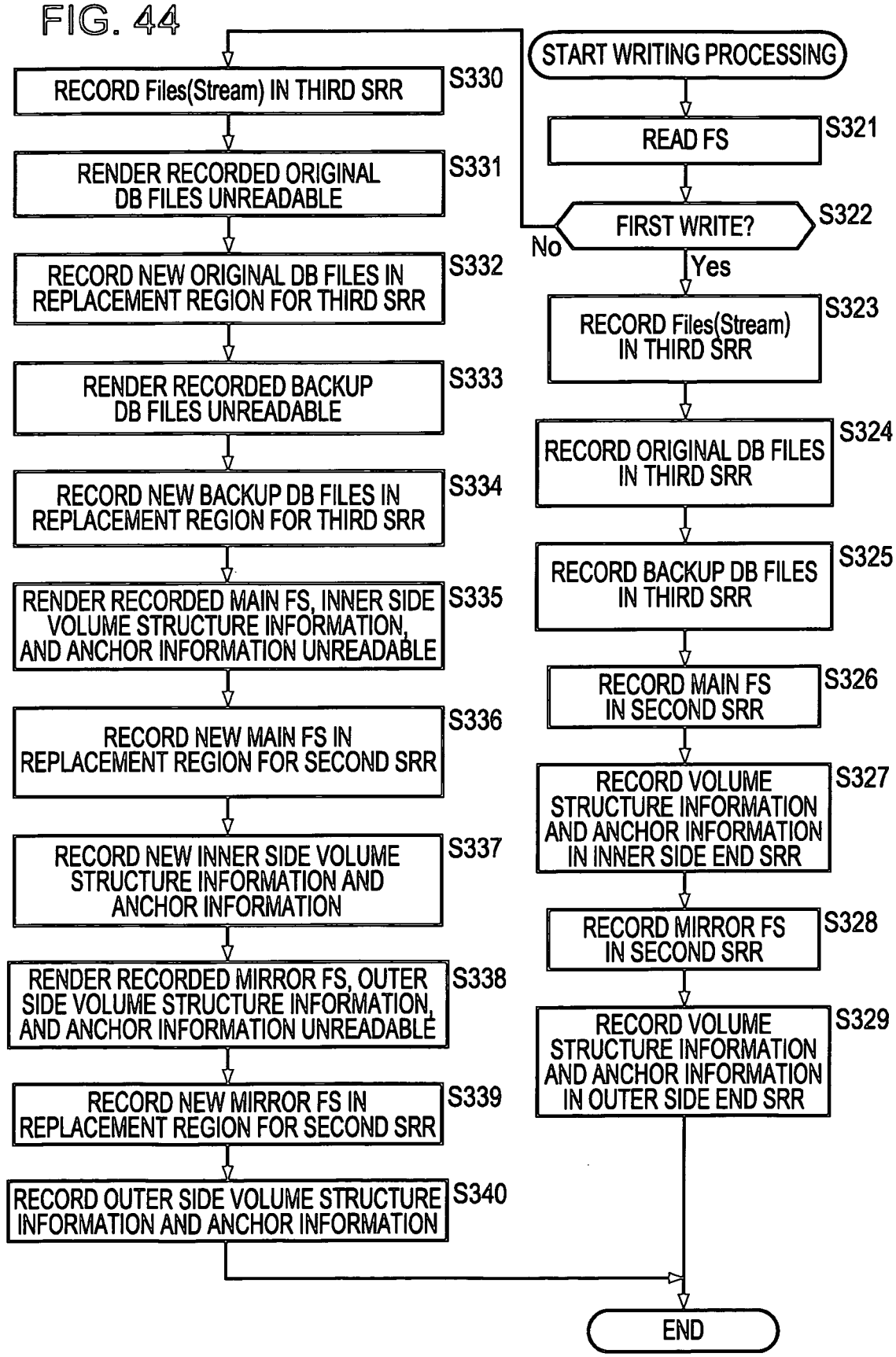
FIG. 44 is a flowchart for describing still other writing processing with the recording/playing mechanism section shown in FIG. 35.

Next, the processing for writing information to the recording medium 81 which has been formatted (initialized) by the processing shown in FIG. 42, by the recording/playing mechanism section 22 shown in FIG. 35, will be described with reference to the flowchart in FIG. 44. Note that the processing in steps S321 and S322 of the flowchart in FIG. 44 is the same as the processing in steps S221 and S222 in the flowchart in FIG. 38, and accordingly description thereof will be omitted.

In step S323, the file system information generating unit 432 causes the recording/playing block 53 to write to the third SRR (SRR3) of the recording medium 81 the stream file Files (Stream) input to the writing unit 73 via the ECC encoding unit 71 and modulation unit 72.

That is, as shown to the upper side in FIG. 43, the file system information generating unit 432 causes the file (Files (Stream) in the drawing) input to the writing unit 73 via the ECC encoding unit 71 and modulation unit 72 to be recorded to the region B323 of the third SRR set on the recording medium 81 by the above-described formatting processing.

In step S324, the file system information generating unit 432 supplies the original DB file to the writing unit 73 via the ECC encoding unit 71 and modulation unit 72, and causes the recording/playing block 53 to write to the third SRR of the recording medium 81.

That is to say, as shown to the upper side in FIG. 43, the file system information generating unit 432 records the original DB file at the region B324 of the third SRR set on the recording medium 81 via the ECC encoding unit 71 and modulation unit 72, by the above-described formatting processing (Files (DB) (original) in the drawing).

In step S325, the file system information generating unit 432 supplies the backup DB file to the writing unit 73 via the ECC encoding unit 71 and modulation unit 72, and causes the recording/playing block 53 to write to the second SRR of the recording medium 81.

That is to say, as shown to the upper side in FIG. 43, the file system information generating unit 432 records the backup DB file at the region B325 of the second SRR set on the recording medium 81 via the ECC encoding unit 71 and modulation unit 72, by the above-described formatting processing (Files (DB) (backup) in the drawing).

In step S326, the file system information generating unit 432 supplies the main FS to the writing unit 73 via the ECC encoding unit 71 and modulation unit 72, and causes the recording/playing block 53 to write to the second SRR on the recording medium 81.

That is to say, as shown to the upper side in FIG. 43, the file system information generating unit 432 records the main FS at the region B311 of the second SRR set on the recording medium 81 via the ECC encoding unit 71 and modulation unit 72, by the above-described formatting processing (FS (Metadata) in the drawing).

In step S327, the file system information generating unit 432 supplies the inner side volume structure information and anchor information to the writing unit 73 via the ECC encoding unit 71 and modulation unit 72, and causes the recording/playing block 53 to write to the inner side end SRR on the recording medium 81. At the upper side in FIG. 43, the inner side volume structure information and anchor information are recorded in the first SRR.

In step S328, the file system information generating unit 432 supplies the mirror FS to the writing unit 73 via the ECC encoding unit 71 and modulation unit 72, and causes the recording/playing block 53 to write to the second SRR on the recording medium 81.

That is to say, as shown to the upper side in FIG. 43, the file system information generating unit 432 records the mirror FS at the region B322 of the second SRR set on the recording medium 81 via the ECC encoding unit 71 and modulation unit 72, by the above-described formatting processing (FS (MD-Mirror) in the drawing).

In step S329, the file system information generating unit 432 supplies the outer side volume structure information and anchor information to the writing unit 73 via the ECC encoding unit 71 and modulation unit 72, and causes the recording/playing block 53 to write to the outer side end SRR on the recording medium 81. At the upper side in FIG. 43, the outer side volume structure information and anchor information are recorded in the fourth SRR ("Volume Str." and "Anchor" at SRR4 in the drawing).

On the other hand, in the event that determination is made in step S322 that this is not the first writing, that is to say, that information has been recorded by the processing of steps S323 through S329 at least once or more for example, the processing proceeds to step S330.

In step S330, the file system information generating unit 432 causes the recording/playing block 53 to write to the third SRR on the recording medium 81 the file (Files (Stream): a file made up of stream data) input to the writing unit 73 via the ECC encoding unit 71 and modulation unit 72.

That is, in the event that information is recorded on the recording medium 81 in a state such as shown to the upper side in FIG. 43 for example, the file system information generating unit 432 causes the file (Files (stream) in the drawing) input to the writing unit 73 via the ECC encoding unit 71 and modulation unit 72 to be recorded to the region B323' of the third SRR set on the recording medium 81 by the above-described formatting processing. More specifically, in the event that the file is an additional write, the file system information generating unit 432 records the additional information newly added to the information recorded in the region B323 shown to the upper side in FIG. 43 in the region B323' shown to the middle of FIG. 43. Also, in the event of recording a file wherein new information has been updated, readout of the file recorded in the region B323 shown to the upper side in FIG. 43 is disabled, and the information of the region B323' is configured so as to record the newly updated file in the region adjacent to the region B325, and is thus recorded.

In step S331, the file system information generating unit 432 controls the writing unit 73 via the ECC encoding unit 71 and modulation unit 72 so as to disable readout of the original DB file (Files (DB) (original)) from the recording medium 81 by the recording/playing block 53.

That is to say, as shown to the lower side of FIG. 43, the file system information generating unit 432 disables readout of the original DB file (Files (DB) (original)) recorded in the region B324 from the recording medium 81 by the recording/playing block 53.

In step S332, the file system information generating unit 432 supplies the new original DB file (Files (DB) (original)) to the writing unit 73 via the ECC encoding unit 71 and modulation unit 72, and causes the recording/playing block 53 to write to a new region in the third SRR.

That is to say, as shown to the lower side of FIG. 43, the file system information generating unit 432 supplies the original DB file (Files (DB) (original)) to the writing unit 73 via the ECC encoding unit 71 and modulation unit 72, and causes the recording/playing block 53 to write to region B324' in the third SRR on the recording medium 81 (Files (DB)-O in the drawing).

In step S333, the file system information generating unit 432 controls the writing unit 73 via the ECC encoding unit 71 and modulation unit 72 so as to disable readout of the backup DB file (Files (DB) (backup)) from the recording medium 81 by the recording/playing block 53.

That is to say, as shown to the lower side of FIG. 43, the file system information generating unit 432 disables readout of the backup DB file (Files (DB) (backup)) recorded in the region B325 from the recording medium 81 by the recording/playing block 53.

In step S334, the file system information generating unit 432 supplies the new backup DB file (Files (DB) (backup)) to the writing unit 73 via the ECC encoding unit 71 and modulation unit 72, and causes the recording/playing block 53 to write to a new region in the third SRR.

That is to say, as shown to the lower side of FIG. 43, the file system information generating unit 432 supplies the backup DB file (Files (DB) (backup)) to the writing unit 73 via the ECC encoding unit 71 and modulation unit 72, and causes the recording/playing block 53 to write to region B325' in the third SRR on the recording medium 81 (Files (DB)-B in the drawing).

In step S335, the file system information generating unit 432 controls the writing unit 73 via the ECC encoding unit 71 and modulation unit 72 so as to disable readout of the main FS (FS (Metadata)) and inner side volume structure information and anchor information from the recording medium 81 by the recording/playing block 53.

That is to say, as shown to the lower side of FIG. 43, the file system information generating unit 432 disables readout of the main FS (FS (Metadata)) recorded in the region B321, and the inner side volume structure information and anchor information recorded in the first SRR from the recording medium 81 by the recording/playing block 53.

In step S336, the file system information generating unit 432 supplies the main FS to the writing unit 73 via the ECC encoding unit 71 and modulation unit 72, and causes the recording/playing block 53 to write to in the second SRR.

That is to say, as shown to the lower side of FIG. 43, the file system information generating unit 432 supplies the main file system information FS to the writing unit 73 via the ECC encoding unit 71 and modulation unit 72, and causes the recording/playing block 53 to write to region B321' in the second SRR on the recording medium 81.

Further, in step S337, the file system information generating unit 432 supplies the inner side volume structure information and anchor information corresponding to the main FS to the writing unit 73 via the ECC encoding unit 71 and modulation unit 72, and causes the recording/playing block 53 to write to a replacement region of the first SRR.

In step S338, the file system information generating unit 432 controls the writing unit 73 via the ECC encoding unit 71 and modulation unit 72 so as to disable readout of the mirror FS (FS (MD-Mirror)) and outer side volume structure information and anchor information from the recording medium 81 by the recording/playing block 53.

That is to say, as shown to the lower side of FIG. 43, the file system information generating unit 432 disables readout of the mirror FS (FS (MD-Mirror)) recorded in the region B322, and the outer side volume structure information and anchor information recorded in the fourth SRR from the recording medium 81 by the recording/playing block 53.

In step S339, the file system information generating unit 432 supplies the mirror FS to the writing unit 73 via the ECC encoding unit 71 and modulation unit 72, and causes the recording/playing block 53 to write in the second SRR.

That is to say, as shown to the lower side of FIG. 43, the file system information generating unit 432 supplies the mirror file system information FS to the writing unit 73 via the ECC encoding unit 71 and modulation unit 72, and causes the recording/playing block 53 to write to region B322' in the second SRR on the recording medium 81.

Further, in step S340, the file system information generating unit 432 supplies the outer side volume structure information and anchor information corresponding to the mirror FS to the writing unit 73 via the ECC encoding unit 71 and modulation unit 72, and causes the recording/playing block 53 to write to a replacement region of the fourth SRR.

Due to the above processing, the file system FS, the stream files, and the DB files, are each recorded in different SRRs, with the file system FS being recorded in a continuous state in a fixed SRR, thereby enabling improvement of access capabilities to the file system FS.

Note that while in the above example, description has been made regarding a case of setting four SRRs at the time of formatting with reference to FIG. 39 through FIG. 44, and in comparing FIG. 41 with FIG. 43, in FIG. 41 the stream files are recorded in an individual SRR, improving access capabilities to the stream files, so this can be said to be suitable for cases wherein large stream files, such as for movies and the like, are recorded in the recording medium. On the other hand, in FIG. 43, the file systems FS are recorded in an individual SRR, so this can be said to be suitable for cases wherein the file system FS is frequently accessed with a personal computer or the like.

While in the above example, description has been made regarding a case of the main and mirror file systems FS being recorded in the same SRR, but a file system Fs is management information within the recording medium 81, and the mirror FS is originally provided as a backup anticipating a case wherein the main FS is damaged. Accordingly, in the event that some sort of shock is applied to the recording medium 81 such that the file system FS is damaged, it would most likely not be a desirable arrangement to have the main FS and mirror FS in close proximity. Accordingly, an arrangement may be made wherein the number of SRRs provided at the time of formatting is increased, so as to record the main FS and mirror FS at positions away from each other.

Figure 45:
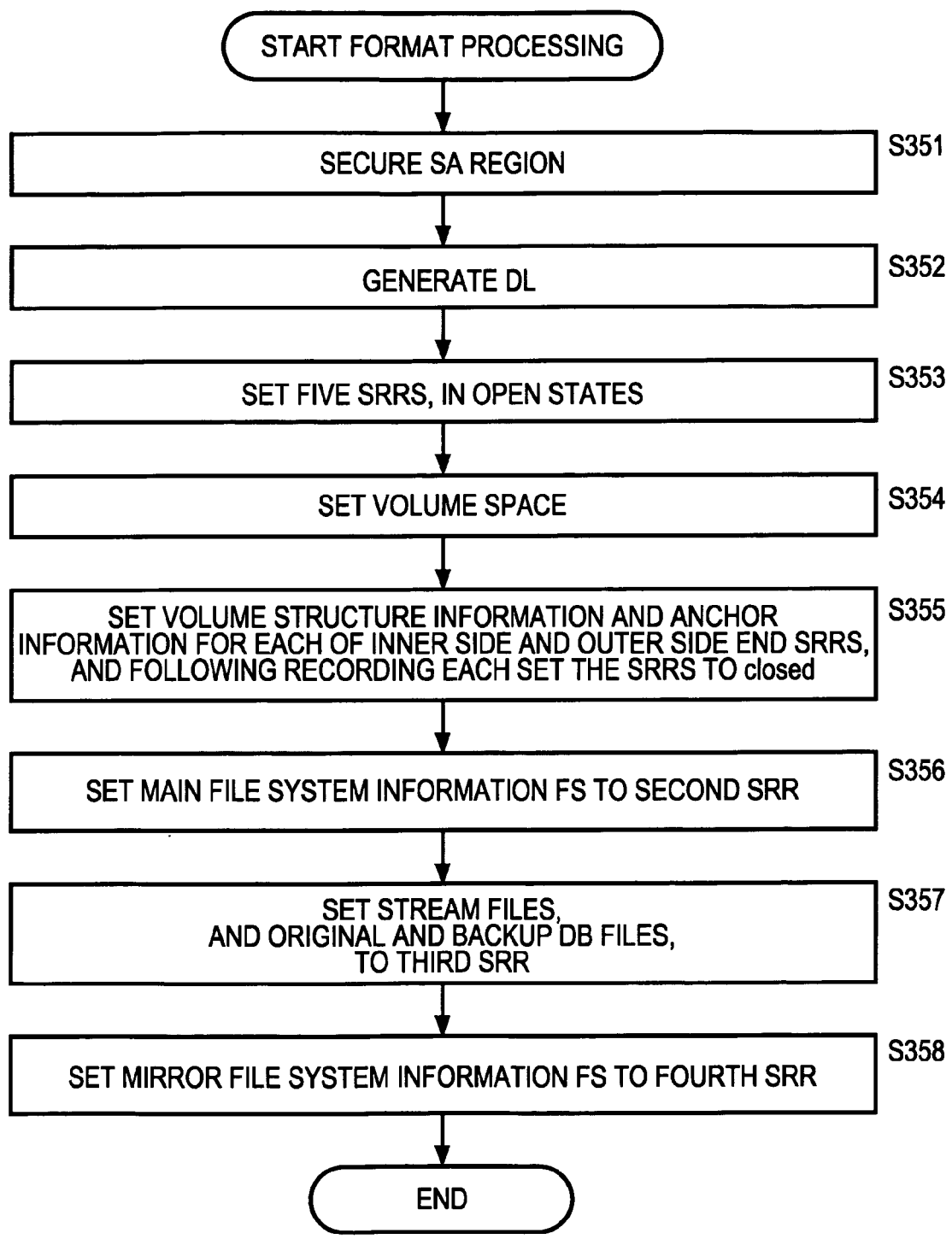
FIG. 45 is a flowchart for describing still other formatting processing with the recording/playing mechanism section shown in FIG. 35.

Next, the processing for formatting of the recording medium 81 wherein one SRR is set for inner side anchor information and volume structure information, one SRR is set for outer side anchor information and volume structure information, one SRR is set for stream files (Files (Stream)) and the original DB file and backup DB file, one SRR is set for the main file system FS, and one SRR is set for the mirror file system FS, will be described, with reference to the flowchart shown in FIG. 45. Note that the processing in steps S351, S352, and S354 of the flowchart in FIG. 45 is the same as the processing in step S201, S202, and S204 in the flowchart in FIG. 36, and accordingly description thereof will be omitted.

In step S353, the initialization unit 432*a* sets one SRR for the inner side anchor information and volume structure information, sets one SRR for the outer side anchor information and volume structure information, sets one SRR for the main file system FS, and further sets one SRR for the mirror file system FS, and sets one SRR for stream files (Files (Stream)) and the original DB file and backup DB file, each in an open state. Consequently, as shown in FIG. 46, the total of five SRRs of a first SRR through a fifth SRR (SRR1 through SRR5 in FIG. 46) are set in open states.

In step S355, the initialization unit 432*a* controls the writing unit 73 so as to cause the recording/playing block 53 to set regions for recording volume structure information and anchor information at the SRRs at the outer side and inner side ends of the recording medium 81. That is to say, in this case, the first SRR and the fifth SRR are set as regions for recording volume structure information and anchor information, as shown to the upper side in FIG. 46.

In step S356, the initialization unit 432*a* controls the writing unit 73 so as to cause the recording/playing block 53 to set the main FS storing file system information in the second SRR of the recording medium 81. That is to say, in the case to the upper side in FIG. 46, the initialization unit 432*a* controls the writing unit 73 so as to cause the recording/playing block 53 to set the main FS (FS (Metadata) at the upper side in FIG. 46), each storing file system information, to the region B331 in the second region of the recording medium 81.

Figure 46:
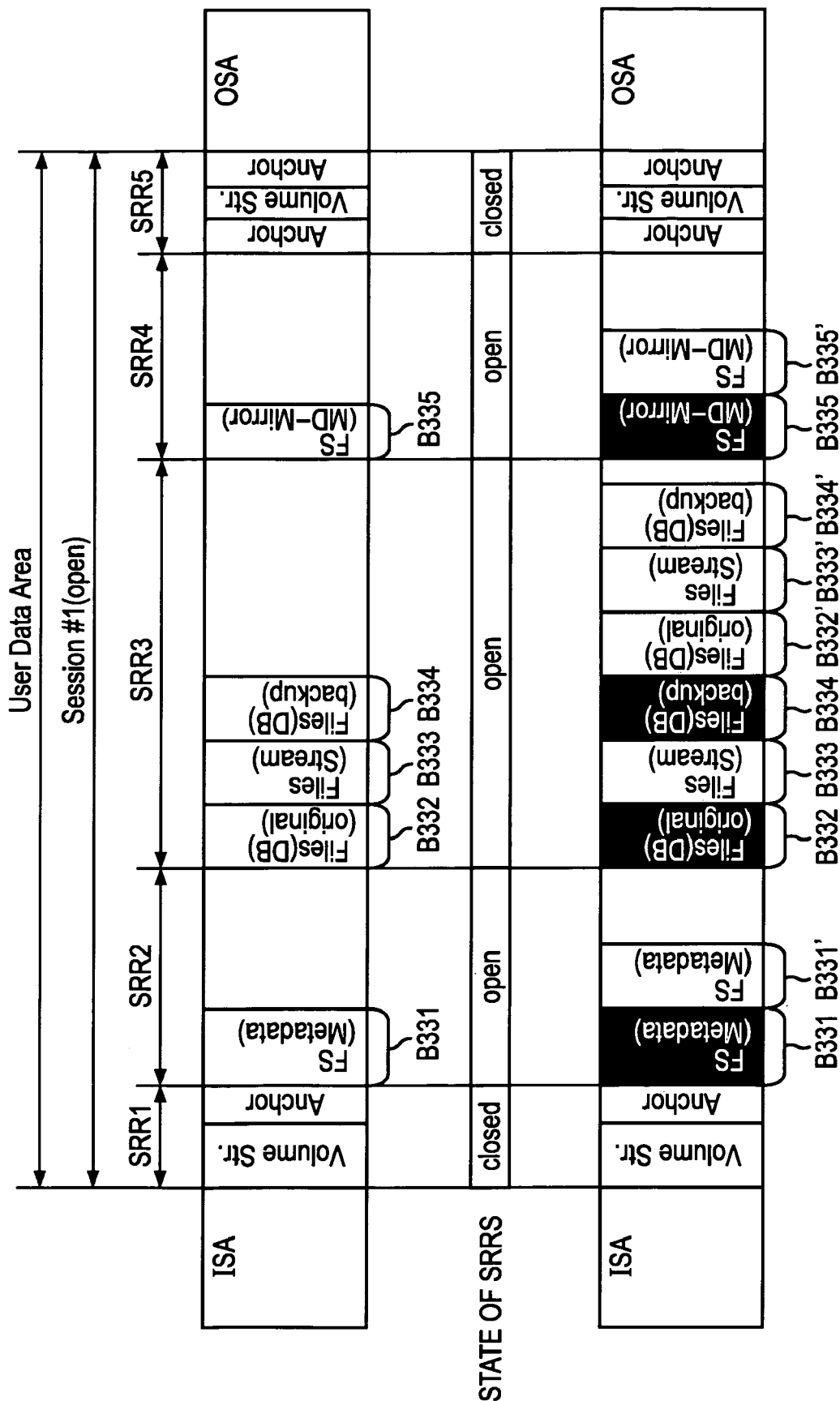
FIG. 46 is a diagram for describing still other formatting processing with the recording/playing mechanism section shown in FIG. 35.

In step S357, the initialization unit 432*a* controls the writing unit 73 so as to cause the recording/playing block 53 to set the stream file, and original and backup DB files (Files (DB) (original) and Files (DB) (backup)) at the upper side in FIG. 46), in the third SRR of the recording medium 81. That is to say, in the case to the upper side in FIG. 46, the initialization unit 432*a* controls the writing unit 73 so as to cause the recording/playing block 53 to set the original DB file (Files (DB) (original)) at the upper side in FIG. 46) to the region B332 of the third SRR of the recording medium 81, the stream file (Files (Stream) at the upper side in FIG. 46) to the region B333, and further the backup DB files (Files (DB) (backup)) at the upper side in FIG. 46) to the region B334.

In step S358, the initialization unit 432*a* controls the writing unit 73 so as to cause the recording/playing block 53 to set the mirror FS which records file system information to the second SRR of the recording medium 81. That is to say, in the case of the upper side in FIG. 46, the initialization unit 432*a* sets the mirror FS (FS (MD-Mirror) in FIG. 46) for recording respective file system information, to the region B335 in the third SRR.

According to the above processing, five SRRs are set on the recording medium 81 to be formatted for each usage.

Next, the processing for writing information to the recording medium 81 which has been formatted (initialized) by the processing shown in FIG. 42, by the recording/playing mechanism section 22 shown in FIG. 35, will be described with reference to the flowchart in FIG. 47. Note that the processing in steps S321 and S322 of the flowchart in FIG. 44 is the same as the processing in steps S221 and S222 in the flowchart in FIG. 38, and accordingly description thereof will be omitted.

In step S373, the file system information generating unit 432 causes the recording/playing block 53 to write to the third SRR (SRR3) on the recording medium 81 the stream file Files (Stream) input to the writing unit 73 via the ECC encoding unit 71 and modulation unit 72.

That is, as shown to the upper side in FIG. 46, the file system information generating unit 432 causes the stream file (Files (Stream) in the drawing) input to the writing unit 73 via the ECC encoding unit 71 and modulation unit 72 to be recorded to the region B333 of the third SRR set on the recording medium 81 by the above-described formatting processing.

In step S374, the file system information generating unit 432 supplies the original DB file to the writing unit 73 via the ECC encoding unit 71 and modulation unit 72, and causes the recording/playing block 53 to write to the third SRR on the recording medium 81.

That is to say, as shown to the upper side in FIG. 46, the file system information generating unit 432 records the original DB file at the region B332 of the third SRR set on the recording medium 81 via the ECC encoding unit 71 and modulation unit 72, by the above-described formatting processing (Files (DB) (original) in the drawing).

In step S375, the file system information generating unit 432 supplies the backup DB file to the writing unit 73 via the ECC encoding unit 71 and modulation unit 72, and causes the recording/playing block 53 to write to the third SRR on the recording medium 81.

That is to say, as shown to the upper side in FIG. 46, the file system information generating unit 432 records the backup DB file at the region B334 of the third SRR set on the recording medium 81 via the ECC encoding unit 71 and modulation unit 72, by the above-described formatting processing (Files (DB) (backup) in the drawing).

In step S376, the file system information generating unit 432 supplies the main FS to the writing unit 73 via the ECC encoding unit 71 and modulation unit 72, and causes the recording/playing block 53 to write to the second SRR on the recording medium 81.

That is to say, as shown to the upper side in FIG. 46, the file system information generating unit 432 records the main FS at the region B331 of the second SRR set on the recording medium 81 via the ECC encoding unit 71 and modulation unit 72, by the above-described formatting processing (FS (Metadata) in the drawing).

In step S377, the file system information generating unit 432 supplies the inner side volume structure information and anchor information to the writing unit 73 via the ECC encoding unit 71 and modulation unit 72, and causes the recording/playing block 53 to write to the inner side end SRR on the recording medium 81. At the upper side in FIG. 46, the inner side volume structure information and anchor information are recorded in the first SRR.

In step S378, the file system information generating unit 432 supplies the mirror FS to the writing unit 73 via the ECC encoding unit 71 and modulation unit 72, and causes the recording/playing block 53 to write to the fourth SRR of the recording medium 81.

That is to say, as shown to the upper side in FIG. 46, the file system information generating unit 432 records the mirror FS at the region B335 of the fourth SRR set on the recording medium 81 via the ECC encoding unit 71 and modulation unit 72, by the above-described formatting processing (FS (MD-Mirror) in the drawing).

In step S379, the file system information generating unit 432 supplies the outer side volume structure information and anchor information to the writing unit 73 via the ECC encoding unit 71 and modulation unit 72, and causes the recording/playing block 53 to write to the outer side end SRR on the recording medium 81. At the upper side in FIG. 46, the outer side volume structure information and anchor information are recorded in the fifth SRR ("Volume Str." and "Anchor" at SRR4 in the drawing).

On the other hand, in the event that determination is made in step S372 that this is not the first writing, that is to say, that information has been recorded by the processing of steps S373 through S379 at least once or more for example, the processing proceeds to step S380.

In step S380, the file system information generating unit 432 causes the recording/playing block 53 to write to the third SRR on the recording medium 81 the stream file (Files (Stream): a file made up of stream data) input to the writing unit 73 via the ECC encoding unit 71 and modulation unit 72.

That is, in the event that information is recorded on the recording medium 81 in a state such as shown to the upper side in FIG. 46 for example, the file system information generating unit 432 causes the file (Files (stream) in the drawing) input to the writing unit 73 via the ECC encoding unit 71 and modulation unit 72 to be recorded to the region B333' of the third SRR set on the recording medium 81 by the above-described formatting processing. More specifically, in the event that the file is an additional write, the file system information generating unit 432 records the additional information newly added to the information recorded in the region B333 shown to the upper side in FIG. 46 is recorded in the region B333, shown to the middle of FIG. 46. Also, in the event of recording a file wherein new information has been updated, readout of the file recorded in the region B333 shown to the upper side in FIG. 46 is disabled, and of the region B333' is configured so as to record the newly updated file, and is thus recorded.

In step S381, the file system information generating unit 432 controls the writing unit 73 via the ECC encoding unit 71 and modulation unit 72 so as to disable readout of the original DB file (Files (DB) (original)) from the recording medium 81 by the recording/playing block 53.

That is to say, as shown to the lower side of FIG. 46, the file system information generating unit 432 disables readout of the original DB file (Files (DB) (original)) recorded in the region B332 from the recording medium 81 by the recording/playing block 53.

In step S382, the file system information generating unit 432 supplies the new original DB file (Files (DB) (original)) to the writing unit 73 via the ECC encoding unit 71 and modulation unit 72, and causes the recording/playing block 53 to write to a new region in the third SRR.

That is to say, as shown to the lower side of FIG. 46, the file system information generating unit 432 supplies the original DB file (Files (DB) (original)) to the writing unit 73 via the ECC encoding unit 71 and modulation unit 72, and causes the recording/playing block 53 to write to region B332' in the third SRR on the recording medium 81 (Files (DB) (original) in the drawing).

In step S383, the file system information generating unit 432 controls the writing unit 73 via the ECC encoding unit 71 and modulation unit 72 so as to disable readout of the backup DB file (Files (DB) (backup)) from the recording medium 81 by the recording/playing block 53.

That is to say, as shown to the lower side of FIG. 46, the file system information generating unit 432 disables readout of the backup DB file (Files (DB) (backup)) recorded in the region B334 from the recording medium 81 by the recording/playing block 53.

In step S384, the file system information generating unit 432 supplies the new backup DB file (Files (DB) (backup)) to the writing unit 73 via the ECC encoding unit 71 and modulation unit 72, and causes the recording/playing block 53 to write to a new region in the third SRR.

That is to say, as shown to the lower side of FIG. 46, the file system information generating unit 432 supplies the backup DB file (Files (DB) (backup)) to the writing unit 73 via the ECC encoding unit 71 and modulation unit 72, and causes the recording/playing block 53 to write to region B334' in the third SRR on the recording medium 81 (Files (DB) (backup) in the drawing).

In step S385, the file system information generating unit 432 controls the writing unit 73 via the ECC encoding unit 71 and modulation unit 72 so as to disable readout of the main FS (FS (Metadata)) and inner side volume structure information and anchor information from the recording medium by the recording/playing block 53.

That is to say, as shown to the lower side of FIG. 46, the file system information generating unit 432 disables readout of the main FS (FS (Metadata)) recorded in the region B331, and the inner side volume structure information and anchor information recorded in the first SRR from the recording medium 81 by the recording/playing block 53. In step S386, the file system information generating unit 432 supplies the main FS to the writing unit 73 via the ECC encoding unit 71 and modulation unit 72, and causes the recording/playing block 53 to write to the second SRR.

That is to say, as shown to the lower side of FIG. 46, the file system information generating unit 432 supplies the main file system information FS to the writing unit 73 via the ECC encoding unit 71 and modulation unit 72, and causes the recording/playing block 53 to write to region B331' in the second SRR on the recording medium 81.

Further, in step S387, the file system information generating unit 432 supplies the inner side volume structure information and anchor information corresponding to the main FS to the writing unit 73 via the ECC encoding unit 71 and modulation unit 72, and causes the recording/playing block 53 to write to a replacement region of the first SRR.

Note that while the replacement region of the first SRR is not shown in FIG. 46, recording is performed substantially in the same way as with the DB files and FS).

In step S388, the file system information generating unit 432 controls the writing unit 73 via the ECC encoding unit 71 and modulation unit 72 so as to disable readout of the mirror FS (FS (MD-Mirror)) and outer side volume structure information and anchor information from the recording medium 81 by the recording/playing block 53.

That is to say, as shown to the lower side of FIG. 46, the file system information generating unit 432 disables readout of the mirror FS (FS (MD-Mirror)) recorded in the region B335, and the outer side volume structure information and anchor information recorded in the fifth SRR from the recording medium 81 by the recording/playing block 53.

In step S389, the file system information generating unit 432 supplies the mirror FS to the writing unit 73 via the ECC encoding unit 71 and modulation unit 72, and causes the recording/playing block 53 to write to the fourth SRR.

That is to say, as shown to the lower side of FIG. 46, the file system information generating unit 432 supplies the mirror file system information FS to the writing unit 73 via the ECC encoding unit 71 and modulation unit 72, and causes the recording/playing block 53 to write to region B335' in the fourth SRR on the recording medium 81.

Further, in step S390, the file system information generating unit 432 supplies the outer side volume structure information and anchor information corresponding to the mirror FS to the writing unit 73 via the ECC encoding unit 71 and modulation unit 72, and causes the recording/playing block 53 to write to a replacement region of the fifth SRR.

Due to the above processing, the main FS and mirror FS are recorded independently in SRRs away from each other, thereby improving of access capabilities of the file system FS, and also improving resistance of the recording medium 81 to scratches and the like. Note that allocation of the SRRs is not restricted to the example shown in FIG. 46, and an arrangement may be made, for example, wherein the DB file and stream file of the third SRR in FIG. 46 are situated in the fourth SRR, with the mirror FS being situated in the third SRR.

Note that while in the above example, description has been made regarding a case of recording the main FS and mirror FS of the file system FS in separate SRRs, however, there is the possibility that playback cannot be performed in the event that the DB file of the stream file is damaged, and originally, the original DB file and the backup DB file are to enable playback of the steam file even if one is damaged. Accordingly, it would most likely not be a desirable arrangement to have the original DB file and backup DB file in close proximity either, for the same reason as described above with the file system FS.

Accordingly, an arrangement may be made wherein the DB files are recorded in different SRRs, as with the file system FS.

Figure 48:
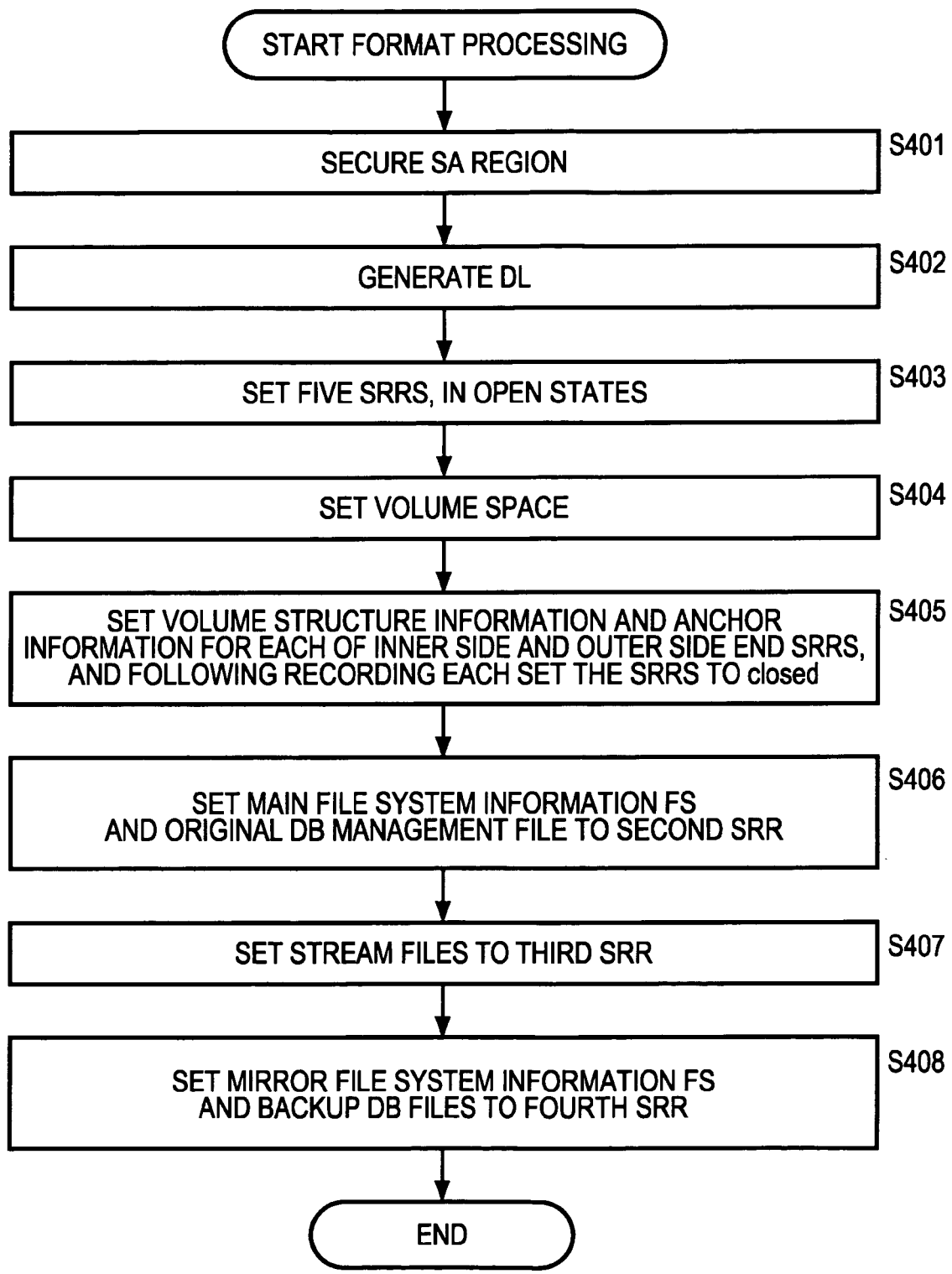
FIG. 48 is a flowchart for describing still other formatting processing with the recording/playing mechanism section shown in FIG. 35.

Next, the processing for formatting of the recording medium 81 wherein one SRR is set for inner side anchor information and volume structure information, one SRR is set for outer side anchor information and volume structure information, one SRR is set for stream files (Files (Stream)), one SRR is set for the main file system FS and original DB file, and one SRR is set for the mirror file system FS and the backup DB file, will be described, with reference to the flowchart shown in FIG. 48. Note that the processing in steps S401, S402, and S404 of the flowchart in FIG. 48 is the same as the processing in step S201, S202, and S204 in the flowchart in FIG. 36, and accordingly description thereof will be omitted.

Figure 49:
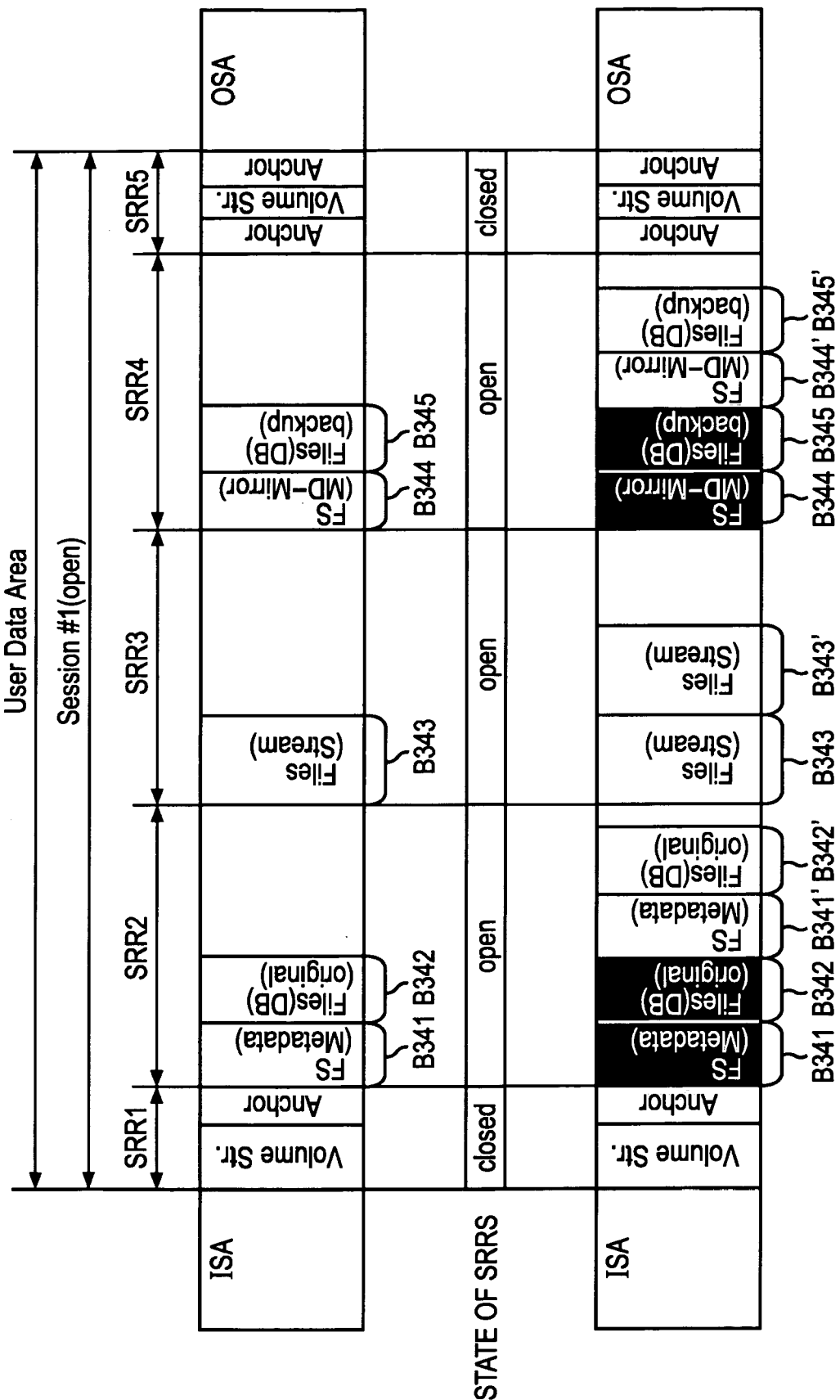
FIG. 49 is a diagram for describing still other formatting processing with the recording/playing mechanism section shown in FIG. 35.

In step S403, the initialization unit 432*a* sets one SRR for the inner side anchor information and volume structure information, sets one SRR for the outer side anchor information and volume structure information, sets one SRR for stream files (Files (Stream)), sets one SRR for the main file system FS and the original DB file, and further sets one SRR for the mirror file system FS and backup DB file, each in an open state. Consequently, as shown in FIG. 49, the total of five SRRs of a first SRR through a fifth SRR (SRR1 through SRR5 in FIG. 49) are set in open states.

In step S405, the initialization unit 432*a* controls the writing unit 73 so as to cause the recording/playing block 53 to set regions for recording volume structure information and anchor information at the SRRs at the outer side and inner side ends of the recording medium 81. That is to say, in this case, the first SRR and the fifth SRR are set as regions for recording volume structure information and anchor information, as shown to the upper side in FIG. 49.

In step S406, the initialization unit 432*a* controls the writing unit 73 so as to cause the recording/playing block to set the main FS and original dB file storing file system information in the second SRR on the recording medium 81. That is to say, in the case to the upper side in FIG. 49, the initialization unit 432*a* controls the writing unit so as to cause the recording/playing block 53 to set the main FS (FS (Metadata) at the upper side in FIG. 46), recording file system information, and the original and backup DB files (Files (DB) (original) and Files (DB) (backup) at the upper side in FIG. 46) to the regions B341 and B342 in the second SRR on the recording medium 81.

In step S407, the initialization unit 432*a* controls the writing unit 73 so as to cause the recording/playing block 53 to set the stream file, in the third SRR on the recording medium 81. That is to say, in the case to the upper side in FIG. 49, the initialization unit 432*a* controls the writing unit 73 so as to cause the recording/playing block 53 to set the stream file (Files (Stream) at the upper side in FIG. 49) to the region B343 in the third SRR on the recording medium 81.

In step S408, the initialization unit 432*a* controls the writing unit 73 so as to cause the recording/playing block 53 to set the mirror FS which records file system information and the backup DB file (Files (DB) (backup)) at the upper side in FIG. 49), to the fourth SRR on the recording medium 81. That is to say, in the case of the upper side in FIG. 49, the initialization unit 432*a* sets the mirror FS (FS (MD-Mirror) in FIG. 49) for recording file system information, and the backup DB file (Files (DB) (backup)) at the upper side in FIG. 49), to the respective regions B344 and B345 in the fourth SRR on the recording medium 81.

According to the above processing, five SRRs are set on the recording medium 81 to be formatted for each usage.

Figure 50:
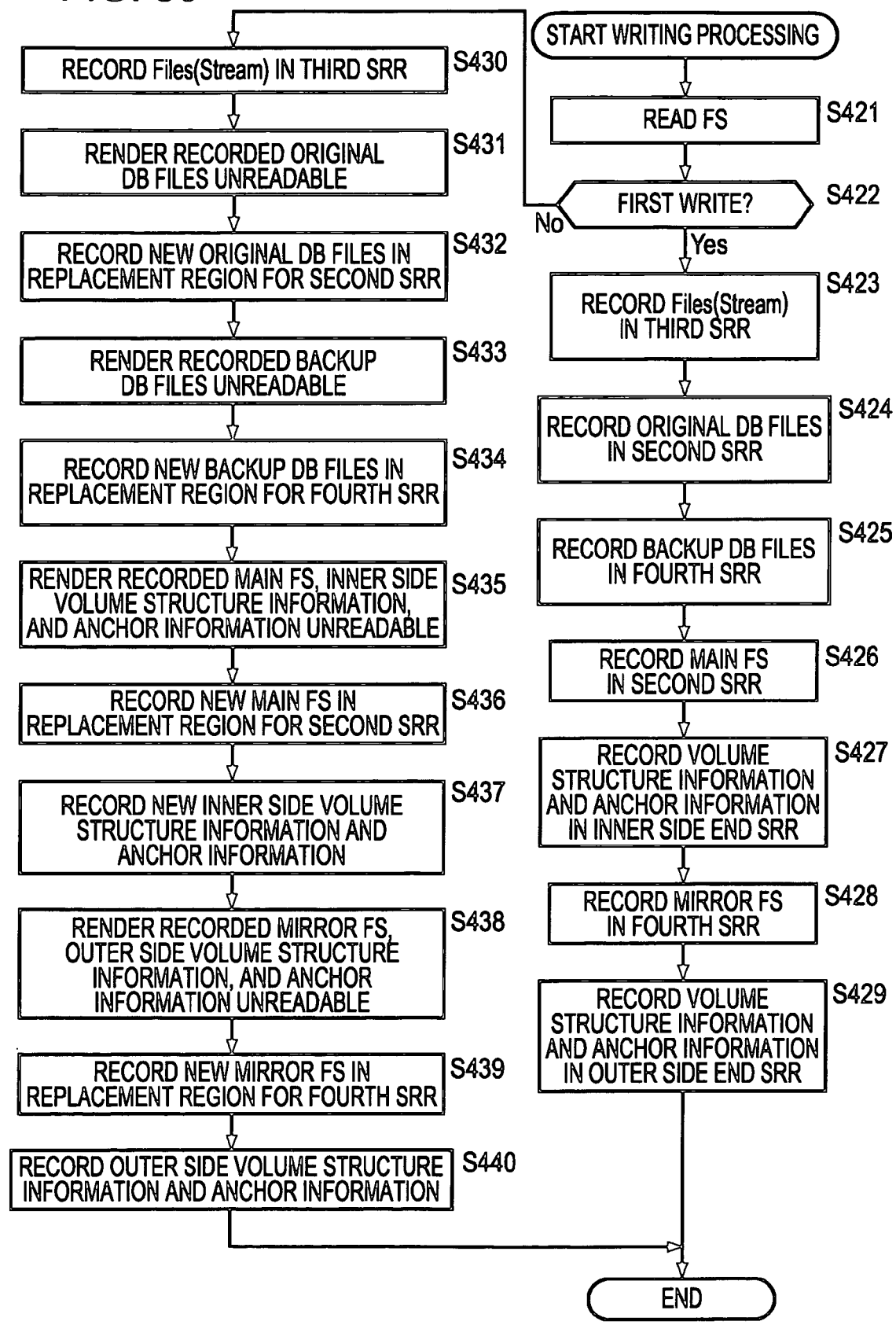
FIG. 50 is a flowchart for describing still other writing processing with the recording/playing mechanism section shown in FIG. 35.

Next, the processing for writing information to the recording medium 81 which has been formatted (initialized) by the processing shown in FIG. 48, by the recording/playing mechanism section 22 shown in FIG. 35, will be described with reference to the flowchart in FIG. 50. Note that the processing in steps S421 and S422 of the flowchart in FIG. 50 is the same as the processing in steps S221 and S222 in the flowchart in FIG. 38, and accordingly description thereof will be omitted.

In step S423, the file system information generating unit 432 causes the recording/playing block 53 to write to the third SRR (SRR3) on the recording medium 81 the stream file Files (Stream) input to the writing unit 73 via the ECC encoding unit 71 and modulation unit 72.

That is, as shown to the upper side in FIG. 49, the file system information generating unit 432 causes the file (Files (Stream) in the drawing) input to the writing unit 73 via the ECC encoding unit 71 and modulation unit 72 to be recorded to the region B343 of the third SRR set on the recording medium 81 by the above-described formatting processing.

In step S424, the file system information generating unit 432 supplies the original DB file to the writing unit 73 via the ECC encoding unit 71 and modulation unit 72, and causes the recording/playing block 53 to write to the second SRR on the recording medium 81.

That is to say, as shown to the upper side in FIG. 49, the file system information generating unit 432 records the original DB file at the region B342 of the second SRR set on the recording medium 81 via the ECC encoding unit 71 and modulation unit 72, by the above-described formatting processing (Files (DB) (original) in the drawing).

In step S425, the file system information generating unit 432 supplies the backup DB file to the writing unit 73 via the ECC encoding unit 71 and modulation unit 72, and causes the recording/playing block 53 to write to the fourth SRR on the recording medium 81.

That is to say, as shown to the upper side in FIG. 49, the file system information generating unit 432 records the backup DB file (Files (DB) (backup) in the drawing) at the region B345 of the fourth SRR set on the recording medium 81 via the ECC encoding unit 71 and modulation unit 72, by the above-described formatting processing.

In step S426, the file system information generating unit 432 supplies the main FS to the writing unit 73 via the ECC encoding unit 71 and modulation unit 72, and causes the recording/playing block 53 to write to the second SRR on the recording medium 81.

That is to say, as shown to the upper side in FIG. 49, the file system information generating unit 432 records the main FS at the region B341 of the second SRR set on the recording medium 81 via the ECC encoding unit 71 and modulation unit 72, by the above-described formatting processing (FS (Metadata) in the drawing).

In step S427, the file system information generating unit 432 supplies the inner side volume structure information and anchor information to the writing unit 73 via the ECC encoding unit 71 and modulation unit 72, and causes the recording/playing block 53 to write to the inner side end SRR on the recording medium 81. At the upper side in FIG. 49, the inner side volume structure information and anchor information are recorded in the first SRR.

In step S428, the file system information generating unit 432 supplies the mirror FS to the writing unit 73 via the ECC encoding unit 71 and modulation unit 72, and causes the recording/playing block 53 to write to the fourth SRR on the recording medium 81.

That is to say, as shown to the upper side in FIG. 49, the file system information generating unit 432 records the mirror FS at the region B344 of the fourth SRR set on the recording medium 81 via the ECC encoding unit 71 and modulation unit 72, by the above-described formatting processing (FS (MD-Mirror) in the drawing).

In step S429, the file system information generating unit 432 supplies the outer side volume structure information and anchor information to the writing unit 73 via the ECC encoding unit 71 and modulation unit 72, and causes the recording/playing block 53 to write to the outer side end SRR on the recording medium 81. At the upper side in FIG. 49, the outer side volume structure information and anchor information are recorded in the fifth SRR ("Volume Str." and "Anchor" at SRR4 in the drawing).

On the other hand, in the event that determination is made in step S422 that this is not the first writing, that is to say, that information has been recorded by the processing of steps S423 through S429 at least once or more for example, the processing proceeds to step S430.

In step S430, the file system information generating unit 432 causes the recording/playing block 53 to write to the third SRR on the recording medium 81 the file (Files (Stream): a file made up of stream data) input to the writing unit 73 via the ECC encoding unit 71 and modulation unit 72.

That is, in the event that information is recorded on the recording medium 81 in a state such as shown to the upper side in FIG. 49 for example, the file system information generating unit 432 causes the file (Files (stream) in the drawing) input to the writing unit 73 via the ECC encoding unit 71 and modulation unit 72 to be recorded to the region B343' of the third SRR set on the recording medium 81 by the above-described formatting processing. More specifically, in the event that the file is an additional write, the file system information generating unit 432 records the additional information newly added to the information recorded in the region B343 shown to the upper side in FIG. 49 in the region B343' shown to the lower side of FIG. 49. Also, in the event of recording a file wherein new information has been updated, readout of the file recorded in the region B343 shown to the upper side in FIG. 49 is disabled, and the newly updated file is recorded to the region B343'.

In step S431, the file system information generating unit 432 controls the writing unit 73 via the ECC encoding unit 71 and modulation unit 72 so as to disable readout of the original DB file (Files (DB) (original)) from the recording medium 81 by the recording/playing block 53.

That is to say, as shown to the lower side of FIG. 49, the file system information generating unit 432 disables readout of the original DB file (Files (DB) (original)) recorded in the region B342 from the recording medium 81 by the recording/playing block 53.

In step S432, the file system information generating unit 432 supplies the new original DB file (Files (DB) (original)) to the writing unit 73 via the ECC encoding unit 71 and modulation unit 72, and causes the recording/playing block 53 to write to a new region in the second SRR.

That is to say, as shown to the lower side of FIG. 49, the file system information generating unit 432 supplies the original DB file (Files (DB) (original)) to the writing unit 73 via the ECC encoding unit 71 and modulation unit 72, and causes the recording/playing block 53 to write to region B342' in the second SRR on the recording medium 81.

In step S433, the file system information generating unit 432 controls the writing unit 73 via the ECC encoding unit 71 and modulation unit 72 so as to disable readout of the backup DB file (Files (DB) (backup)) from the recording medium 81 by the recording/playing block 53.

That is to say, as shown to the lower side of FIG. 49, the file system information generating unit 432 disables readout of the backup DB file (Files (DB) (backup)) recorded in the region B345 from the recording medium 81 by the recording/playing block 53.

In step S434, the file system information generating unit 432 supplies the new backup DB file (Files (DB) (backup)) to the writing unit 73 via the ECC encoding unit 71 and modulation unit 72, and causes the recording/playing block 53 to write to a new region in the fourth SRR.

That is to say, as shown to the lower side of FIG. 49, the file system information generating unit 432 supplies the backup DB file (Files (DB) (backup)) to the writing unit 73 via the ECC encoding unit 71 and modulation unit 72, and causes the recording/playing block 53 to write to region B345' in the fourth SRR on the recording medium 81.

In step S435, the file system information generating unit 432 controls the writing unit 73 via the ECC encoding unit 71 and modulation unit 72 so as to disable readout of the main FS (FS (Metadata)) and inner side volume structure information and anchor information from the recording medium 81 by the recording/playing block 53.

That is to say, as shown to the lower side of FIG. 49, the file system information generating unit 432 disables readout of the main FS (FS (Metadata)) recorded in the region B341, and the inner side volume structure information and anchor information recorded in the first SRR from the recording medium 81 by the recording/playing block 53.

In step S436, the file system information generating unit 432 supplies the main FS to the writing unit 73 via the ECC encoding unit 71 and modulation unit 72, and causes the recording/playing block 53 to write to the second SRR.

That is to say, as shown to the lower side of FIG. 49, the file system information generating unit 432 supplies the main file system information FS to the writing unit 73 via the ECC encoding unit 71 and modulation unit 72, and causes the recording/playing block 53 to write to region B341' in the second SRR on the recording medium 81.

Further, in step S437, the file system information generating unit 432 supplies the inner side volume structure information and anchor information corresponding to the main FS to the writing unit 73 via the ECC encoding unit 71 and modulation unit 72, and causes the recording/playing block 53 to write to a replacement region of the first SRR.

In step S438, the file system information generating unit 432 controls the writing unit 73 via the ECC encoding unit 71 and modulation unit 72 so as to disable readout of the mirror FS (FS (MD-Mirror)) and outer side volume structure information and anchor information from the recording medium 81 by the recording/playing block 53.

That is to say, as shown to the lower side of FIG. 49, the file system information generating unit 432 disables readout of the mirror FS (FS (MD-Mirror)) recorded in the region B344, and the outer side volume structure information and anchor information recorded in the fifth SRR from the recording medium 81 by the recording/playing block 53.

In step S439, the file system information generating unit 432 supplies the mirror FS to the writing unit 73 via the ECC encoding unit 71 and modulation unit 72, and causes the recording/playing block 53 to write to the fourth SRR.

That is to say, as shown to the lower side of FIG. 49, the file system information generating unit 432 supplies the mirror file system information FS to the writing unit 73 via the ECC encoding unit 71 and modulation unit 72, and causes the recording/playing block 53 to write to region B345' in the fourth SRR on the recording medium 81.

Further, in step S440, the file system information generating unit 432 supplies the outer side volume structure information and anchor information corresponding to the mirror FS to the writing unit 73 via the ECC encoding unit 71 and modulation unit 72, and causes the recording/playing block 53 to write to a replacement region of the fifth SRR.

Due to the above processing, the main FS and mirror FS are recorded independently in SRRs away from each other, and also, the original DB file and backup DB file are recorded at positions away from each other, thereby improving resistance of the recording medium 81 to scratches and the like.

Note that while in the above example, description has been made regarding a case of recording the main FS of the file system FS and the original DB file in one SRR, and the mirror FS and back up DB file each in the same SRR, but it is preferable that these not exist together at the time of readout. Accordingly, the file system FS and DB files may be arranged to each be recorded in different SRRs.

Figure 51:
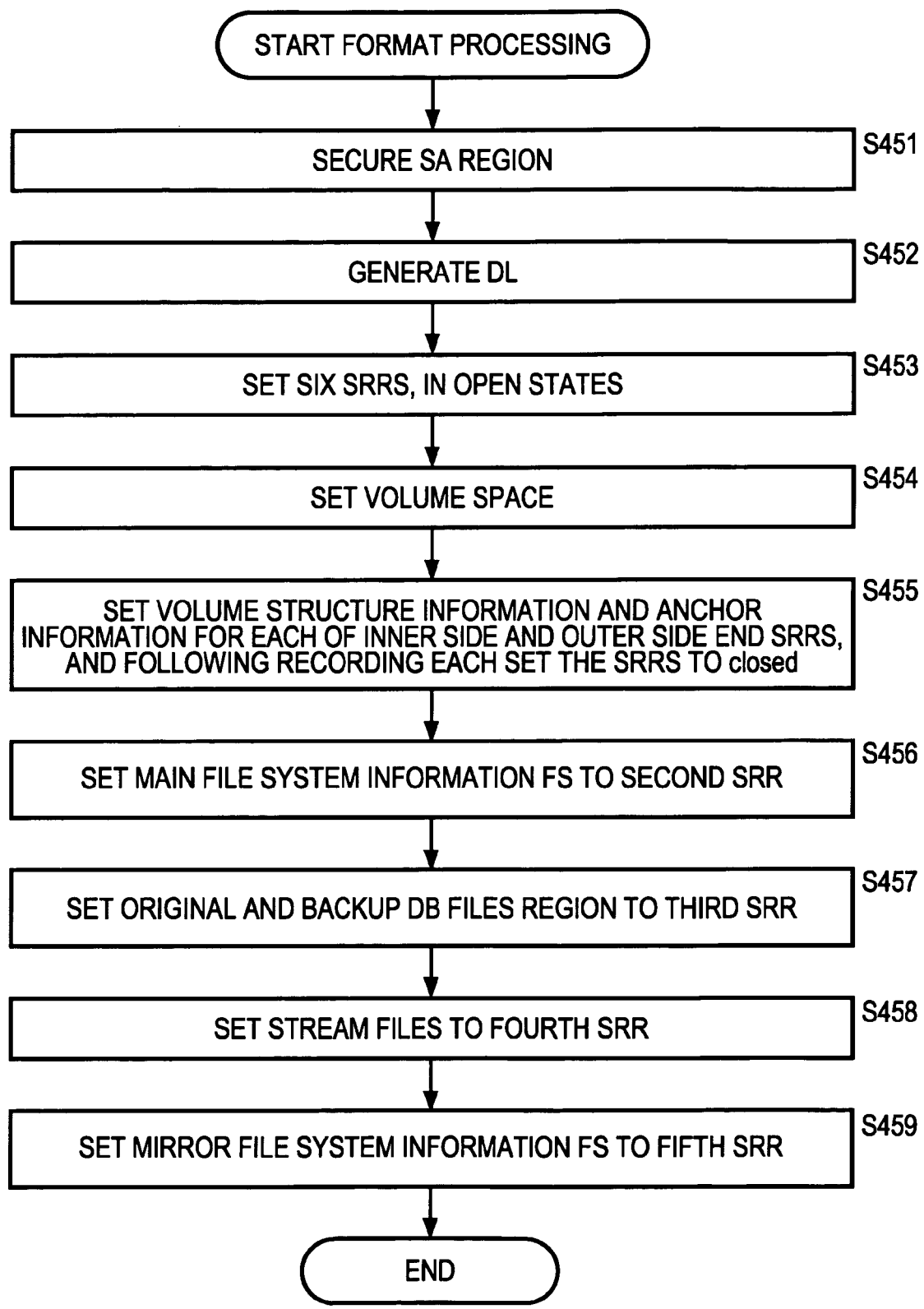
FIG. 51 is a flowchart for describing still other formatting processing with the recording/playing mechanism section shown in FIG. 35.

Next, the processing for formatting of the recording medium 81 wherein one SRR is set for inner side anchor information and volume structure information, one SRR is set for outer side anchor information and volume structure information, one SRR is set for stream files (Files (Stream)), one SRR is set for the main file system FS, one SRR is set for the mirror file system FS, and one SRR is set for the original DB file and backup DB file, will be described, with reference to the flowchart shown in FIG. 51. Note that the processing in steps S451, S452, and S454 of the flowchart in FIG. 51 is the same as the processing in step S201, S202, and S204 in the flowchart in FIG. 36, and accordingly description thereof will be omitted.

In step S453, the initialization unit 432*a* sets one SRR for the inner side anchor information and volume structure information, sets one SRR for the outer side anchor information and volume structure information, sets one SRR for stream files (Files (Stream)), sets one SRR for the main file system FS, sets one SRR for the mirror file system FS, and sets one SRR for the original DB file and backup DB file, each in an open state. Consequently, as shown in FIG. 52, the total of six SRRs of a first SRR through a sixth SRR (SRR1 through SRR6 in FIG. 52) are set in open states.

In step S455, the initialization unit 432*a* controls the writing unit 73 so as to cause the recording/playing block 53 to set regions for recording volume structure information and anchor information at the SRRs at the outer side and inner side ends of the recording medium 81. That is to say, in this case, the first SRR and the sixth SRR are set as regions for recording volume structure information and anchor information, as shown to the upper side in FIG. 52.

In step S456, the initialization unit 432*a* controls the writing unit 73 so as to cause the recording/playing block 53 to set the main FS storing file system information in the second SRR on the recording medium 81. That is to say, in the case to the upper side in FIG. 52, the initialization unit 432*a* controls the writing unit 73 so as to cause the recording/playing block 53 to set the main FS (FS (Metadata) at the upper side in FIG. 52) to the region B351 in the second SRR on the recording medium 81.

Figure 52:
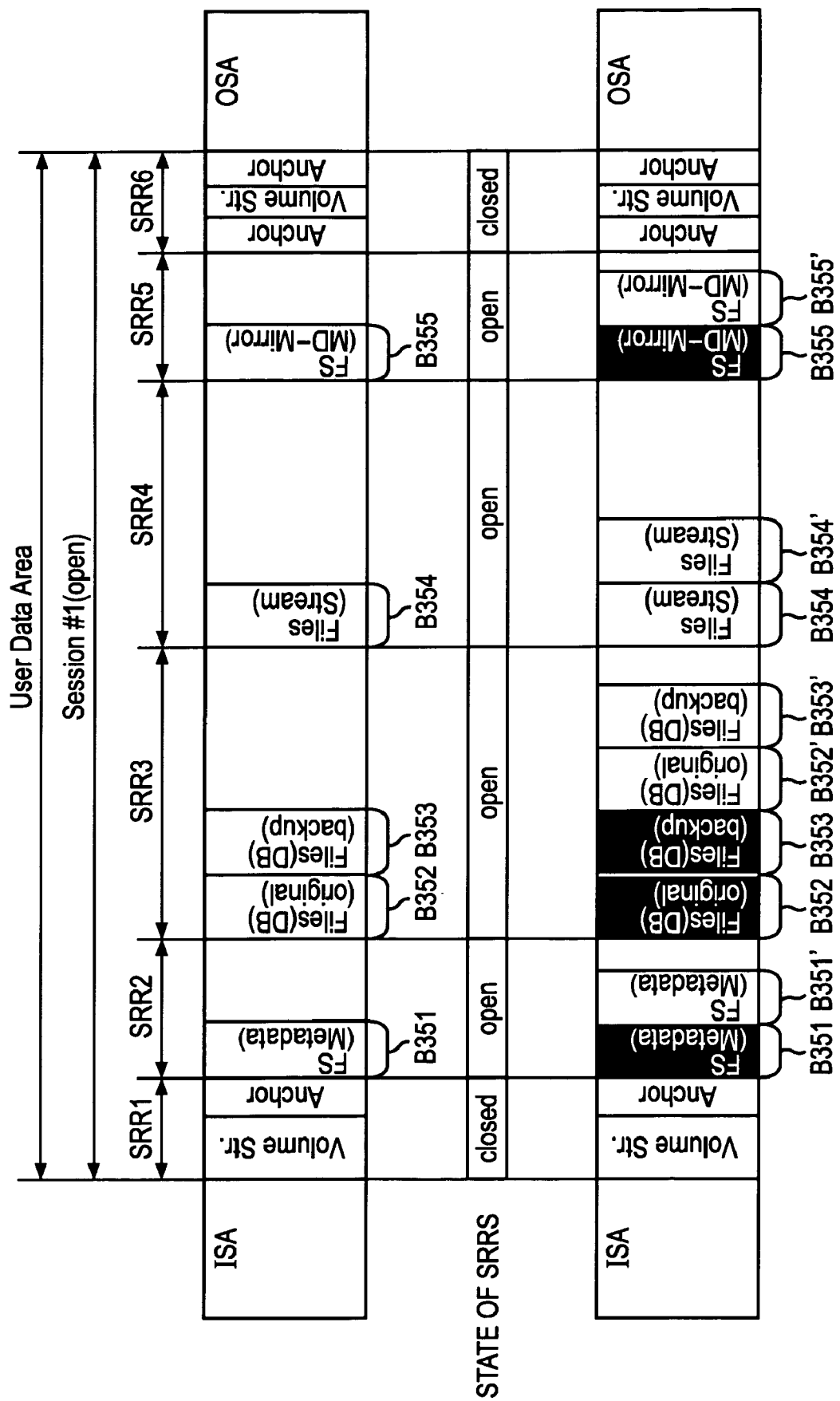
FIG. 52 is a diagram for describing still other formatting processing with the recording/playing mechanism section shown in FIG. 35.

In step S457, the initialization unit 432*a* controls the writing unit 73 so as to cause the recording/playing block 53 to set the original DB file (Files (DB) (original)) at the upper side in FIG. 52) and the backup DB file (Files (DB) (backup)) at the upper side in FIG. 52) in the third SRR on the recording medium 81. That is to say, in the case to the upper side in FIG. 52, the initialization unit 432*a* controls the writing unit 73 so as to cause the recording/playing block 53 to set the original DB file and backup DB file to the regions B352 and B353 in the third SRR in the recording medium 81.

In step S458, the initialization unit 432*a* controls the writing unit 73 so as to cause the recording/playing block 53 to set the stream file to the fourth SRR on the recording medium 81. That is to say, in the case of the upper side in FIG. 52, the initialization unit 432*a* sets the stream file (Files (Stream) at the upper side in FIG. 52) to region B354 in the fourth SRR of the recording medium 81.

In step S459, the initialization unit 432*a* controls the writing unit 73 so as to cause the recording/playing block 53 to set the mirror FS for recording the file system information to the fifth SRR on the recording medium 81. That is to say, in the case of the upper side in FIG. 52, the initialization unit 432*a* sets the mirror FS (FS (MD-Mirror) at the upper side in FIG. 49) to region B355 in the fourth SRR of the recording medium 81.

According to the above processing, six SRRs are set on the recording medium 81 to be formatted for each usage.

Figure 53:
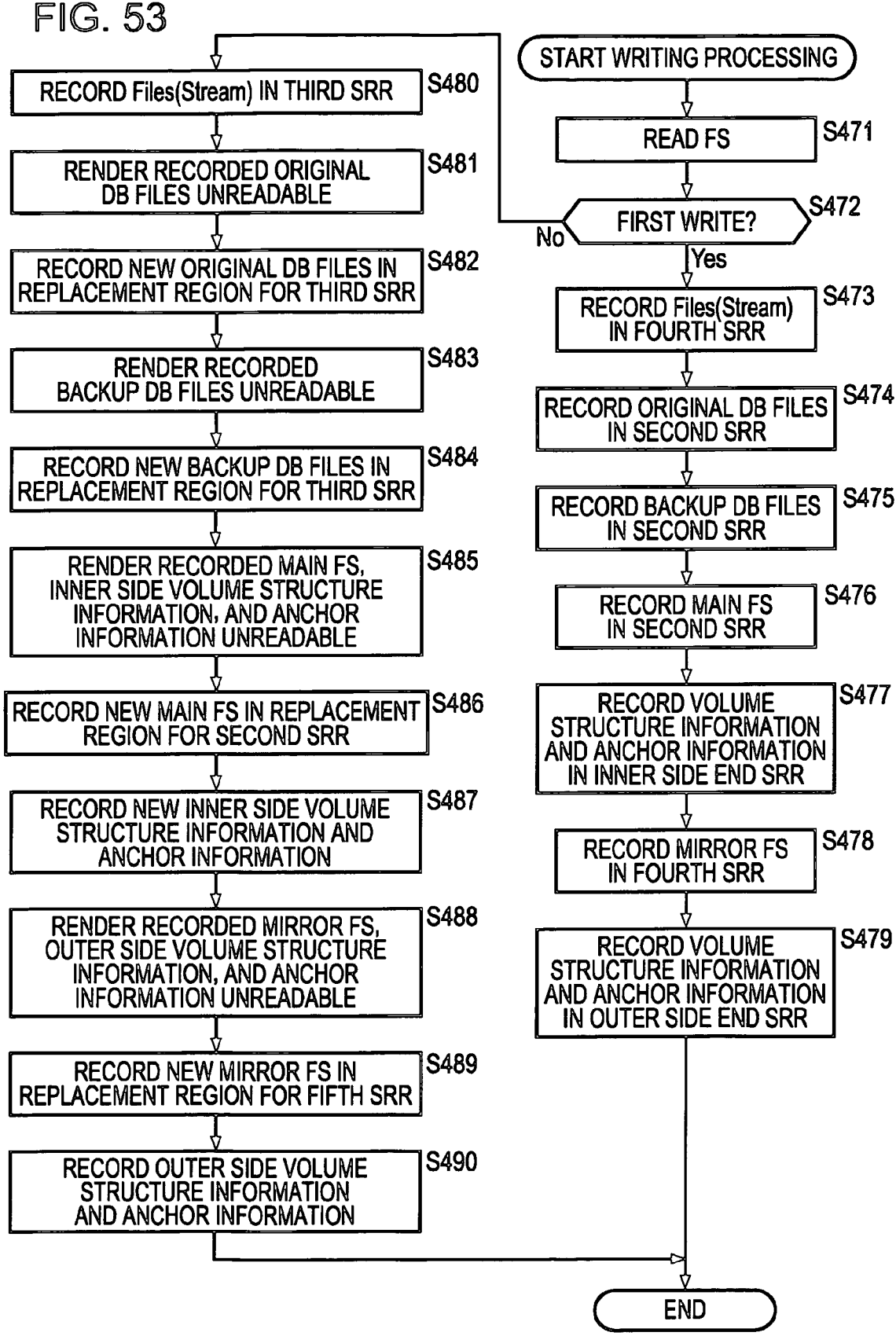
FIG. 53 is a flowchart for describing still other writing processing with the recording/playing mechanism section shown in FIG. 35.

Next, the processing for writing information to the recording medium 81 which has been formatted (initialized) by the processing shown in FIG. 51, by the recording/playing mechanism section 22 shown in FIG. 35, will be described with reference to the flowchart in FIG. 53. Note that the processing in steps S471 and S472 of the flowchart in FIG. 53 is the same as the processing in steps S221 and S222 in the flowchart in FIG. 38, and accordingly description thereof will be omitted.

In step S473, the file system information generating unit 432 causes the recording/playing block 53 to write to the fourth SRR (SRR4) of the recording medium 81 the stream file Files (Stream) input to the writing unit 73 via the ECC encoding unit 71 and modulation unit 72.

That is, as shown to the upper side in FIG. 52, the file system information generating unit 432 causes the file (Files (Stream) in the drawing) input to the writing unit 73 via the ECC encoding unit 71 and modulation unit 72 to be recorded to the region B354 of the fourth SRR set on the recording medium 81 by the above-described formatting processing.

In step S474, the file system information generating unit 432 supplies the original DB file to the writing unit via the ECC encoding unit 71 and modulation unit 72, and causes the recording/playing block 53 to write to the second SRR on the recording medium 81.

That is to say, as shown to the upper side in FIG. 52, the file system information generating unit 432 records the original DB file at the region B352 of the second SRR set on the recording medium 81 via the ECC encoding unit 71 and modulation unit 72, by the above-described formatting processing (Files (DB) (original) in the drawing).

In step S475, the file system information generating unit 432 supplies the backup DB file to the writing unit 73 via the ECC encoding unit 71 and modulation unit 72, and causes the recording/playing block 53 to write to the second SRR on the recording medium 81.

That is to say, as shown to the upper side in FIG. 52, the file system information generating unit 432 records the backup DB file (Files (DB) (backup) in the drawing) at the region B353 of the second SRR set on the recording medium 81 via the ECC encoding unit 71 and modulation unit 72, by the above-described formatting processing.

In step S476, the file system information generating unit 432 supplies the main FS to the writing unit 73 via the ECC encoding unit 71 and modulation unit 72, and causes the recording/playing block 53 to write to the second SRR on the recording medium 81.

That is to say, as shown to the upper side in FIG. 52, the file system information generating unit 432 records the main FS at the region B351 of the second SRR set on the recording medium 81 via the ECC encoding unit 71 and modulation unit 72, by the above-described formatting processing (FS (Metadata) in the drawing).

In step S477, the file system information generating unit 432 supplies the inner side volume structure information and anchor information to the writing unit 73 via the ECC encoding unit 71 and modulation unit 72, and causes the recording/playing block 53 to write to the inner side end SRR on the recording medium 81. At the upper side in FIG. 52, the inner side volume structure information and anchor information are recorded in the first SRR.

In step S478, the file system information generating unit 432 supplies the mirror FS to the writing unit 73 via the ECC encoding unit 71 and modulation unit 72, and causes the recording/playing block 53 to write to the fifth SRR on the recording medium 81.

That is to say, as shown to the upper side in FIG. 52, the file system information generating unit 432 records the mirror FS at the region B355 of the fifth SRR set on the recording medium 81 via the ECC encoding unit 71 and modulation unit 72, by the above-described formatting processing (FS (MD-Mirror) in the drawing).

In step S479, the file system information generating unit 432 supplies the outer side volume structure information and anchor information to the writing unit 73 via the ECC encoding unit 71 and modulation unit 72, and causes the recording/playing block 53 to write to the outer side end SRR on the recording medium 81. At the upper side in FIG. 52, the outer side volume structure information and anchor information are recorded in the sixth SRR ("Volume Str." and "Anchor" at SRR6 in the drawing).

On the other hand, in the event that determination is made in step S472 that this is not the first writing, that is to say, that information has been recorded by the processing of steps S473 through S479 at least once or more for example, the processing proceeds to step S480.

In step S480, the file system information generating unit 432 causes the recording/playing block 53 to write to the fourth SRR on the recording medium 81 the file (Files (Stream): a file made up of stream data) input to the writing unit 73 via the ECC encoding unit 71 and modulation unit 72.

That is, in the event that information is recorded on the recording medium 81 in a state such as shown to the upper side in FIG. 52 for example, the file system information generating unit 432 causes the file (Files (stream) in the drawing) input to the writing unit 73 via the ECC encoding unit 71 and modulation unit 72 to be recorded to the region B354' of the fourth SRR set on the recording medium 81 by the above-described formatting processing. More specifically, in the event that the file is an additional write, the file system information generating unit 432 records the additional information newly added to the information recorded in the region B354 shown to the upper side in FIG. 52 is recorded in the region B354' shown to the lower side of FIG. 52. Also, in the event of recording a file wherein new information has been updated, readout of the file recorded in the region B354 shown to the upper side in FIG. 52 is disabled, and the newly updated file is recorded to the region B354'.

In step S481, the file system information generating unit 432 controls the writing unit 73 via the ECC encoding unit 71 and modulation unit 72 so as to disable readout of the original DB file (Files (DB) (original)) from the recording medium 81 by the recording/playing block 53.

That is to say, as shown to the lower side of FIG. 52, the file system information generating unit 432 disables readout of the original DB file (Files (DB) (original)) recorded in the region B352 from the recording medium 81 by the recording/playing block 53.

In step S482, the file system information generating unit 432 supplies the new original DB file (Files (DB) (original)) to the writing unit 73 via the ECC encoding unit 71 and modulation unit 72, and causes the recording/playing block 53 to write to a new region in the third SRR.

That is to say, as shown to the lower side of FIG. 52, the file system information generating unit 432 supplies the original DB file (Files (DB) (original)) to the writing unit 73 via the ECC encoding unit 71 and modulation unit 72, and causes the recording/playing block 53 to write to region B352' in the third SRR on the recording medium 81.

In step S483, the file system information generating unit 432 controls the writing unit 73 via the ECC encoding unit 71 and modulation unit 72 so as to disable readout of the backup DB file (Files (DB) (backup)) from the recording medium 81 by the recording/playing block 53.

That is to say, as shown to the lower side of FIG. 52, the file system information generating unit 432 disables readout of the backup DB file (Files (DB) (backup)) recorded in the region B353 from the recording medium 81 by the recording/playing block 53.

In step S484, the file system information generating unit 432 supplies the new backup DB file (Files (DB) (backup)) to the writing unit 73 via the ECC encoding unit 71 and modulation unit 72, and causes the recording/playing block 53 to write to a new region in the third SRR.

That is to say, as shown to the lower side of FIG. 52, the file system information generating unit 432 supplies the backup DB file (Files (DB) (backup)) to the writing unit 73 via the ECC encoding unit 71 and modulation unit 72, and causes the recording/playing block 53 to write to region B353' in the fourth SRR on the recording medium 81.

In step S485, the file system information generating unit 432 controls the writing unit 73 via the ECC encoding unit 71 and modulation unit 72 so as to disable readout of the main FS (FS (Metadata)) and inner side volume structure information and anchor information from the recording medium 81 by the recording/playing block 53.

That is to say, as shown to the lower side of FIG. 52, the file system information generating unit 432 disables readout of the main FS (FS (Metadata)) recorded in the region B351, and the inner side volume structure information and anchor information recorded in the first SRR from the recording medium 81 by the recording/playing block 53.

In step S486, the file system information generating unit 432 supplies the main FS to the writing unit 73 via the ECC encoding unit 71 and modulation unit 72, and causes the recording/playing block 53 to write to the second SRR.

That is to say, as shown to the lower side of FIG. 52, the file system information generating unit 432 supplies the main file system information FS to the writing unit 73 via the ECC encoding unit 71 and modulation unit 72, and causes the recording/playing block 53 to write to region B351' in the second SRR on the recording medium 81.

Further, in step S487, the file system information generating unit 432 supplies the inner side volume structure information and anchor information corresponding to the main FS to the writing unit 73 via the ECC encoding unit 71 and modulation unit 72, and causes the recording/playing block to write to a replacement region of the first SRR.

In step S488, the file system information generating unit 432 controls the writing unit 73 via the ECC encoding unit 71 and modulation unit 72 so as to disable readout of the mirror FS (FS (MD-Mirror)) and outer side volume structure information and anchor information from the recording medium 81 by the recording/playing block 53. That is to say, as shown to the lower side of FIG. 52, the file system information generating unit 432 disables readout of the mirror FS (FS (MD-Mirror)) recorded in the region B355, and the outer side volume structure information and anchor information recorded in the sixth SRR from the recording medium 81 by the recording/playing block 53.

In step S489, the file system information generating unit 432 supplies the mirror FS to the writing unit 73 via the ECC encoding unit 71 and modulation unit 72, and causes the recording/playing block 53 to write to the fifth SRR. That is to say, as shown to the lower side of FIG. 52, the file system information generating unit 432 supplies the mirror file system information FS to the writing unit 73 via the ECC encoding unit 71 and modulation unit 72, and causes the recording/playing block 53 to write to region B355' in the fifth SRR on the recording medium 81.

Further, in step S490, the file system information generating unit 432 supplies the outer side volume structure information and anchor information corresponding to the mirror FS to the writing unit 73 via the ECC encoding unit and modulation unit 72, and causes the recording/playing block 53 to write to a replacement region of the sixth SRR. Due to the above processing, the main FS and mirror FS are recorded independently in SRRs away from each other, and also separately from the original DB file and backup DB file are thereby improving access capabilities of the file system FS, and also improving resistance of the recording medium 81 to scratches and the like.

Note that in the above, while the main FS and mirror FS of the file system FS can be recorded to different SRRs, the original DB file and backup DB file are recorded in the same SRR, so there is the possibility that the original DB file and backup DB may be damaged together. Accordingly, these may be recorded in different SRRs.

Figure 54:
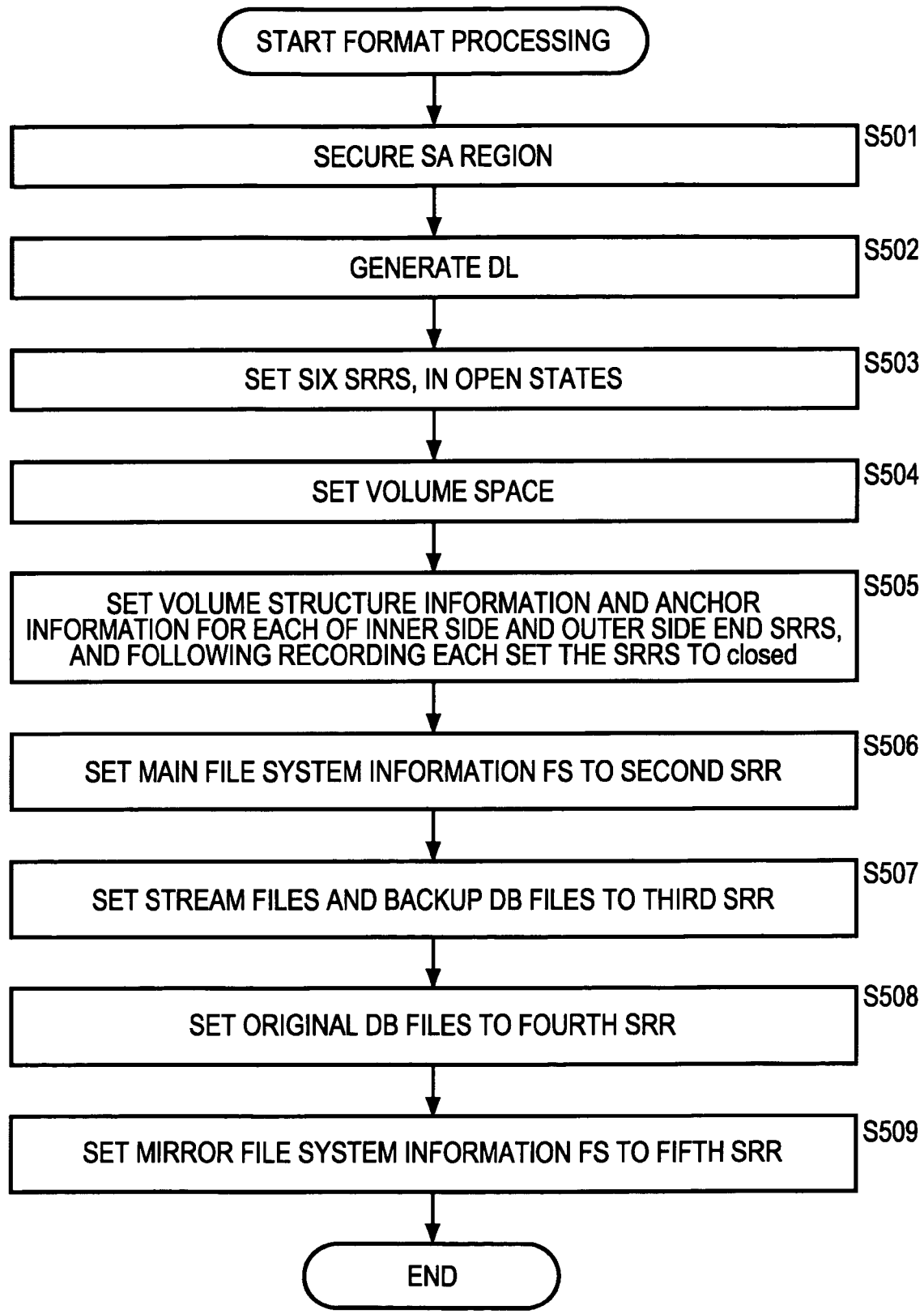
FIG. 54 is a flowchart for describing still other formatting processing with the recording/playing mechanism section shown in FIG. 35.

Next, the processing for formatting of the recording medium 81 wherein one SRR is set for inner side anchor information and volume structure information, one SRR is set for outer side anchor information and volume structure information, one SRR is set for stream files (Files (Stream)) and the backup DB file, one SRR is set for the main file system FS, one SRR is set for the mirror file system FS, and one SRR is set for the original DB file, will be described, with reference to the flowchart shown in FIG. 54. Note that the processing in steps S501, S502, and S504 of the flowchart in FIG. 54 is the same as the processing in step S201, S202, and S204 in the flowchart in FIG. 36, and accordingly description thereof will be omitted.

In step S503, the initialization unit 432a sets one SRR for the inner side anchor information and volume structure information, sets one SRR for the outer side anchor information and volume structure information, sets one SRR for stream files (Files (Stream)) and the backup DB file, sets one SRR for the main file system FS, sets one SRR for the mirror file system FS, and sets one SRR for the original DB file, each in an open state. Consequently, as shown in FIG. 55, the total of six SRRs of a first SRR through a sixth SRR (SRR1 through SRR6 in FIG. 55) are set in open states.

In step S505, the initialization unit 432a controls the writing unit 73 so as to cause the recording/playing block 53 to set regions for recording volume structure information and anchor information at the SRRs at the outer side and inner side ends of the recording medium 81. That is to say, in this case, the first SRR and the sixth SRR are set as regions for recording volume structure information and anchor information, as shown to the upper side in FIG. 55.

In step S506, the initialization unit 432a controls the writing unit 73 so as to cause the recording/playing block 53 to set the main FS for storing file system information in the second SRR on the recording medium 81. That is to say, in the case to the upper side in FIG. 55, the initialization unit 432a controls the writing unit 73 so as to cause the recording/playing block 53 to set the main FS (FS (Metadata) at the upper side in FIG. 55) to the region B361 in the second SRR on the recording medium 81.

Figure 55:
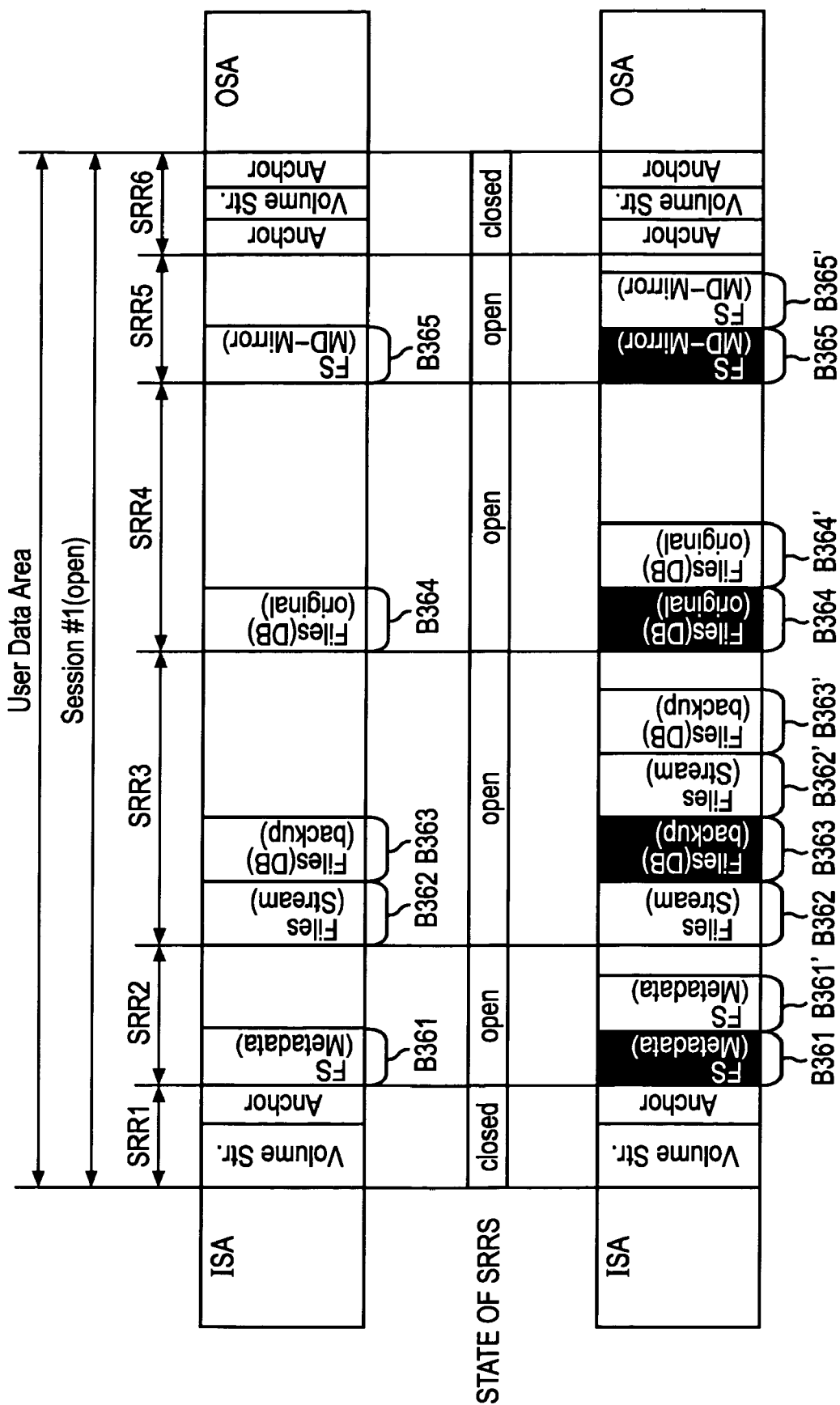
FIG. 55 is a diagram for describing still other formatting processing with the recording/playing mechanism section shown in FIG. 35.

In step S507, the initialization unit 432a controls the writing unit 73 so as to cause the recording/playing block 53 to set the stream file (Files (Stream)) and the backup DB file (Files (DB) (backup)) at the upper side in FIG. 55) in the third SRR on the recording medium 81. That is to say, in the case to the upper side in FIG. 55, the initialization unit 432a controls the writing unit 73 so as to cause the recording/playing block 53 to set the stream file and backup DB file to the regions B362 and B363 in the third SRR on the recording medium 81.

In step S508, the initialization unit 432a controls the writing unit 73 so as to cause the recording/playing block 53 to set the original DB file to the fourth SRR on the recording medium 81. That is to say, in the case of the upper side in FIG. 55, the initialization unit 432a sets the original DB file (Files (DB) (original) at the upper side in FIG. 55) to region B364 in the fourth SRR on the recording medium 81.

In step S509, the initialization unit 432a controls the writing unit 73 so as to cause the recording/playing block 53 to set the mirror FS for recording the file system information to the fifth SRR on the recording medium 81. That is to say, in the case of the upper side in FIG. 55, the initialization unit 432a sets the mirror FS (FS (MD-Mirror) in FIG. 55) storing the file system information to region B355 in the fourth SRR on the recording medium 81.

According to the above processing, six SRRs are set on the recording medium 81 to be formatted for each usage.

Figure 56:
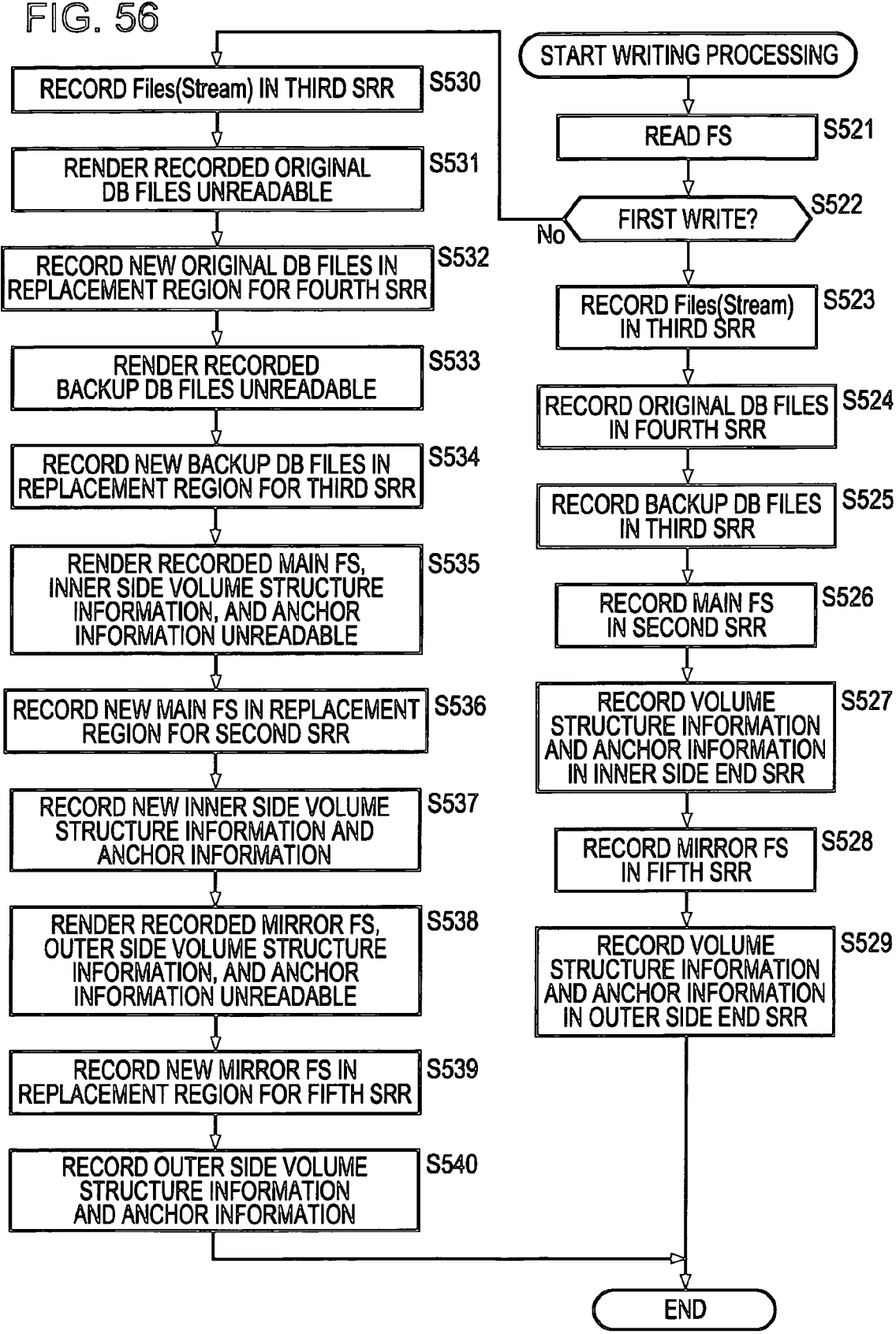
FIG. 56 is a flowchart for describing still other formatting processing with the recording/playing mechanism section shown in FIG. 35.

Next, the processing for writing information to the recording medium 81 which has been formatted (initialized) by the processing shown in FIG. 54, by the recording/playing mechanism section 22 shown in FIG. 35, will be described with reference to the flowchart in FIG. 56. Note that the processing in steps S521 and S522 of the flowchart in FIG. 56 is the same as the processing in steps S221 and S222 in the flowchart in FIG. 38, and accordingly description thereof will be omitted.

In step S523, the file system information generating unit 432 causes the recording/playing block 53 to write to the third SRR (SRR3) on the recording medium 81 the stream file Files (Stream) input to the writing unit 73 via the ECC encoding unit 71 and modulation unit 72.

That is, as shown to the upper side in FIG. 55, the file system information generating unit 432 causes the file (Files (Stream) in the drawing) input to the writing unit 73 via the ECC encoding unit 71 and modulation unit 72 to be recorded to the region B362 of the third SRR set on the recording medium 81 by the above-described formatting processing.

In step S524, the file system information generating unit 432 supplies the original DB file to the writing unit 73 via the ECC encoding unit 71 and modulation unit 72, and causes the recording/playing block 53 to write to the fourth SRR on the recording medium 81.

That is to say, as shown to the upper side in FIG. 55, the file system information generating unit 432 records the original DB file at the region B364 of the fourth SRR set on the recording medium 81 via the ECC encoding unit 71 and modulation unit 72, by the above-described formatting processing (Files (DB) (original) in the drawing).

In step S525, the file system information generating unit 432 supplies the backup DB file to the writing unit 73 via the ECC encoding unit 71 and modulation unit 72, and causes the recording/playing block 53 to write to the third SRR on the recording medium 81.

That is to say, as shown to the upper side in FIG. 55, the file system information generating unit 432 records the backup DB file (Files (DB) (backup) in the drawing) at the region B363 of the third SRR set on the recording medium 81 via the ECC encoding unit 71 and modulation unit 72, by the above-described formatting processing.

In step S526, the file system information generating unit 432 supplies the main FS to the writing unit 73 via the ECC encoding unit 71 and modulation unit 72, and causes the recording/playing block 53 to write to the second SRR on the recording medium 81.

That is to say, as shown to the upper side in FIG. 55, the file system information generating unit 432 records the main FS at the region B361 of the second SRR set on the recording medium 81 via the ECC encoding unit 71 and modulation unit 72, by the above-described formatting processing (FS (Metadata) in the drawing).

In step S527, the file system information generating unit 432 supplies the inner side volume structure information and anchor information to the writing unit 73 via the ECC encoding unit 71 and modulation unit 72, and causes the recording/playing block 53 to write to the inner side end SRR on the recording medium 81. At the upper side in FIG. 55, the inner side volume structure information and anchor information are recorded in the first SRR.

In step S528, the file system information generating unit 432 supplies the mirror FS to the writing unit 73 via the ECC encoding unit 71 and modulation unit 72, and causes the recording/playing block 53 to write to the fifth SRR on the recording medium 81.

That is to say, as shown to the upper side in FIG. 55, the file system information generating unit 432 records the mirror FS at the region B365 of the fifth SRR set on the recording medium 81 via the ECC encoding unit 71 and modulation unit 72, by the above-described formatting processing (FS (MD-Mirror) in the drawing).

In step S529, the file system information generating unit 432 supplies the outer side volume structure information and anchor information to the writing unit 73 via the ECC encoding unit 71 and modulation unit 72, and causes the recording/playing block 53 to write to the outer side end SRR on the recording medium 81. At the upper side in FIG. 55, the outer side volume structure information and anchor information are recorded in the sixth SRR ("Volume Str." and "Anchor" at SRR6 in the drawing).

On the other hand, in the event that determination is made in step S522 that this is not the first writing, that is to say, that information has been recorded by the processing of steps S523 through S529 at least once or more for example, the processing proceeds to step S530.

In step S530, the file system information generating unit 432 causes the recording/playing block 53 to write to the fourth SRR on the recording medium 81 the file (Files (Stream): a file made up of stream data) input to the writing unit 73 via the ECC encoding unit 71 and modulation unit 72.

That is, in the event that information is recorded on the recording medium 81 in a state such as shown to the upper side in FIG. 55 for example, as shown to the lower side in FIG. 55, the file system information generating unit 432 causes the stream file (Files (stream) in the drawing) input to the writing unit 73 via the ECC encoding unit 71 and modulation unit 72 to be recorded to the region B362' of the third SRR set on the recording medium 81 by the above-described formatting processing. More specifically, in the event that the file is an additional write, the file system information generating unit 432 records the additional information newly added to the information recorded in the region B362 shown to the upper side in FIG. 55 in the region B362' shown to the lower side of FIG. 55. Also, in the event of recording a file wherein new information has been updated, readout of the file recorded in the region B362 shown to the upper side in FIG. 55 is disabled, and the newly updated file is recorded to the region B362'.

In step S531, the file system information generating unit 432 controls the writing unit 73 via the ECC encoding unit 71 and modulation unit 72 so as to disable readout of the original DB file (Files (DB) (original)) from the recording medium 81 by the recording/playing block 53.

That is to say, as shown to the lower side of FIG. 55, the file system information generating unit 432 disables readout of the original DB file (Files (DB) (original)) recorded in the region B364 from the recording medium 81 by the recording/playing block 53.

In step S532, the file system information generating unit 432 supplies the new original DB file (Files (DB) (original)) to the writing unit 73 via the ECC encoding unit 71 and modulation unit 72, and causes the recording/playing block 53 to write to a new region in the fourth SRR.

That is to say, as shown to the lower side of FIG. 55, the file system information generating unit 432 supplies the original DB file (Files (DB) (original)) to the writing unit via the ECC encoding unit 71 and modulation unit 72, and causes the recording/playing block 53 to write to region B364' in the fourth SRR on the recording medium 81. In step S533, the file system information generating unit 432 controls the writing unit 73 via the ECC encoding unit 71 and modulation unit 72 so as to disable readout of the backup DB file (Files (DB) (backup)) from the recording medium 81 by the recording/playing block 53.

That is to say, as shown to the lower side of FIG. 55, the file system information generating unit 432 disables readout of the backup DB file (Files (DB) (backup)) recorded in the region B363 from the recording medium 81 by the recording/playing block 53.

In step S534, the file system information generating unit 432 supplies the new backup DB file (Files (DB) (backup)) to the writing unit 73 via the ECC encoding unit 71 and modulation unit 72, and causes the recording/playing block 53 to write to a new region in the third SRR.

That is to say, as shown to the lower side of FIG. 55, the file system information generating unit 432 supplies the backup DB file (Files (DB) (backup)) to the writing unit 73 via the ECC encoding unit 71 and modulation unit 72, and causes the recording/playing block 53 to write to region B363' in the third SRR on the recording medium 81. In step S535, the file system information generating unit 432 controls the writing unit 73 via the ECC encoding unit 71 and modulation unit 72 so as to disable readout of the main FS (FS (Metadata)) and inner side volume structure information and anchor information from the recording medium 81 by the recording/playing block 53.

That is to say, as shown to the lower side of FIG. 55, the file system information generating unit 432 disables readout of the main FS (FS (Metadata)) recorded in the region B361, and the inner side volume structure information and anchor information recorded in the first SRR from the recording medium 81 by the recording/playing block 53.

In step S536, the file system information generating unit 432 supplies the main FS to the writing unit 73 via the ECC encoding unit 71 and modulation unit 72, and causes the recording/playing block 53 to write to the second SRR.

That is to say, as shown to the lower side of FIG. 55, the file system information generating unit 432 supplies the main file system information FS to the writing unit 73 via the ECC encoding unit 71 and modulation unit 72, and causes the recording/playing block 53 to write to region B361' in the second SRR on the recording medium 81.

Further, in step S537, the file system information generating unit 432 supplies the inner side volume structure information and anchor information corresponding to the main FS to the writing unit 73 via the ECC encoding unit 71 and modulation unit 72, and causes the recording/playing block 53 to write to a replacement region of the first SRR.

In step S538, the file system information generating unit 432 controls the writing unit 73 via the ECC encoding unit 71 and modulation unit 72 so as to disable readout of the mirror FS (FS (MD-Mirror)) and outer side volume structure information and anchor information from the recording medium 81 by the recording/playing block 53.

That is to say, as shown to the lower side of FIG. 55, the file system information generating unit 432 disables readout of the mirror FS (FS (MD-Mirror)) recorded in the region B365, and the outer side volume structure information and anchor information recorded in the sixth SRR from the recording medium 81 by the recording/playing block 53.

In step S539, the file system information generating unit 432 supplies the mirror FS to the writing unit 73 via the ECC encoding unit 71 and modulation unit 72, and causes the recording/playing block 53 to write to the fifth SRR.

That is to say, as shown to the lower side of FIG. 55, the file system information generating unit 432 supplies the mirror file system information FS to the writing unit 73 via the ECC encoding unit 71 and modulation unit 72, and causes the recording/playing block 53 to write to region B365' in the fifth SRR on the recording medium 81.

Further, in step S540, the file system information generating unit 432 supplies the outer side volume structure information and anchor information corresponding to the mirror FS to the writing unit 73 via the ECC encoding unit 71 and modulation unit 72, and causes the recording/playing block 53 to write to a replacement region of the sixth SRR.

Due to the above processing, the main FS, mirror FS, original DB file, and backup DB file, are recorded in different SRRs, thereby enabling improvement in access capabilities of the main FS, mirror FS, original DB file, and backup DB file, and also improving resistance of the main FS, mirror FS, original DB file, and backup DB file, on the recording medium 81, to scratches and the like. Of course, in FIG. 55 the stream file (Files (Stream)) is recorded on the same SRR with the DB files, but an arrangement may be made wherein this is recorded in the same SRR with any one of the main FS, mirror FS, or original DB file.

In the above, the stream files are recorded in the same SRR with one of the main FS, mirror FS, original DB file, and backup DB file, so different types of files are recorded in the same SRR, and accordingly there is the possibility that access capabilities may deteriorate. Accordingly, the stream file, main FS, mirror FS, original DB file, and backup DB file, may have SRRs set for each, and the placement thereof may differ.

Figure 57:
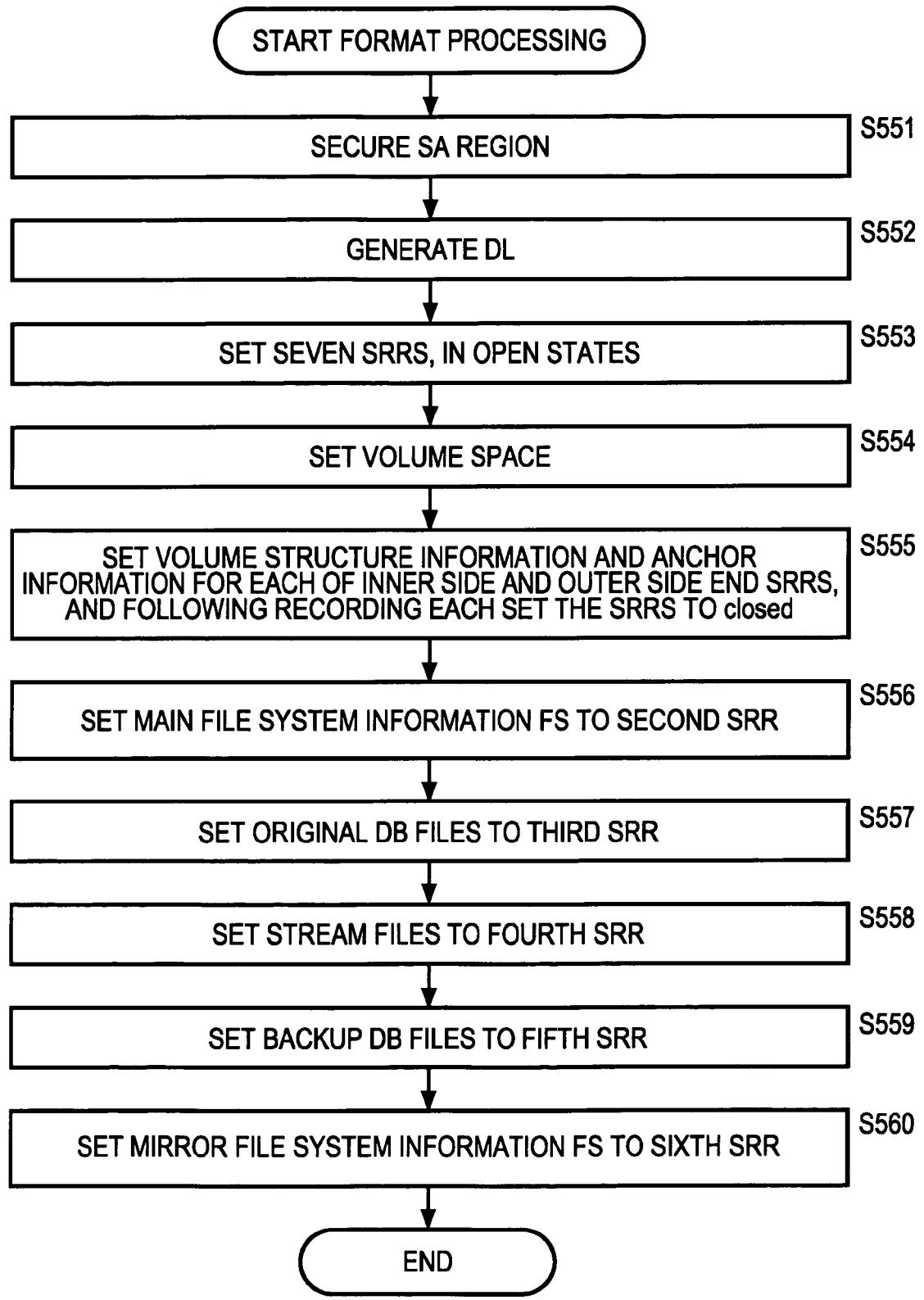
FIG. 57 is a flowchart for describing still other formatting processing with the recording/playing mechanism section shown in FIG. 35.

Next, the processing for formatting of the recording medium 81 wherein one SRR is set for inner side anchor information and volume structure information, one SRR is set for outer side anchor information and volume structure information, one SRR is set for stream files (Files (Stream)), one SRR is set for the backup DB file, one SRR is set for the main file system FS, one SRR is set for the mirror file system FS, and one SRR is set for the original DB file, will be described, with reference to the flowchart shown in FIG. 57. Note that the processing in steps S551, S552, and S554 of the flowchart in FIG. 57 is the same as the processing in step S201, S202, and S204 in the flowchart in FIG. 36, and accordingly description thereof will be omitted.

In step S553, the initialization unit 432a sets one SRR for the inner side anchor information and volume structure information, sets one SRR for the outer side anchor information and volume structure information, sets one SRR for stream files (Files (Stream)), sets one SRR for the backup DB file, sets one SRR for the main file system FS, sets one SRR for the mirror file system FS, and sets one SRR for the original DB file, each in an open state.

Consequently, as shown in FIG. 55, the total of seven SRRs of a first SRR through a seventh SRR (SRR1 through SRR7 in FIG. 58) are set in open states.

In step S555, the initialization unit 432a controls the writing unit 73 so as to cause the recording/playing block 53 to set regions for recording volume structure information and anchor information at the SRRs at the outer side and inner side ends of the recording medium 81. That is to say, in this case, the first SRR and the seventh SRR are set as regions for recording volume structure information and anchor information, as shown to the upper side in FIG. 58.

In step S556, the initialization unit 432*a* controls the writing unit 73 so as to cause the recording/playing block 53 to set the main FS storing file system information in the second SRR on the recording medium 81. That is to say, in the case to the upper side in FIG. 58, the initialization unit 432*a* controls the writing unit 73 so as to cause the recording/playing block 53 to set the main FS (FS (Metadata) at the upper side in FIG. 58) to the region B371 in the second SRR on the recording medium 81.

In step S557, the initialization unit 432*a* controls the writing unit 73 so as to cause the recording/playing block 53 to set the original DB file in the third SRR on the recording medium 81. That is to say, in the case to the upper side in FIG. 58, the initialization unit 432*a* controls the writing unit 73 so as to cause the recording/playing block 53 to set the original DB file to the region B372 in the third SRR in the recording medium 81.

In step S558, the initialization unit 432*a* controls the writing unit 73 so as to cause the recording/playing block 53 to set the stream file (Files (Stream)) to the fourth SRR on the recording medium 81. That is to say, in the case of the upper side in FIG. 58, the initialization unit 432*a* sets the stream file (Files (Stream) at the upper side in FIG. 58) to region B373 in the fourth SRR on the recording medium 81.

In step S559, the initialization unit 432*a* controls the writing unit 73 so as to cause the recording/playing block 53 to set the backup DB file to the fifth SRR on the recording medium 81. That is to say, in the case of the upper side in FIG. 58, the initialization unit 432*a* sets the backup DB file storing the file system information (Files (DB) (backup) at the upper side in FIG. 58) to region B374 in the fifth SRR on the recording medium 81.

In step S560, the initialization unit 432*a* controls the writing unit 73 so as to cause the recording/playing block 53 to set the mirror file system FS to the sixth SRR on the recording medium 81. That is to say, in the case of the upper side in FIG. 58, the initialization unit 432*a* sets the mirror file system FS (FS (MD-Mirror) at the upper side in FIG. 58) to region B375 in the sixth SRR in the recording medium 81.

According to the above processing, seven SRRs are set on the recording medium 81 to be formatted for each usage.

Figure 59:
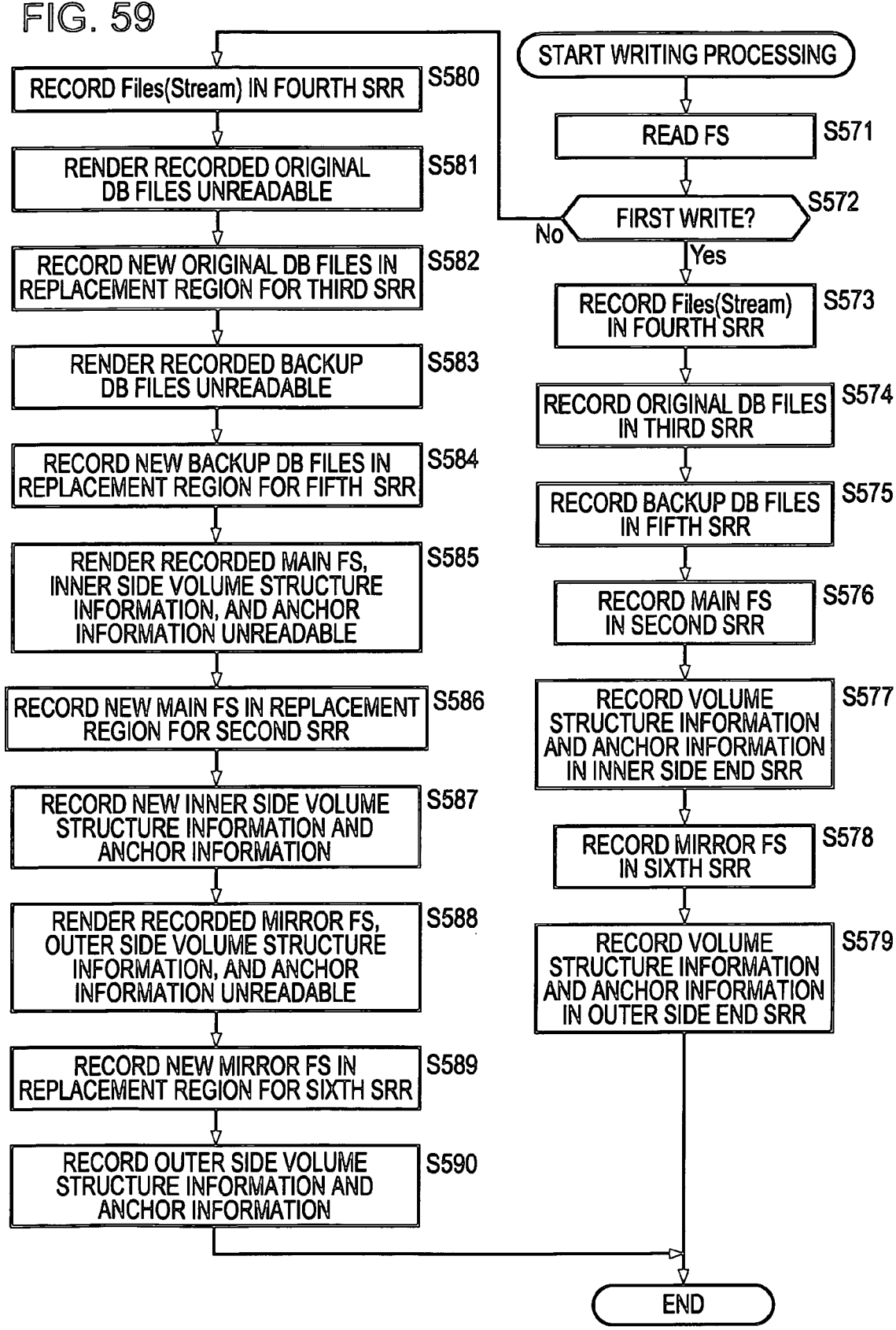
FIG. 59 is a flowchart for describing still other writing processing with the recording/playing mechanism section shown in FIG. 35.

Next, the processing for writing information to the recording medium 81 which has been formatted (initialized) by the processing shown in FIG. 57, by the recording/playing mechanism section 22 shown in FIG. 35, will be described with reference to the flowchart in FIG. 59. Note that the processing in steps S571 and S572 of the flowchart in FIG. 59 is the same as the processing in steps S221 and S222 in the flowchart in FIG. 38, and accordingly description thereof will be omitted.

In step S573, the file system information generating unit 432 causes the recording/playing block 53 to write to the fourth SRR (SRR4) on the recording medium 81 the stream file Files (Stream) input to the writing unit 73 via the ECC encoding unit 71 and modulation unit 72.

Figure 58:
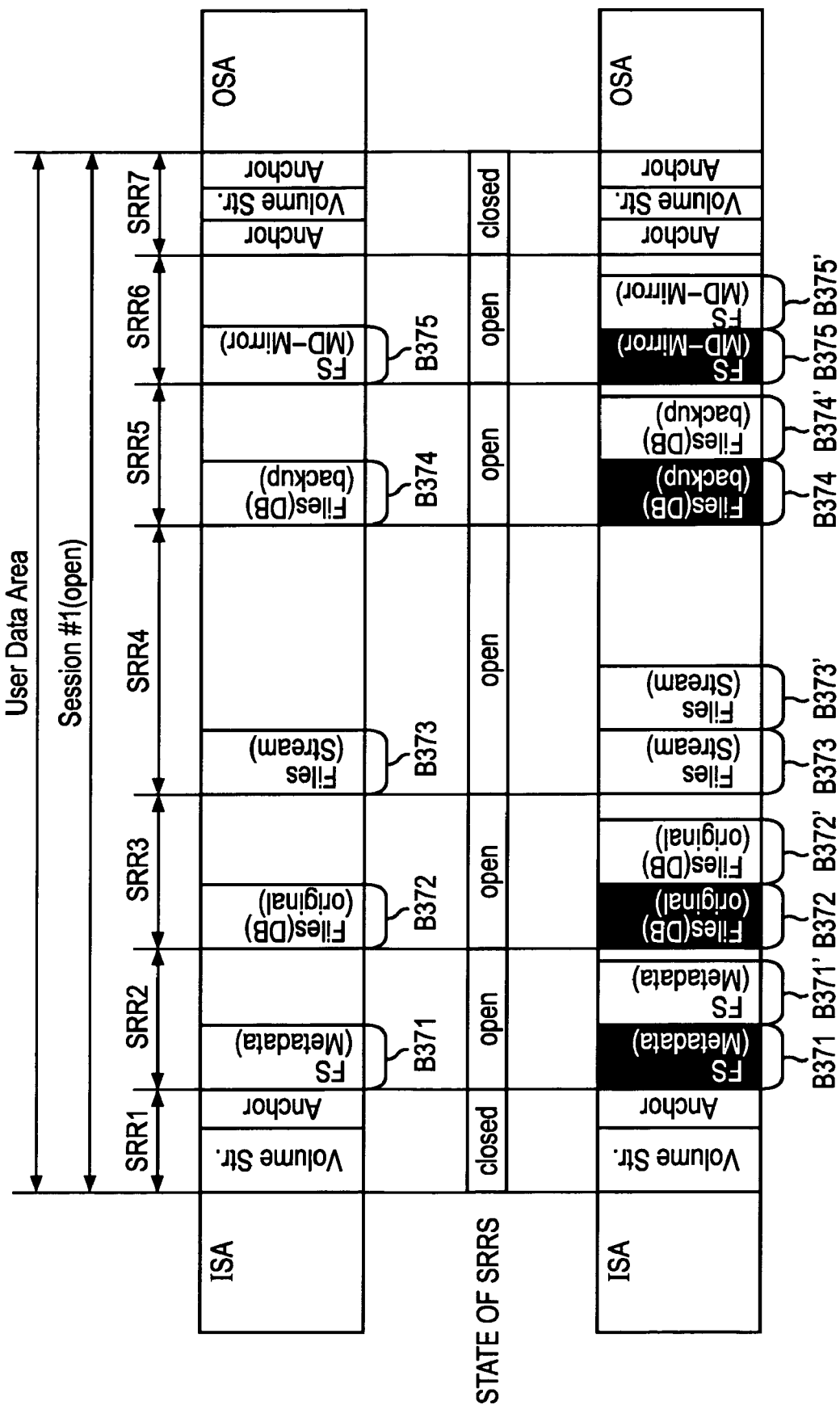
FIG. 58 is a diagram for describing still other formatting processing with the recording/playing mechanism section shown in FIG. 35.

That is, as shown to the upper side in FIG. 58, the file system information generating unit 432 causes the file (Files (Stream) in the drawing) input to the writing unit 73 via the ECC encoding unit 71 and modulation unit 72 to be recorded to the region B373 of the fourth SRR set on the recording medium 81 by the above-described formatting processing.

In step S574, the file system information generating unit 432 supplies the original DB file to the writing unit 73 via the ECC encoding unit 71 and modulation unit 72, and causes the recording/playing block 53 to write to the third SRR on the recording medium 81.

That is to say, as shown to the upper side in FIG. 58, the file system information generating unit 432 records the original DB file at the region B372 of the third SRR set on the recording medium 81 via the ECC encoding unit 71 and modulation unit 72, by the above-described formatting processing (Files (DB) (original) in the drawing).

In step S575, the file system information generating unit 432 supplies the backup DB file to the writing unit 73 via the ECC encoding unit 71 and modulation unit 72, and causes the recording/playing block 53 to write to the fifth SRR on the recording medium 81.

That is to say, as shown to the upper side in FIG. 58, the file system information generating unit 432 records the backup DB file (Files (DB) (backup) in the drawing) at the region B374 of the fifth SRR set on the recording medium 81 via the ECC encoding unit 71 and modulation unit 72, by the above-described formatting processing.

In step S576, the file system information generating unit 432 supplies the main FS to the writing unit 73 via the ECC encoding unit 71 and modulation unit 72, and causes the recording/playing block 53 to write to the second SRR on the recording medium 81.

That is to say, as shown to the upper side in FIG. 58, the file system information generating unit 432 records the main FS at the region B371 of the second SRR set on the recording medium 81 via the ECC encoding unit 71 and modulation unit 72, by the above-described formatting processing (FS (Metadata) in the drawing).

In step S577, the file system information generating unit 432 supplies the inner side volume structure information and anchor information to the writing unit 73 via the ECC encoding unit 71 and modulation unit 72, and causes the recording/playing block 53 to write to the inner side end SRR on the recording medium 81. At the upper side in FIG. 58, the inner side volume structure information and anchor information are recorded in the first SRR.

In step S578, the file system information generating unit 432 supplies the mirror FS to the writing unit 73 via the ECC encoding unit 71 and modulation unit 72, and causes the recording/playing block 53 to write to the sixth SRR on the recording medium 81.

That is to say, as shown to the upper side in FIG. 58, the file system information generating unit 432 records the mirror FS at the region B375 of the sixth SRR set on the recording medium 81 via the ECC encoding unit 71 and modulation unit 72, by the above-described formatting processing (FS (MD-Mirror) in the drawing).

In step S579, the file system information generating unit 432 supplies the outer side volume structure information and anchor information to the writing unit 73 via the ECC encoding unit 71 and modulation unit 72, and causes the recording/playing block 53 to write to the outer side end SRR on the recording medium 81. At the upper side in FIG. 58, the outer side volume structure information and anchor information are recorded in the seventh SRR ("Volume Str." and "Anchor" at SRR7 in the drawing).

On the other hand, in the event that determination is made in step S572 that this is not the first writing, that is to say, that information has been recorded by the processing of steps S573 through S579 at least once or more for example, the processing proceeds to step S580.

In step S580, the file system information generating unit 432 causes the recording/playing block 53 to write to the fourth SRR on the recording medium 81 the file (Files (Stream): a file made up of stream data) input to the writing unit 73 via the ECC encoding unit 71 and modulation unit 72.

That is, in the event that information is recorded on the recording medium 81 in a state such as shown to the upper side in FIG. 58 for example, as shown to the lower side in FIG. 58, the file system information generating unit 432 causes the file (Files (stream) in the drawing) input to the writing unit 73 via the ECC encoding unit 71 and modulation unit 72 to be recorded to the region B373' of the fourth SRR set on the recording medium 81 by the above-described formatting processing. More specifically, in the event that the file is an additional write, the file system information generating unit 432 records the additional information newly added to the information recorded in the region B373 shown to the upper side in FIG. 58 in the region B373' shown to the lower side of FIG. 58. Also, in the event of recording a file wherein new information has been updated, readout of the file recorded in the region B373 shown to the upper side in FIG. 58 is disabled, and the newly updated file is recorded to the region B373'.

In step S581, the file system information generating unit 432 controls the writing unit 73 via the ECC encoding unit 71 and modulation unit 72 so as to disable readout of the original DB file (Files (DB) (original)) from the recording medium 81 by the recording/playing block 53.

That is to say, as shown to the lower side of FIG. 58, the file system information generating unit 432 disables readout of the original DB file (Files (DB) (original)) recorded in the region B372 from the recording medium 81 by the recording/playing block 53.

In step S582, the file system information generating unit 432 supplies the new original DB file (Files (DB) (original)) to the writing unit 73 via the ECC encoding unit 71 and modulation unit 72, and causes the recording/playing block 53 to write to a new region in the third SRR.

That is to say, as shown to the lower side of FIG. 58, the file system information generating unit 432 supplies the original DB file (Files (DB) (original)) to the writing unit via the ECC encoding unit 71 and modulation unit 72, and causes the recording/playing block 53 to write to region B372' in the third SRR on the recording medium 81.

In step S583, the file system information generating unit 432 controls the writing unit 73 via the ECC encoding unit 71 and modulation unit 72 so as to disable readout of the backup DB file (Files (DB) (backup)) from the recording medium 81 by the recording/playing block 53.

That is to say, as shown to the lower side of FIG. 58, the file system information generating unit 432 disables readout of the backup DB file (Files (DB) (backup)) recorded in the region B374 from the recording medium 81 by the recording/playing block 53.

In step S584, the file system information generating unit 432 supplies the new backup DB file (Files (DB) (backup)) to the writing unit 73 via the ECC encoding unit 71 and modulation unit 72, and causes the recording/playing block 53 to write to a new region in the fifth SRR.

That is to say, as shown to the lower side of FIG. 58, the file system information generating unit 432 supplies the backup DB file (Files (DB) (backup)) to the writing unit 73 via the ECC encoding unit 71 and modulation unit 72, and causes the recording/playing block 53 to write to region B374' in the fifth SRR on the recording medium 81.

In step S585, the file system information generating unit 432 controls the writing unit 73 via the ECC encoding unit 71 and modulation unit 72 so as to disable readout of the main FS (FS (Metadata)) and inner side volume structure information and anchor information from the recording medium 81 by the recording/playing block 53.

That is to say, as shown to the lower side of FIG. 58, the file system information generating unit 432 disables readout of the main FS (FS (Metadata)) recorded in the region B371, and the inner side volume structure information and anchor information recorded in the first SRR from the recording medium 81 by the recording/playing block 53.

In step S586, the file system information generating unit 432 supplies the main FS to the writing unit 73 via the ECC encoding unit 71 and modulation unit 72, and causes the recording/playing block 53 to write to the second SRR.

That is to say, as shown to the lower side of FIG. 58, the file system information generating unit 432 supplies the main file system information FS to the writing unit 73 via the ECC encoding unit 71 and modulation unit 72, and causes the recording/playing block 53 to write to region B371' in the second SRR on the recording medium 81.

Further, in step S587, the file system information generating unit 432 supplies the inner side volume structure information and anchor information corresponding to the main FS to the writing unit 73 via the ECC encoding unit 71 and modulation unit 72, and causes the recording/playing block 53 to write to a replacement region of the first SRR.

In step S588, the file system information generating unit 432 controls the writing unit 73 via the ECC encoding unit 71 and modulation unit 72 so as to disable readout of the mirror FS (FS (MD-Mirror)) and outer side volume structure information and anchor information from the recording medium 81 by the recording/playing block 53.

That is to say, as shown to the lower side of FIG. 58, the file system information generating unit 432 disables readout of the mirror FS (FS (MD-Mirror)) recorded in the region B365, and the outer side volume structure information and anchor information recorded in the seventh SRR from the recording medium 81 by the recording/playing block 53.

In step S589, the file system information generating unit 432 supplies the mirror FS to the writing unit 73 via the ECC encoding unit 71 and modulation unit 72, and causes the recording/playing block 53 to write to the sixth SRR.

That is to say, as shown to the lower side of FIG. 58, the file system information generating unit 432 supplies the mirror file system information FS to the writing unit 73 via the ECC encoding unit 71 and modulation unit 72, and causes the recording/playing block 53 to write to region B375' in the sixth SRR on the recording medium 81.

Further, in step S590, the file system information generating unit 432 supplies the outer side volume structure information and anchor information corresponding to the mirror FS to the writing unit 73 via the ECC encoding unit 71 and modulation unit 72, and causes the recording/playing block 53 to write to a replacement region of the seventh SRR.

Due to the above processing, the stream file, main FS, mirror FS, original DB file, and backup DB file, are each recorded in different SRRs, thereby enabling improvement in access capabilities of the stream file, main FS, mirror FS, original DB file, and backup DB file, and also improving resistance of the main FS, mirror FS, original DB file, and backup DB file, on the recording medium 81, to scratches and the like.

Summarizing the processing described with reference to FIG. 35 through FIG. 59, the less mixed the stream file, DB files, and file system FS are, the more the access capabilities to each of the stream file, DB files, and file system FS can be improved. Also, the farther away the main FS and mirror FS, and the original DB file and backup DB file are from each other, the more the resistance to defects is improved. However, carrying out this in a precise manner increases the number of SRRs set at the time of formatting. Consequently, upon using up particular regions, there is generated the need to newly create a track, which may make management complicated. Accordingly, formatting is preferably performed by setting the size and number of SRRs according to the usage thereof, and in the above-described processing assumes that the number and size of the SRRs can be set.

Figure 38:
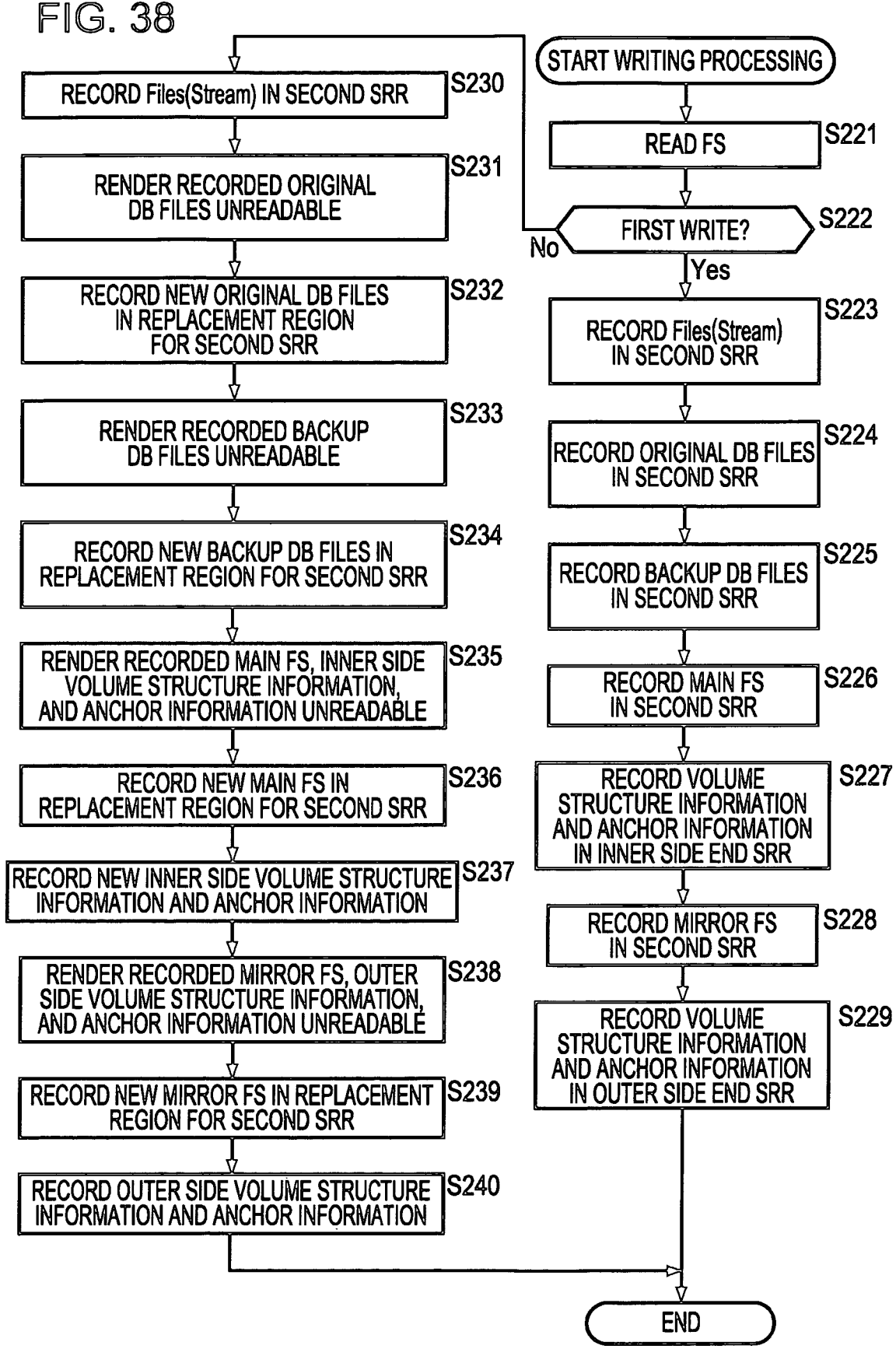
FIG. 38 is a flowchart for describing writing processing with the recording/playing mechanism section shown in FIG. 35.
Figure 47:
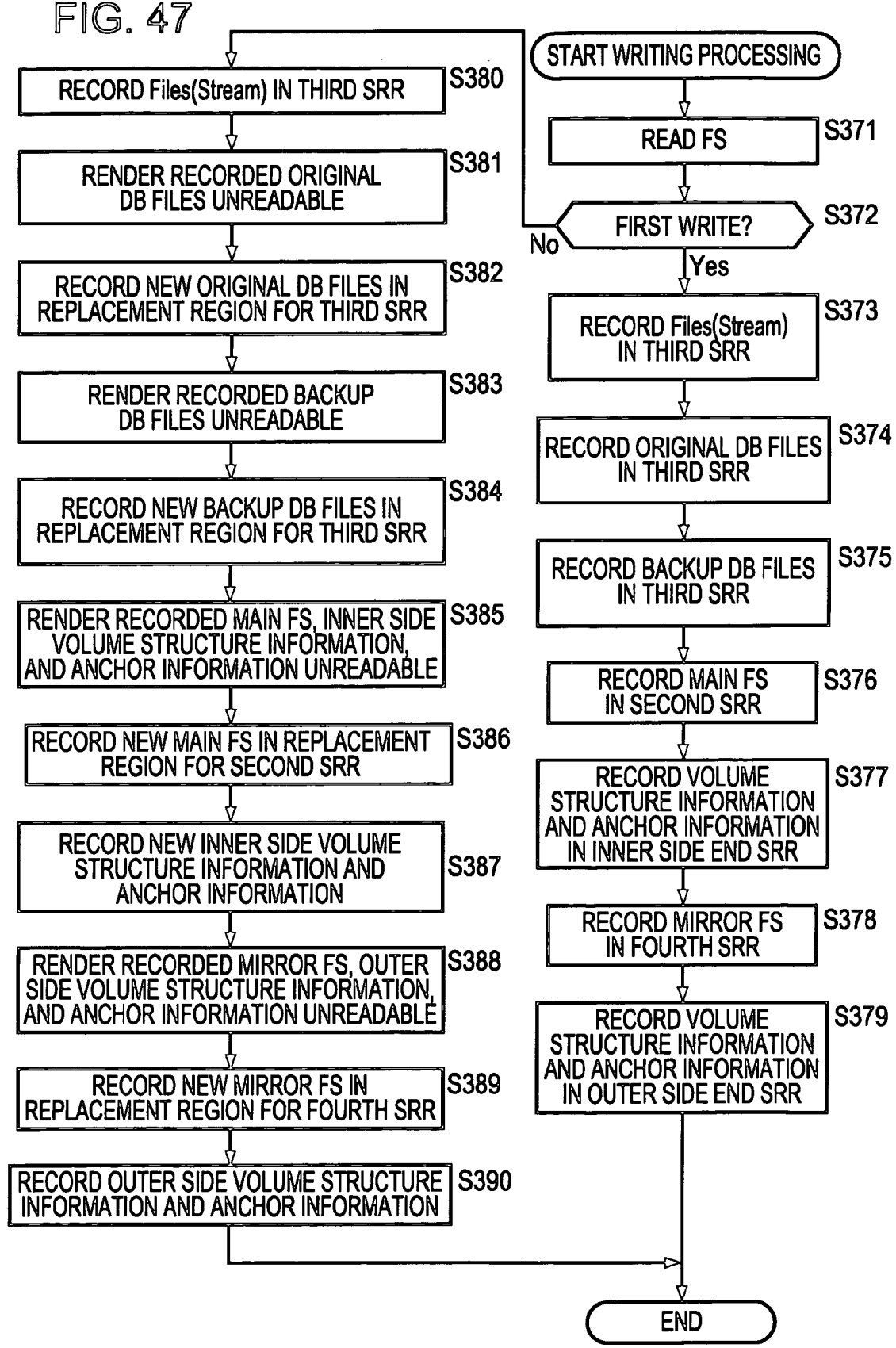
FIG. 47 is a flowchart for describing still other writing processing with the recording/playing mechanism section shown in FIG. 35.

Note that there are cases wherein the anchor information and volume structure information do not necessarily need to be rewritten, and in such cases, the processing of steps S235, S237, S238, and S240 in FIG. 38, the processing of steps S285, S287, S288, and S290 in FIG. 41, the processing of steps S335, S337, S338, and S340 in FIG. 44, the processing of steps S385, S387, S388, and S390 in FIG. 47, the processing of steps S435, S437, S438, and S440 in FIG. 50, the processing of steps S485, S487, S488, and S490 in FIG. 53, the processing of steps S535, S537, S538, and S540 in FIG. 56, and the processing of steps S585, S587, S258, and S260 in FIG. 59, are omitted.

Next, detailed description will be given of the recording processing in the above-described processing of steps S13 through S18, S21, S22, S25, and S26 of the flowchart shown in FIG. 17, the processing of steps S43 through S48, S50, S51, S54, and S55 of the flowchart shown in FIG. 20, the processing of steps S73 through S77, S79, S80, and S83 of the flowchart shown in FIG. 23, the processing of steps S103 through S109, S112 through S114, S117, and S118, of the flowchart shown in FIG. 26, the processing of steps S133 through S138, S141, S142, S145, and S146 of the flowchart shown in FIG. 29, the processing of steps S163 through S168, S172, S173, S175, S176, and S180 through S182 shown in FIG. 32, the processing of steps S223 through S230, S232, S234, S236, S237, S239, and S240 shown in FIG. 38, the processing of steps S273 through S280, S282, S284, S286, S287, S289, and S290 in FIG. 41, the processing of steps S323 through S330, S332, S334, S336, S337, S339, and S340 in FIG. 44, the processing of steps S373 through S380, S382, S384, S386, S387, S389, and S390 in FIG. 47, the processing of steps S423 through S430, S432, S434, S436, S437, S439, and S430 in FIG. 50, the processing of steps S473 through S480, S482, S484, S486, S487, S489, and S490 in FIG. 53, the processing of steps S523 through S530, S532, S534, S536, S537, S539, and S540 in FIG. 56, and the processing of steps S573 through S580, S582, S584, S586, S587, S589, and S590 in FIG. 59.

The above recording processing is divided into replacement information management processing for generating replacement information, made up of a list of replacement source information and replacement target information of data of a file to be overwritten or updated, in units of ECC clusters, as a temporary DL (temporary DL), and real recording processing for organizing the information of the replacement origin and the replacement target based on the temporary DL to generate a final DL ultimately recorded in the recoding medium (hereinafter called a final DL), and actually recording data in the recording medium 81 in units of clusters.

Figure 60:
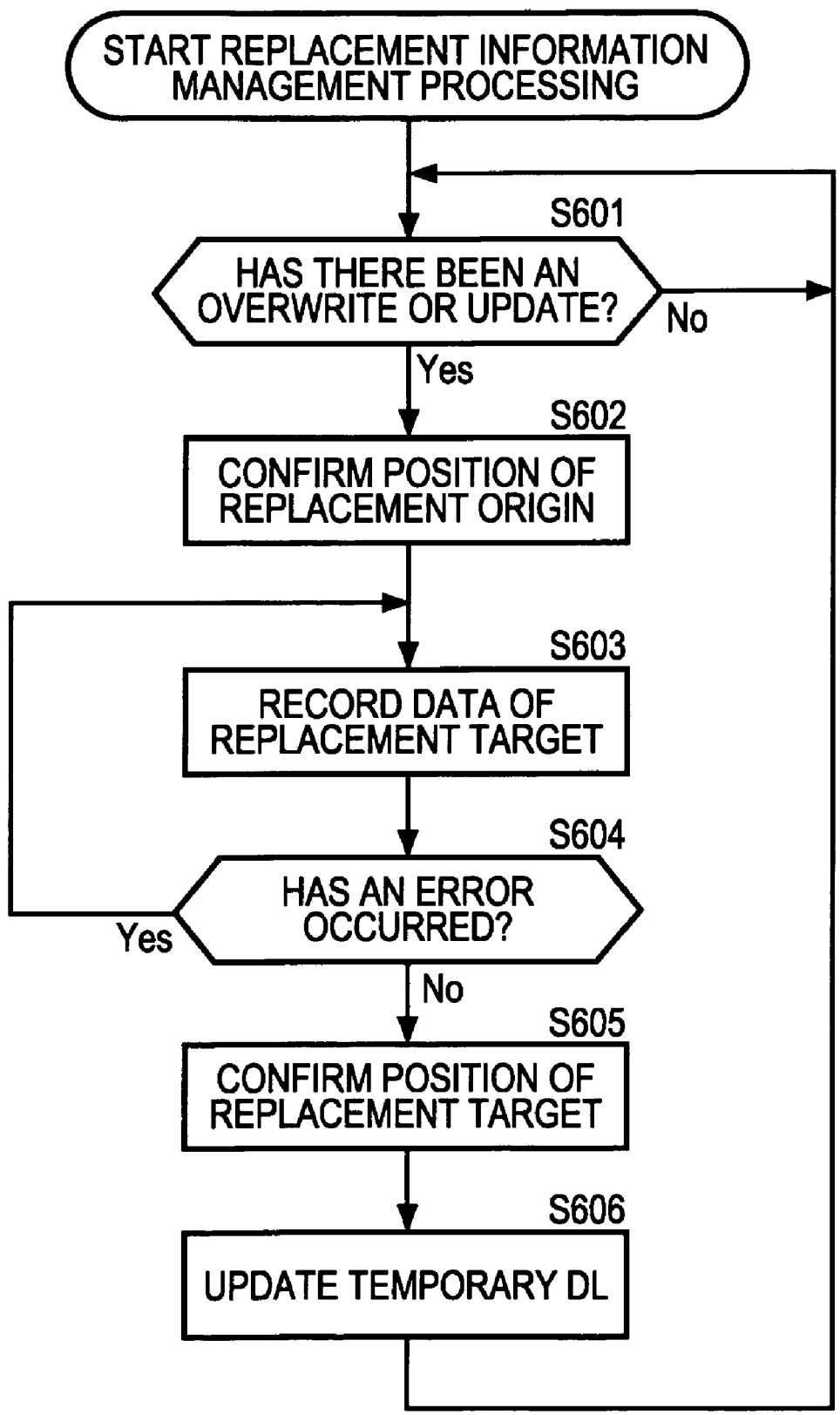
FIG. 60 is a flowchart for describing replacement information management processing with the recording/playing mechanism section shown in FIG. 3.

First, replacement information management processing will be described with reference to the flowchart in FIG. 60.

In step S601, the replacement information management unit 63 determines whether or not there is an overwrite or update cluster, and this processing is repeated until determination is made that there is an overwrite or update cluster. In step S601, by processing such as the main FS being recorded in the SA region by the processing of step S21 in the flowchart in FIG. 17 for example, being carried out, whereby the main FS recorded in the block B111 as the replacement origin in FIG. 18 is to be recorded to block B111' as the replacement target, determination is made that there is an overwrite or update cluster, and the processing advances to step S602.

In step S602, the replacement information management unit 63 confirms the position of the replacement origin of the data predetermined cluster units, making up the file data to be overwritten or updated. For example, as can be seen to the upper side of FIG. 61, in the event that the address of the replacing source is a cluster of A, A which is the position of the replacement source is confirmed. Note that at the upper left in FIG. 61, each block represents one cluster of data, and A and B represent addressees indicating the positions of clusters, with the addresses of the clusters increasing by one from the left toward the right in the drawing for each square. Also, hatched clusters indicate clusters where data is actually situated, and black clusters indicate clusters where not data has been recorded.

In step S603, the replacement information management unit 63 sets and stores the position of the replacement target of the data in predetermined cluster units, for the data of the file being overwritten or updated. For example, as shown to the upper left in FIG. 61, in the event that the position of the replacement target of a cluster of which the replacement origin position is A, is B, the data is stored to the position B for the replacement target, within the memory 63a.

In step S604, the replacement information management unit 63 determines whether or not an error has occurred in the processing in step S603 described above, and in the event that determination is made that no error has occurred, the processing advances to step S605.

In step S605, the replacement information management unit 63 confirms the position of the replacement target address.

In step S606, the replacement information management unit 63 updates the DL generated by the formatting processing described above in the memory 63a, based on the replacement origin and replacement target addressees of the clusters making up the data of the file to be overwritten or updated, and the processing returns to step S601.

Figure 61:
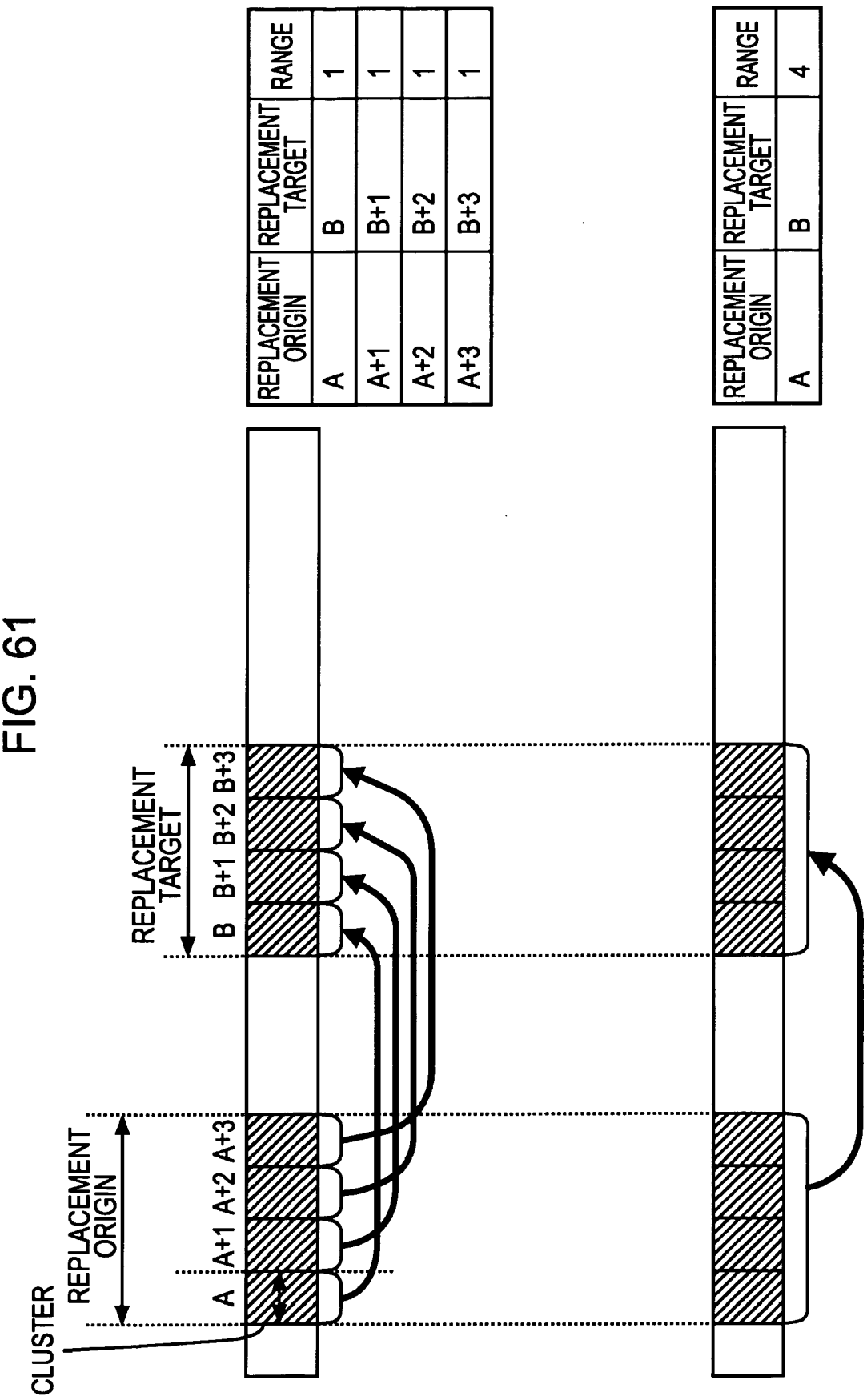
FIG. 61 is a diagram for describing replacement information management processing with the recording/playing mechanism section shown in FIG. 3.

In this case for example, this is recorded as the list at the very top at the upper right in FIG. 61. Note that from the left at the upper right in FIG. 61 are described the head address of the replacement origin, the head address of the replacement target, and the cluster range. At the very top at the upper right in FIG. 61, are described the head address of the replacement origin is A and are described the head address of the replacement target is B, and the range is one, indicating that essentially, one cluster from the head of the replacement origin A is being replaced to the position of one cluster from the head of the replacement target B. In the case of the upper left in FIG. 61, repeating the processing of steps S602 through S606 four times generates a temporary DL such as shown to the upper right in FIG. 61. That is to say, at the upper left and right in FIG. 61, data of which the replacement origin is one cluster of data from the head of the position of the address A+1 is replaced into data of which the replacement target is one cluster of data from the head of the position of the address B+1 by overwriting or updating, data of which the replacement origin is one cluster of data from the head of the position of the address A+2 is replaced into data of which the replacement target is one cluster of data from the head of the position of the address B+2 by overwriting or updating, and data of which the replacement origin is one cluster of data from the head of the position of the address A+3 is replaced into data of which the replacement target is one cluster of data from the head of the position of the address B+3 by overwriting or updating.

Figure 62:
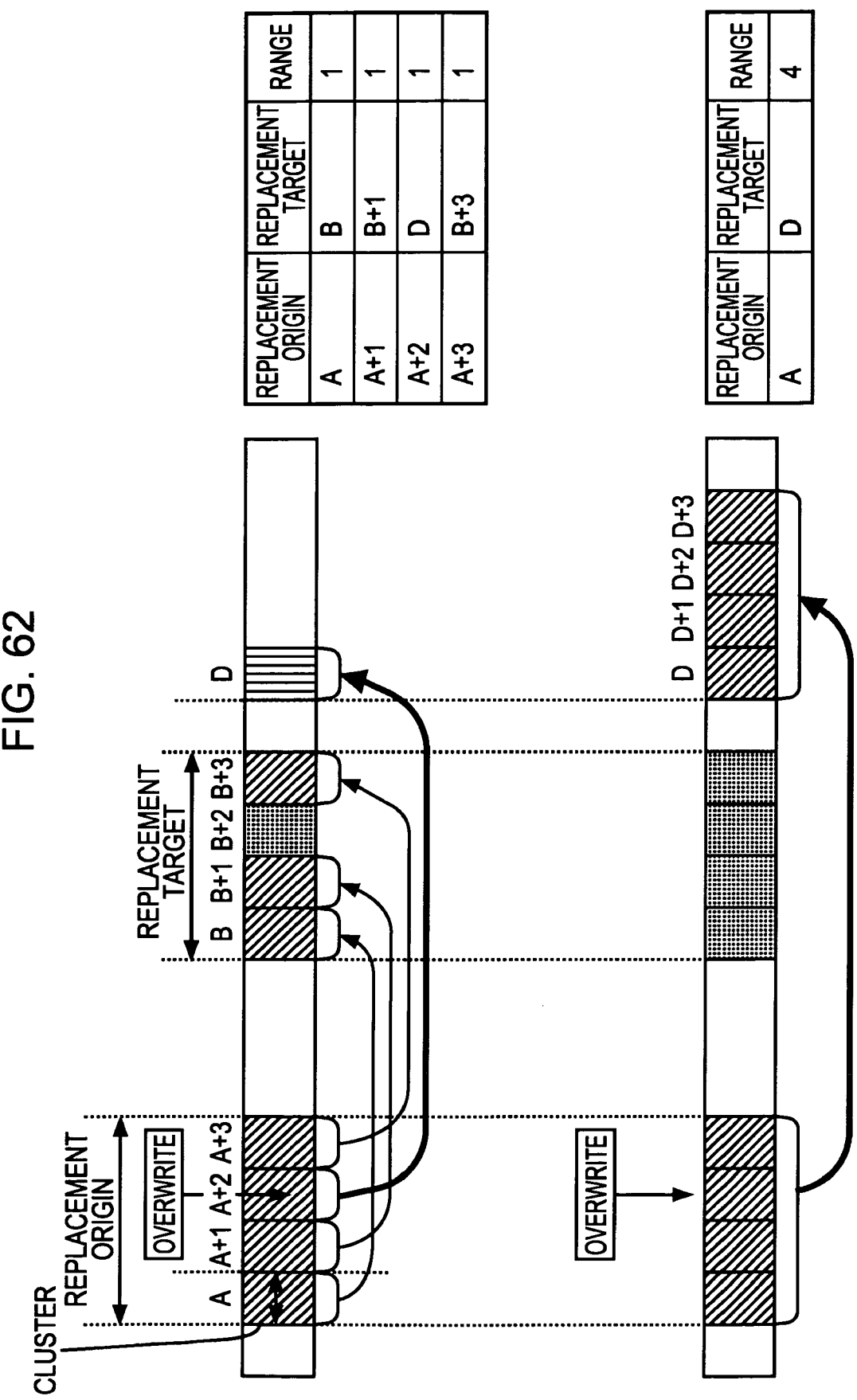
FIG. 62 is a diagram for describing replacement information management processing with the recording/playing mechanism section shown in FIG. 3.

Further, in the event that there is the state at the upper left and right in FIG. 61 for example, and only one cluster of data at the position of the address A+2 is overwritten as shown to the upper left in FIG. 62, in step S602 the address of the replacement origin is A+2, and in step S603 the replacement target address is changed from B+1 to D. Consequently, at the upper right in FIG. 62, the one cluster of data of which the address of the replacement origin starts at A+2 is replaced with the data of one cluster from the replacement target address of D (the square with vertical lines in FIG. 62) so as to be updated.

On the other hand, in the event that determination is made in step S605 that an error has occurred, the processing returns to step S603, and the subsequent processing is repeated. That is to say, as shown to the upper left in FIG. 63, the one cluster of data of which the head is the replacement origin address A+2 is set at the position of the one cluster of which the head is the replacement target address B+2. In the event that an error occurs due to some reason at the time of this temporary DL information being recorded to the memory 63a, a new replacement target is set again, and in the case of FIG. 63, the replacement target address is changed from B+2 to C. Accordingly, as shown to the upper right in FIG. 63, the head address of the replacement target is changed to C (the square with bar marks in FIG. 63) as to the head address of A+2 of the replacement origin.

Due to the above processing a temporary DL made up of replacement origin information and replacement target information in increments of cluster, is generated.

Figure 64:
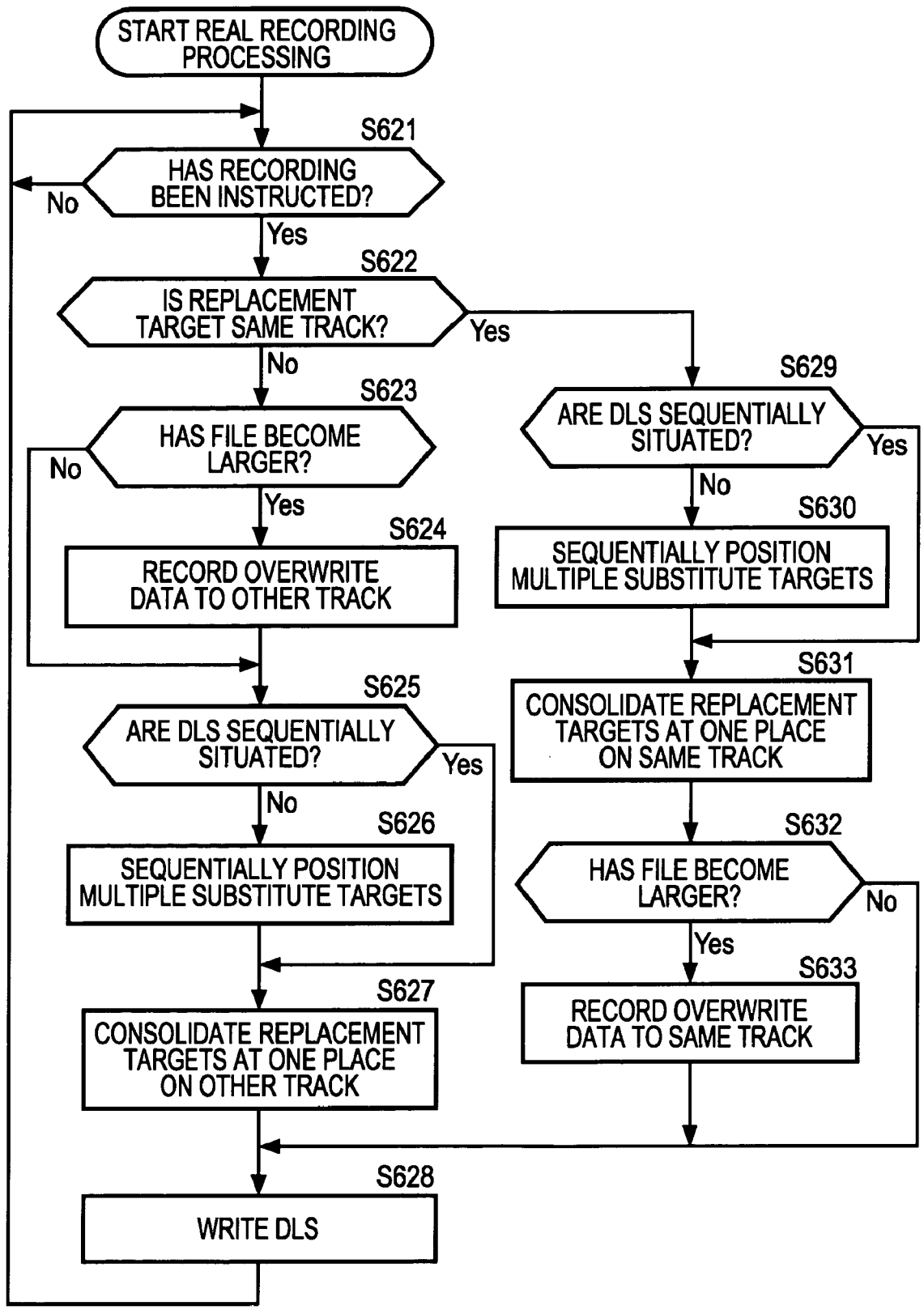
FIG. 64 is a flowchart for describing real recording processing with the recording/playing mechanism section shown in FIG. 3.

Next, real recording processing will be described with reference to the flowchart in FIG. 64.

In step S621, the replacement information generating unit 64 determines whether or not an instruction has been made from the control unit 51 to record data to the recording medium 81. This recording instruction is output in cases such as the capacity of recording to the memory 63a to exceeds the limit capacity, the above-described replacement management processing stopping (such as in a case of the processing in step S601 repeating), and so forth.

In the event that recording is instructed in step S621, in step S622 the replacement information generating unit 64 determines whether or not the track (SRR) serving as the replacement destination is within the same track, i.e., whether or not track (SRR) serving as the replacement destination is another track (or SA region). For example, in the event that determination is made that this is not the same track, the processing advances to step S623.

In step S623, the replacement information generating unit 64 determines whether or not the size of the file to be overwritten or updated is larger than the original file size, and in the event that determination is made that this is not greater, the processing advances to step S625.

In step S625, the replacement information generating unit 64 inquires of the replacement information management unit 63 regarding whether or not the cluster information recorded in the temporary DL is sequential. For example, as shown to the upper left and right in FIG. 61, in the event that the address of the head position of the replacement origin is A through A+3, and the address of the head position of the replacement target is B through B+3, respectively, the addresses of the replacement target are situated sequentially, so determination is made that the DL placement is sequential, and the processing advances to step S627.

In step S627, the replacement information generating unit 64 generates and stores a final DL in the memory 64a in a state of the replacement targets being grouped together at a single location on another track. That is to say, recording is performed as shown to the lower right in FIG. 61 with the head address of the replacement origin being A and head address of the replacement target being B and the range being 4, so that the range of four clusters from the address A which is the head position of the replacement origin, is a range of four clusters from the address B which is the head position of the replacement target, as shown to the lower left in FIG. 61, based on the description of the temporary DL shown to the upper right in FIG. 61. Thus, temporary DL information made up of replacement origin and replacement target information in cluster units are converted into replacement origin and replacement target information corresponding to multiple continuous clusters, thereby generating a final DL smaller than the temporary DL, which is stored in the memory 64a.

Further, in step S628, the replacement information generating unit 64 causes the recording unit 52 to write data to the recording medium 81 based on the final DL stored in the memory 64a, and also record the final DL to the recording medium 81.

Thus, generating a final DL based on the information of the temporary DL allows the number of lists to be reduced, and the storage capacity of the DL recorded in the recording medium 81 (final DL) can be reduced, so the capacity of the recording medium 81 consumed by overwriting or updating can be conserved.

Figure 63:
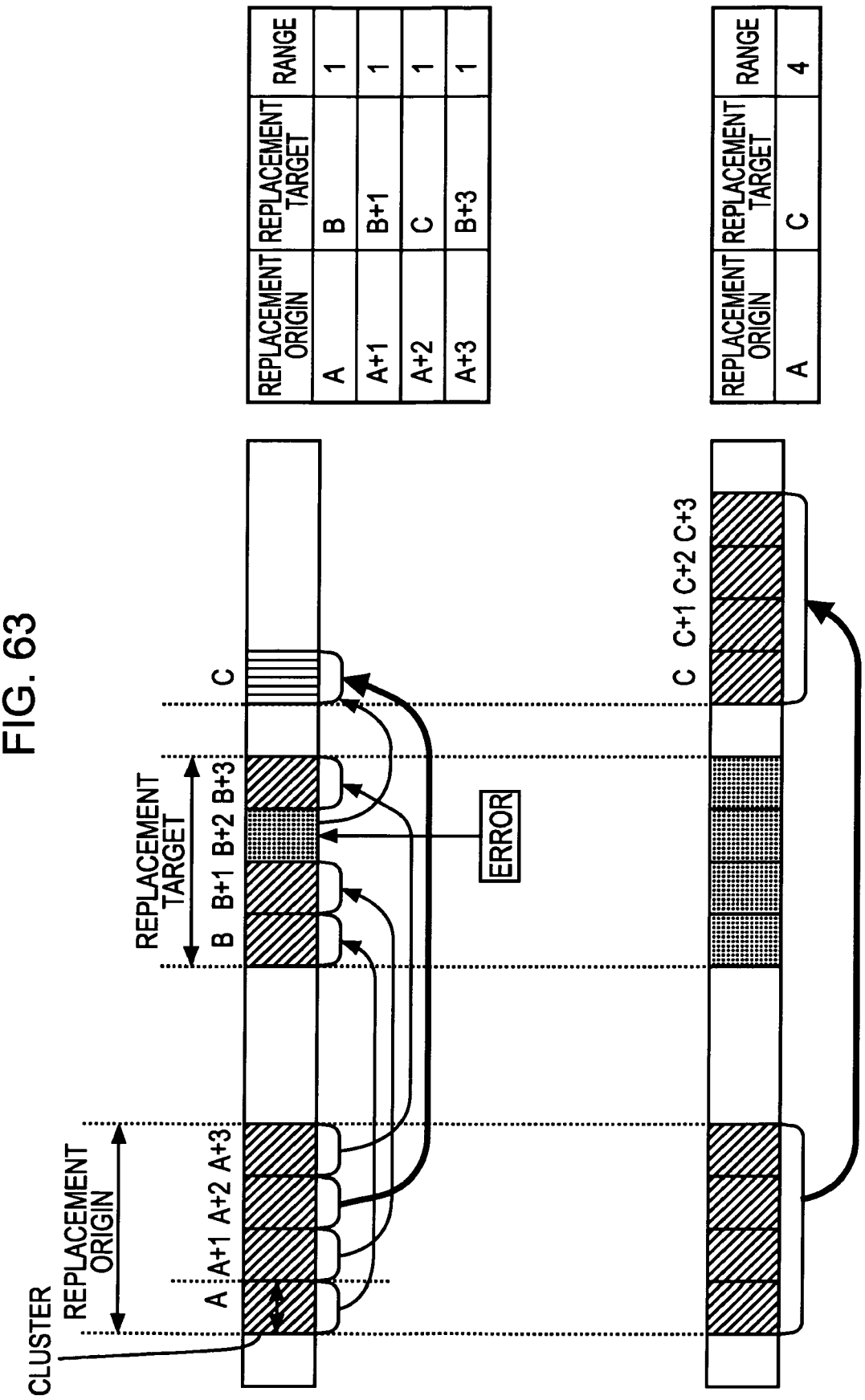
FIG. 63 is a diagram for describing replacement information management processing with the recording/playing mechanism section shown in FIG. 3.

Also, in the event that a temporary DL is recorded in step S625, as shown in FIG. 62 or FIG. 63 for example, the clusters are determined not to be sequential. That is to say, with FIG. 62 for example, the range of each one cluster with the replacement target addresses B and B+1 as the head corresponding to the replacement origin addresses A and A+1 is sequential, but the replacement target addresses corresponding to the replacement origin addresses A+2 and A+3 are a range of one cluster each of which D and B+3 are the head, meaning that the clusters are not sequential. Accordingly, in step S625, determination is made that there are not sequential, and the processing proceeds to step S626.

In step S626, the replacement information generating unit 64 re-situates the multiple replacement target addresses so as to be sequential, based on the information of the temporary DL. That is to say, as shown to the lower left in FIG. 62 for example, data of clusters sequentially situated at the range of the replacement origin addresses of A through A+3, are situated sequentially at the range of the replacement target addresses of D through D+3, and accordingly can be situated sequentially. Consequently, in step S627 which is subsequent processing, a final DL wherein a configuration is made at one place on another replacement target track, can be generated. Note that at the lower right in FIG. 62, a final DL is generated which indicates that the replacement origin is four clusters from the position of the head address which is A, and the replacement target is four clusters from the position of the head address which is D.

Consequently, the capacity of the recording medium 81 consumed by overwriting or updating can be conserved, the same as described above.

Further, in step S623, in the event that determination is made that a file made of multiple clusters at the replacement origin increases in size due to overwriting or updating, the replacement information generating unit 64 sequentially writes the clusters making up the data which has grown in size due to the overwriting processing at the replacement target.

Figure 65:
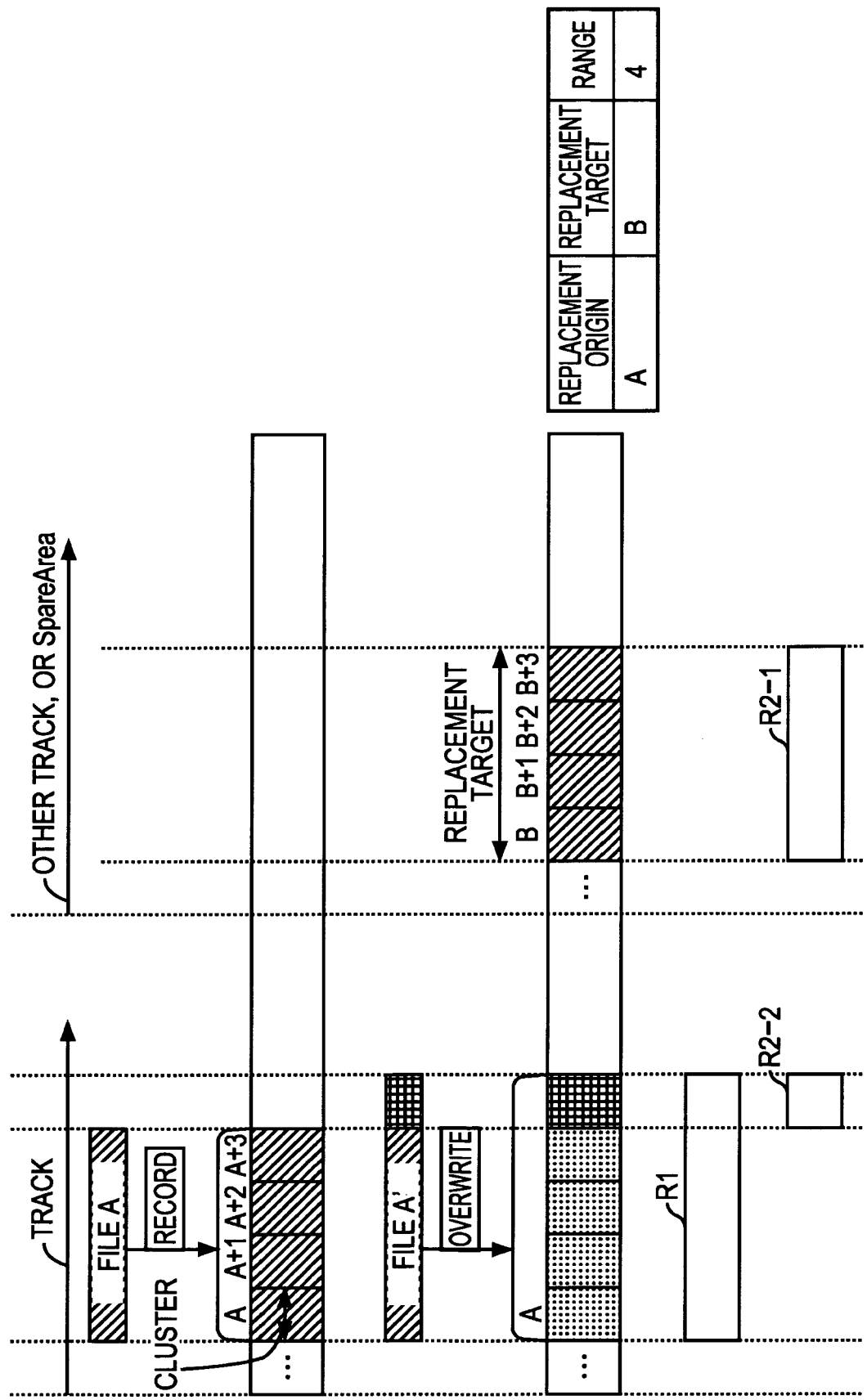
FIG. 65 is a diagram for describing real recording processing with the recording/playing mechanism section shown in FIG. 3.

That is, as shown to the upper side of FIG. 65, in the event that the replacement origin file A is recorded in the range of addresses A through A+3, and the file A' generated by overwriting this file A is increased in size by one cluster with the address A+4 shown to the middle left of FIG. 65 (the cluster indicated by the grid design square in FIG. 65), the replacement information generating unit 64 sequentially writes the one cluster of overwrite data with the address A+4 as the head thereof continuous from the replacement origin data.

Summarizing the above, in the event that the replacement target is not the same track but another track or SA region as described above, the logical region is indicated by a sequential range of addresses A through A+4 as indicated by range R1, and the physical recording range is the two locations of regions R2-1 and R2-2, as shown to the bottom in FIG. 65. Accordingly, in the event that file A is read out from the recording medium 81, readout is performed in the order of the regions R2-1 and R2-2, so physically, there is the need to physically read out in the direction opposite to the recording direction. Consequently, in the event that the replacement target is not the same track, file system processing can be managed easily since logical addresses are sequential. However, in this case, the cluster placement is not physically sequential, and further the readout order is switched, so file readout cannot be performed at high speed.

On the other hand, in the event that the replacement target is within the same track in step s622, the processing of steps S625 through S627 is executed in steps S629 through S631, and further, the processing of steps S623 and S624 is executed in steps S632 and S633. That is to say, the order of processing is switched. However, in step S633, the data of the cluster by which the file has increased in size is recorded sequentially with the data recorded to the replacement target.

Figure 66:
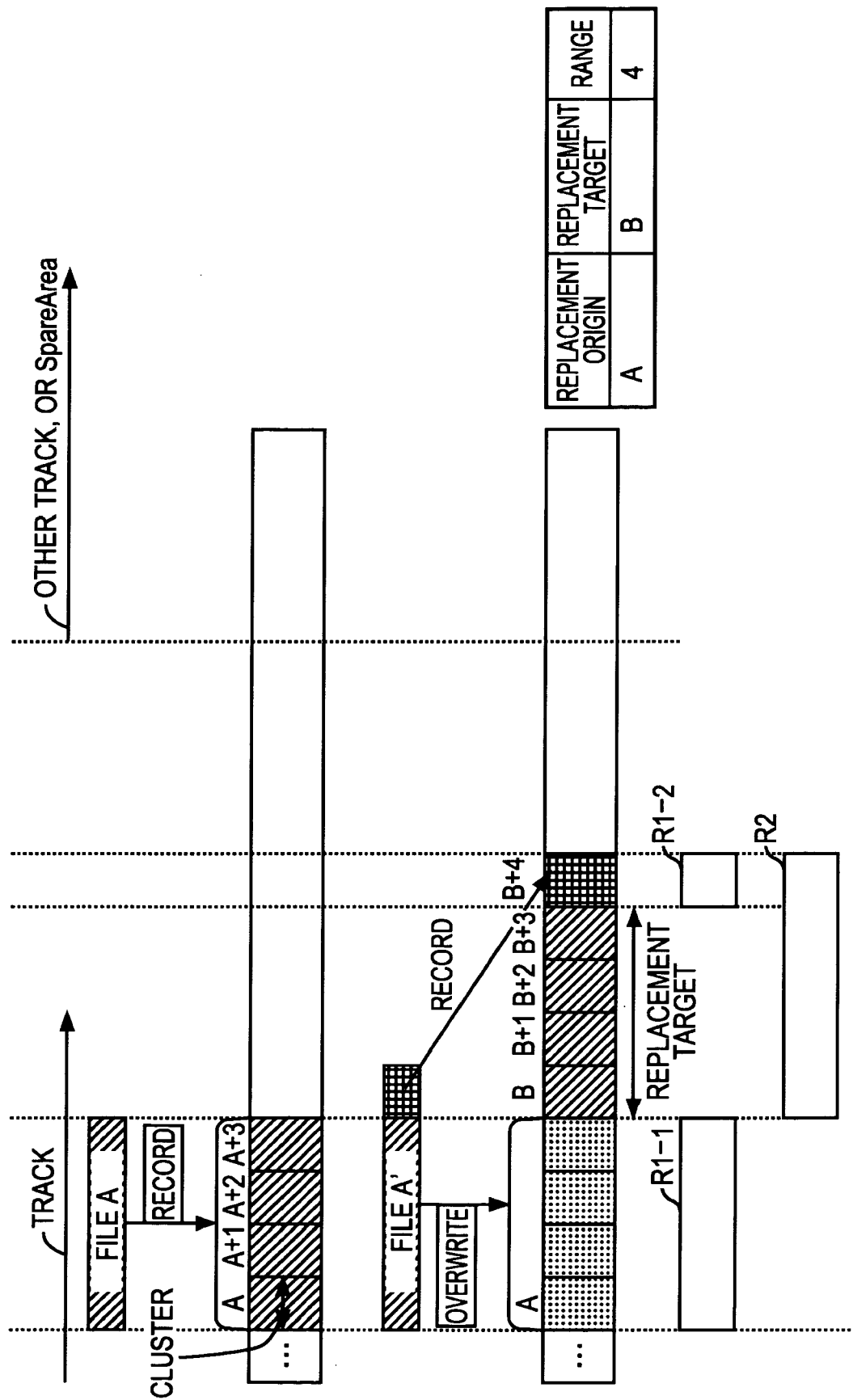
FIG. 66 is a diagram for describing real recording processing with the recording/playing mechanism section shown in FIG. 3.

That is to say, in the event that the replacement target is the same track, the replacement target is within the same track, so as shown to the middle in FIG. 66, this is a region of four clusters starting at the address B which is a position sequential as to the replacement target (a region of four clusters of which the head is address B (=A+4), and further, at the time of overwriting or updating to the position of the sequential address B+4, the cluster by which the size has increased (the cluster indicated by the grid design square) is recorded.

Summarizing the above, in the event that the replacement target is the same track as described above, the logical range is indicated by the two locations of the range of addresses A through A+3 shown as region R1-1 and the range of address B+4 shown as region R2-1, as shown to the lower side of FIG. 66, and the physical recording region is the one location of region R2. On the other hand, as shown to the lower side of FIG. 66, in the event of the file A being read out from the recording medium 81, the region R2 can be read out sequentially, meaning that physical readout as to the recording direction is facilitated.

Consequently, in the event that the replacement target is the same track, the logical address is split up for file system processing so management is difficult, but the placement is physically sequential, so file readout can be realized at high speed.

Note that the final DLs to the middle right in FIG. 65 and FIG. 66 are both the same in that the replacement origin is the four clusters from the address A and the corresponding replacement target is the four clusters from the address B. However, in FIG. 65 the address B is not within the same track, and in FIG. 66 the address B is within the same track.

That is to say, regarding whether or not to place the replacement target within the same track, each has its strong and weak points as described above, so these need to be used according to usage. For example, with moving image data or audio data or the like wherein the playing time of the recorded file information is temporally constrained, the replacement target is preferably recorded within the same track. On the other hand, in cases with databases or the like where there is no temporal constraint for playing, the replacement target is preferably not in the same track, to facilitate data management.

Further, the difference of whether or not to place the replacement target within the same track occurs to the contradiction between the logical placement and physical placement, but files to be recorded may be in any data format if recording is performed so as to resolve this contradiction.

For example, recording a file regarding which overwriting has been instructed on a new region without performing any replacement information management processing means that the logical placement and the physical placement agree.

Figure 67:
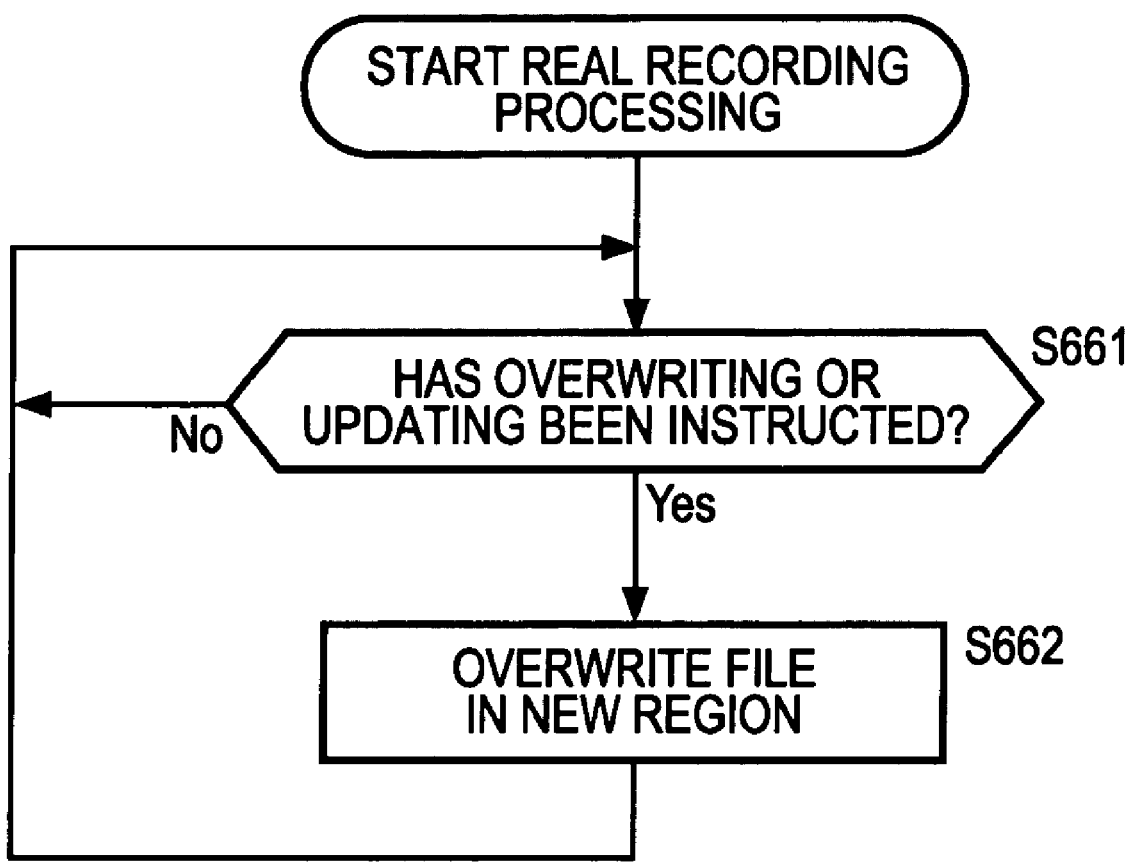
FIG. 67 is a flowchart for describing other real recording processing with the recording/playing mechanism section shown in FIG. 3.

FIG. 67 is a flowchart for describing real recording processing in a case of sequential recording of a file regarding which overwriting has been instructed in a new region, without performing any replacement information management processing.

In step S661, the file system information generating unit 62 determines whether new file overwriting or updating has been instructed, and repeats the processing until instructed. In the event that overwriting or updating has been instructed, in step S662 the file system information generating unit 62 records the overwritten or updated file in a new region.

Figure 68:
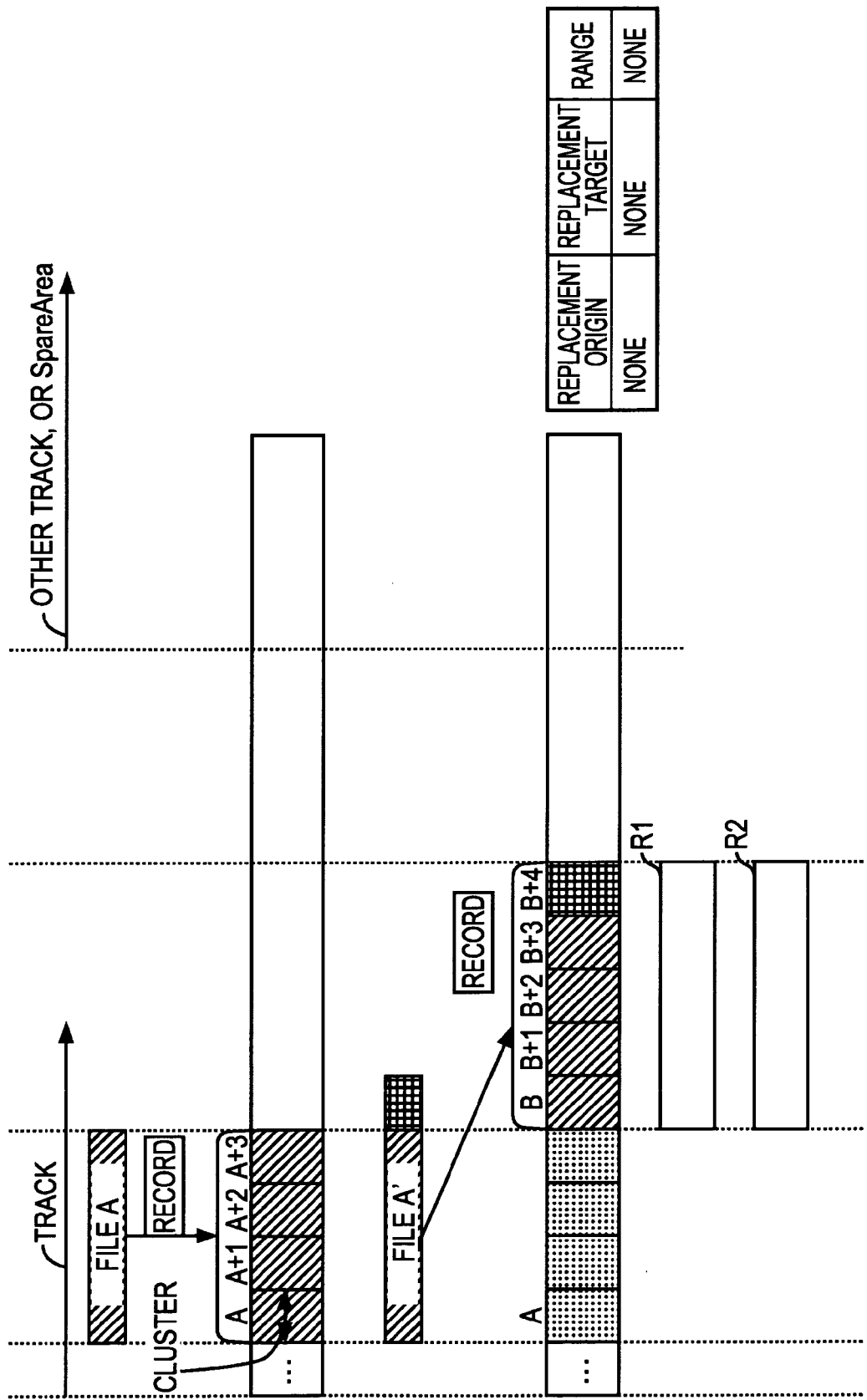
FIG. 68 is a diagram for describing other real recording processing with the recording/playing mechanism section shown in FIG. 3.

That is to say, as shown to the upper side in FIG. 68, in the event that the original file A is recorded in the range of addressees A through A+3, upon the file A being overwritten or updated as file A', overwriting or updating the file A' in the range of addresses B through B+4 continuing from the region where the file A was recorded as shown to the middle left in FIG. 68 means that the range R1 indicating the logical placement and the range R2 indicating the physical placement are the same as shown to the bottom in FIG. 68, so there is no contradiction, and therefore management and playing is facilitated for files of all formats, and readout can be performed at high speed. Note that in this case, the file to be overwritten or updated also has the logical address and physical address overwritten or updated, so registration to the DL is unnecessary, as shown to the middle right in FIG. 68 (there is no replacement origin, replacement target, and range information).

Figure 69:
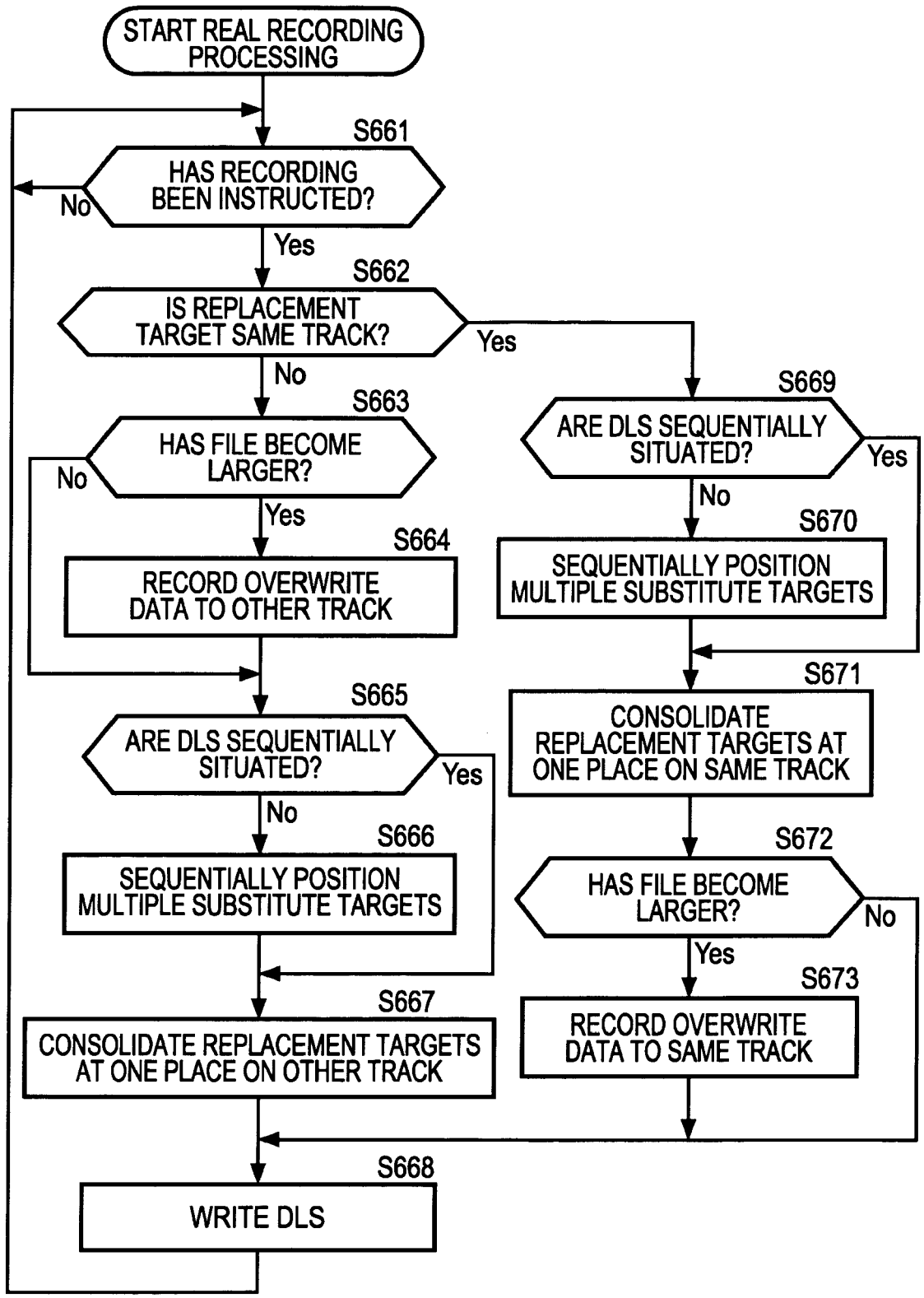
FIG. 69 is a flowchart for describing real recording processing with the recording/playing mechanism section shown in FIG. 3, at the time of a recording medium being mounted.

Next, real recording processing at the time of mounting the recording medium 81 will be described with reference to the flowchart in FIG. 69. The real recording processing at the time of mounting the recording medium 81 is processing performed for cases such as a DL recorded in a recording medium 81 being recorded in the format of a temporary DL, described in cluster units, and not grouped so that the replacement target addresses are sequential, in which case this is read out and grouped together at the point that the recording medium 81 is mounted. Note that in the flowchart in FIG. 69, the processing of steps S662 through S669 is the same as the processing of steps S622 and S625 through S631 in the flowchart in FIG. 64, and accordingly, description thereof will be omitted.

That is to say, in step S661, the processing is repeated until the recording medium 81 is mounted, and upon the recording medium 81 being mounted, the processing of steps S662 through S669 is executed.

Figure 70:
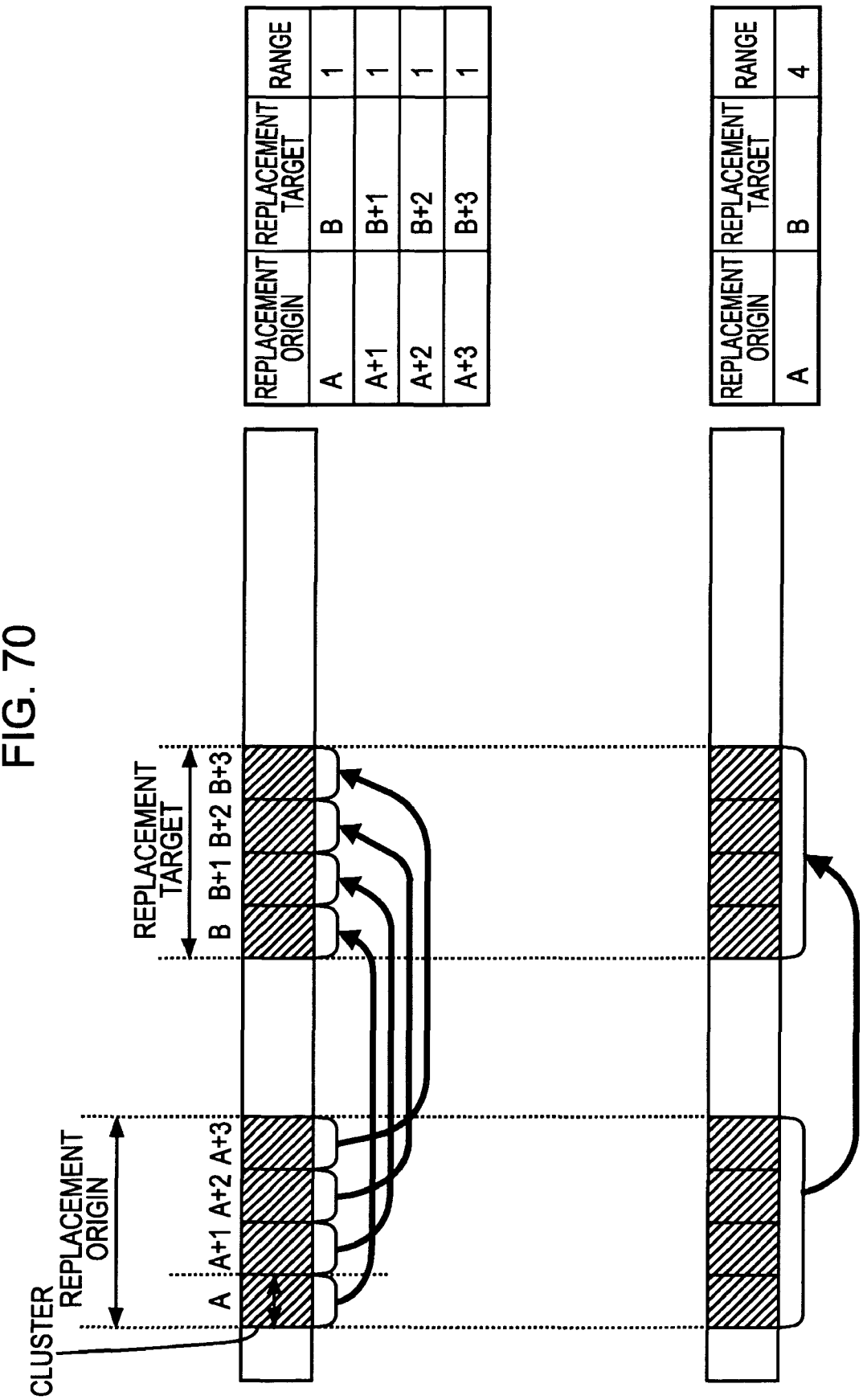
FIG. 70 is a diagram for describing real recording processing with the recording/playing mechanism section shown in FIG. 3, at the time of a recording medium being mounted.

For example, as shown to the upper right in FIG. 70, in the temporary DL at the upper side, the replacement target corresponding to the replacement origin of one cluster of which the head is the position of the address A, is the range of one cluster of which the head is the position of the address B, the replacement target corresponding to the replacement origin of one cluster of which the head is the position of the address A+1, is the range of one cluster of which the head is the position of the address B+1, the replacement target corresponding to the replacement origin of one cluster of which the head is the position of the address A+2, is the range of one cluster of which the head is the position of the address B+2, and the replacement target corresponding to the replacement origin of one cluster of which the head is the position of the address A+3, is the range of one cluster of which the head is the position of the address B+2. Accordingly, information is in units of clusters, so there is the need to compile a DL for each cluster, making the DL large.

However, with the real recording processing at the time of mounting the recording medium 81 described with reference to the flowchart in FIG. 69, the fact that the replacement target corresponding to the replacement origin of four clusters starting at the position of address A is the range of four clusters starting at the position of address B, can be represented in a single list (one set of information of the replacement origin, replacement target, and range) in the DL at the lower side of FIG. 70, so the configuration of the DL can be reduced in size. Also, due to this processing, even in the event of a recording medium 81 which has been recorded with information by a recording/playing device which does not have the functions of grouping the DL so as to be smaller, described with reference to the flowchart shown in FIG. 64, is mounted, the DL can be reduced in size at the point of being mounted, thereby enabling storage capacity which is consumed by DL recording in subsequent processing to be conserved.

According to the present invention, the User region or an SA region are used as replacement sectors at the time of adding or updating files, thereby facilitating updating of data which is required to be recorded at a location fixed at a logical address, such as file system information, anchor information, volume structure information, and stream data database files, and also facilitating readout of post-updating data. Also, at this time, one of the file system information, anchor information, volume structure information, and stream data database files, is selectively recorded to an SA region, so consumption of the capacity of the SA region can be reduced. Further, even in cases where files are frequently updated, there is no need to repeatedly sequentially re-situated and record the updated files, thereby enabling additional writing of data to write-at-once media, conservation of recording capacity necessary for updating, and so forth. Also, overwritten or updated file information is recorded as replacement for the pre-overwriting or updating information, using both the User region and SA regions, thereby allowing the usage region of the SA regions to be conserved. Further, at the time of recording, the placement of the clusters in the temporary DL is made sequential, so the list in the final DL can be made smaller, and accordingly can be made the final DL recorded in the recording medium 81.

The above-described series of processing can be executed by hardware, or can be executed by software. In the event of executing the series of processing by software, a computer is used in which a program configuring the software is built into dedicated hardware, or is installed from a recording medium to a general-use personal computer for example, capable of executing various types of functions by various types of programs being installed thereto.

The recording media recording the program is not only configured of packaged media storing the program such as a magnetic disk 41 (including flexible disks), optical disks 42 (including CD-ROM (Compact Disc-Read Only Memory) and DVD (Digital Versatile Disk)), or semiconductor memory 44 or the like distributed so as to provide the program to users, separately from the computer, as shown in FIG. 2, but also is configured or ROM 12 and a hard disk included in the storage unit 18 and so forth in which the program is recorded, provided to the user in a state of the program being built into the computer beforehand.

Note that in the present specification, steps describing the program recorded in the recording medium include, of course, processing performed following the time-sequence in the described order, but also include processing not processed according to the time-sequence and executed in parallel or individually.

The invention claimed is:

1. An information recording device that adapts a write-at-once optical disc to be recorded upon multiple times, the information recording device comprising:
   means for setting a replacement region and a user region, and also initializing the write-at-once optical disc;
   means for setting a first track where content is recorded in said user region, according to attributes of said content;
   means for recording the content to the first track and first file system information of a placement of said content in said write-at-once optical disc to the write-at-once optical disc;
   means for disabling readout of a non-defective area of the write-at-once optical disc where the first file system information of the placement of said content is recorded in said write-at-once optical disc in response to additional content being written to the write-at-once optical disc by the means for recording; and
   the means for recording records second file system information of a placement of said content and said additional content on the write-at-once optical disc to the replacement region of the write-at-once optical disc, wherein the second file system information uses a same logical address as the first file system information.

2. The information recording device according to claim 1, wherein said means for setting sets, in said user region, a track for recording each of a main file and a mirror file, made up of the second file system information of the placement of said content and said additional content.

3. The information recording device according to claim 1, wherein said means for setting sets, in said user region, a track for recording a management file made up of information for managing said content, in addition to the first file system information of the placement of said content recorded in said recording medium.

4. The information recording device according to claim 3, wherein said means for setting sets, in said user region, a track for recording an original management file made up of information for managing said content, and a backup management file, in addition to the first file system information of the placement of said content recorded in said write-at-once optical disc.

5. The information recording device of claim 1, wherein the means for recording records the second file system information at an ISA (inner spare area) region of the write-at-once optical disc.

6. An information recording method of adapting a write-at-once optical disc to be recorded upon multiple times, the method comprising:
   setting a replacement region and a user region, and also initializing the write-at-once optical disc;
   setting a first track where content is recorded in said user region, according to attributes of said content;

recording the content to the first track and first file system information of the placement of said content in said write-at-once optical disc to the write-at-once optical disc;

disabling readout of a non-defective area of the write-at-once optical disc where the first file system information of the placement of said content is recorded in said write-at-once optical disc in response to additional content being written to the write-at-once optical disc; and recording second file system information of a placement of said content and said additional content to the replacement region of said write-at-once optical disc, wherein the second file system information uses a same logical address as the first file system information.

7. A non-transitory computer readable storage medium storing a computer-readable program, which when executed by a computer causes the computer to execute a method of adapting a write-at-once optical disc to be recorded upon multiple times, the method comprising:

setting a replacement region and a user region, and also initializing the write-at-once optical disc;

setting a first track where content is recorded in said user region, according to attributes of said content;

recording the content to the first track and first file system information of the placement of said content in said write-at-once optical disc to the write-at-once optical disc;

disabling readout of a non-defective area of the write-at-once optical disc where the first file system information of the placement of said content is recorded in said write-at-once optical disc in response to additional content being written to the write-at-once optical disc; and recording second file system information of a placement of said content and said additional content to the replacement region of said write-at-once optical disc, wherein the second file system information uses a same logical address as the first file system information.

8. An information recording device that adapts a write-at-once optical disc to be recorded upon multiple times, the information recording device comprising:

an initializing unit that sets a replacement region and a user region, and also initializes the write-at-once optical disc;

a processor that sets a first track where content is recorded in said user region, according to attributes of said content; and a recording unit that records the content to the first track and first file system information of a placement of said content in said write-at-once optical disc to the write-at-once optical disc, wherein the processor disables readout of a non-defective area of the write-at-once optical disc where the first file system information of the placement of said content is recorded in said write-at-once optical disc in response to additional content being written to the recording medium by the recording unit, and the recording unit records second file system information of a placement of said content and the additional content to the write-at-once optical disc, wherein the second file system information uses a same logical address as the first information.

* * * * *